US008626626B2

(12) United States Patent
Hardison, III

(10) Patent No.: US 8,626,626 B2
(45) Date of Patent: Jan. 7, 2014

(54) METHOD OF AND SYSTEM FOR CAPTURING INTEREST EARNED ON THE MONETARY VALUE OF TRANSFERRED MONETARY RIGHTS MANAGED ON AN INTERNET-BASED MONETARY RIGHTS TRANSFER (MRT) NETWORK SUPPORTED BY A REAL-TIME GROSS SETTLEMENT (RTGS) SYSTEM

(75) Inventor: Joseph H. Hardison, III, Darien, CT (US)

(73) Assignee: Interest Capturing Systems, LLC, Darien, CT (US)

( * ) Notice: Subject to any disclaimer, the term of this patent is extended or adjusted under 35 U.S.C. 154(b) by 31 days.

(21) Appl. No.: 13/173,376

(22) Filed: Jun. 30, 2011

(65) Prior Publication Data

US 2012/0016782 A1 Jan. 19, 2012

Related U.S. Application Data

(63) Continuation-in-part of application No. 12/987,260, filed on Jan. 10, 2011, now abandoned, which is a continuation of application No. 11/651,413, filed on Jan. 9, 2007, now abandoned, and a continuation-in-part of application No. 12/987,255, filed on Jan. 10, 2011, now abandoned, which is a continuation of application No. 11/328,433, filed on Jan. 9, 2006, now abandoned.

(51) Int. Cl.
*G06Q 40/00* (2012.01)

(52) U.S. Cl.
USPC .............................................. 705/35; 705/39

(58) Field of Classification Search
USPC ..................................................... 705/35, 39
See application file for complete search history.

(56) References Cited

U.S. PATENT DOCUMENTS

| | | | |
|---|---|---|---|
| 4,507,745 | A | 3/1985 | Agrawal |
| 4,751,640 | A | 6/1988 | Lucas et al. |
| 5,082,275 | A | 1/1992 | Nilssen |
| 5,297,026 | A | 3/1994 | Hoffman |
| 5,794,234 | A | 8/1998 | Church et al. |
| 5,802,499 | A | 9/1998 | Sampson et al. |
| 5,832,461 | A | 11/1998 | Leon et al. |

(Continued)

FOREIGN PATENT DOCUMENTS

WO 2007081936 A 7/2007

OTHER PUBLICATIONS

"Fedwire", Federal Reserve Wire Network, pp. 1-2, (Jun. 7, 2006).*

(Continued)

*Primary Examiner* — Sarah M Monfeldt
*Assistant Examiner* — John Scarito
(74) *Attorney, Agent, or Firm* — Thomas J. Perkowski, Esq., P.C.

(57) ABSTRACT

Method of capturing interest associated with a whole or partial amount of money possessed or controlled by an owner/holder and held in a first account maintained by a home financial institution, associated with a monetary rights transfer (MRT) network operably connected to the infrastructure of the Internet and a real-time gross settlement (RTGS) system, and the home financial institution or an external financial institution associated with the MRT network, maintaining a second account, interest bearing, for the owner/holder of the amount of money to capture interest.

20 Claims, 164 Drawing Sheets

(56) References Cited

U.S. PATENT DOCUMENTS

| | | | |
|---|---|---|---|
| 5,839,118 | A | 11/1998 | Ryan et al. |
| 5,852,811 | A | 12/1998 | Atkins |
| 5,892,900 | A | 4/1999 | Ginter et al. |
| 5,911,135 | A | 6/1999 | Atkins |
| 5,924,082 | A | 7/1999 | Silverman et al. |
| 5,933,817 | A | 8/1999 | Hucal |
| 5,943,422 | A | 8/1999 | Van Wie et al. |
| 5,991,876 | A | 11/1999 | Johnson et al. |
| 6,006,332 | A | 12/1999 | Rabne et al. |
| 6,021,397 | A | 2/2000 | Jones et al. |
| 6,049,782 | A | 4/2000 | Gottesman et al. |
| 6,112,181 | A | 8/2000 | Shear et al. |
| 6,112,189 | A | 8/2000 | Rickard et al. |
| 6,157,920 | A | 12/2000 | Jakobsson et al. |
| 6,192,405 | B1 | 2/2001 | Bunnell |
| 6,233,566 | B1 | 5/2001 | Levine et al. |
| 6,240,185 | B1 | 5/2001 | Van Wie et al. |
| 6,240,399 | B1 | 5/2001 | Frank et al. |
| 6,304,860 | B1 | 10/2001 | Martin, Jr. et al. |
| 6,324,525 | B1 | 11/2001 | Kramer et al. |
| 6,327,652 | B1 | 12/2001 | England et al. |
| 6,330,670 | B1 | 12/2001 | England et al. |
| 6,449,367 | B2 | 9/2002 | Van Wie et al. |
| 6,460,082 | B1 | 10/2002 | Lumelsky et al. |
| 6,609,113 | B1 | 8/2003 | O'Leary et al. |
| 6,618,484 | B1 | 9/2003 | Van Wie et al. |
| 6,618,808 | B1 | 9/2003 | Johnson et al. |
| 6,658,568 | B1 | 12/2003 | Ginter et al. |
| 6,769,032 | B1 | 7/2004 | Katiyar et al. |
| 6,795,922 | B2 | 9/2004 | Johnson et al. |
| 6,850,252 | B1 | 2/2005 | Hoffberg |
| 6,859,880 | B2 | 2/2005 | Johnson et al. |
| 6,868,408 | B1 | 3/2005 | Rosen |
| 6,904,432 | B2 | 6/2005 | Charlot et al. |
| 6,938,021 | B2 | 8/2005 | Shear et al. |
| 6,968,021 | B1 | 11/2005 | White et al. |
| 6,968,996 | B2 | 11/2005 | Reddy et al. |
| 6,993,508 | B1 | 1/2006 | Major et al. |
| 7,073,199 | B1 | 7/2006 | Raley |
| 7,092,914 | B1 | 8/2006 | Shear et al. |
| 7,092,953 | B1 | 8/2006 | Haynes |
| 7,099,849 | B1 | 8/2006 | Reeder et al. |
| 7,110,983 | B2 | 9/2006 | Shear et al. |
| 7,124,302 | B2 | 10/2006 | Ginter et al. |
| 7,130,829 | B2 | 10/2006 | Banerjee et al. |
| 7,143,066 | B2 | 11/2006 | Shear et al. |
| 7,194,092 | B1 | 3/2007 | England et al. |
| 7,209,892 | B1 | 4/2007 | Galuten et al. |
| 7,237,125 | B2 | 6/2007 | Raley et al. |
| 7,240,196 | B2 | 7/2007 | Cooper et al. |
| 7,281,274 | B2 | 10/2007 | Manning et al. |
| 7,290,699 | B2 | 11/2007 | Reddy et al. |
| 7,302,483 | B1 | 11/2007 | Carbone et al. |
| 7,308,717 | B2 | 12/2007 | Koved et al. |
| 7,310,729 | B2 | 12/2007 | Gordon et al. |
| 7,313,814 | B2 | 12/2007 | Zhu et al. |
| 7,360,030 | B1 | 4/2008 | Georgiev |
| 7,360,098 | B2 | 4/2008 | Johnson et al. |
| 7,389,273 | B2 | 6/2008 | Irwin et al. |
| 7,436,958 | B2 | 10/2008 | Ji et al. |
| 7,523,054 | B2 | 4/2009 | Tyson-Quah |
| 7,536,347 | B2 | 5/2009 | Tyson-Quah |
| 2002/0013767 | A1 | 1/2002 | Katz |
| 2002/0022966 | A1 | 2/2002 | Horgan |
| 2002/0087461 | A1 | 7/2002 | Ganesan et al. |
| 2002/0116331 | A1 | 8/2002 | Cataline et al. |
| 2002/0185529 | A1 | 12/2002 | Cooper et al. |
| 2003/0018563 | A1 | 1/2003 | Kilgour et al. |
| 2003/0018694 | A1 | 1/2003 | Chen et al. |
| 2003/0070080 | A1 | 4/2003 | Rosen |
| 2003/0091635 | A1 | 5/2003 | Baichwal et al. |
| 2003/0097331 | A1 | 5/2003 | Cohen |
| 2003/0140003 | A1 | 7/2003 | Wang et al. |
| 2003/0212641 | A1 | 11/2003 | Johnson |
| 2003/0216990 | A1 | 11/2003 | Star |
| 2003/0225688 | A1 | 12/2003 | Dobbins |
| 2003/0236726 | A1 | 12/2003 | Almonte et al. |
| 2004/0044632 | A1 | 3/2004 | Onn et al. |
| 2004/0153403 | A1 | 8/2004 | Sadre |
| 2005/0097017 | A1 | 5/2005 | Hanratty |
| 2005/0125323 | A1* | 6/2005 | Warren ........................... 705/35 |
| 2006/0031154 | A1 | 2/2006 | Noviello et al. |
| 2007/0055594 | A1 | 3/2007 | Rivest et al. |
| 2007/0162369 | A1 | 7/2007 | Hardison |
| 2007/0233590 | A1 | 10/2007 | Hardison |
| 2008/0201230 | A1 | 8/2008 | Hardison |
| 2010/0318445 | A1 | 12/2010 | Hardison, III |
| 2011/0166998 | A1 | 7/2011 | Hardison, III |
| 2012/0016782 | A1 | 1/2012 | Hardison, III |

OTHER PUBLICATIONS

"Fedwire®", Federal Reserve Wire Network, pp. 1-2, (Jun. 7, 2006).

"Wholesale Payment Systems IT Examination Handbook", Federal Financial Institutions Examination Council, pp. 1-34, A1-E2, (Jul. 2004).

Allsopp, Peter et al. "The Evolution of Real-Time Gross Settlement", The World Bank, Financial Infrastructure Series/Payment Systems Development Group, pp. 1-53, (Feb. 2009).

Article entitled "Investors Get Shortchanged on Interest" by Aaron Lucchetti, Wall Street Journal, Feb. 17, 2005, pp. D1-D2.

Article entitled "Sweep Yields Can Make You Weep" by Joan Goldwasser, Kiplinger's Personal Finance magazine, May 2005, 1 page.

Article entitled "Wall Street Cuts Yield on Investors' Cash" Jane J. Kim, Wall Street Journal, Aug. 31, 2005, pp. D1 and D3.

Furfine, Craig et al. "Analyzing Alternative Intraday Credit Policies in Real-Time Gross Settlement Systems", Board of Governors of the Federal Reserve System, Washington, D.C., pp. 1-24, (Aug. 11, 1997).

Penner, J.E., "The Bundle of Rights's Picture of Property", 43 UCLA L. Rev. 711 1995-1996. 74 pages.

Search Report for PCT/US07/00500 completed Nov. 13, 2007.

* cited by examiner

The Nature of Money – A Complex Instrument

National Interest Rate Discrepancies (Examples)

| Product | Highest Rate | National Average | %Difference |
|---|---|---|---|
| Money Mkt. | 4.30% | 0.74% | 481.1% |
| 1 Month CD | 4.00% | 1.53% | 161.4% |
| 2 Month CD | 4.00% | 1.57% | 154.8% |
| 3 Month CD | 4.30% | 2.26% | 90.3% |
| 6 Month CD | 4.60% | 2.81% | 63.7% |
| 1 Year CD | 4.90% | 3.31% | 48.1% |
| 2 Year CD | 4.95% | 3.52% | 40.6% |
| 5 Year CD | 5.15% | 4.04% | 27.5% |

Jumbo Rates

| Product | Highest Rate | National Average | %Difference |
|---|---|---|---|
| Money Mkt. | 4.75% | 1.91% | 148.7% |
| 1 Month CD | 4.00% | 2.07% | 93.2% |
| 2 Month CD | 4.00% | 2.16% | 85.2% |
| 3 Month CD | 4.45% | 2.69% | 65.4% |
| 6 Month CD | 4.60% | 3.20% | 43.8% |
| 1 Year CD | 4.84% | 3.62% | 33.7% |
| 2 Year CD | 4.91% | 3.77% | 30.2% |
| 5 Year CD | 5.17% | 4.15% | 24.6% |

Source: BankRate.com, Tuesday, December 13, 2005

FIG. 2C
(Prior Art)

Conventional Money Transfer Systems

Recognition of the Set of Individual, Separable Rights Possessed by an Owner of Money ("CASH") in Accordance with the Principles of the Present Invention

U.S. Dollar Based System

1) Right To Invest = R (α, $)
2) Right To Earn interest = R (β, $)
3) Right Use as Collateral = R (χ, $)
4) Right Security/store of value = R (δ, $)
5) Right To Make Purchases = R (ε, $)
6) Right To Make Payments = R (ϕ, $)
7) Right To Lend = R (γ, $)
8) Right To Borrow = R (η, $)
9) Right To Gift = R (ι, $)

*i* = accrued interest

Thus the entire set of rights possessed by an owner of U.S. currency ("CASH ($)") can be represented as follows:

{R (α…ι, $)} = {R (α, $), R (β, $), R (χ, $), R (δ, $), R (ε, $), R (ϕ, $), R (γ, $), R (η, $), R (ι, $)}

Similarly, the entire set of rights possessed by an owner of British Pound Sterling ("CASH (GBP)") can be represented as follows:

{R (α…ι, GBP)} = {R (α, GBP), R (β, GBP), R (χ, GBP), R (δ, GBP), (ε, GBP), R (ϕ, GBP), R (γ, GBP), R (η, GBP), R (ι, GBP) }

FIG. 4A

Similarly, the entire set of rights possessed by an owner of Japanese Yen ("CASH (JPY)") can be expressed as follows:

$$\{R(\alpha\ldots\iota, JPY)\} = \{R(\alpha, JPY), R(\beta, JPY), R(\chi, JPY), R(\delta, JPY), R(\varepsilon, JPY), R(\phi, JPY), R(\gamma, JPY), R(\eta, JPY), R(\iota, JPY)\}$$

Any set of rights possessed by the holder of any currency can be represented in this manner.

FIG. 4B

Monetary Right(s) Transfer Network (MRTN) Utilizing Real-Time Gross Settlement (RTGS) within the Global Financial Marketplace MRT Network Universal Financial Institution Account Opening Process MRT Network Universal Financial Institution Account Opening Process/Graphic User Interface

MRT Network System
Enterprise Level Computer Network
(ELCN)
MRT Universal Financial Account Opening Form

Personal/Business Information

Name: ______________________
Address: ____________________
Email Address: _______________
Phone # _____________________
Tax ID # _ _ _ - _ _ - _ _ _ _
DOB: _ _ - _ _ - _ _ _ _
Driver's License Number__________

Accounts

Home Bank: __________________
Account Number(s):
Checking: ____________________
Savings: _____________________
Money Market: _______________
CD: _________________________
Mortgage Servicer:______________
Account Number: ______________
Employer: ____________________
Employer Tax ID # _ _ - _ _ _ _ _ _ _
Prepaid Accounts: Debit Cards, Gift Cards, Peyroll Cards, Benefits Cards, EZ Pass Account, Others STANDARDIZED BANK ACCOUNT LEGALESE AGREED TO BY ALL PARTICIPATING FINANCIAL INSTITUTIONS AND MRT USERS

FIG. 8

MRT Network Universal Financial Institution Account Opening Process

Internet-Based Monetary Right(s) Transfer (MRT) Network of the Present Invention Illustrative Example of a Monetary Rights Transfer (MRT) Network Using Fedwire Real Time Gross Settlement (RTGS) to Support the MRT Process Monetary Value Accounting on the MRT Network

Monetary Value Accounting

Definitions

Monetary Value: MV

MV Properties:

MV Type:

CASH Principle (CPj)
CASH Interest (CIj)
Monetary Rights (Rj (α…ι, $))
FRB Credit (FRBCj)
FRB Debit (FRBDj)

Currency Type: $, EUR, JPY, etc.

Origin Type:

CASH Principle (CPk)
CASH Interest (CIk)
Monetary Rights (Rk)
FRB Credit (FRBCk)
FRB Debit (FRBDk)

Variable: Time (t)

Monetary Rights (MR) Types:

1) Right to Earn Interest (R (β, $))
2) Right to Invest (R (α, $))
3) Right to Lend (R (γ, $))
4) Right to Use as Collateral (R (χ, $))
5) Right of Security (store of value) (R (δ, $))
6) Right to Purchase (R (ε, $))
7) Right to Pay (R (φ, $))
8) Right to Borrow (R (η, $))
9) Right to Gift (R (ι, $))

FIG. 11A1

MRT Control Function and Monetary Value Relationships Across the MRT Network

| |
|---|
| **MRT Control Function**<br><br>$\sum MV(Rj(\alpha \ldots \iota, \$, Rk, t)) \leq MV(CPj, \$, CPk, t)$ |
| **Monetary Value Relationships across the MRT Network**<br><br>$MV(CPj, \$, CPk, t) = MV(Rj(\alpha \ldots \iota, \$, CPj, t)) = MV(FRBCj, \$, Rk, t) =$<br>$MV(FRBDj, \$, Rk, t)$ |

FIG. 11A2

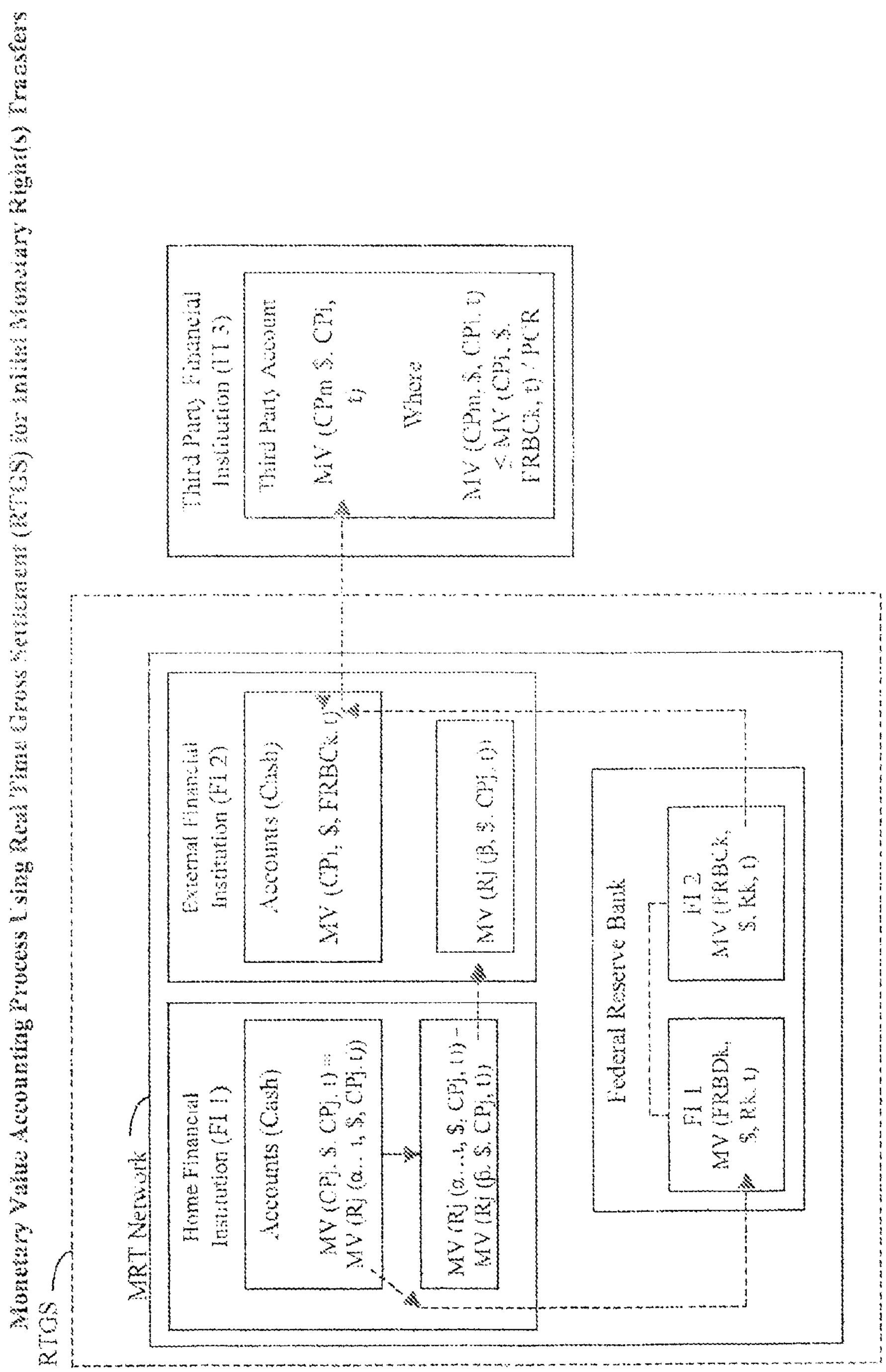
FIG. 11B1

Monetary Value Accounting Process Using Real Time Gross Settlement (RTGS) for Initial Monetary Right(s) Transfers
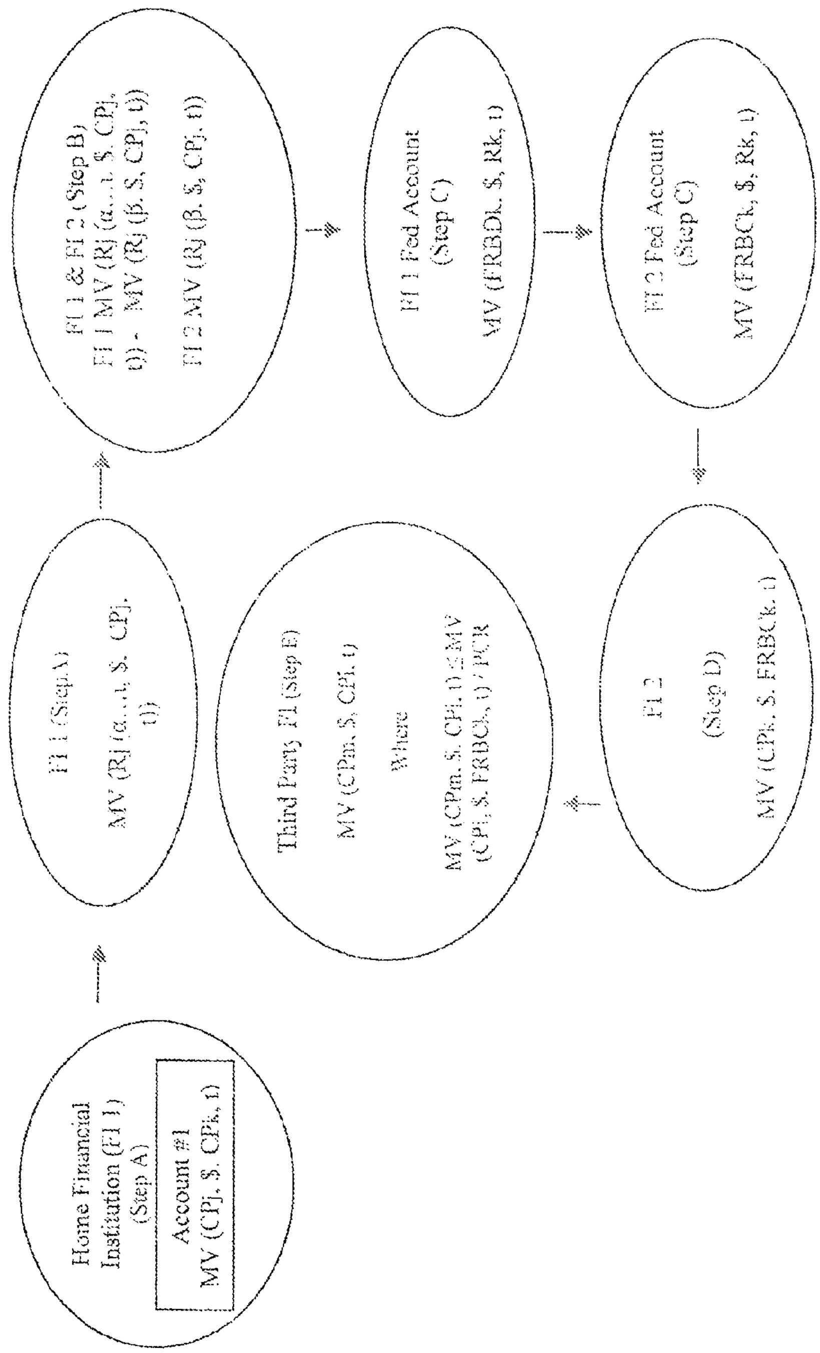
FIG. 11B2

Monetary Value Accounting Process Using Real Time Gross Settlement (RTGS) for Initial Monetary Right(s) Transfers

Initial Outgoing Monetary Right(s) Transfer Equations:

Home Bank Starting Balance: $MV(CPj, \$, CPk, t) = MV(Rj(\alpha \ldots \iota, \$, CPj, t))$ Home Bank: $MV(Rj(\alpha \ldots \iota, \$, CPj, t)) - MV(Rj(\beta, \$, CPj, t)) = MV(FRBDk, \$, Rk, t) - MV(Rj(\beta, \$, CPj, t))$ Receiving Bank: $MV(FRBCk, \$, Rk, t) + MV(Rj(\beta, \$, CPj, t)) = MV(CPk, \$, FRBCk, t) + MV(Rj(\beta, \$, CPj, t))$ Home Bank Ending Balance: $MV(CPj, \$, CPk, t) - MV(Rj(\beta, \$, CPj, t)) = MV(FRBDk, \$, Rk, t) - MV(Rj(\beta, \$, CPj, t))$ Receiving Bank Ending Balance: $MV(FRBCk, \$, Rk, t) + MV(Rj(\beta, \$, CPj, t)) = MV(CPk, \$, FRBCk, t) + MV(Rj(\beta, \$, CPj, t))$ Federal Reserve Bank Ending Balances: Home Bank $= MV(FRBDk, \$, Rk, t)$
Receiving Bank $= MV(FRBCk, \$, Rk, t)$ MRT Accounting Balance: Home Bank: $MV(Rj(\alpha \ldots \iota, \$, Rk, t)) - MV(Rj(\beta, \$, CPj, t))$
Receiving Bank: $MV(Rj(\beta, \$, CPj, t))$

FIG. 11B3

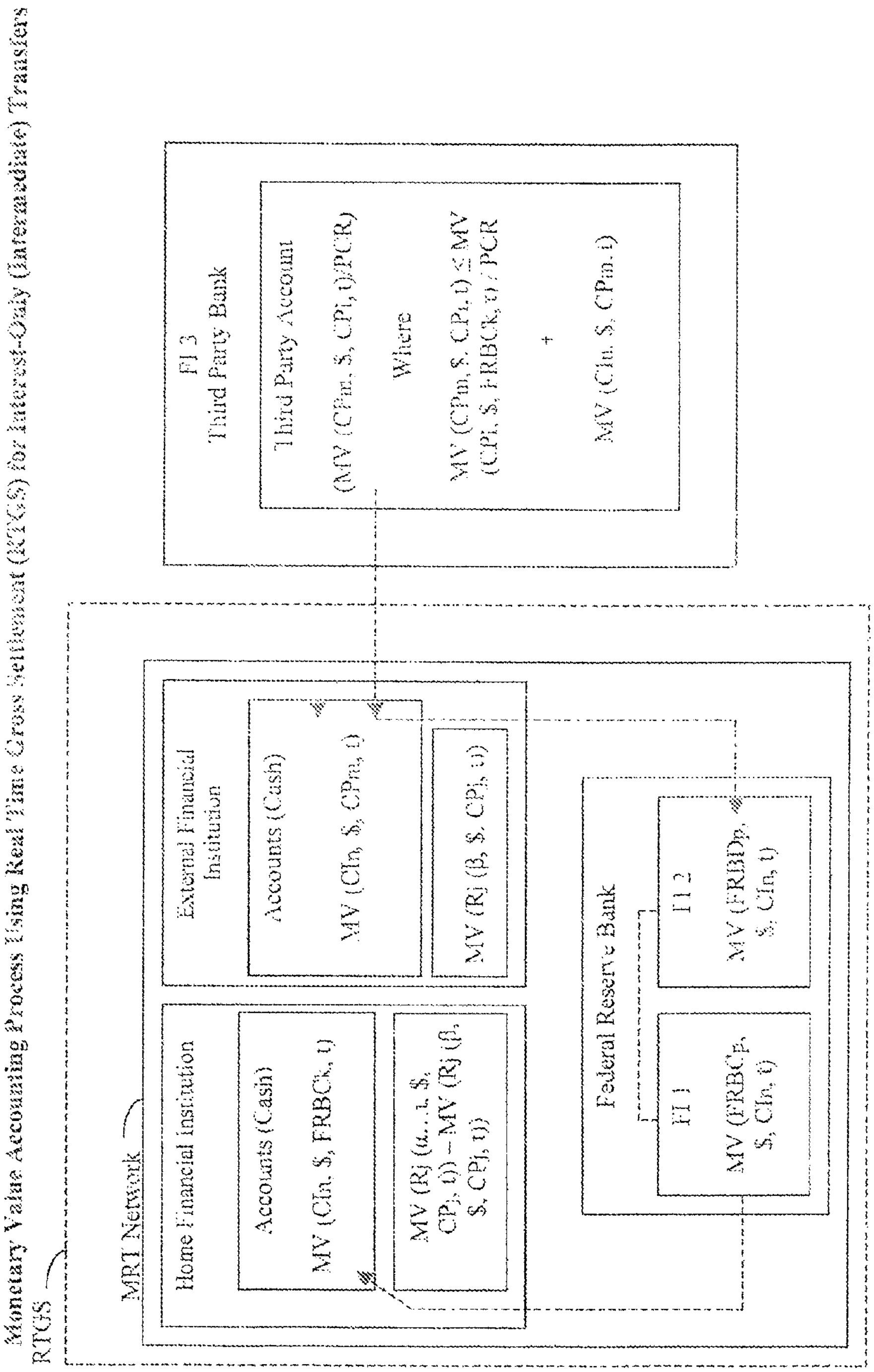
FIG. 11C1

Monetary Value Accounting Process Using Real Time Gross Settlement (RTGS) for Interest-Only (Intermediate) Transfers
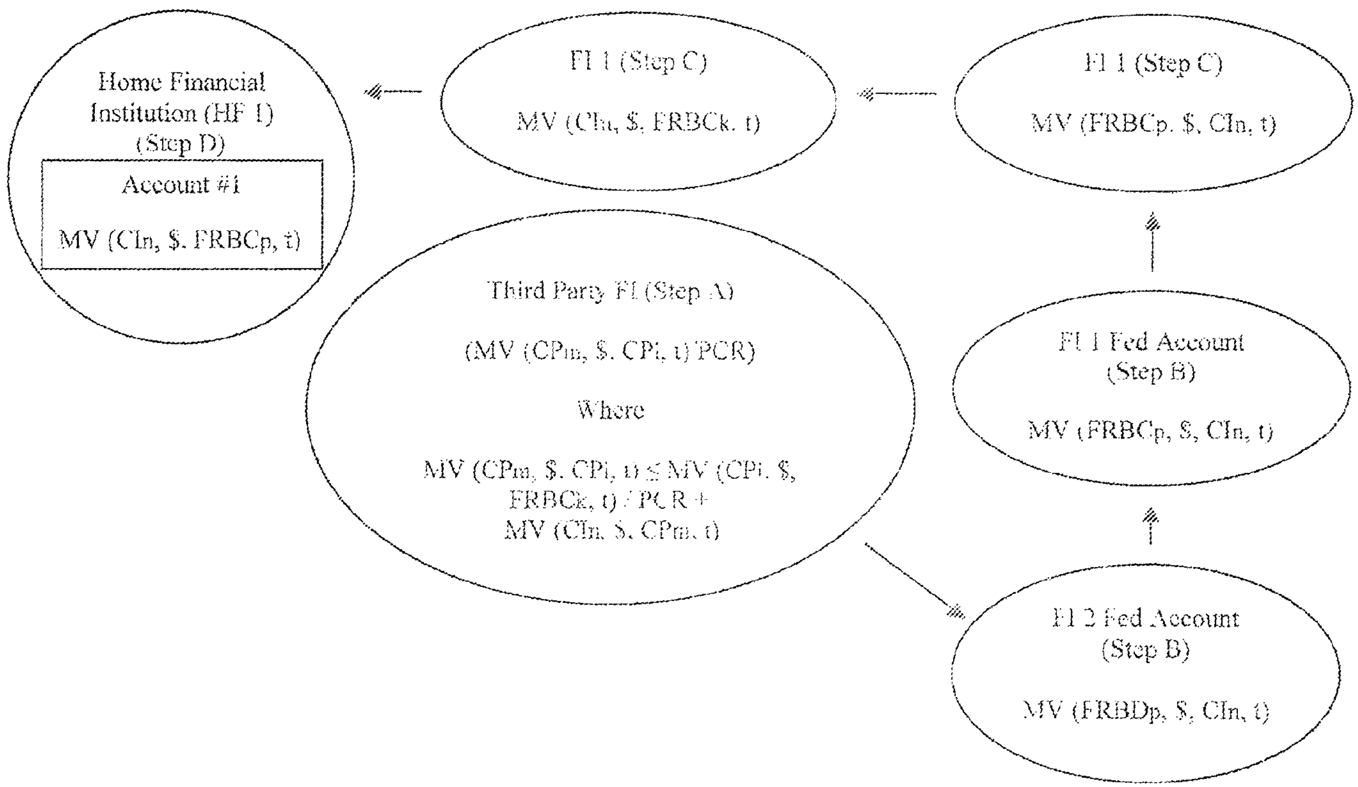
FIG. 11C2

Monetary Value Accounting Process Using Real Time Gross Settlement (RTGS) for Interest-Only (Intermediate) Transfers

Final Closing Monetary Right(s) Transfer Equation:

Receiving Bank Starting Balance: MV (CIn, \$, CPm, t) + MV (Rk (β, \$, CPj, t))

Receiving Bank: (MV (FRBDp, \$, CPm, t) + MV (Rk (β, \$, CPj, t)) - MV (FRBDp, \$, CIn, t))

Home Bank: MV (FRBCp, \$, CIn, t))

Home Bank Ending Balance: (MV (Rj (α…ι, \$, CPj, t)) - MV (Rk (β, \$, CPj, t))) + MV (CIn, \$, FRBCp, t)
= MV (CIn, \$, FRBCp, t)

Receiving Bank Ending Balance: 0

Federal Reserve Bank Ending Balances:
Home Bank = MV (FRBCp, \$, CIn, t))
Receiving Bank = MV (FRBDp, \$, CIn, t)

MRT Accounting Balance: Home Bank: MV (Rj (α…ι, \$, Rk, t) - MV (Rk (β, \$, CPj, t))
Receiving Bank: MV (Rk (β, \$, CPj, t))

FIG. 11C3

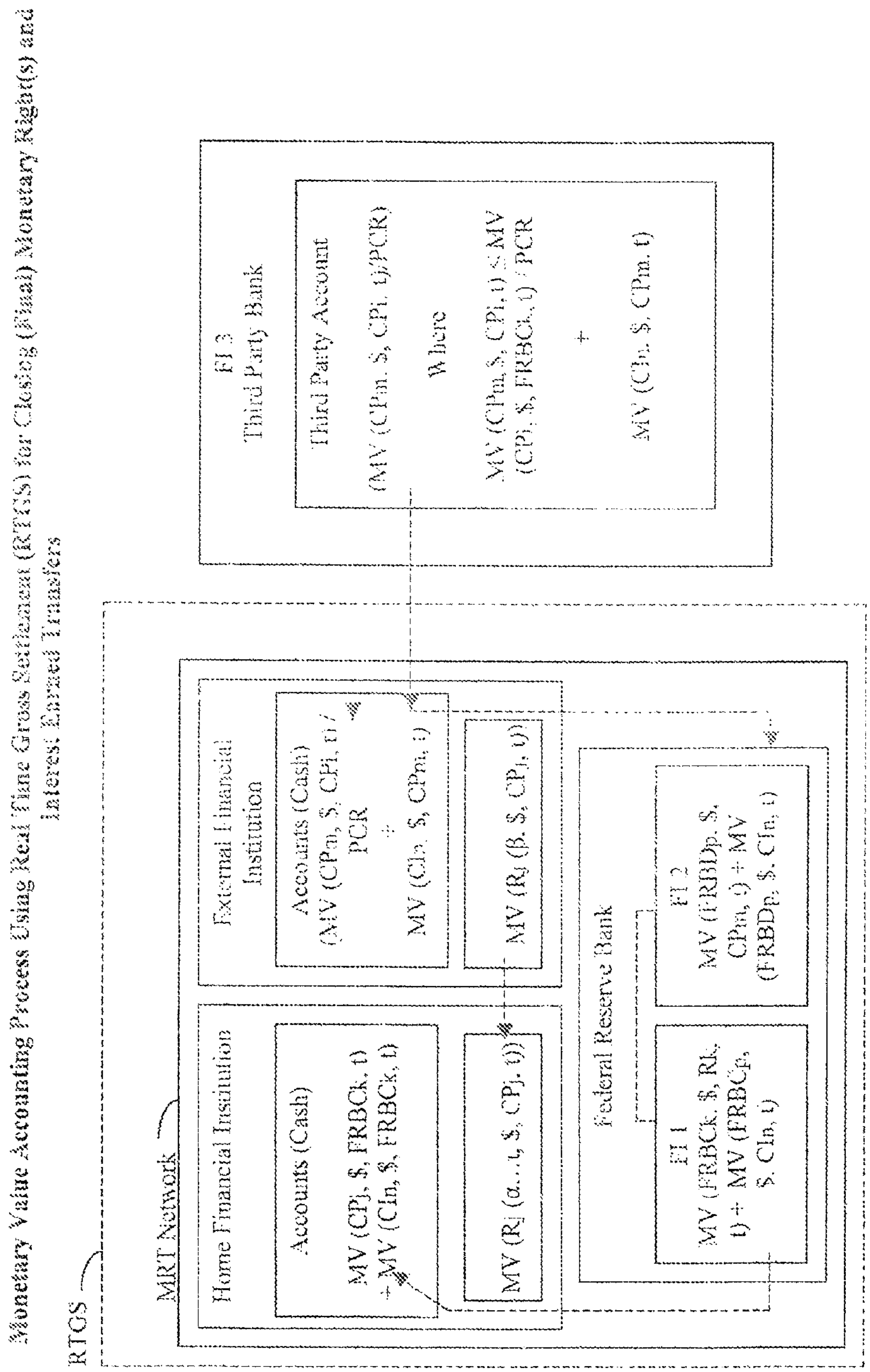
FIG. 11D1

Monetary Value Accounting Process Using Real Time Gross Settlement (RTGS) for Closing (Final) Monetary Right(s) and Interest Earned Transfers
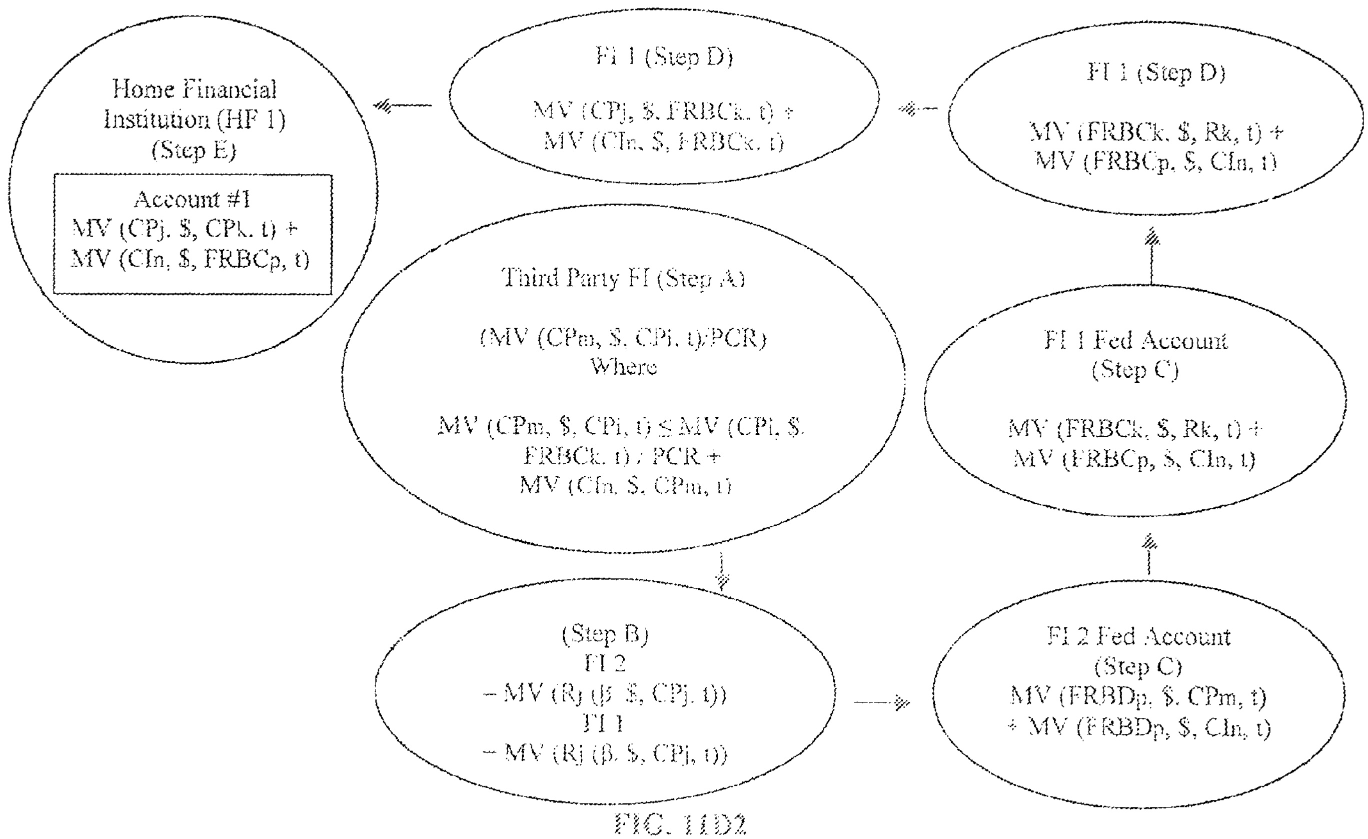
FIG. 11D2

Monetary Value Accounting Process Using Real Time Gross Settlement (RTGS) for Closing (Final) Monetary Right(s) and Interest Earned Transfers

Final Closing Monetary Right(s) Transfer Equation:

Receiving Bank Starting Balance: MV (CPm, $, CPj, t) / PCR + MV (CIn, $, CPm, t) + MV (Rk (β, $, CPj, t))

Receiving Bank: (MV (FRBDp, $, CPm, t) + MV (FRBDp, $, CIn, t)) - MV (Rk (β, $, CPj, t))

Home Bank: (MV (FRBCp, $, CPm, t) + MV (FRBCp, $, CIn t)) + (MV (Rj (β, $, CPj, t))

Home Bank Ending Balance: MV (Rj (α…ι, $, CPj, t)) + MV (CIn, $, FRBCp, t) + MV (CPj, $, CPk, t) + MV (CIn, $, FRBCp, t)

Receiving Bank Ending Balance: 0

Federal Reserve Bank Ending Balances:
Home Bank = MV (FRBCp, $, Rk, t) + MV (FRBCp, $, CIn, t))
Receiving Bank = MV (FRBDp, $, CPm, t) + MV (FRBDp, $, CIn, t)

MRT Accounting Balance: Home Bank: MV (Rj (α…ι, $, Rk, t))
Receiving Bank: 0

FIG. 11D3

MRT Process of the Present Invention Layers to Implementation

Figure 13A:
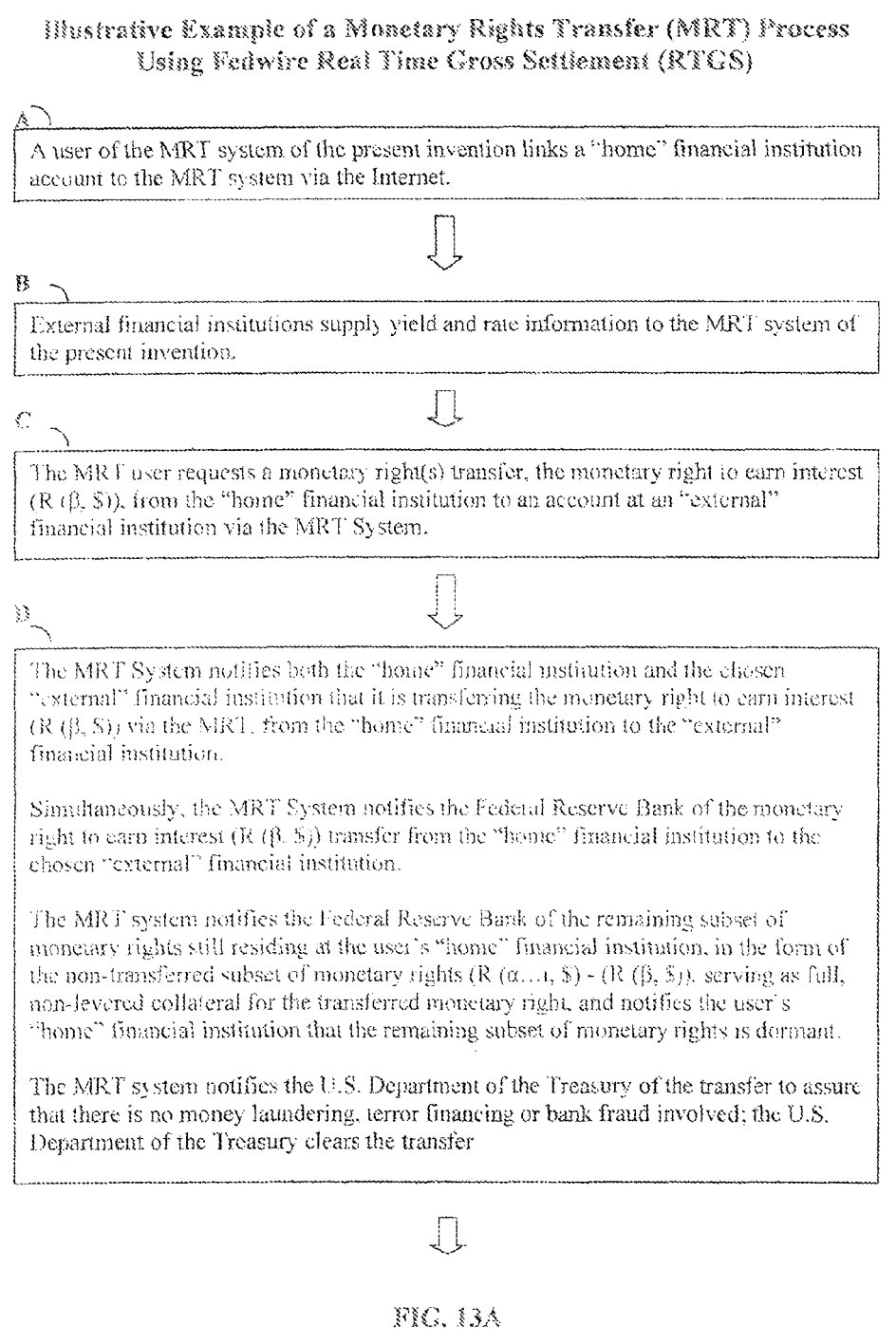

Illustrative Example of a Monetary Rights Transfer (MRT) Process Using Fedwire Real Time Gross Settlement (RTGS)

A

A user of the MRT system of the present invention links a "home" financial institution account to the MRT system via the Internet.

B

External financial institutions supply yield and rate information to the MRT system of the present invention.

C

The MRT user requests a monetary right(s) transfer, the monetary right to earn interest (R (β, $)), from the "home" financial institution to an account at an "external" financial institution via the MRT System.

D

The MRT System notifies both the "home" financial institution and the chosen "external" financial institution that it is transferring the monetary right to earn interest (R (β, $)) via the MRT, from the "home" financial institution to the "external" financial institution.

Simultaneously, the MRT System notifies the Federal Reserve Bank of the monetary right to earn interest (R (β, $)) transfer from the "home" financial institution to the chosen "external" financial institution.

The MRT system notifies the Federal Reserve Bank of the remaining subset of monetary rights still residing at the user's "home" financial institution, in the form of the non-transferred subset of monetary rights (R (α…ι, $) - (R (β, $)), serving as full, non-levered collateral for the transferred monetary right, and notifies the user's "home" financial institution that the remaining subset of monetary rights is dormant.

The MRT system notifies the U.S. Department of the Treasury of the transfer to assure that there is no money laundering, terror financing or bank fraud involved; the U.S. Department of the Treasury clears the transfer

Figure 13B:
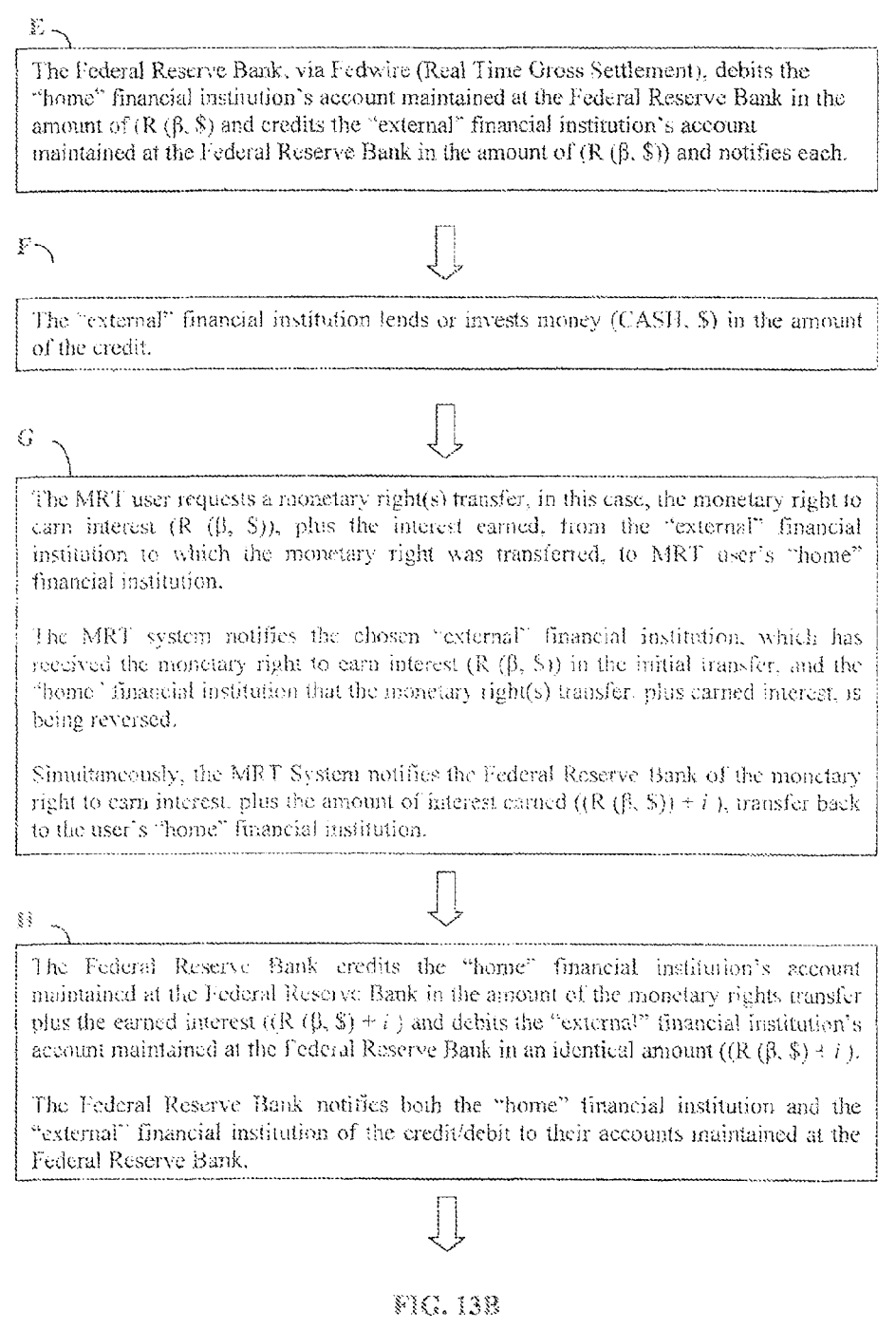

The Federal Reserve Bank, via Fedwire (Real Time Gross Settlement), debits the "home" financial institution's account maintained at the Federal Reserve Bank in the amount of (R (β, $) and credits the "external" financial institution's account maintained at the Federal Reserve Bank in the amount of (R (β, $)) and notifies each.

⇩

F

The "external" financial institution lends or invests money (CASH, $) in the amount of the credit.

⇩

G

The MRT user requests a monetary right(s) transfer, in this case, the monetary right to earn interest (R (β, $)), plus the interest earned, from the "external" financial institution to which the monetary right was transferred, to MRT user's "home" financial institution.

The MRT system notifies the chosen "external" financial institution, which has received the monetary right to earn interest (R (β, $)) in the initial transfer, and the "home" financial institution that the monetary right(s) transfer, plus earned interest, is being reversed.

Simultaneously, the MRT System notifies the Federal Reserve Bank of the monetary right to earn interest, plus the amount of interest earned ((R (β, $)) + *i* ), transfer back to the user's "home" financial institution.

⇩

H

The Federal Reserve Bank credits the "home" financial institution's account maintained at the Federal Reserve Bank in the amount of the monetary rights transfer plus the earned interest ((R (β, $) + *i* ) and debits the "external" financial institution's account maintained at the Federal Reserve Bank in an identical amount ((R (β, $) + *i* ).

The Federal Reserve Bank notifies both the "home" financial institution and the "external" financial institution of the credit/debit to their accounts maintained at the Federal Reserve Bank.

The "external" financial institution either (i) may have to liquidate its investment(s) in the amount of the monetary right to earn interest plus any earned interest ((R (β, $) + $i$ ) or, (ii) may have to cancel the loans in the amount of the monetary right to earn interest plus any earned interest ((R (β, $) + $i$) in order to satisfy the MRT user's request to rescind the monetary rights transfer.

⇩

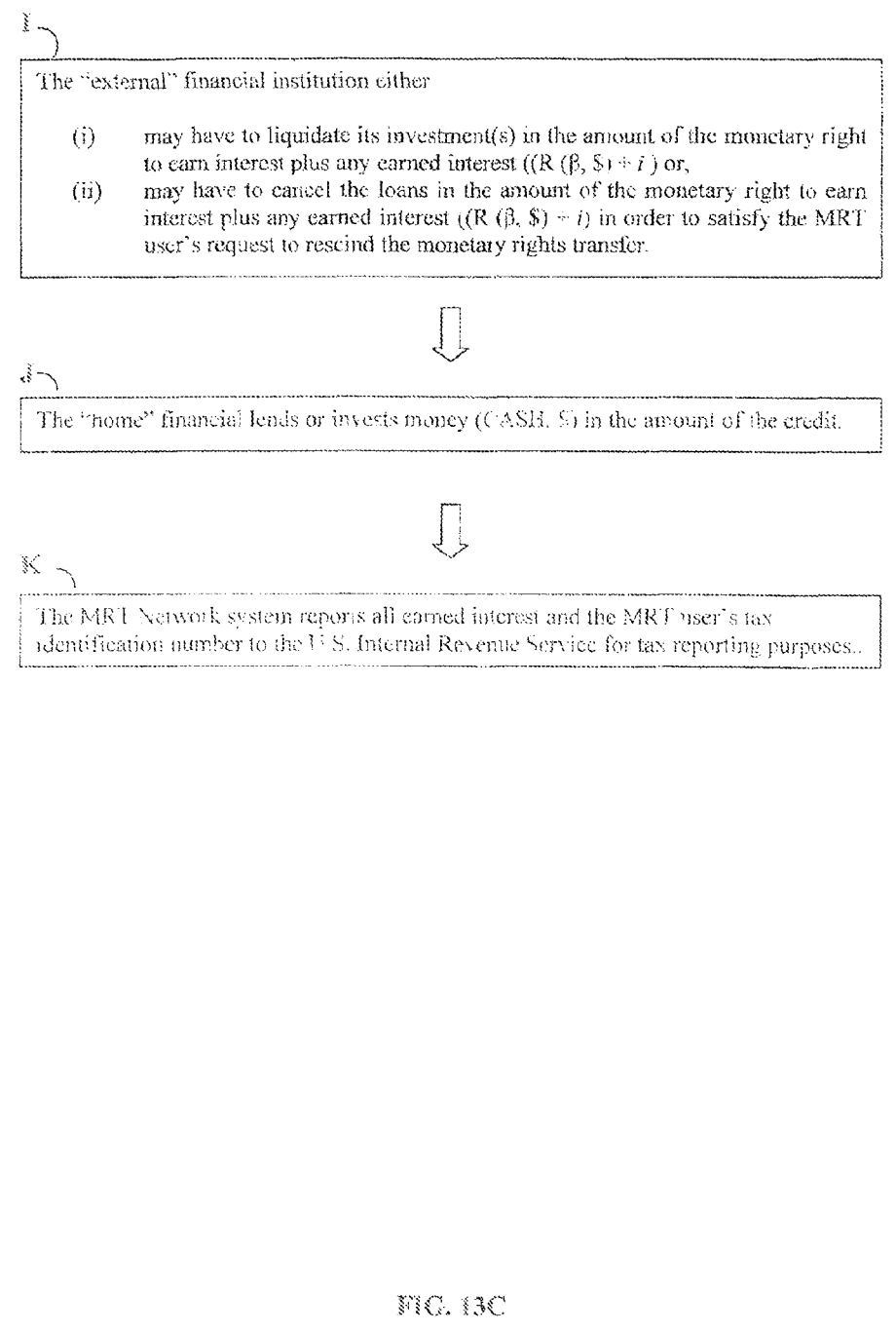

J

The "home" financial lends or invests money (CASH, $) in the amount of the credit.

⇩

K

The MRT Network system reports all earned interest and the MRT user's tax identification number to the U.S. Internal Revenue Service for tax reporting purposes..

FIG. 13C

MRT Network System Accounting for Net-Settled Monetary Right(s) Transfers Utilizing Fedwire or Other Real-Time Gross Settlement (RTGS) Systems MRT Network System Accounting for Net-Settled Monetary Right(s) Transfers Utilizing Fedwire or Other Real-Time Gross Settlement (RTGS) Systems MRT Network System Accounting for Net-Settled Monetary Right(s) Transfers Utilizing Fedwire or Other Real-Time Gross Settlement (RTGS) Systems

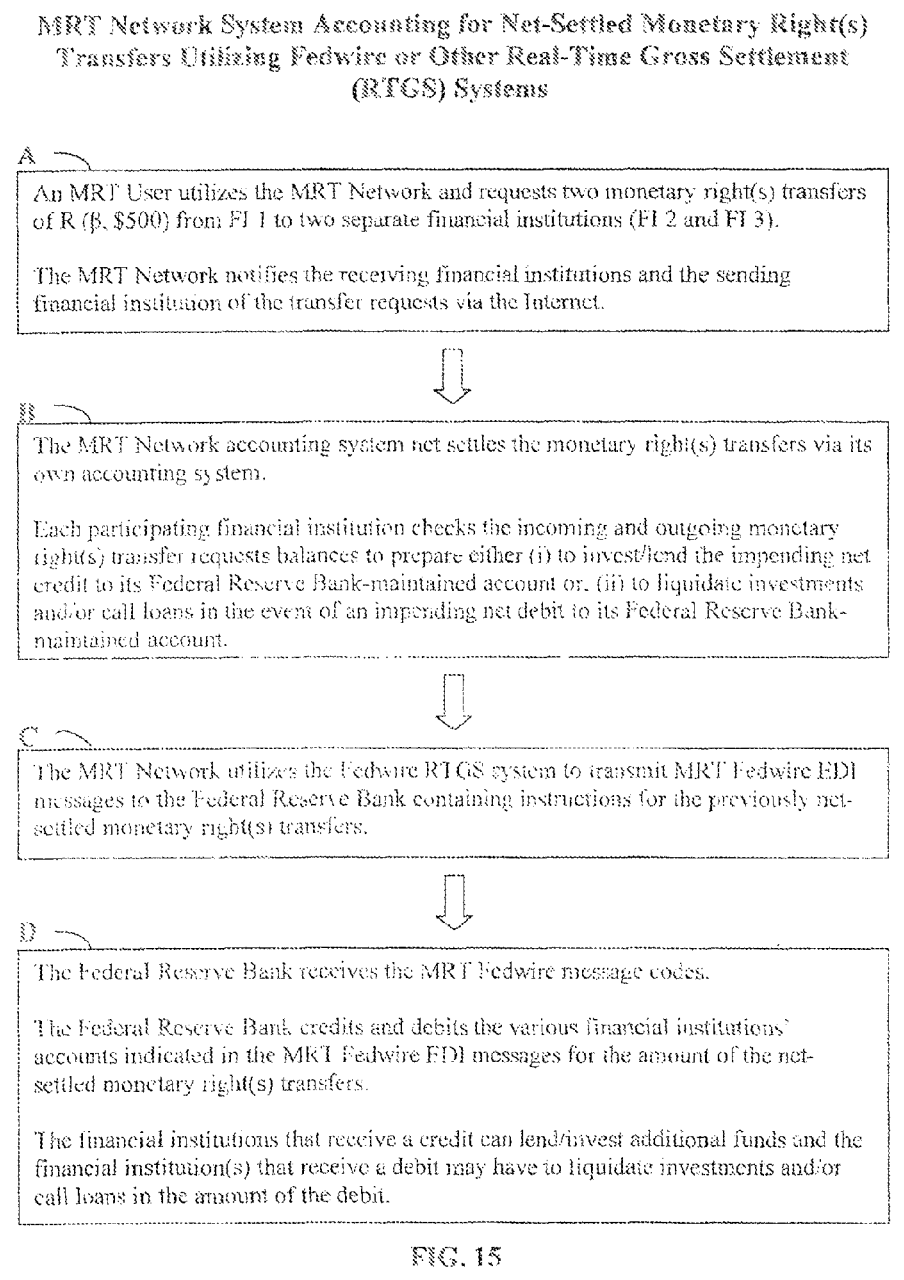

A

An MRT User utilizes the MRT Network and requests two monetary right(s) transfers of R (β, $500) from FI 1 to two separate financial institutions (FI 2 and FI 3).

The MRT Network notifies the receiving financial institutions and the sending financial institution of the transfer requests via the Internet.

⇩

B

The MRT Network accounting system net settles the monetary right(s) transfers via its own accounting system.

Each participating financial institution checks the incoming and outgoing monetary right(s) transfer requests balances to prepare either (i) to invest/lend the impending net credit to its Federal Reserve Bank-maintained account or, (ii) to liquidate investments and/or call loans in the event of an impending net debit to its Federal Reserve Bank-maintained account.

⇩

C

The MRT Network utilizes the Fedwire RTGS system to transmit MRT Fedwire EDI messages to the Federal Reserve Bank containing instructions for the previously net-settled monetary right(s) transfers.

⇩

D

The Federal Reserve Bank receives the MRT Fedwire message codes.

The Federal Reserve Bank credits and debits the various financial institutions' accounts indicated in the MRT Fedwire EDI messages for the amount of the net-settled monetary right(s) transfers.

The financial institutions that receive a credit can lend/invest additional funds and the financial institution(s) that receive a debit may have to liquidate investments and/or call loans in the amount of the debit.

FIG. 15

MRT Network Accounting System for Net-Settling Monetary Right(s) Transfers

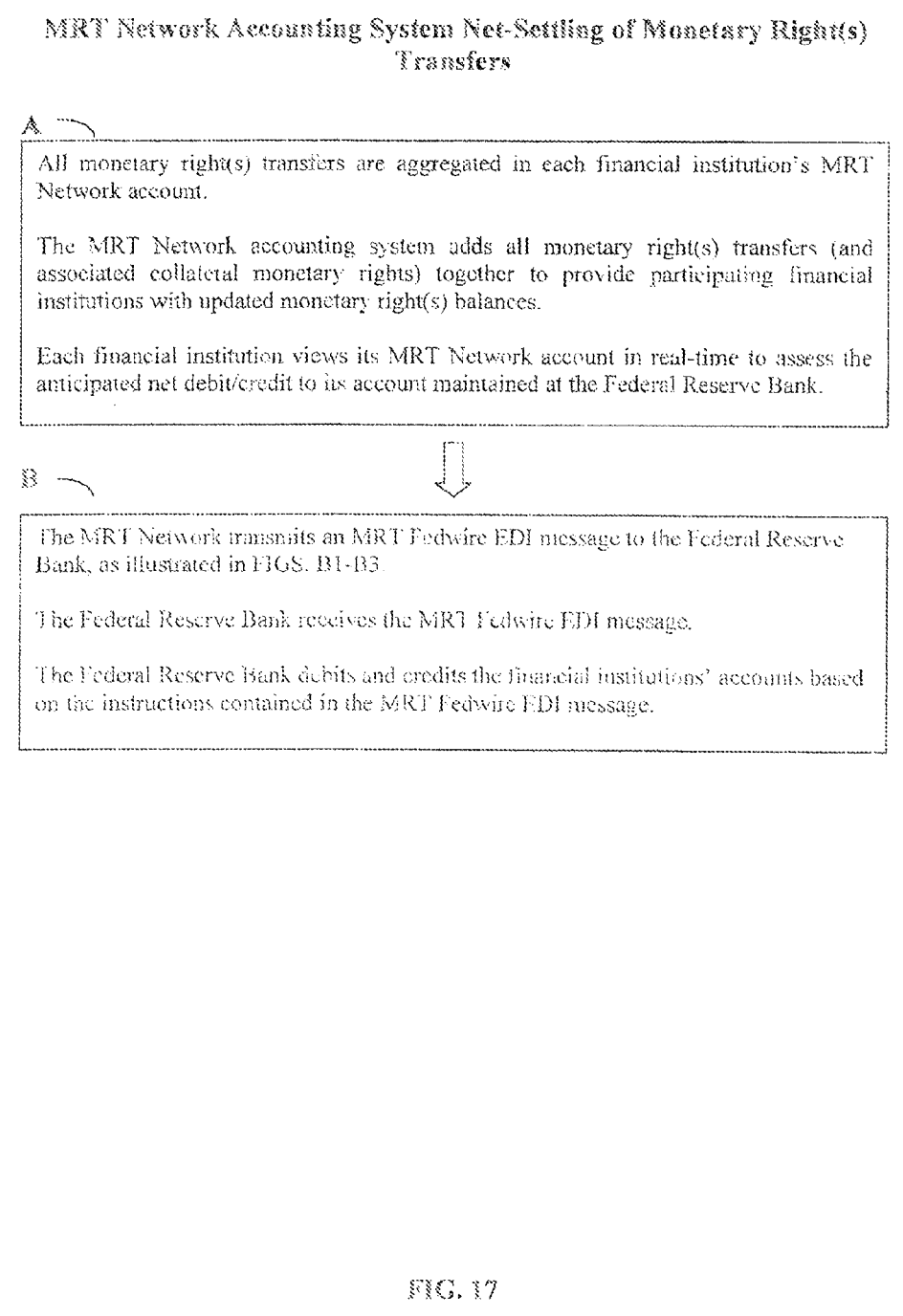

MRT Network Accounting System Net-Settling of Monetary Right(s) Transfers

A

All monetary right(s) transfers are aggregated in each financial institution's MRT Network account.

The MRT Network accounting system adds all monetary right(s) transfers (and associated collateral monetary rights) together to provide participating financial institutions with updated monetary right(s) balances.

Each financial institution views its MRT Network account in real-time to assess the anticipated net debit/credit to its account maintained at the Federal Reserve Bank.

B

The MRT Network transmits an MRT Fedwire EDI message to the Federal Reserve Bank, as illustrated in FIGS. B1-B3.

The Federal Reserve Bank receives the MRT Fedwire EDI message.

The Federal Reserve Bank debits and credits the financial institutions' accounts based on the instructions contained in the MRT Fedwire EDI message.

FIG. 17

MRT Network Accounting System for Fedwire Credit Recipient Time-Specific Net-Settlement of Monetary Right(s) Transfers Utilizing Fedwire or Other Real-Time Gross Settlement (RTGS) Systems MRT Network Accounting System for Fedwire Credit Recipient Cumulative Credit Net-Settlement of Monetary Right(s) Transfers Utilizing Fedwire or Other Real-Time Gross Settlement (RTGS) Systems MRT Network Accounting System for Fedwire Credit Recipient-Preferred Net-Settlement of Monetary Right(s) Transfers Utilizing Fedwire or Other Real-Time Gross Settlement (RTGS) Systems MRT Network Accounting System for Fedwire Credit Recipient Net-Settlement of Monetary Right(s) Transfers Utilizing Fedwire or Other Real-Time Gross Settlement (RTGS) Systems

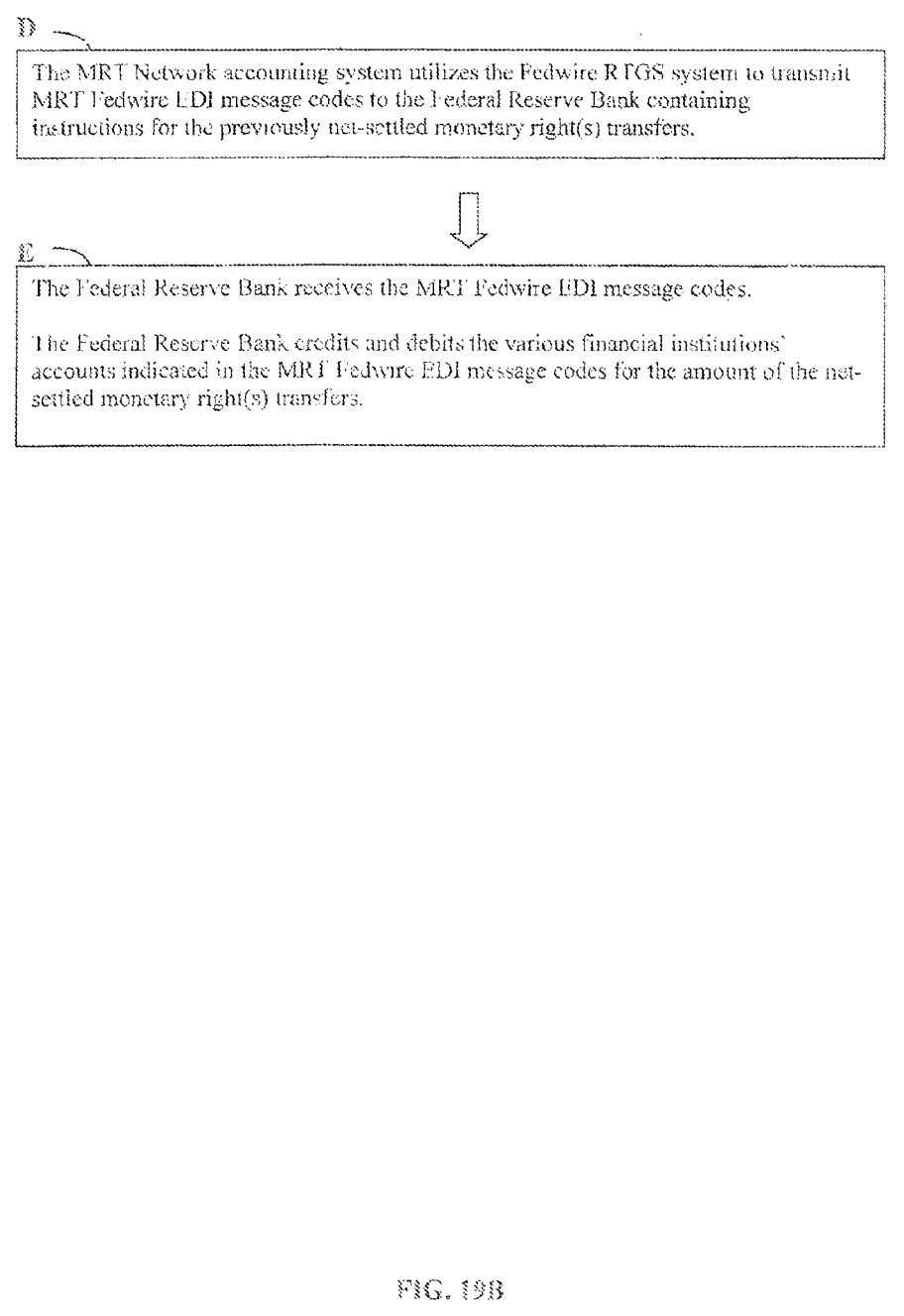

D

The MRT Network accounting system utilizes the Fedwire RTGS system to transmit MRT Fedwire EDI message codes to the Federal Reserve Bank containing instructions for the previously net-settled monetary right(s) transfers.

E

The Federal Reserve Bank receives the MRT Fedwire EDI message codes.

The Federal Reserve Bank credits and debits the various financial institutions' accounts indicated in the MRT Fedwire EDI message codes for the amount of the net-settled monetary right(s) transfers.

FIG. 19B

MRT User Monetary Right(s) Transfer Timing Filter for Aggregated MRT Fedwire EDI Transfers

MRT Monetary Right(s) Transfer Options

- ☐ Transfer my monetary right(s) instantaneously - as soon as I elect to make a monetary right(s) transfer.
- ☐ Delay my monetary right(s) transfer until the end of the business day and aggregate it with other monetary right(s) transfers in order to save on transfer costs.
- ☐ Allow my monetary right(s) transfer to be transferred at the discretion of the receiving financial institution.

FIG. 20

MRT Aggregated Monetary Right(s) Transfer for Automated, Preloaded Payment Systems (EZ Pass Example)

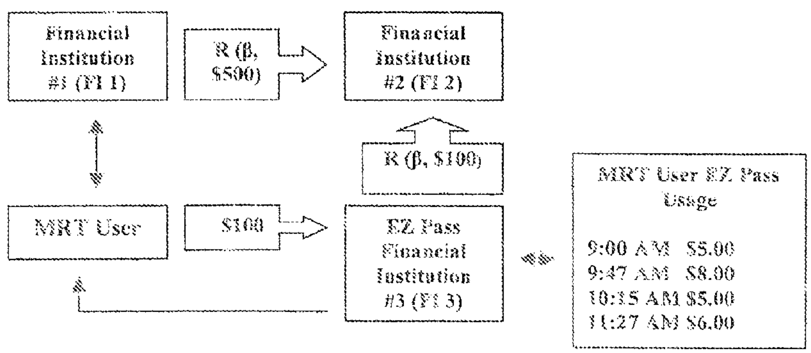

MRT Network Accounting System Ledger

| FI 1 MRT Account | FI 2 MRT Account | FI 3 MRT Account |
|---|---|---|
| (R (α…ι, $500)) - R (β, $500) | R (β, $500) | |
| | R (β, $100) | (R (α…ι, $100)) - R (β, $100) |
| | - R (β, $24) | R (β, $24) |

Fedwire RTGS

Federal Reserve Bank (FRB) Accounting Ledger

| | FI 1 FRB Account | FI 2 FRB Account | FI 3 FRB Account |
|---|---|---|---|
| Opening Balance | $10,000 | $10,000 | $10,000 |
| MRT Fedwire Transfer #1 | ($500) | $500 | |
| MRT Fedwire Transfer #2 | | $100 | ($100) |
| MRT Fedwire Transfer #3 | | ($24) | $24 |
| Closing Balance | $9,500 | $10,576 | $9,924 |

FIG. 21

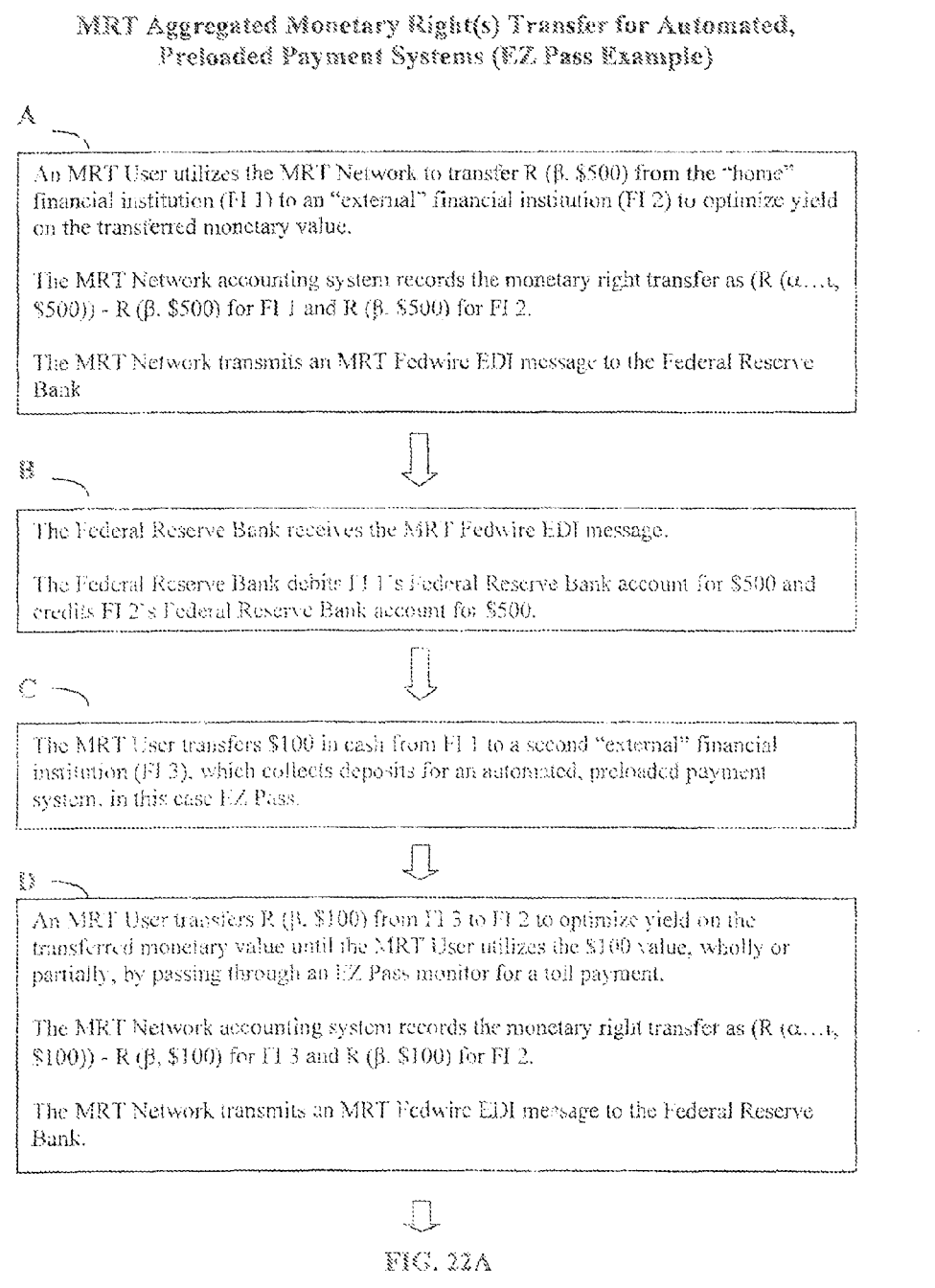

MRT Aggregated Monetary Right(s) Transfer for Automated, Preloaded Payment Systems (EZ Pass Example)

A

An MRT User utilizes the MRT Network to transfer R (β, $500) from the "home" financial institution (FI 1) to an "external" financial institution (FI 2) to optimize yield on the transferred monetary value.

The MRT Network accounting system records the monetary right transfer as (R (α…ι, $500)) - R (β, $500) for FI 1 and R (β, $500) for FI 2.

The MRT Network transmits an MRT Fedwire EDI message to the Federal Reserve Bank

B

The Federal Reserve Bank receives the MRT Fedwire EDI message.

The Federal Reserve Bank debits FI 1's Federal Reserve Bank account for $500 and credits FI 2's Federal Reserve Bank account for $500.

C

The MRT User transfers $100 in cash from FI 1 to a second "external" financial institution (FI 3), which collects deposits for an automated, preloaded payment system, in this case EZ Pass.

D

An MRT User transfers R (β, $100) from FI 3 to FI 2 to optimize yield on the transferred monetary value until the MRT User utilizes the $100 value, wholly or partially, by passing through an EZ Pass monitor for a toll payment.

The MRT Network accounting system records the monetary right transfer as (R (α…ι, $100)) - R (β, $100) for FI 3 and R (β, $100) for FI 2.

The MRT Network transmits an MRT Fedwire EDI message to the Federal Reserve Bank.

FIG. 22A

MRT Aggregated Monetary Right(s) Transfer for Preloaded/Prepaid Payment Products and Devices (Prepaid Debit Cards, Gift Cards, Payroll Cards, etc.)

Figure 24A:
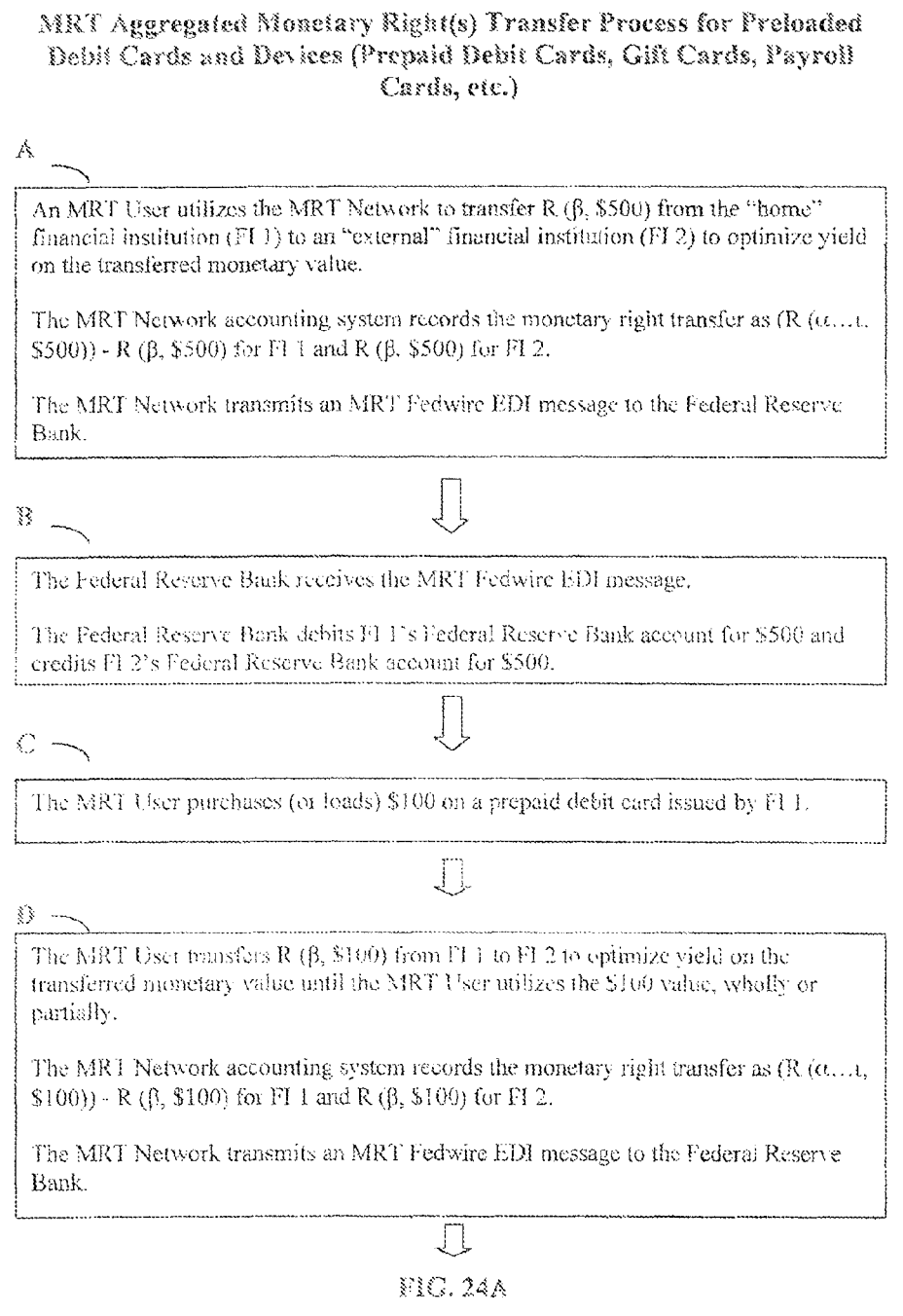

MRT Aggregated Monetary Right(s) Transfer Process for Preloaded Debit Cards and Devices (Prepaid Debit Cards, Gift Cards, Payroll Cards, etc.)

A

An MRT User utilizes the MRT Network to transfer R (β, \$500) from the "home" financial institution (FI 1) to an "external" financial institution (FI 2) to optimize yield on the transferred monetary value.

The MRT Network accounting system records the monetary right transfer as (R (α…ι, \$500)) - R (β, \$500) for FI 1 and R (β, \$500) for FI 2.

The MRT Network transmits an MRT Fedwire EDI message to the Federal Reserve Bank.

⇩

B

The Federal Reserve Bank receives the MRT Fedwire EDI message.

The Federal Reserve Bank debits FI 1's Federal Reserve Bank account for \$500 and credits FI 2's Federal Reserve Bank account for \$500.

⇩

C

The MRT User purchases (or loads) \$100 on a prepaid debit card issued by FI 1.

⇩

D

The MRT User transfers R (β, \$100) from FI 1 to FI 2 to optimize yield on the transferred monetary value until the MRT User utilizes the \$100 value, wholly or partially.

The MRT Network accounting system records the monetary right transfer as (R (α…ι, \$100)) - R (β, \$100) for FI 1 and R (β, \$100) for FI 2.

The MRT Network transmits an MRT Fedwire EDI message to the Federal Reserve Bank.

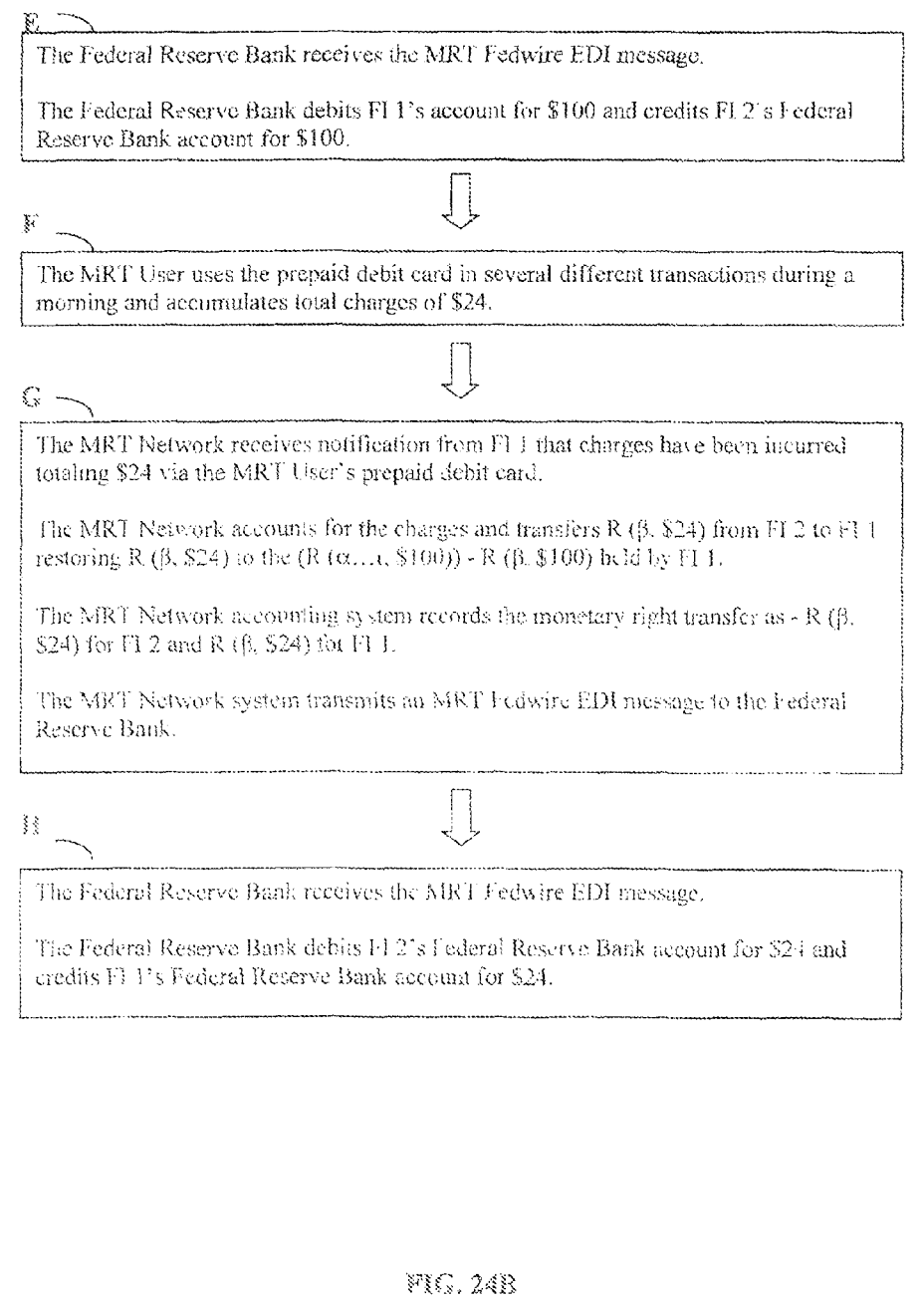

The Federal Reserve Bank receives the MRT Fedwire EDI message.

The Federal Reserve Bank debits FI 1's account for $100 and credits FI 2's Federal Reserve Bank account for $100.

F

The MRT User uses the prepaid debit card in several different transactions during a morning and accumulates total charges of $24.

G

The MRT Network receives notification from FI 1 that charges have been incurred totaling $24 via the MRT User's prepaid debit card.

The MRT Network accounts for the charges and transfers R (β, $24) from FI 2 to FI 1 restoring R (β, $24) to the (R (α…ι, $100)) - R (β, $100) held by FI 1.

The MRT Network accounting system records the monetary right transfer as - R (β, $24) for FI 2 and R (β, $24) for FI 1.

The MRT Network system transmits an MRT Fedwire EDI message to the Federal Reserve Bank.

H

The Federal Reserve Bank receives the MRT Fedwire EDI message.

The Federal Reserve Bank debits FI 2's Federal Reserve Bank account for $24 and credits FI 1's Federal Reserve Bank account for $24.

FIG. 24B

Implementation of MRTS Network of the Present Invention (WebObjects HTML-based Application Communication Chain)

Implementation of MRTS Network of the Present invention (Java Client's Distributed, Multi-Tier Architecture)

Products and Services Supportable with Interest Capturing Services (ICS) provided on the MRTS Network of the Present Invention

The MRTS and/or its participating financial institutions' product offerings may include, but are not limited to the following accounts and products:

1) Checking accounts
2) Savings accounts
3) Money market accounts
4) Cash management accounts
5) Brokerage accounts and products
6) Derivative products and accounts
7) Insurance products and accounts
8) Certificates of deposit
9) Debit and credit card accounts
10) Money market mutual funds
11) NOW accounts
12) Commercial paper
13) Bankers acceptances
14) Forward rate agreements
15) Mortgage instruments
16) Corporate Instruments
17) Government Instruments
18) IRA's
19) 401(k)'s
20) Pension plans
21) IRA CD's
22) Customized accounts and products
23) Agency instruments
24) Swaps And any other interest bearing accounts, products or securities, and any other banking, brokerage, insurance or other financial products.

FIG. 26

Provisions of the MRTS Network of the Present Invention

As administrator of the system to provide transfers of the individual right(s) associated with holding money, MRTS will provide the following:

1) A secure internet environment for accountholders and other system participants.

2) Application for accountholder status and storage of applicant's information provided.

3) Application and storage of accountholder's provided information for pre-specified criteria.

4) Periodic and consolidated statements including, but not limited to, the following: transaction log(s), interest earned, tax statements (to accountholder and government), interest right (R (β, $)) balances, transaction performance vs. average rates available, fees, charges and penalties incurred, etc.

5) Establishment and maintenance of contacts, based on information provided by accountholder of: employer and human resources provider, mortgage holder and mortgage servicer, all parties to whom accountholder pays bills, all institutions where accountholder maintains accounts holding accountholder's monies, etc.

6) Solicitation and maintenance of updated information from all participating institutions including, but not limited to, the following: accounts and products available, yields and rates, credit and safety ratings, fees, charges and penalties, minimum required balances, maximum deposit insurance provided, duration (if any) of investments, currency conversion rates and foreign yields, maximum amount of accounts and/or products on offer, methods of interest rate/yield computation, etc.

FIG. 27

Product/Service Suite Architecture Supported on the MRTS Network of the Present Invention Management Services for Financial Institutions Offering Interest Capturing Services (ICS)-Enabled Products & Services Registered on the MRTS Network Management Services for Accountholders with Money in ICS-Enabled Products Registered on the MRTS Network

MRT FEDWIRE EDI CODES

MRT Fedwire EDI CODE FUNCTIONS

Monetary Right to Earn Interest = (R (β, $)
Non-transferred Subset of Monetary Rights (Collateral) = (R (α…ι, $) - (R (β, $))
Interest = *i*

125 - "External" financial institutions supply account/yield information to MRT
126 - MRT user requests monetary rights transfer, via MRT, from user's "Home" financial institution to "External" financial institution
127 - (R (β, $) transfer notification from "Home" financial institution via MRT
128 - (R (β, $) transfer notification to "External" financial institution via MRT
129 - MRT notifies Federal Reserve Bank of monetary right(s) transfer
130 - Report from MRT to Federal Reserve Bank of appropriate collateral, in the form of the non-transferred subset of monetary rights (R (α…ι, $) - (R (β, $)) residing at the "Home" financial institution
131 – MRT notifies U.S. Treasury of monetary right(s) transfer
132 - Federal Reserve debits "Home" financial institution's account maintained at the Federal Reserve Bank in the amount of (R (β, $)
133 - Federal Reserve credits "External" financial institution's account maintained at the Federal Reserve Bank in the amount of (R (β, $)
134 - MRT user requests monetary rights transfer, via MRT, from "External" financial institution back to user's "Home" financial institution
135 - (R (β, $) + earned interest (*i*) transfer request reported to Federal Reserve Bank by MRT
136 - (R (β, $) + (*i*) transferred from "External" financial institution to MRT
137 - (R (β, $) + (*i*) transferred to "Home" financial institution from MRT
138 – Federal Reserve debits "External" financial institution's account maintained at the Federal Reserve Bank in the amount of (R (β, $) + *i*
139 – Federal Reserve credits "Home" financial institution's account maintained at the Federal Reserve Bank in the amount of (R (β, $) + *i*
140 - Earned interest (*i*) transfer reported with MRT user's tax identification number to U.S. Internal Revenue Service by MRT

FIG. 30

STEP A of MRT PROCESS: MRT User Linking "Home" Financial Institution to MRT Network System STEP B of MRT PROCESS: Rate & Yield Flow from "External" Bank(s) to MRT Network System EDI Messaging Used to Implement STEP B:

EDI MESSAGE: 125 - "External" Financial Institutions feed yield/rate information to the MRT System via the Internet Network Participants Involved in EDI Messaging: MRT System, "External" Financial Institutions STEP B of MRT PROCESS

MRT EDI – 125

From: Acme Bank
To: MRT System
Date: 10/10/10
Time: 10:10:10 AM

Money Market Yield: 1.41%
1-Mo. CD Yield: 0.50%
2-Mo. CD Yield: 0.50%
3-Mo. CD Yield: 0.85%
6-Mo. CD Yield: 1.11%
1-Yr. CD Yield: 1.55%
2-Yr. CD Yield: 1.85%
5-Yr. CD Yield: 3.01%

Status: Automatic Update

FIG. 32B

STEP C of MRT PROCESS: MRT User Requests Monetary Right(s) Transfer from MRT User's "Home" Financial Institution to "External" Financial Institution EDI Messaging Used to Implement STEP C:

EDI MESSAGE: 126 - MRT User Requests Monetary Rights Transfer, Via MRT, From User's "Home" Financial Institution to "External" Financial Institution Network Participants Involved in EDI Messaging: MRT User, MRT System, MRT User's "Home" Financial Institution

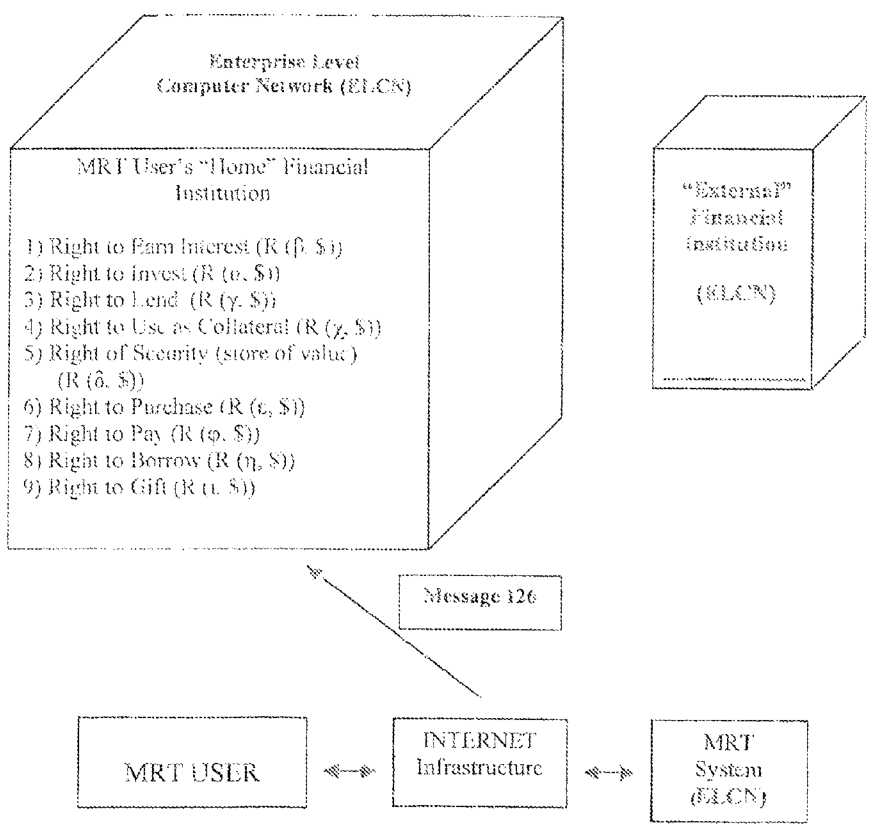

FIG. 33A

STEP C of MRT PROCESS

MRT EDI – 126

From: MRT User
To: MRT

Account # 12344321
Date: 10/10/10
Time: 10:10:11 AM

Order: Monetary Right (R (β, $)) transfer request
Amount: $5,000.00
From: ABC Bank
To: Acme Bank
Account: 1-Yr. CD
Yield: 1.55%
Compounds: Monthly
Execution: IMMEDIATE Status: Active

FIG. 33B

STEP D of MRT PROCESS: Monetary Right(s) Transfer Using MRT Process of the Present Invention EDI Messaging Used to Implement STEP D:
EDI MESSAGE: 127-131 MRT User Requests Monetary Rights Transfer, Via MRT, From User's "Home" Financial Institution to "External" Financial Institution
Network Participants Involved in EDI Messaging: MRT User, MRT System, MRT User's "Home" Financial Institution, Federal Reserve Bank, Treasury Department

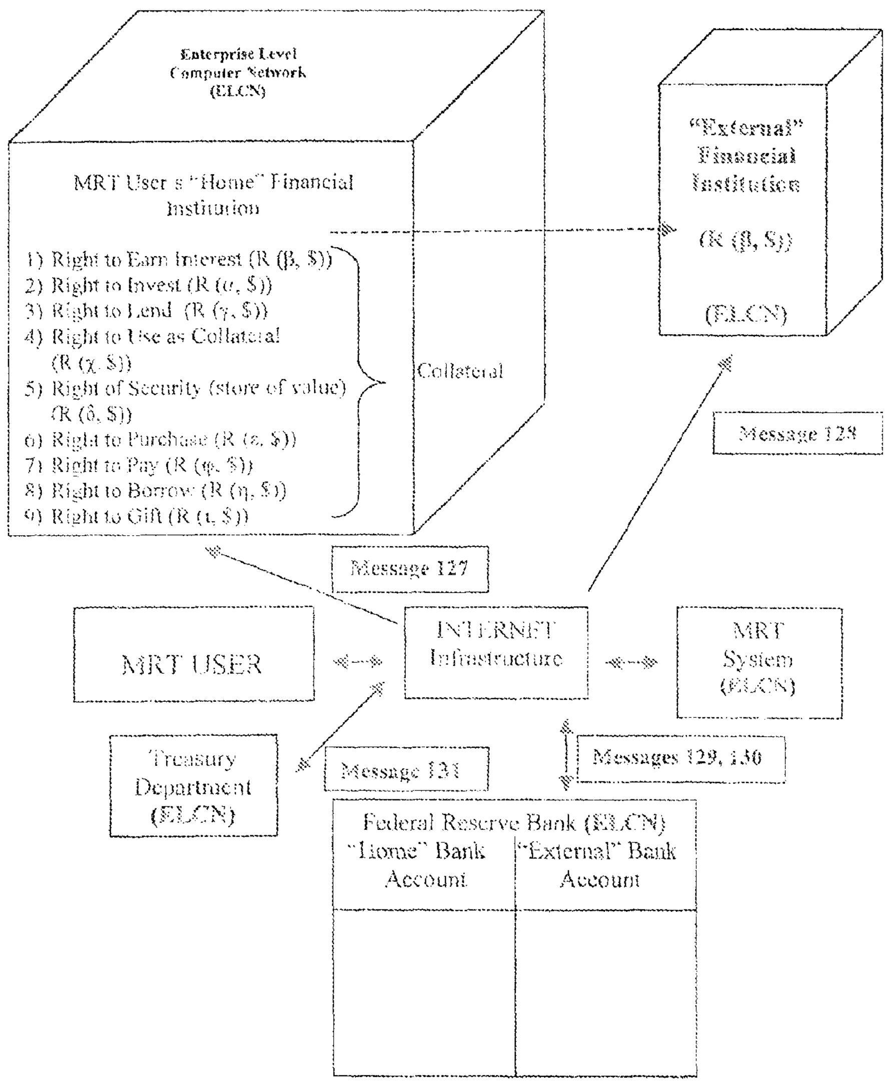

FIG. 34A

STEP D of MRT PROCESS

MRT EDI - 127
From: MRT
To: ABC Bank
Monetary Right(s) Transfer Request

Accountholder: Jay Hardison
Account #: 12344321
Tax ID #: 123-45-6789
DOB: 10/10/62
Address: 11 Easy Street
New York, NY 10001
Date: 10/10/10
Time: 10:10:11 AM Order: Monetary Right (R (β, $)) transfer request
Amount: $5,000.00
From: ABC Bank
To: Acme Bank
Account #: 43211234
Execution: IMMEDIATE
Status: Active

FIG. 34B

MRT EDI - 128
From: MRT
To: Acme Bank
Monetary Right(s) Transfer

Accountholder: Jay Hardison
Account #: 12344321
Tax ID #: 123-45-6789
DOB: 10/10/62
Address: 11 Easy Street
New York, NY 10001
Date: 10/10/10
Time: 10:10:11 AM Order: Monetary Right (R (β, $)) transfer request
Amount: $5,000.00
From: ABC Bank
To: Acme Bank
Account: 1-Year CD
Yield: 1.55%
Execution: IMMEDIATE
Status: Active

FIG. 34C

STEP D of MRT PROCESS

MRT EDI – 129

From: MRT

To: Federal Reserve Bank

Monetary Right(s) Transfer: (R (β, $))
Full Collateral: YES
Collateral: (R (α…ι, $) - (R (β, $))

Sender Bank: ABC Bank
Federal Reserve Account #1234
Recipient Bank: Acme Bank
Federal Reserve Account # 4321

Account # 12344321
Date: 10/10/10
Time: 10:10:11 AM
Account # 12344321
Order: Monetary Right (R (β, $)) transfer request
Amount: $5,000.00
From: ABC Bank
To: Acme Bank
Account # 43211234
Execution: IMMEDIATE
Status: Active

FIG. 34D

MRT EDI – 130

From: MRT
To: Federal Reserve Bank
Monetary Right(s) Transfer Collateral Confirmation:

Holding Bank: ABC Bank
Federal Reserve Account #1234
Collateral Backing (R (β, $)) Transfer to Recipient Bank: Acme Bank
Collateral: (R (α…ι, $) - (R (β, $))

Account # 12344321
Date: 10/10/10
Time: 10:10:11 AM

Collateral: (R (α…ι, $) - (R (β, $))
Amount: $5,000
Held at: ABC Bank
Execution: IMMEDIATE
Status: Active

FIG. 34E

STEP D of MRT PROCESS: MRT EDI Message 131

MRT EDI - 131

From: MRT
To: United States Treasury

Monetary Right(s) Transfer

Accountholder: Jay Hardison
Sending Bank: ABC Bank
Account #: 12344321
Tax ID #: 123-45-6789
DOB: 10/10/62
Address: 11 Easy Street
New York, NY 10001

Date: 10/10/10
Time: 10:10:11 AM

Order: Monetary Right (R (β, $)) transfer request
Amount: $5,000.00
From: ABC Bank
To: Acme Bank
Execution: IMMEDIATE Status: Active

FIG. 34F

STEP D of MRT PROCESS: MRT Fedwire Message Format
Sample Translation of MRT EDI 129 Transaction Set

MRT*C*0000500000*ABC*1234*DA*12344321*FED*CTX**ACM*4321*CA*43211234*101010*101011\

MRT = Type of Transfer (Monetary Right(s) Transfer)
C = Collateralized
$5,000.00 = Transfer amount
ABC = Sender of Monetary Right(s)
DA = Debit Fed Account Number (ABA Code)
12344321 = User's Account Number to be Debited
1234 = Sender's Fed Account Number
FED = Use Fedwire for immediate transfer
CTX = Use CTX Format
ACM = Recipient Bank
4321 = Recipient Bank's Fed Account Number
CA = Credit Fed Account Number (ABA Code)
43211234 = User's Account Number to be Credited
101029 = October 10, 2010
101011 = 10:10:11 AM From: MRT
To: Federal Reserve Bank Monetary Right(s) Transfer: (R (β, $)); fully collateralized: (R (α…ι, $) – R (β, $))

Sender Bank: ABC Bank
Federal Reserve Account (ABA) #1234
Recipient Bank: Acme Bank
Federal Reserve Account (ABA) # 4321

From ABC Account # 12344321
To: Acme Account # 43211234
Date: 10/10/10
Time: 10:10:11 AM Order: Monetary Right (R (β, $)) transfer request
Amount: $5,000.00
From: ABC Bank
To: Acme Bank
Execution: IMMEDIATE

FIG. 34H

STEP E of MRT PROCESS: Fedwire Debit/Credit of Participating Banks' Accounts Maintained at the Federal Reserve Bank via Real Time Gross Settlement (RTGS)

EDI Messaging Used to Implement STEP E:
EDI MESSAGE: 132, 133 - Fedwire Debit/Credit of Participating Banks' Accounts Maintained at the Federal Reserve Bank via Real Time Gross Settlement (RTGS)
Network Participants Involved in EDI Messaging: MRT User's "Home" Financial Institution, Federal Reserve Bank "External" Financial Institution

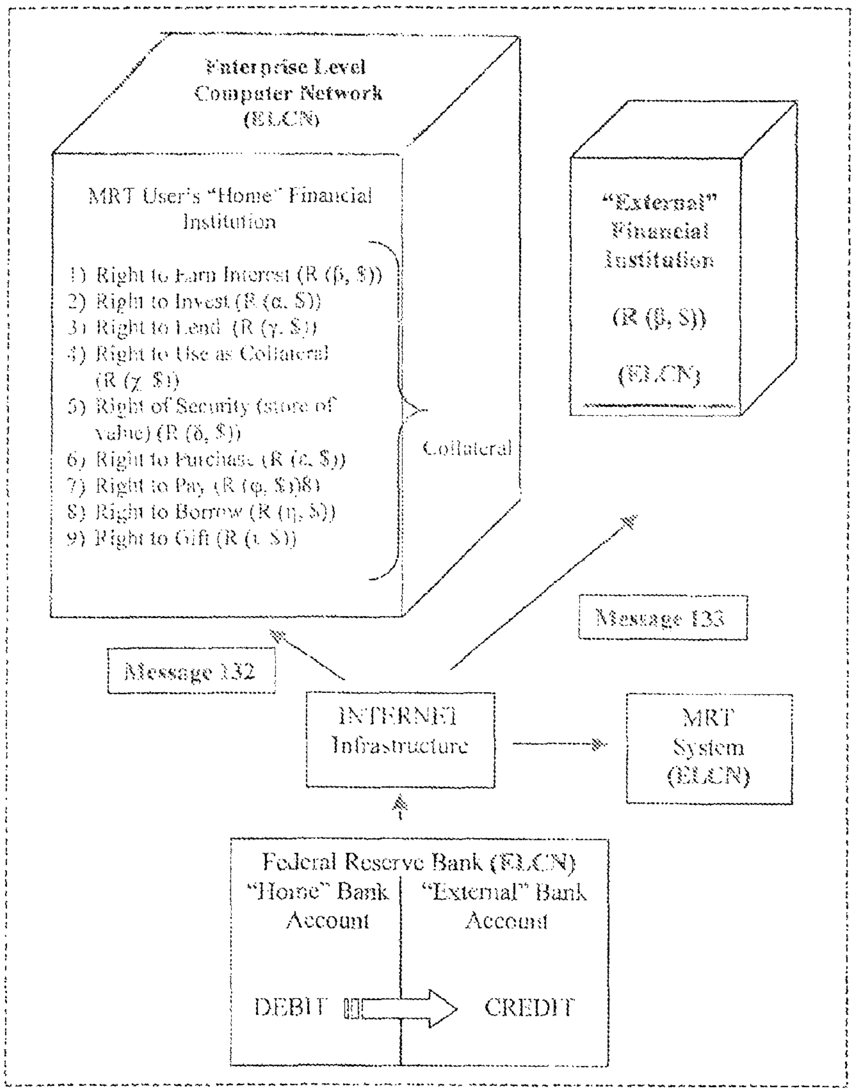

Real Time Gross Settlement FIG. 35A

STEP E of MRT PROCESS

MRT EDI – 132

From: Federal Reserve Bank
To: ABC Bank

Federal Reserve Account Debit: $5,000.00
Federal Reserve Account # 1234

Collateral Backing (R (β, $)) Transfer to Recipient Bank: Acme Bank
Collateral: (R (α…ι, $) - (R (β, $))

Account # 12344321
Date: 10/10/10
Time: 10:10:11 AM

Collateral: (R (σ…ι, $) - (R (β, $))
Collateral Amount: $5,000
Held at: ABC Bank
Execution: IMMEDIATE
Status: Active

FIG. 35B

MRT EDI – 133

From: Federal Reserve Bank
To: Acme Bank

Federal Reserve Account Credit: $5,000.00
Federal Reserve Account # 4321

Collateral Backing (R (β, $)) Transfer held at: ABC Bank
Collateral: (R (α… ι $) - (R (β, $))

Account # 12344321
Date: 10/10/10
Time: 10:10:11 AM

Collateral: (R (α…ι, $) - (R (β, $))
Collateral Amount: $5,000
Held at: ABC Bank
Execution: IMMEDIATE Status: Active

FIG. 35C

STEP F of MRT PROCESS: External Bank Lending/Investing Based on Received Monetary Right and Credit of Federal Reserve-maintained Account EDI Messaging Used to Implement STEP F:
EDI MESSAGE: NO EDI -- "External" Bank Lends/Invests based on received monetary right(s) transfer and Federal Reserve Account CREDIT
Network Participants Involved in EDI Messaging: N/A

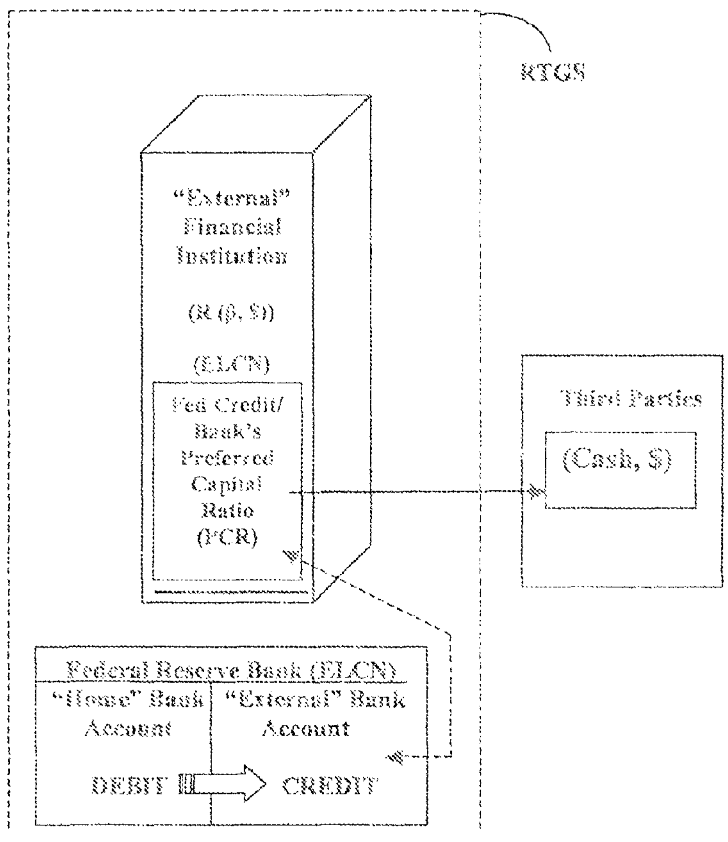

FIG. 36

STEP G of MRT PROCESS: MRT User Request to Transfer Monetary Right(s) plus Earned Interest from "External" Financial Institution Back to User's "Home" Financial Institution

EDI Messaging Used to Implement STEP G:
EDI MESSAGE: 134, 135, 136, 137 – MRT User Request to Transfer Monetary Right(s), plus earned interest, back to MRT User's "home" financial institution
Network Participants Involved in EDI Messaging: MRT User, MRT System, MRT User's "Home" Financial Institution, Federal Reserve Bank, "External" Financial Institution

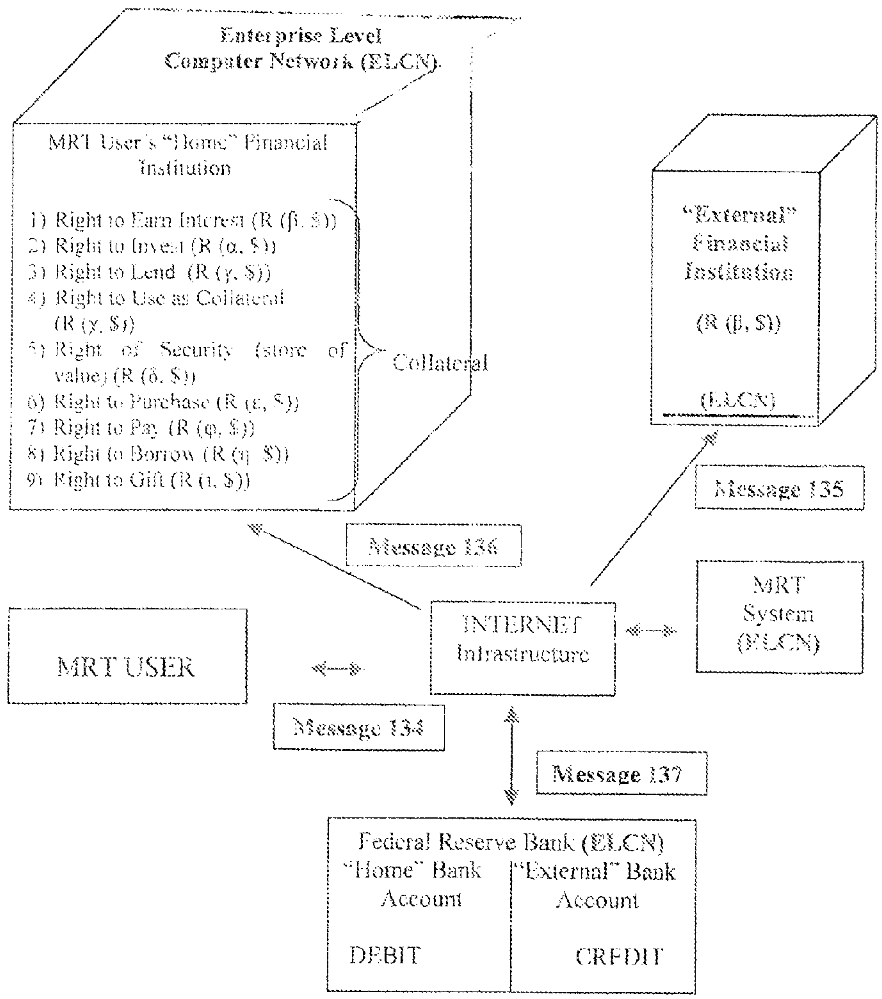

FIG. 37A

STEP G of MRT PROCESS

MRT EDI – 134

From: MRT User
To: MRT

Account # 12344321
Date: 10/10/11
Time: 10:10:11 AM

Order: Monetary Right (R (β. $)) transfer request
Amount. $5,000.00
Interest Amount: $77.50
Total: $5,077.50
From: Acme Bank
To: ABC Bank
Execution: IMMEDIATE Status: Active

FIG. 37B

MRT EDI – 135

From: MRT
To: Acme Bank

Monetary Right(s) : Interest Earned Transfer Request

Accountholder: Jay Hardison
Account #: 45211234
Tax ID #: 123-45-6789
DOB: 10/10/62
Address: 11 Easy Street
New York, NY 10001

Date: 10/10/11
Time: 10:10:11 AM

Order: Monetary Right (R (β. $)) transfer request
Amount: $5,000.00
Interest Amount: $77.50
From: Acme Bank
To: ABC Bank
Account #: 12344321
Execution: IMMEDIATE
Status: Active

FIG. 37C

STEP G of MRT PROCESS

MRT EDI - 136

From: MRT
To: ABC Bank
Monetary Right(s) + Interest Earned Transfer Notice

Accountholder. Jay Hardison
Account #: 12344321
Tax ID #: 123-45-6789
DOB: 10/10/62
Address: 11 Easy Street
New York, NY 10001
Date: 10/10/11
Time: 10:10:11 AM Order: Monetary Right (R (β, $)) transfer request
Amount: $5,000.00
Interest Amount: $77.50
From: Acme Bank
To: ABC Bank
Execution: IMMEDIATE
Status: Active

FIG. 37D

MRT EDI – 137

From: MRT
To: Federal Reserve Bank
Monetary Right(s) Transfer Confirmation:

Sender Bank: Acme Bank
Federal Reserve Account #4321
Recipient Bank: ABC Bank
Federal Reserve Account # 1234

Monetary Right(s) Transfer: (R (β, $))
Amount: $5,000.00
Interest Transfer: $77.50
Total: $5,077.50

Account # 43211234
Date: 10/10/11
Time: 10:10:11 AM

Collateral: (R (α…ι, $) - (R (β, $))
Amount: $5,000
Held at: ABC Bank
Execution: IMMEDIATE Status: Active

FIG. 37E

STEP II of MRT PROCESS: External Bank Cancellation of Lending/Investing Based on Received Request to Return Transferred Monetary Right and Debit of Federal Reserve-maintained Account EDI Messaging Used to Implement STEP II:
EDI MESSAGE: No EDI - "External" Bank Cancellation of Loan/Investment based on request to cancel monetary right(s) transfer
Network Participants Involved in EDI Messaging: None

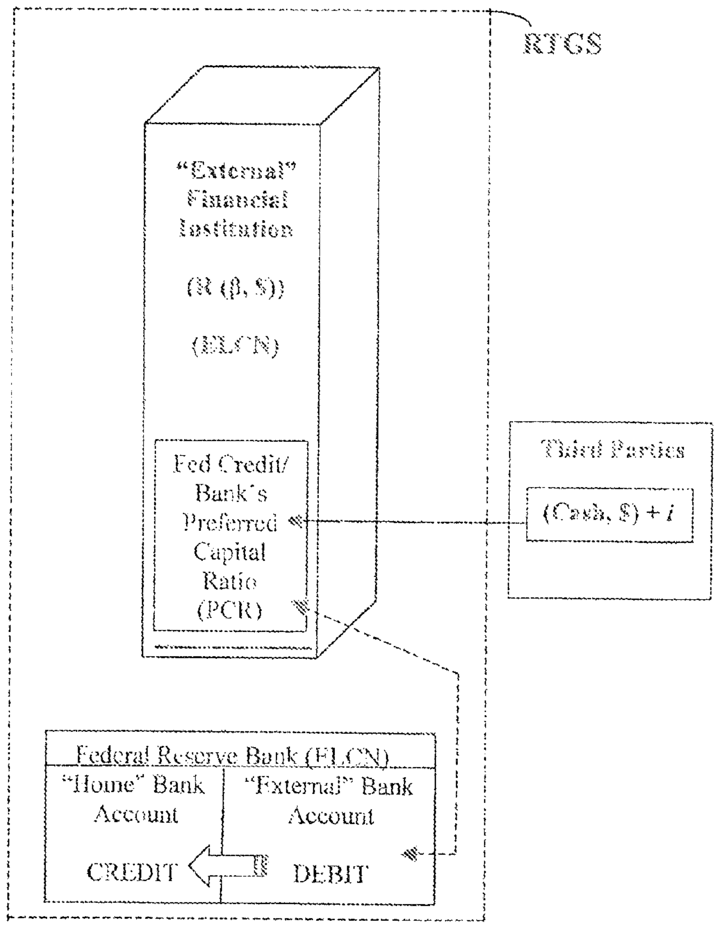

FIG. 38

STEP I of MRT PROCESS: Fedwire Debit/Credit of Participating Banks' Accounts Maintained at the Federal Reserve Bank via Real Time Gross Settlement (RTGS)

EDI Messaging Used to Implement STEP I:
EDI MESSAGE: 138, 139 – Fedwire Debit/Credit of Participating Banks' Accounts Maintained at the Federal Reserve Bank via Real Time Gross Settlement (RTGS)
Network Participants Involved in EDI Messaging: "External" Financial Institution, "Home" Financial Institution, Federal Reserve Bank, MRT System (notification)

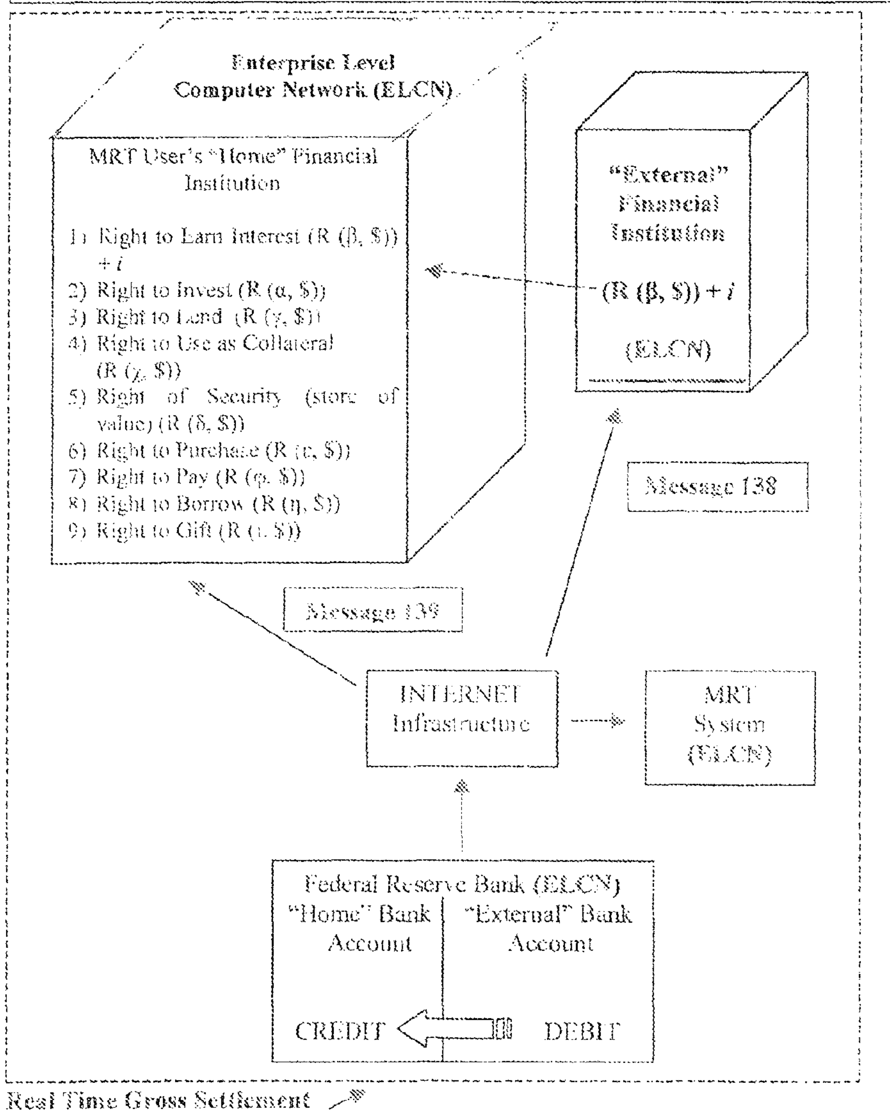

FIG. 39A

STEP 1 of MRT PROCESS

MRT EDI - 138

From: Federal Reserve Bank
To: Acme Bank

Federal Reserve Account Debit: $5,077.50
Federal Reserve Account #4321

Accountholder: Jay Hardison
Account # 43211234
Date: 10/10/11
Time: 10:10:11 AM (R (β, $) Debit Amount: $5,000.00
Interest Debit Amount: $77.50
Total: $5,077.50

To: ABC Bank
Federal Reserve Account #: 1234
Execution: IMMEDIATE Status: Active

FIG. 39B

MRT EDI – 139

From: Federal Reserve Bank
To: ABC Bank

Federal Reserve Account Credit: $5,077.50
Federal Reserve Account # 1234

Accountholder: Jay Hardison
Account # 12344321
Date: 10/10/11
Time: 10:10:11 AM (R (β, $) Credit Amount: $5,000
Interest Credit Amount: $77.50
Total: $5,077.50

From: Acme Bank
Federal Reserve Account # 4321
Execution: IMMEDIATE Status: Active

FIG. 39C

STEP J of MRT PROCESS: "Home" Financial Institution Lending/Investing After Return of Monetary Right(s) plus Earned Interest

EDI Messaging Used to Implement STEP J:
EDI MESSAGE. No EDI– "Home" lends/invests amount of monetary right(s) transfer, plus interest.
Network Participants Involved in EDI Messaging: None STEP K of MRT PROCESS: Reporting of Earned Interest Income by the MRT Process of the Present Invention EDI Messaging Used to Implement STEP K:
EDI MESSAGE: 140 – MRT System reports MRT's User's interest earned from monetary right(s) transfer to both the MRT User and to the Internal Revenue Service
Network Participants Involved in EDI Messaging: MRT User, MRT System, IRS

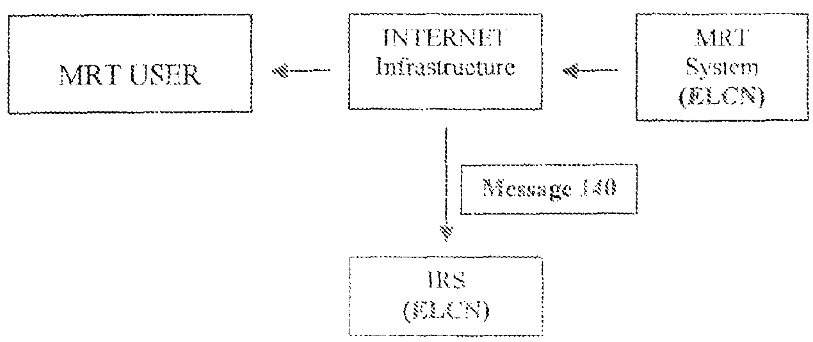

FIG. 41A

STEP K of MRT PROCESS

MRT EDI – 140
From: MRT
To: Internal Revenue Service
Interest Income Report

Accountholder: Jey Hardison
Bank: Acme Bank
Account #: 43211234
Tax ID #: 123-45-6789
DOB: 10/10/62
Address: 11 Easy Street
New York, NY 10001

Date: 10/10/11
Time: 10:10:11 AM

Interest Earned: $77.50
From: Acme Bank
Tax ID #: 27272727
Execution: IMMEDIATE
Status: Active

FIG. 41B

MRT FEDWIRE EDI Message Exchange Log

Type: MRT Transfer
Monetary Right(s): R (β, $)
Method: Fedwire
Sending Bank: ABC Bank
Fed ABA:1234
Account Number: 12344321
Receiving Bank: Acme Bank
FED ABA:4321
Account Number: 43211234

Monetary Right Transfer Amount: $5,000.00 (R (β, $5000)
Earned Interest Income: $77.50

Date: 10/10/10
Time: 10:10:10 AM

ME = Message Exchange

| | |
|---|---|
| ME 125 | MRT, Participating Financial Institutions |
| ME 126 | MRT, MRT User |
| ME 127 | MRT, "Home" Financial Institution |
| ME 128 | MRT, "External" Financial Institution(s) |
| ME 129 | MRT, Federal Reserve Bank |
| ME 130 | MRT, Federal Reserve Bank |
| ME 131 | MRT, U.S. Treasury (Homeland Security) |
| ME 132 | Federal Reserve Bank, "Home" Financial Institution (Debit) |
| ME 133 | Federal Reserve Bank, "External" Financial Institution (Credit) |
| ME 134 | MRT, MRT User |
| ME 135 | MRT, "External" Financial Institution |
| ME 136 | MRT, "Home" Financial Institution |
| ME 137 | MRT, Federal Reserve Bank |
| ME 138 | Federal Reserve Bank, "External" Financial Institution (Debit) |
| ME 139 | Federal Reserve Bank, "Home" Financial Institution (Credit) |
| ME 140 | MRT, Internal Revenue Service (Reporting of Earned Interest) |
| | |
| | |

FIG. 42

Monetary Rights Transfer (MRT) Accounting Process for Monetary Right Transfer and for Collateralization Manual Right to Earn Interest (REI) Transfer Process
(Method "A") on the MRTS Network of the Present Invention

Manual REI Transfer Process (Method "A") on the MRTS Network of the Present Invention

Accountholder Reviews Updated Rates from Participating Banks

Click → Make Transfer

| Transfer From | Yield | Existing Accounts | Balance | Amount Available for Interest Right Transfer(s) |
|---|---|---|---|---|
| X | 0.00% | Citi Checking | $50,000.00 | $47,500.00 * |
| | 2.48% | Chase Savings | $80,000.00 | $80,000.00 |
| | 2.74% | Merrill Lynch Brokerage | $200,000.00 | $200,000.00 |
| | 3.01% | Fidelity Mny Mkt | $250,000.00 | $245,000.00 ** |

* $2,500.00 required minimum balance for free checking

** $5,000.00 required minimum balance

FIG. 45A1

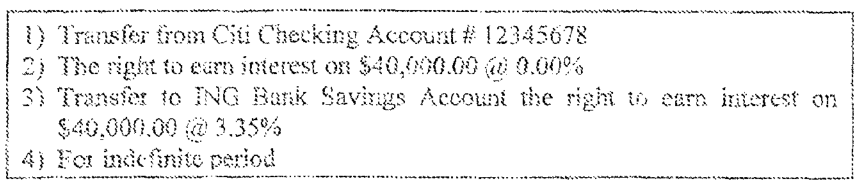
FIG. 45A2
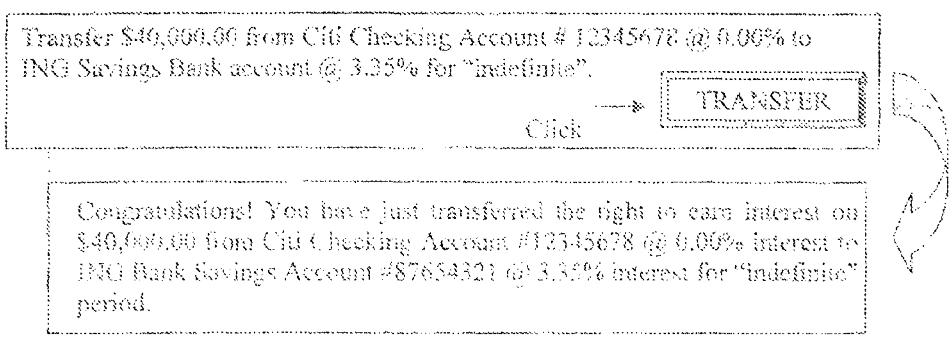
FIG. 45A3

Accounts Status (NEW)

| Yield | Existing Accounts | Balance | Interest Right Transfer(s) | Interest Right(s) Available for Transfer |
|---|---|---|---|---|
| 0.00% | Citi Checking | $50,000.00 | ($40,000.00) | $ 7,500.00 * |
| 2.48% | Chase Savings | $80,000.00 | | $80,000.00 |
| 2.74% | Merrill Lynch Brokerage | $200,000.00 | | $200,000.00 |
| 3.01% | Fidelity Mny Mkt. | $250,000.00 | | $245,000.00 ** |
| 3.35% | INGBank Savings | $ 0.00 | $40,000.00 | $40,000.00 |

* $2,500.00 required minimum balance for free checking

** $5,000.00 required minimum balance

FIG. 45B

Manual REI Transfer Process (Method "A") on the MRTS Network of the Present Invention

Accountholder-Specified Criteria REI Transfer Process (Method "B") on the MRTS Network of the Present Invention

Accountholder-Specified Criteria REI Transfer Process (Method "B") on the MRTS Network of the Present Invention
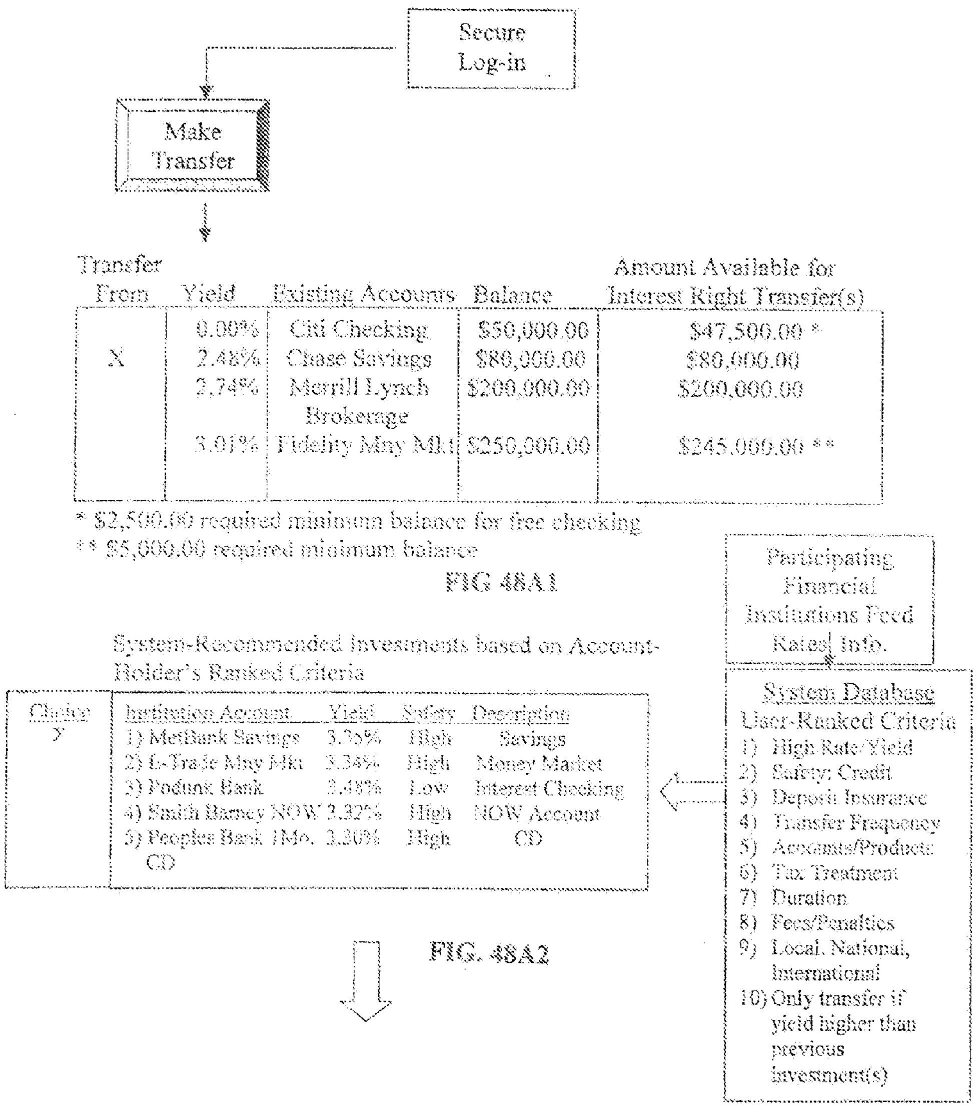
FIG 48A1
FIG. 48A2

Transfer right to earn interest on $40,000.00 from Chase Savings Account #12345678 to MetBank Savings Account @ 3.35% for "indefinite"

TRANSFER

Congratulations! You have just transferred the right to earn interest on $40,000.00 from Chase Savings Account #12345678 to MetBank Savings Account # 87654321 for "indefinite".

FIG. 48A3

Accounts Status (NEW)

| Yield | Existing Accounts | Balance | Interest Right Transfer(s) | Interest Right(s) Available for Transfer |
|---|---|---|---|---|
| 0.00% | Citi Checking | $50,000.00 | ($40,000.00) | $ 7,500.00 * |
| 2.48% | Chase Savings | $80,000.00 | | $80,000.00 |
| 2.74% | Merrill Lynch Brokerage | $200,000.00 | | $200,000.00 |
| 3.01% | Fidelity Mny Mkt. | $250,000.00 | | $245,000.00 ** |
| 3.35% | MetBank Savings | $ 0.00 | $40,000.00 | $40,000.00 |

* $2,500.00 required minimum balance for free checking

** $5,000.00 required minimum balance

FIG. 48B1

Accountholder-Specified Criteria REI Transfer Process (Method "B") on the MRTS Network of the Present Invention

Preferred Partner Network (PPN) REI Transfer Process (Method "C") on the MRTS Network of the Present Invention

Preferred Partner Network (PPN) REI Transfer Process (Method "C") on the MRTS Network of the Present Invention

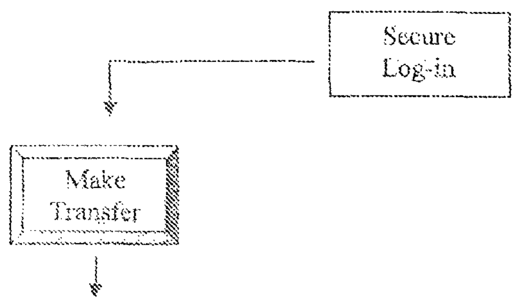

| Transfer From | Yield | Existing Accounts | Balance | Amount Available for Interest Right Transfer(s) |
|---|---|---|---|---|
| X | 0.00% | Citi Checking | $50,000.00 | $47,500.00 * |
| X | 3.22% | Chase Savings | $80,000.00 | $80,000.00 |
| | 3.40% | Schwab Brokerage | $200,000.00 | $200,000.00 |
| | 3.41% | AIG CD 3 Mo. | $250,000.00 | $245,000.00 ** |

* $2,500.00 required minimum balance for free checking

** $5,000.00 penalty for early withdrawal

FIG. 51A1

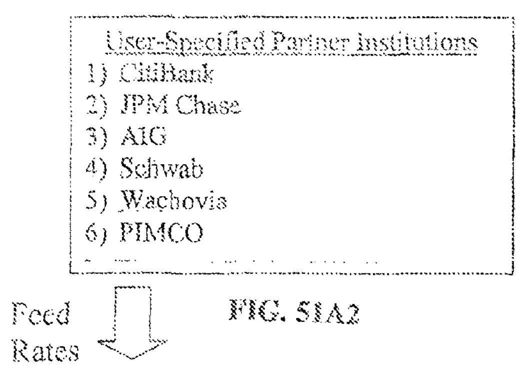

FIG. 51A2

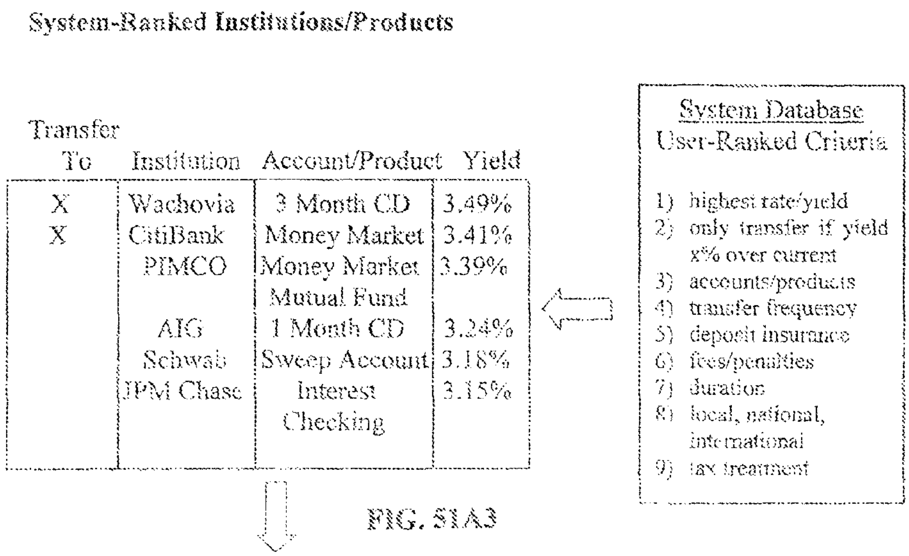
FIG. 51A3
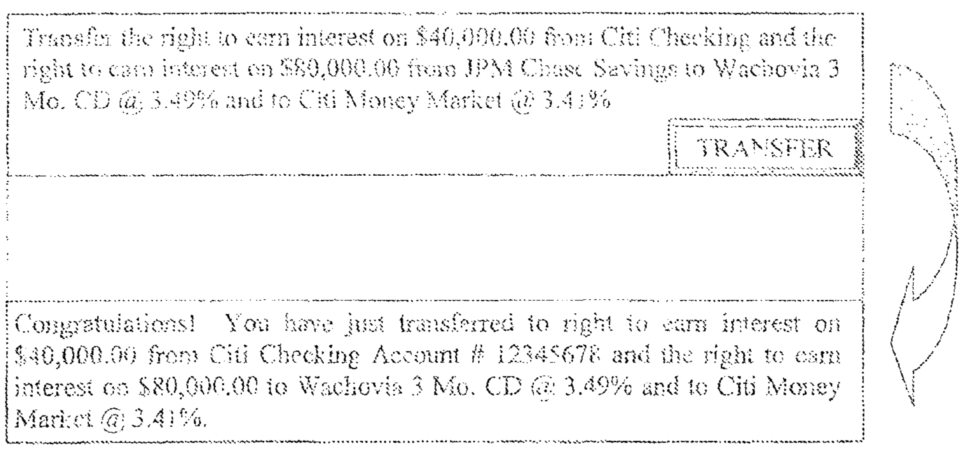
FIG. 51A4

Accounts Status (NEW)

| Yield | Existing Accounts | Balance | Interest Right Transfer(s) | Interest Right(s) Available for Transfer |
|---|---|---|---|---|
| 0.00% | Citi Checking | $50,000.00 | ($40,000.00) | $ 7,500.00 * |
| 3.22% | Chase Savings | $80,000.00 | ($80,000.00) | $80,000.00 |
| 3.40% | Schwab Brokerage | $200,000.00 | | $200,000.00 |
| 3.01% | AIG 3 Mo. CD | $250,000.00 | | $245,000.00 ** |
| 3.49% | Wachovia 3 Mo. CD | $ 0.00 | $99,135.00 | $99,135.00 |
| 3.41% | Citi Money Market | $ 0.00 | $20,865.00 | $20,865.00 |

* $2,500.00 required minimum balance for free checking

** $5,000.00 penalty for early withdrawal

FIG. 51B1

Preferred Partner Network (PPN) REI Transfer Process (Method "C") on the MRTS Network of the Present Invention System-Selected REI Transfer Process (Method "D") on the MRTS Network of the Present Invention System-Selected Criteria REI Transfer Process (Method "D")
on the MRTS Network of the Present Invention
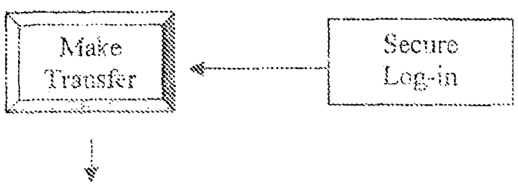
| Transfer From | Yield | Existing Accounts | Balance | Amount Available for Interest Right Transfer(s) |
|---|---|---|---|---|
| X | 0.00% | Citi Checking | $50,000.00 | $47,500.00 * |
| X | 3.22% | Chase Savings | $80,000.00 | $80,000.00 |
| X | 3.40% | Schwab Brokerage | $200,000.00 | $200,000.00 |
| | 3.41% | AIG CD 3 Mo. | $250,000.00 | $245,000.00 ** |
* $2,500.00 required minimum balance for free checking
** $5,000.00 penalty for early withdrawal
FIG. 54A1

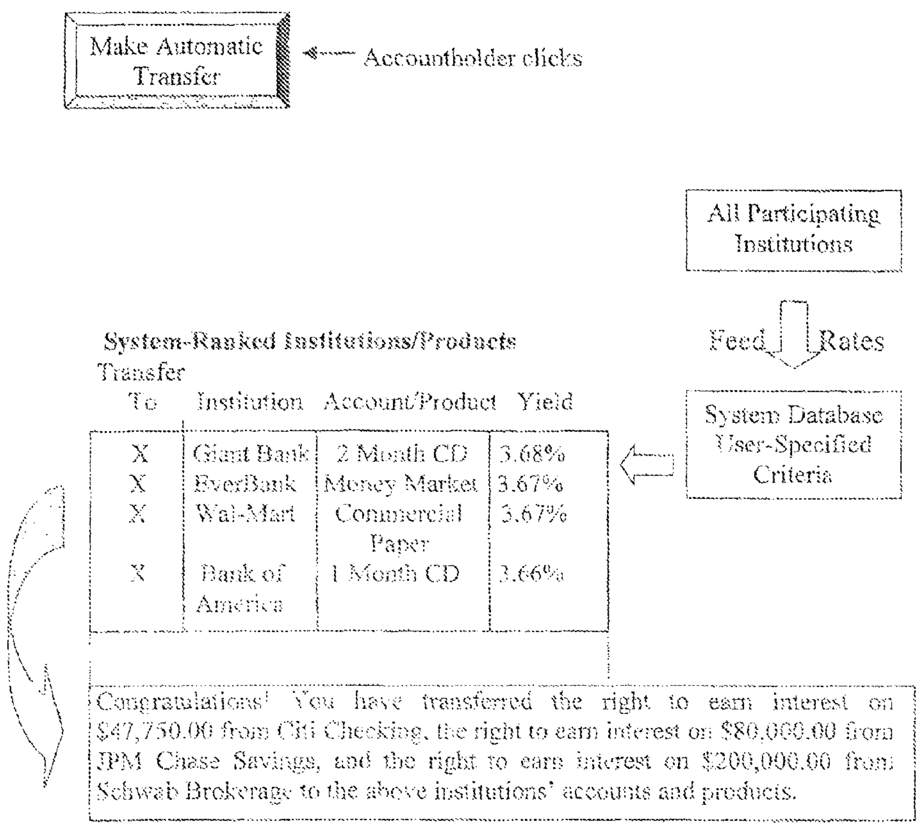
FIG. 54A2

Accounts Status (NEW)

| Yield | Existing Accounts | Balance | Interest Right Transfer(s) | Interest Right(s) Available for Transfer |
|---|---|---|---|---|
| 0.00% | Citi Checking | $50,000.00 | ($47,500.00) | $ 0.00 * |
| 3.22% | Chase Savings | $80,000.00 | ($80,000.00) | $0.00 |
| 3.40% | Schwab Brokerage | $200,000.00 | ($200,000.00) | $0.00 |
| 3.01% | AIG 3 Mo. CD | $250,000.00 | $0.00 | $245,000.00 ** |
| 3.68% | Giant Bank 2M CD | $ 0.00 | $99,390.40 | $99,390.40 |
| 3.67% | EverBank Money Market | $ 0.00 | $96,459.92 | $96,459.92 |
| 3.67% | W-Mart 90 Day CP | $0.00 | $99,090.84 | $99,090.84 |
| 3.66% | Bk of Am. 1M CD | $0.00 | $32,558.84 | $32,558.84 |

* $2,500.00 required minimum balance for free checking

** $5,000.00 penalty for early withdrawal

FIG. 54B1

System-Selected Criteria REI Transfer Process (Method "D") on the MRTS Network of the Present Invention

F

MRTS then displays accountholder's new accounts status including existing institutions and accounts/products (R (α…ι, $), accounts from which R (β, $) has been transferred (R (α…ι, $) - R (β, $)), and accounts to which R (β, $) has been transferred.

FIG. 55B

Internal REI Transfer Process (Method "E") on the MRTS Network of the Present Invention
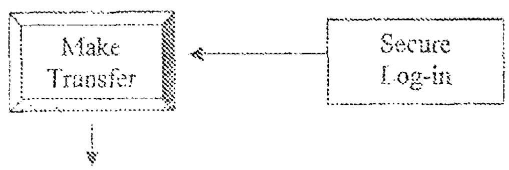
| Transfer From | Yield | Existing Accounts | Balance | Amount Available for Interest Right Transfer(s) |
|---|---|---|---|---|
| X | 0.00% | Citi Checking | $50,000.00 | $47,500.00 * |
* $2,500.00 required minimum balance for free checking
FIG. 57A1

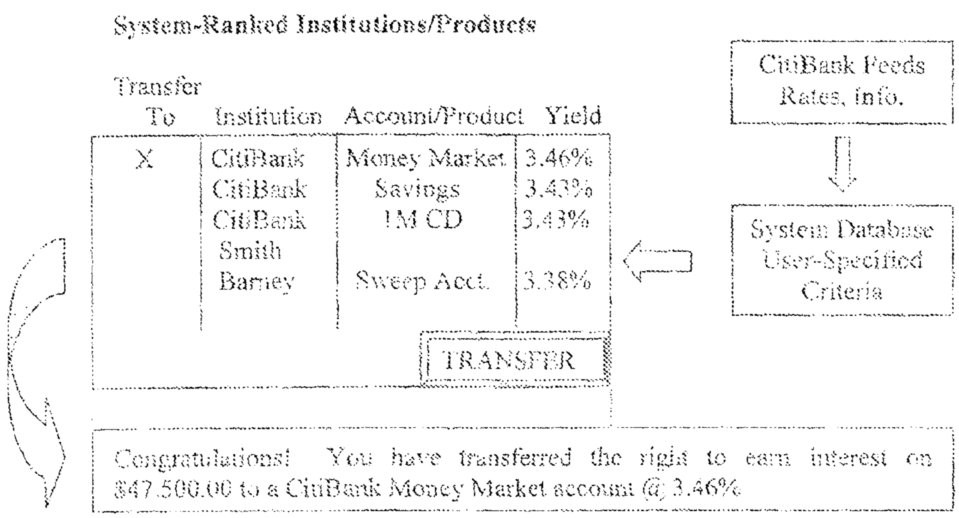
FIG. 57A2

Accounts Status (NEW)

| Yield | Existing Accounts | Balance | Interest Right Transfer(s) | Interest Right(s) Available for Transfer |
|---|---|---|---|---|
| 0.00% | Citi Checking | $50,000.00 | ($47,500.00) | $ 2,500.00 * |
| 3.46% | Citi Money Market | $ 0.00 | $47,500.00 | $47,500.00 |

* $2,500.00 required minimum balance for free checking

FIG. 57B1

Figure 58A:
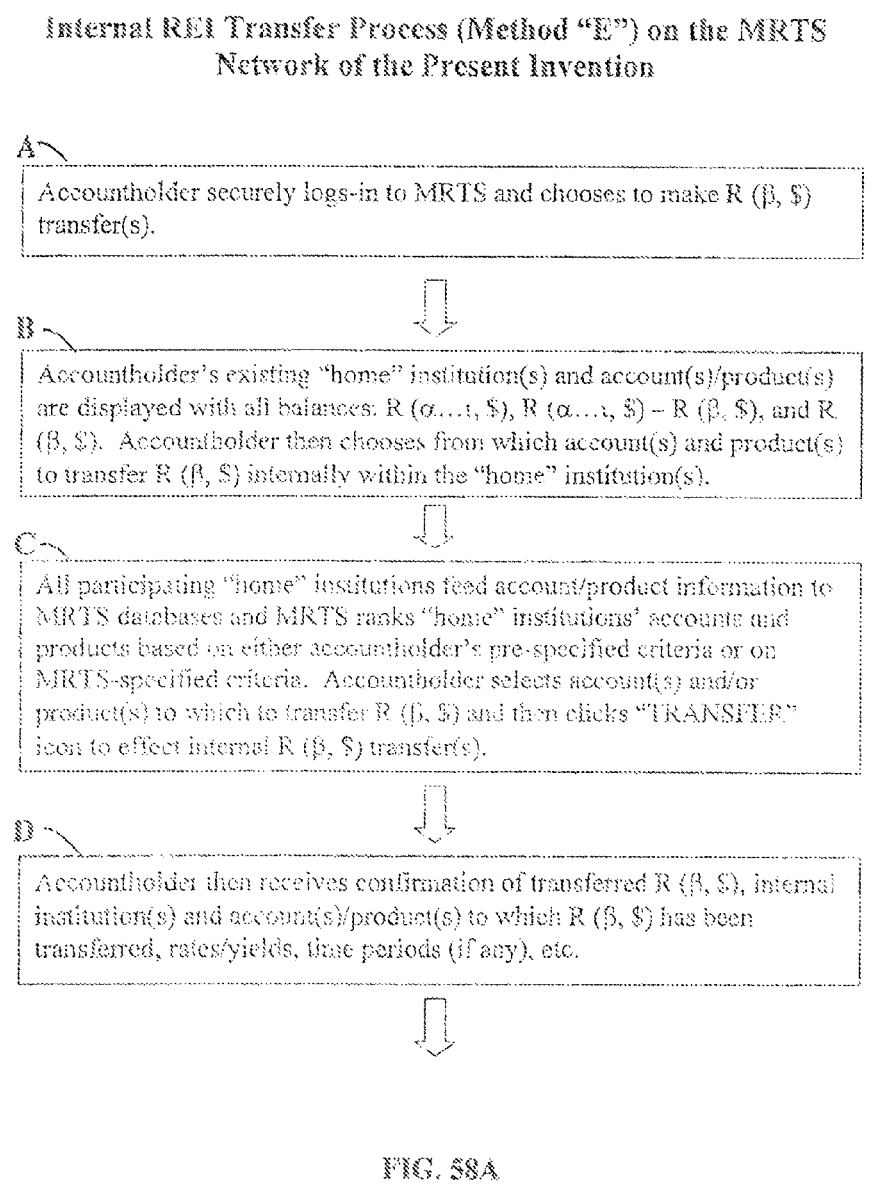

Internal REI Transfer Process (Method "E") on the MRTS Network of the Present Invention

A: Accountholder securely logs-in to MRTS and chooses to make R (β, $) transfer(s).

B: Accountholder's existing "home" institution(s) and account(s)/product(s) are displayed with all balances: R (α…ι, $), R (α…ι, $) – R (β, $), and R (β, $). Accountholder then chooses from which account(s) and product(s) to transfer R (β, $) internally within the "home" institution(s).

C: All participating "home" institutions feed account/product information to MRTS databases and MRTS ranks "home" institutions' accounts and products based on either accountholder's pre-specified criteria or on MRTS-specified criteria. Accountholder selects account(s) and/or product(s) to which to transfer R (β, $) and then clicks "TRANSFER" icon to effect internal R (β, $) transfer(s).

D: Accountholder then receives confirmation of transferred R (β, $), internal institution(s) and account(s)/product(s) to which R (β, $) has been transferred, rates/yields, time periods (if any), etc.

MRTS then displays accountholder's new accounts status including existing "home" institutions and accounts/products (R (α…ι, $), "home" institutions' accounts from which R (β, $) has been transferred (R (α…ι, $) - R (β, $)), and "home" institutions' accounts to which R (β, $) has been transferred.

FIG. 58B

Rate Collection and Display Process on the MRTS Network of the Present Invention Rate Collection and Display Process on the MRTS Network of the Present Invention REI Transfer Process Coincident with Purchases, Payments and Withdrawals (Commerce Facilitation) on the MRTS Network of the Present Invention Secure Log-in TRANSFER (Transfer has already occurred)

Account Status

| Yield | Existing Accounts | Balance | Interest Right Transfer(s) | Interest Right(s) Available for Transfer |
|---|---|---|---|---|
| 3.52% | NetBank Savings | $0.00 | $40,000.00 | $40,000.00 |
| 3.50% | E-Trade 1M CD | $0.00 | $50,000.00 | $50,000.00 * |
| 3.50% | PayPal Mny Mrkt. | $0.00 | $27,000.00 | $27,000.00 |

* Six months interest penalty for early withdrawal.

Accountholder has transferred these funds from a checking account with a linked debit card. Accountholder then makes a debit card purchase (or writes a check, makes ATM (or other) withdrawal) for $227.00.

FIG. 61B1

| Date | Transaction | Amount | Method |
|---|---|---|---|
| 10/07/05 | Amazon.com | $227.00 | Citi debit card |

FIG. 61B2

Account Status (NEW)

| Yield | Existing Accounts | Balance | Interest Right Transfer(s) | Interest Right(s) Available for Transfer |
|---|---|---|---|---|
| 3.52% | NetBank Savings | $0.00 | $40.000.00 | $40,000.00 |
| 3.50% | E-Trade 1M CD | $0.00 | $50,000.00 | $50,000.00 * |
| 3.50% | PayPal Mny Mrkt. | $0.00 | $26,773.00 | $26,773.00 |

* Six months interest penalty for early withdrawal

FIG. 61C1

Transaction Log

| Date | Transaction Log | Amount | Method | Paypal interest right balance |
|---|---|---|---|---|
| 10/07/05 | Amazon.com | $227.00 | Citi debit card | $26,773.00 |
| 10/10/05 | Home Depot | $334.74 | Citi debit card | $26,438.26 |
| 10/10/05 | CitiBank ATM | $200.00 | Citi ATM card | $26,238.74 |
| 10/12/05 | Dominos Pizza | $47.77 | CitiBank check | $26,190.49 |
| 10/15/05 | City Ford | $19,243.38 | CitiBank check | $ 6,947.11 |
| 10/18/05 | CitiBank Teller | $150.00 | teller withdrawal | $ 6,797.11 |

FIG. 61C2

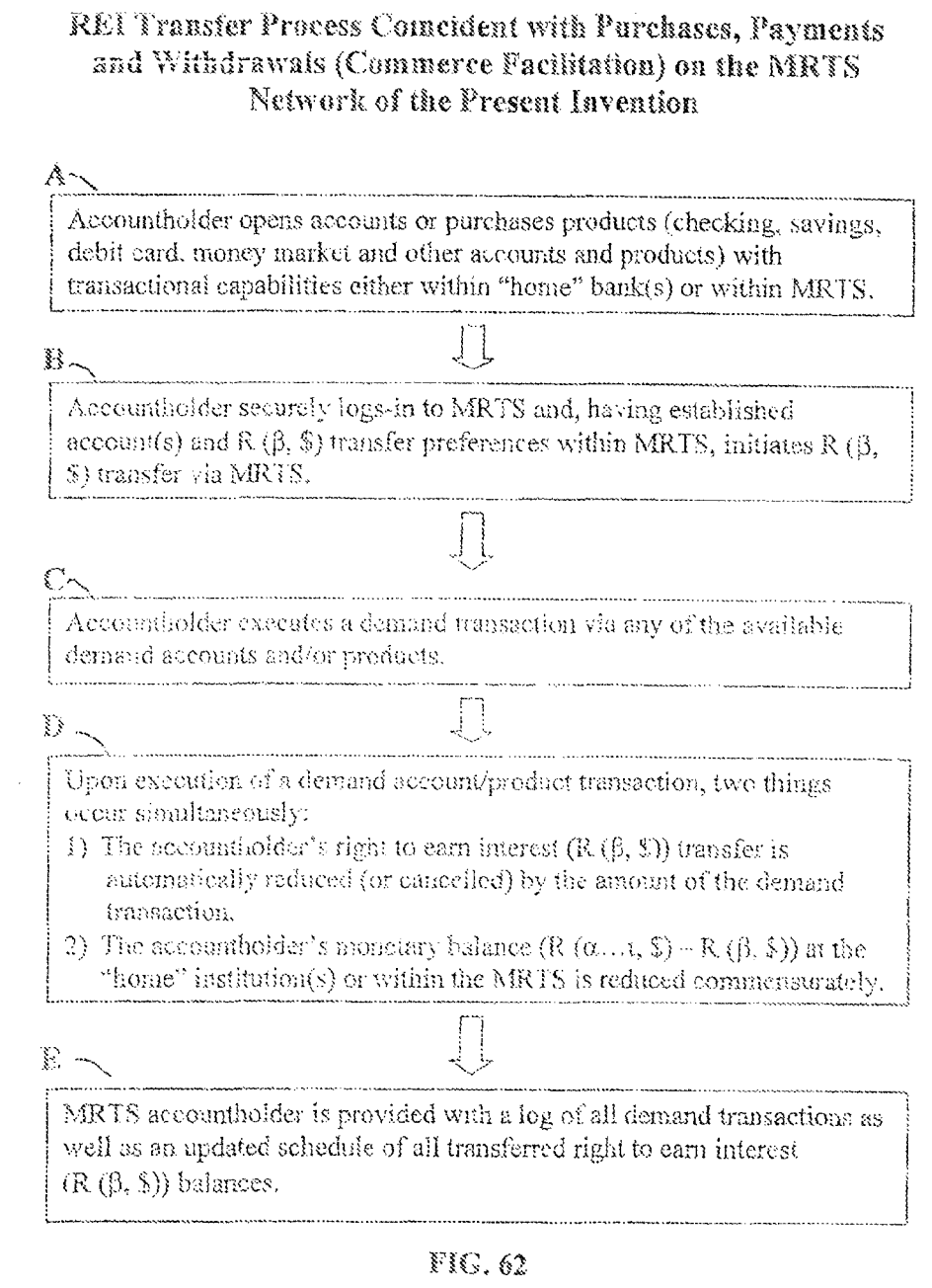

REI Transfer Process Coincident with Purchases, Payments and Withdrawals (Commerce Facilitation) on the MRTS Network of the Present Invention

A

Accountholder opens accounts or purchases products (checking, savings, debit card, money market and other accounts and products) with transactional capabilities either within "home" bank(s) or within MRTS.

⇩

B

Accountholder securely logs-in to MRTS and, having established account(s) and R (β, $) transfer preferences within MRTS, initiates R (β, $) transfer via MRTS.

⇩

C

Accountholder executes a demand transaction via any of the available demand accounts and/or products.

⇩

D

Upon execution of a demand account/product transaction, two things occur simultaneously:

1) The accountholder's right to earn interest (R (β, $)) transfer is automatically reduced (or cancelled) by the amount of the demand transaction.
2) The accountholder's monetary balance (R (α…ι, $) – R (β, $)) at the "home" institution(s) or within the MRTS is reduced commensurately.

⇩

E

MRTS accountholder is provided with a log of all demand transactions as well as an updated schedule of all transferred right to earn interest (R (β, $)) balances.

FIG. 62

Tax Recognition and Reporting Process on the MRTS Network of the Present Invention

Tax Recognition and Reporting Process on the MRTS Network of the Present Invention

Mortgage REI Transfer Process on the MRTS Network of the Present Invention

* Interest Right (ℝ (β, $)) Transfer is automatically reduced or cancelled upon disbursement of actual payments.

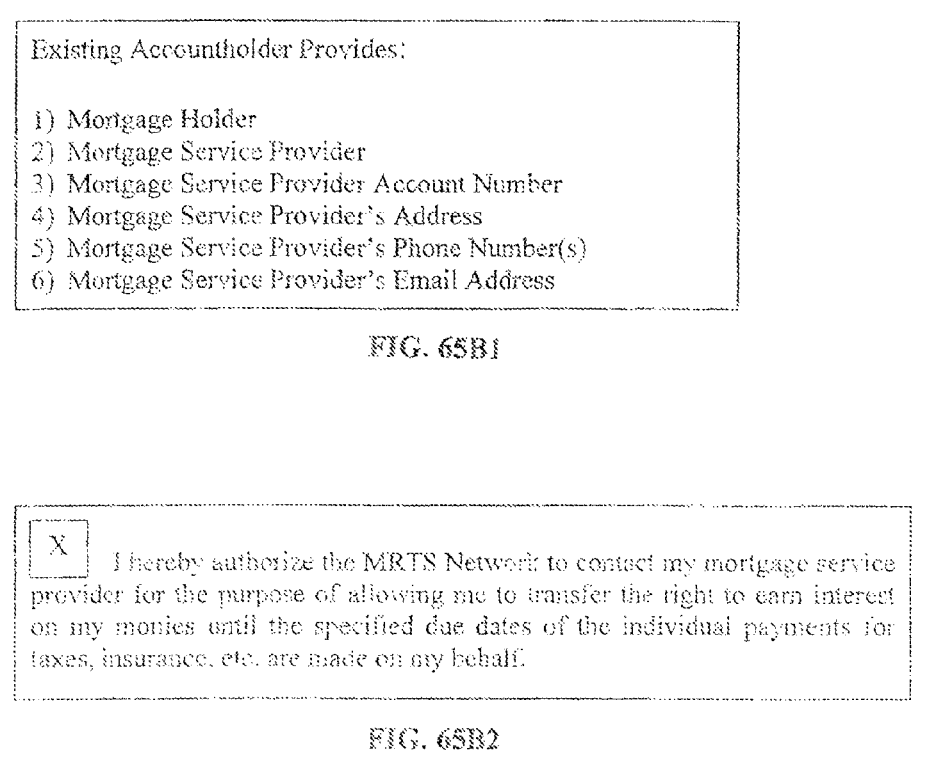

Existing Accountholder Provides:

1) Mortgage Holder
2) Mortgage Service Provider
3) Mortgage Service Provider Account Number
4) Mortgage Service Provider's Address
5) Mortgage Service Provider's Phone Number(s)
6) Mortgage Service Provider's Email Address

FIG. 65B1

[X] I hereby authorize the MRTS Network to contact my mortgage service provider for the purpose of allowing me to transfer the right to earn interest on my monies until the specified due dates of the individual payments for taxes, insurance, etc. are made on my behalf.

FIG. 65B2

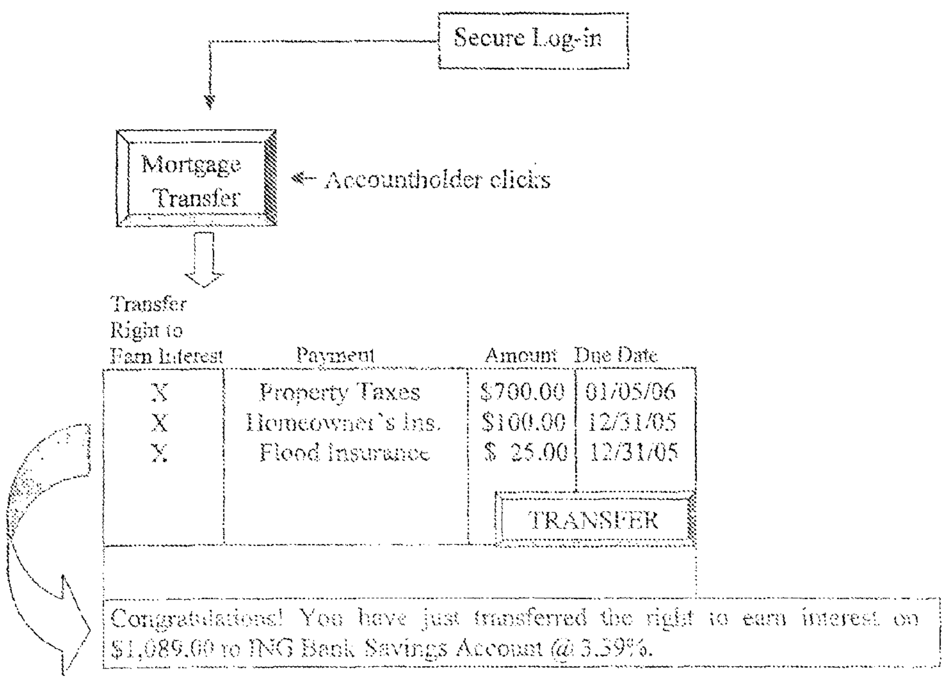
FIG. 65B3

Account Status (NEW)

| Yield | Existing Accounts | Balance | Interest Right Transfer(s) | Interest Right(s) Available for Transfer |
|---|---|---|---|---|
| 3.39% | ING Bank Savings | $0.00 | $825.00 | $825.00 |

FIG. 65C1

Transaction Log

| Date | Account | Reduction of Transferred Right to Earn Interest | Purpose |
|---|---|---|---|
| 12/31/05 | ING Bank Sav.<br>ING Bank Sav. | ($100.00)<br>($25.00) | Restore the right to earn interest to Countrywide to make homeowner's and flood insurance premium payments. |

FIG. 65C2

Account Status (NEW)

| Yield | Existing Accounts | Balance | Interest Right Transfer(s) | Interest Right(s) Available for Transfer |
|---|---|---|---|---|
| 3.42% | ING Bank Savings | $0.00 | $700.00 | $700.00 |

FIG. 65C3

Figure 66A:
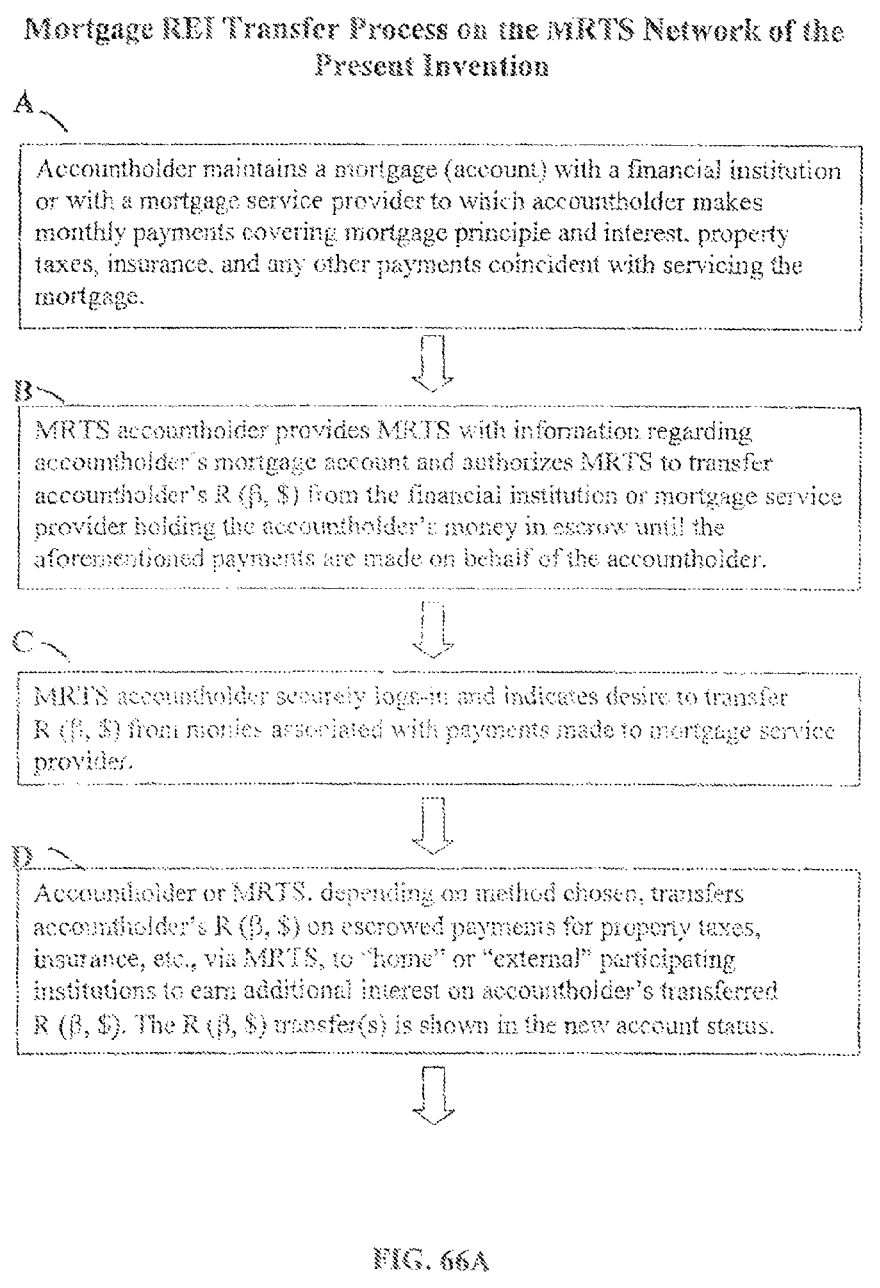

Mortgage REI Transfer Process on the MRTS Network of the Present Invention

A

Accountholder maintains a mortgage (account) with a financial institution or with a mortgage service provider to which accountholder makes monthly payments covering mortgage principle and interest, property taxes, insurance, and any other payments coincident with servicing the mortgage.

⇩

B

MRTS accountholder provides MRTS with information regarding accountholder's mortgage account and authorizes MRTS to transfer accountholder's R (β, $) from the financial institution or mortgage service provider holding the accountholder's money in escrow until the aforementioned payments are made on behalf of the accountholder.

⇩

C

MRTS accountholder securely logs-in and indicates desire to transfer R (β, $) from monies associated with payments made to mortgage service provider.

⇩

D

Accountholder or MRTS, depending on method chosen, transfers accountholder's R (β, $) on escrowed payments for property taxes, insurance, etc., via MRTS, to "home" or "external" participating institutions to earn additional interest on accountholder's transferred R (β, $). The R (β, $) transfer(s) is shown in the new account status.

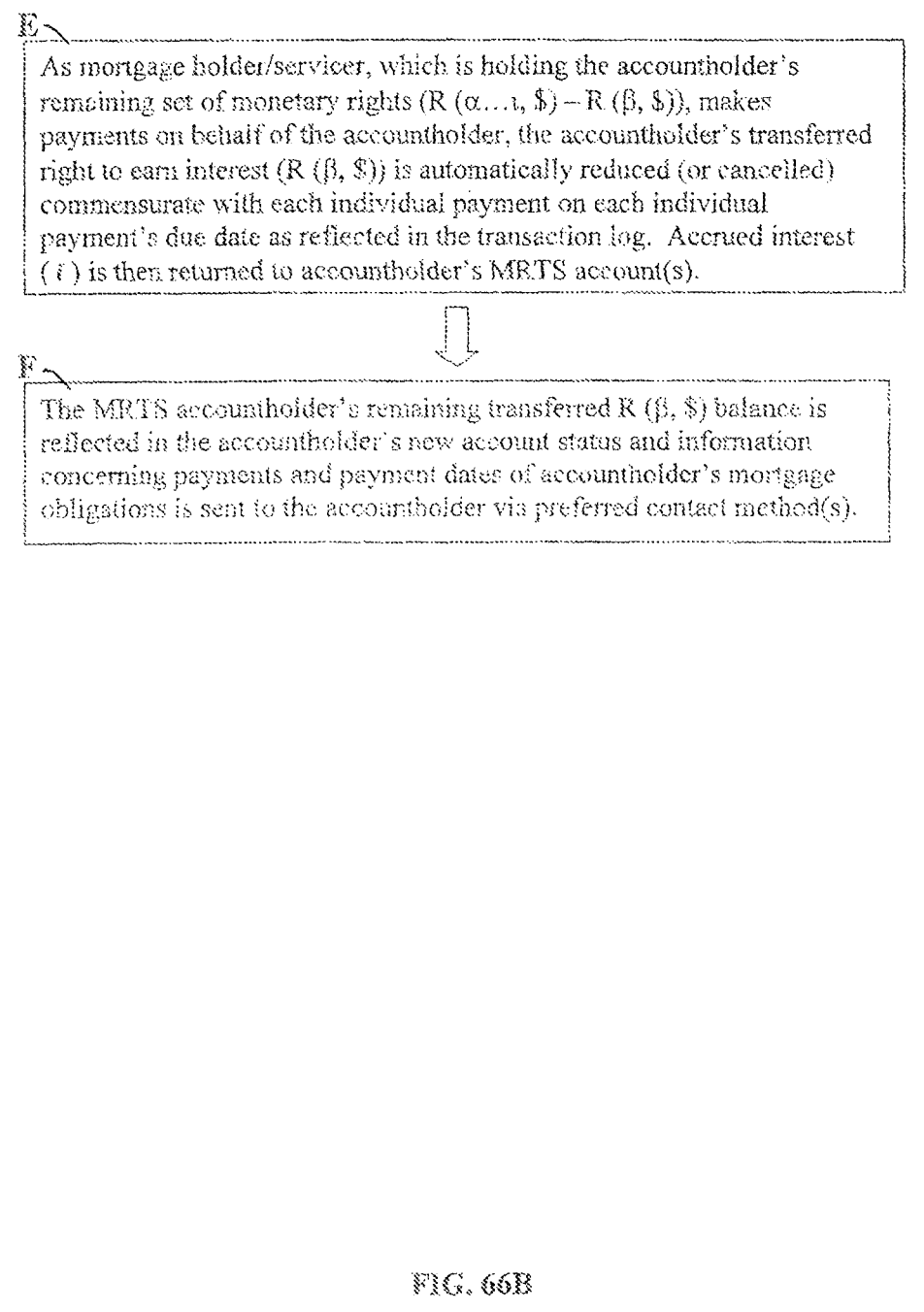

As mortgage holder/servicer, which is holding the accountholder's remaining set of monetary rights (R (α…ι, $) – R (β, $)), makes payments on behalf of the accountholder, the accountholder's transferred right to earn interest (R (β, $)) is automatically reduced (or cancelled) commensurate with each individual payment on each individual payment's due date as reflected in the transaction log. Accrued interest ( $i$ ) is then returned to accountholder's MRTS account(s).

⇩

F

The MRTS accountholder's remaining transferred R (β, $) balance is reflected in the accountholder's new account status and information concerning payments and payment dates of accountholder's mortgage obligations is sent to the accountholder via preferred contact method(s).

FIG. 66B

Existing Accountholder Provides:

1) Employer Name
2) Employer Address
3) Employer Phone Number
4) Human Resources Contact Name
5) Human Resources Contact Phone Number
6) Human Resources Contact Email Address
7) Payroll Service Provider Name (if applicable)
8) Payroll Service Provider Contact Information

FIG. 67B1

[X] I hereby authorize OptiBank to contact my human resources contact and/or my payroll service provider for the purpose of allowing me to transfer the right to earn interest on my monies until the specified due dates of the individual payments for taxes, insurance, etc. are made on my behalf.

FIG. 67B2

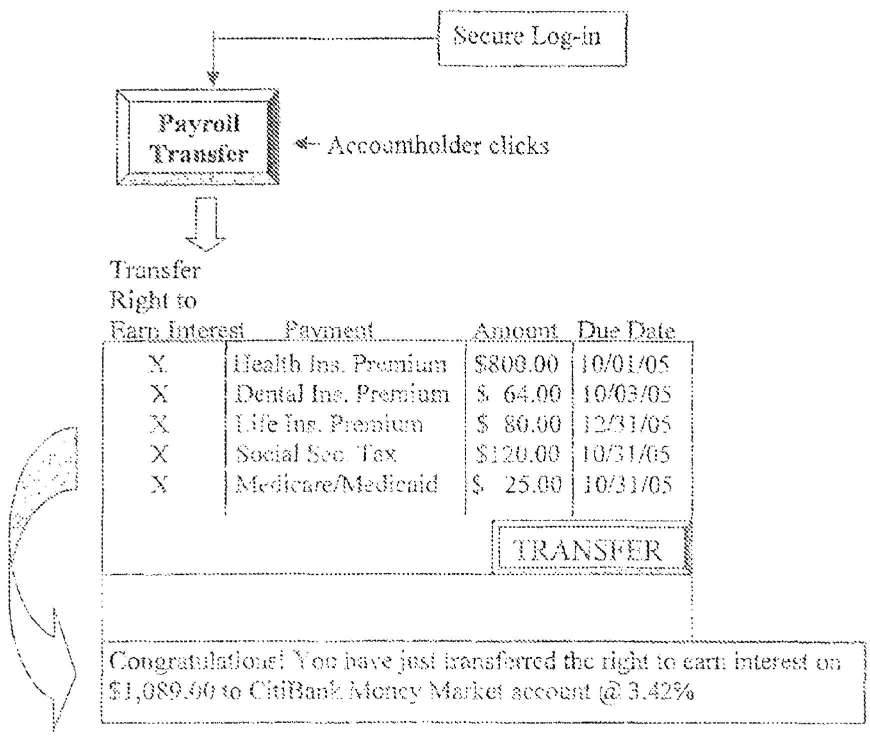
FIG. 67B3

Account Status (NEW)

| Yield | Existing Accounts | Balance | Interest Right Transfer(s) | Interest Right(s) Available for |
|---|---|---|---|---|
| 3.42% | CitiBank Mny Mkt. | $0.00 | $1,089.00 | $1,089.00 |

FIG. 67C1

Transaction Log

| Date | Account | Reduction of Transferred Right to Earn Interest | Purpose |
|---|---|---|---|
| 10/01/05 | CitiBank Mny Mkt. | ($800.00) | Restore right to earn interest to ADP to make health insurance premium payment |

FIG. 67C2

Account Status (NEW)

| Yield | Existing Accounts | Balance | Interest Right Transfer(s) | Interest Right(s) Available for |
|---|---|---|---|---|
| 3.42% | CitiBank Mny Mkt. | $0.00 | $289.00 | $289.00 |

FIG. 67C3

Figure 68A:
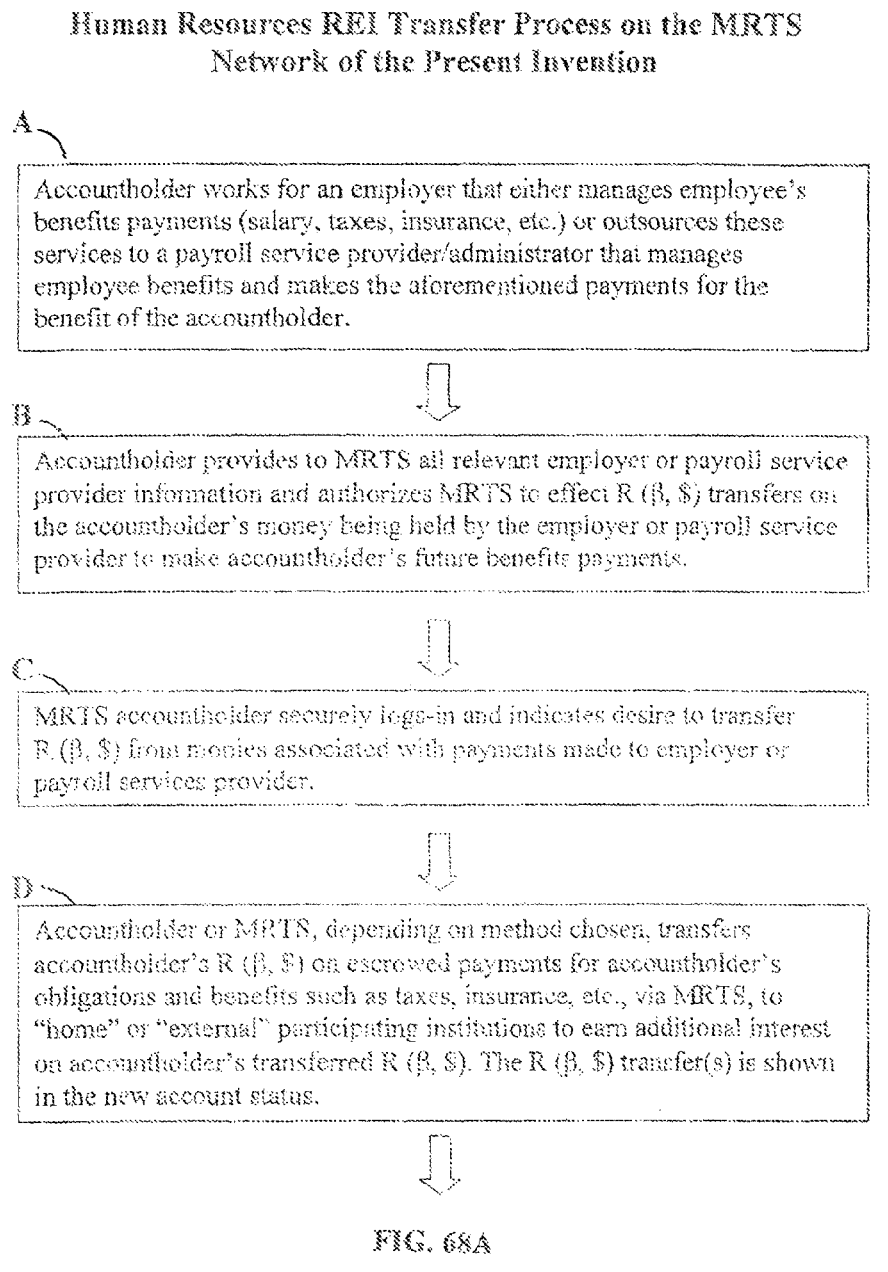

Human Resources REI Transfer Process on the MRTS Network of the Present Invention

A

Accountholder works for an employer that either manages employee's benefits payments (salary, taxes, insurance, etc.) or outsources these services to a payroll service provider/administrator that manages employee benefits and makes the aforementioned payments for the benefit of the accountholder.

⇩

B

Accountholder provides to MRTS all relevant employer or payroll service provider information and authorizes MRTS to effect R (β, $) transfers on the accountholder's money being held by the employer or payroll service provider to make accountholder's future benefits payments.

⇩

C

MRTS accountholder securely logs-in and indicates desire to transfer R (β, $) from monies associated with payments made to employer or payroll services provider.

⇩

D

Accountholder or MRTS, depending on method chosen, transfers accountholder's R (β, $) on escrowed payments for accountholder's obligations and benefits such as taxes, insurance, etc., via MRTS, to "home" or "external" participating institutions to earn additional interest on accountholder's transferred R (β, $). The R (β, $) transfer(s) is shown in the new account status.

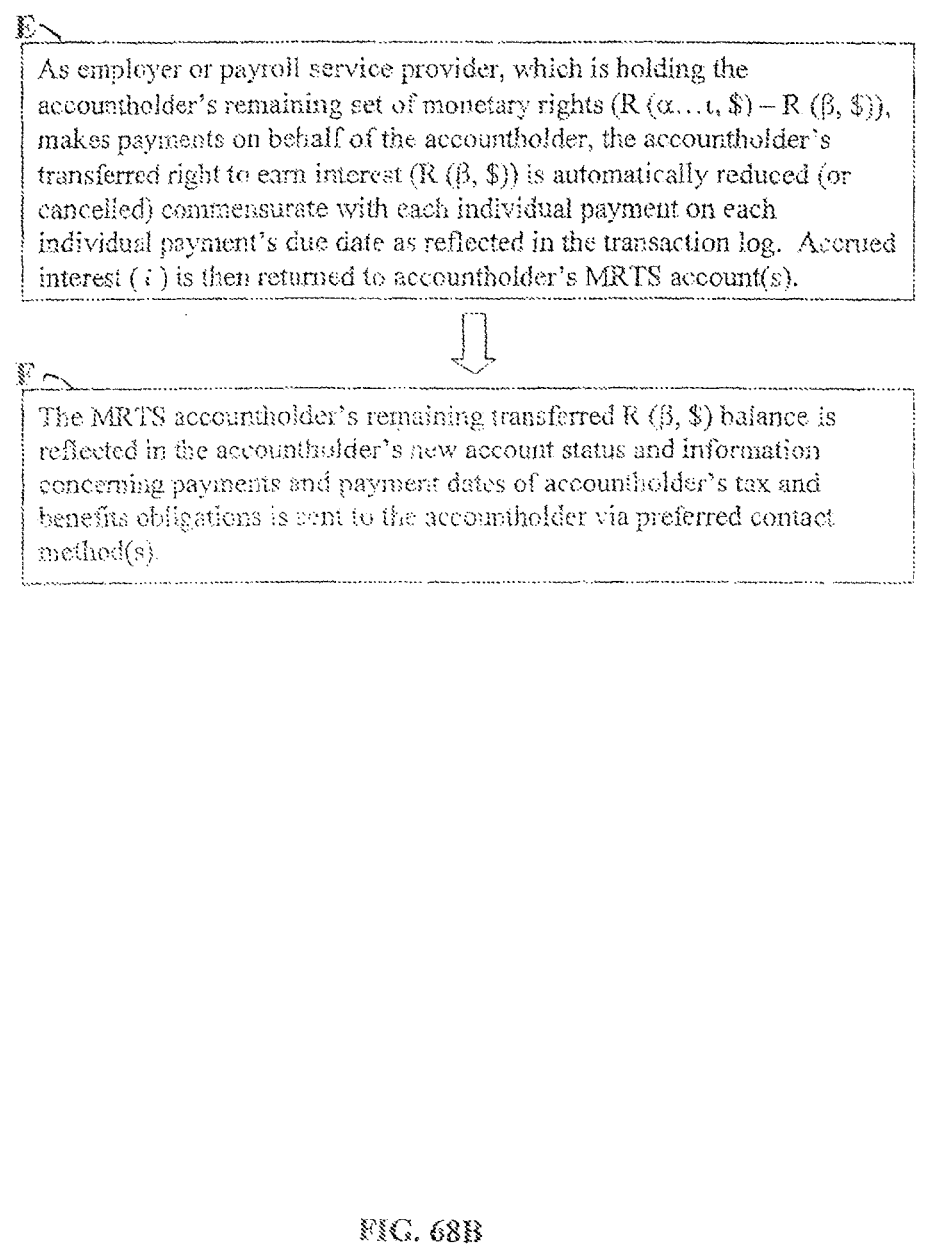

As employer or payroll service provider, which is holding the accountholder's remaining set of monetary rights (R (α…ι, \$) – R (β, \$)), makes payments on behalf of the accountholder, the accountholder's transferred right to earn interest (R (β, \$)) is automatically reduced (or cancelled) commensurate with each individual payment on each individual payment's due date as reflected in the transaction log. Accrued interest ( *i* ) is then returned to accountholder's MRTS account(s).

⇩

F

The MRTS accountholder's remaining transferred R (β, \$) balance is reflected in the accountholder's new account status and information concerning payments and payment dates of accountholder's tax and benefits obligations is sent to the accountholder via preferred contact method(s).

FIG. 68B

Method of Payment Involving Withholding the REI (R (β, $)) until Payment Due Date on the MRTS Network of the Present Invention

Existing Accountholder Provides:

1) Power company name and account number
2) Mortgage servicer name and account number
3) Cable company name and account number
4) Insurance company names and account/policy numbers
5) Water company name and account number
6) Taxing authority names and account numbers
7) Internet service provider name and account number
8) Gas company name and account number
9) Credit card name and account number
10) Any other names and account numbers for billing

FIG. 69B1

[X] I hereby authorize OptiBank to contact the above listed companies for the purpose of allowing me to transfer the right to earn interest on my monies until the specified due dates of the individual payments for bill payments made on my behalf.

FIG. 69B2

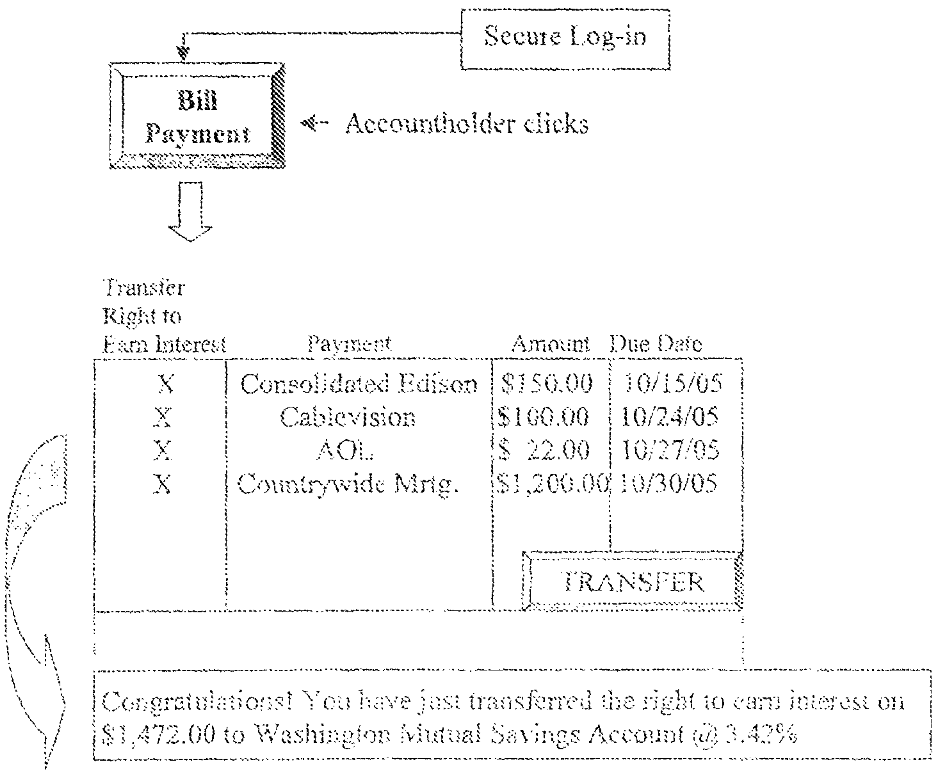
FIG. 69B3

Account Status (NEW)

| Yield | Existing Accounts | Balance | Interest Right Transfer(s) | Interest Right(s) Available for Transfer |
|---|---|---|---|---|
| 3.42% | Wash. Mut. Savings | $0.00 | $1,472.00 | $1,472.00 |

FIG. 69C1

Transaction Log

| Date | Account | Reduction of Transferred Right to Earn Interest | Purpose |
|---|---|---|---|
| 10/15/05 | Wash. Mut. Savings | ($150.00) | Restore the right to earn interest to Consolidated Edison to make monthly power bill payment. |

FIG. 69C2

Account Status (NEW)

| Yield | Existing Accounts | Balance | Interest Right Transfer(s) | Interest Right(s) Available for Transfer |
|---|---|---|---|---|
| 3.42% | Wash. Mut. Savings | $0.00 | $1,322.00 | $1,322.00 |

FIG. 69C3

Figure 69D1:
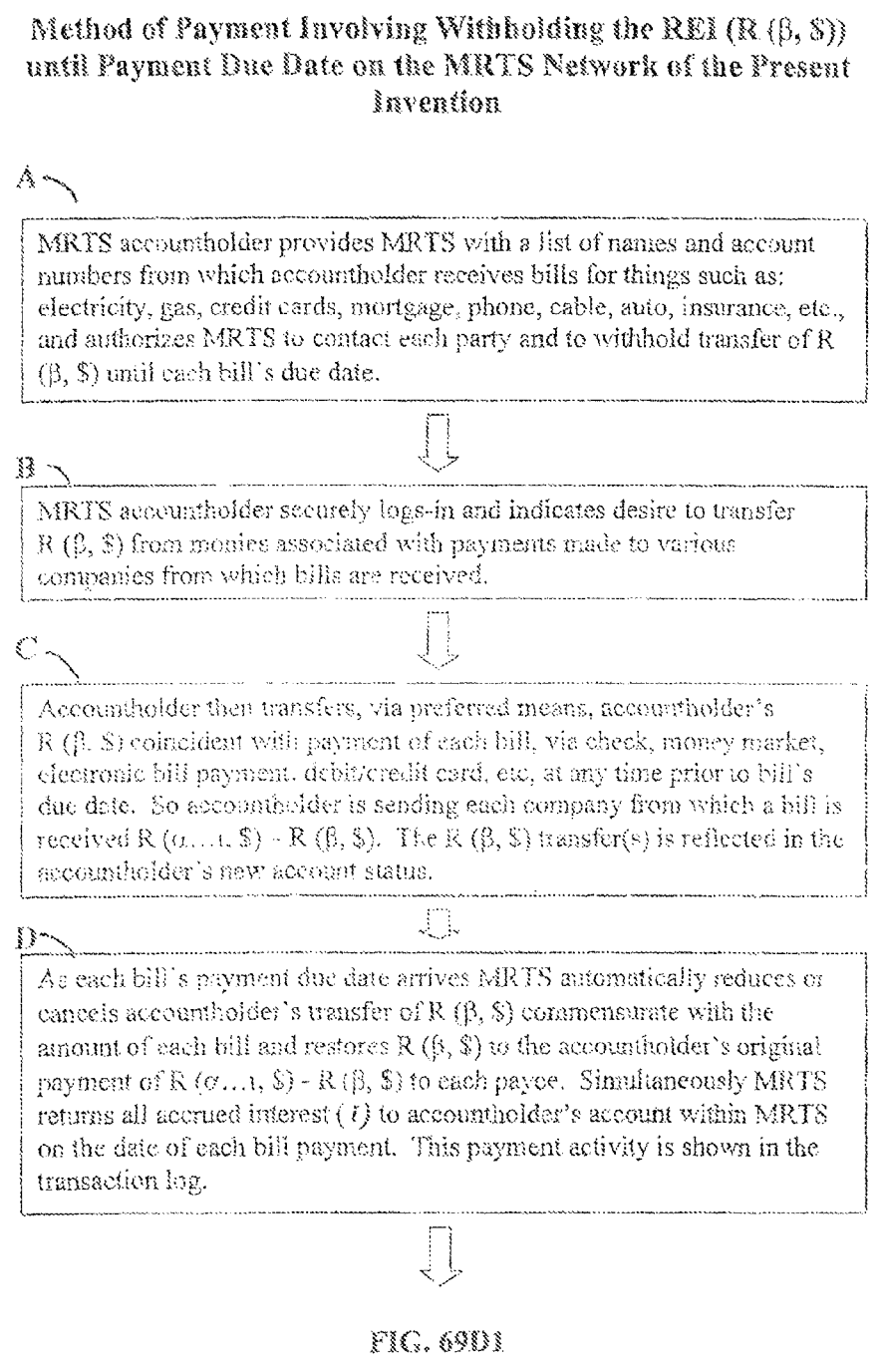

Method of Payment Involving Withholding the REI (R (β, $)) until Payment Due Date on the MRTS Network of the Present Invention

A

MRTS accountholder provides MRTS with a list of names and account numbers from which accountholder receives bills for things such as: electricity, gas, credit cards, mortgage, phone, cable, auto, insurance, etc., and authorizes MRTS to contact each party and to withhold transfer of R (β, $) until each bill's due date.

⇩

B

MRTS accountholder securely logs-in and indicates desire to transfer R (β, $) from monies associated with payments made to various companies from which bills are received.

⇩

C

Accountholder then transfers, via preferred means, accountholder's R (β, $) coincident with payment of each bill, via check, money market, electronic bill payment, debit/credit card, etc, at any time prior to bill's due date. So accountholder is sending each company from which a bill is received R (α…ι, $) - R (β, $). The R (β, $) transfer(s) is reflected in the accountholder's new account status.

⇩

D

As each bill's payment due date arrives MRTS automatically reduces or cancels accountholder's transfer of R (β, $) commensurate with the amount of each bill and restores R (β, $) to the accountholder's original payment of R (α…ι, $) - R (β, $) to each payee. Simultaneously MRTS returns all accrued interest (*i*) to accountholder's account within MRTS on the date of each bill payment. This payment activity is shown in the transaction log.

After each payment of a bill by restoring R (β, $) to the R (α…ι, $) – R (β, $) sent to the payee, MRTS then provides to accountholder an updated new account status reflecting the new balance of the transferred R (β, $). Accountholder also receives updates on interest earned on all R (β, $) transfers.

FIG. 69D2

Account-Specific Method of Payment Involving Withholding the REI (R (β, $)) until Payment Due Date on the MRTS Network of the Present Invention

Figure 70B:
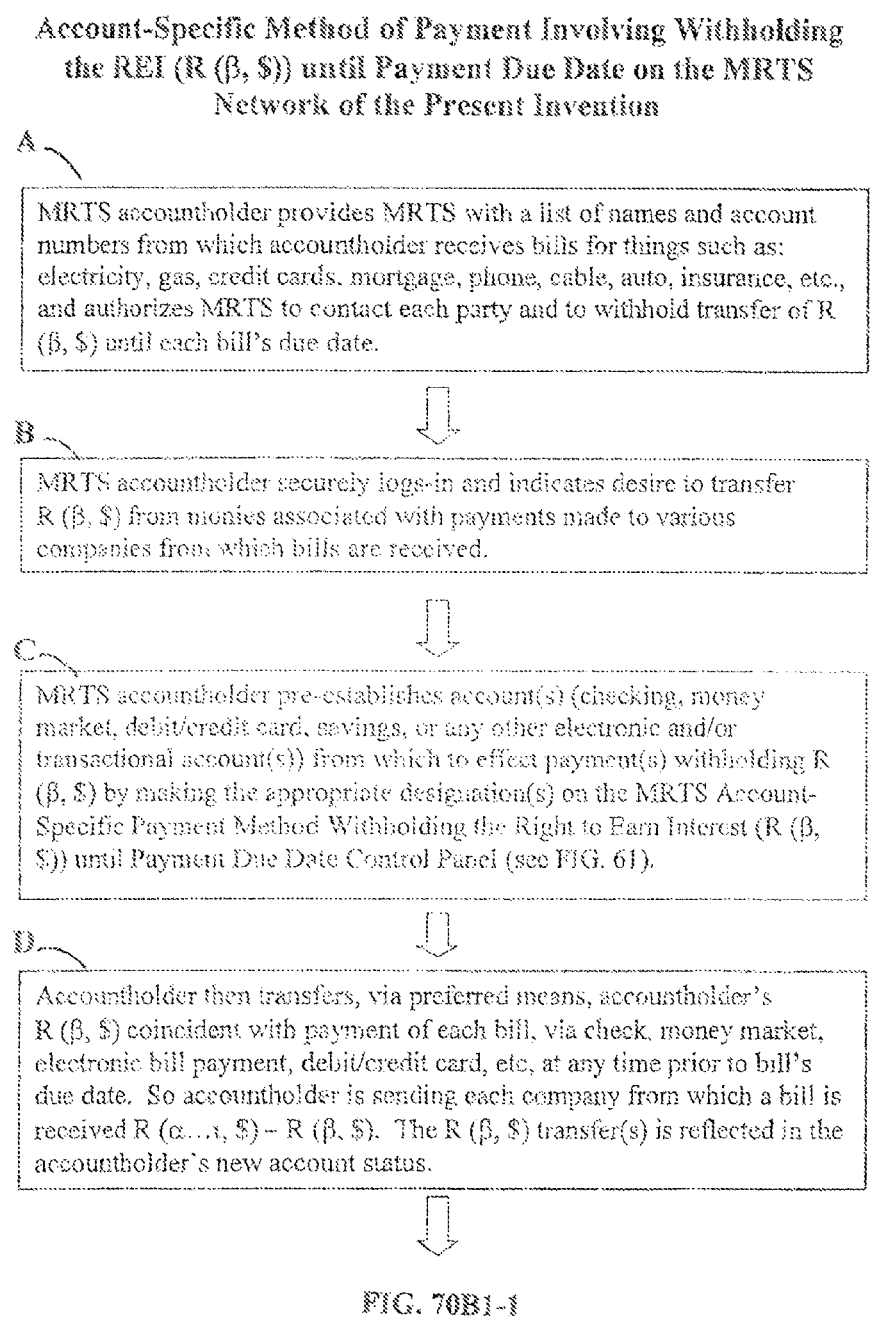

Account-Specific Method of Payment Involving Withholding the REI (R (β, $)) until Payment Due Date on the MRTS Network of the Present Invention

A

MRTS accountholder provides MRTS with a list of names and account numbers from which accountholder receives bills for things such as: electricity, gas, credit cards, mortgage, phone, cable, auto, insurance, etc., and authorizes MRTS to contact each party and to withhold transfer of R (β, $) until each bill's due date.

⇩

B

MRTS accountholder securely logs-in and indicates desire to transfer R (β, $) from monies associated with payments made to various companies from which bills are received.

⇩

C

MRTS accountholder pre-establishes account(s) (checking, money market, debit/credit card, savings, or any other electronic and/or transactional account(s)) from which to effect payment(s) withholding R (β, $) by making the appropriate designation(s) on the MRTS Account-Specific Payment Method Withholding the Right to Earn Interest (R (β, $)) until Payment Due Date Control Panel (see FIG. 61).

⇩

D

Accountholder then transfers, via preferred means, accountholder's R (β, $) coincident with payment of each bill, via check, money market, electronic bill payment, debit/credit card, etc, at any time prior to bill's due date. So accountholder is sending each company from which a bill is received R (α…ι, $) – R (β, $). The R (β, $) transfer(s) is reflected in the accountholder's new account status.

Figure 70B:
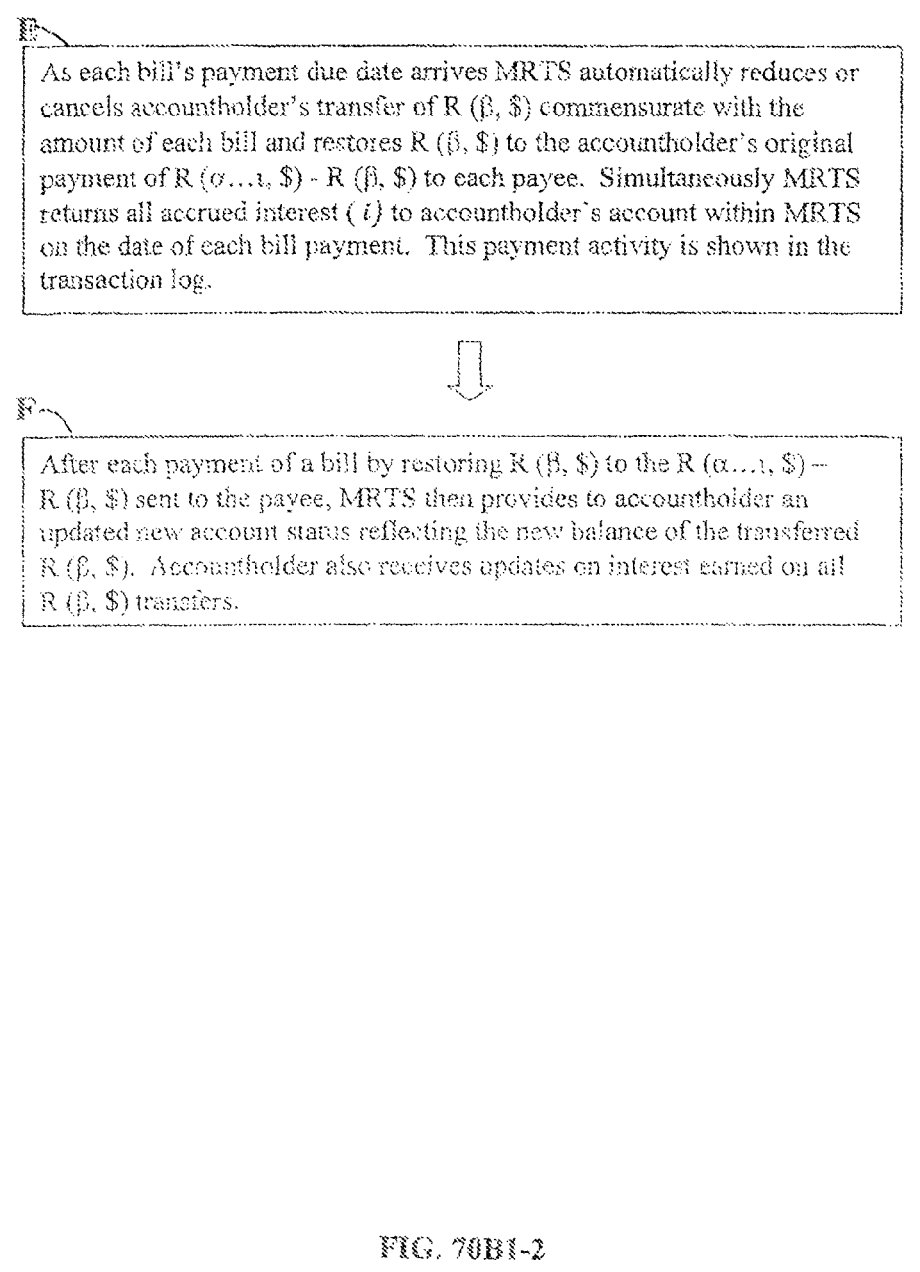

As each bill's payment due date arrives MRTS automatically reduces or cancels accountholder's transfer of R (β, $) commensurate with the amount of each bill and restores R (β, $) to the accountholder's original payment of R (α…ι, $) - R (β, $) to each payee. Simultaneously MRTS returns all accrued interest ( *i* ) to accountholder's account within MRTS on the date of each bill payment. This payment activity is shown in the transaction log.

⇩

F

After each payment of a bill by restoring R (β, $) to the R (α…ι, $) – R (β, $) sent to the payee, MRTS then provides to accountholder an updated new account status reflecting the new balance of the transferred R (β, $). Accountholder also receives updates on interest earned on all R (β, $) transfers.

FIG. 70B1-2

Right of First Refusal ("Home" and "External" Bank(s)) REI Transfer Process on the MRTS Network of the Present Invention Right of First Refusal REI Transfer Process on the MRTS Network of the Present Invention Right of First Refusal REI Transfer Process Counter-Offer Method (Accepted) on the MRTS Network of the Present Invention Right of First Refusal REI Transfer Process Counter-Offer Method (Rejected) on the MRTS Network of the Present Invention

Right of First Refusal ("Home" and "External" Bank(s)) REI Transfer Process on the MRTS Network of the Present Invention

Note: This is the convention for GBP, EUR, AUD and NZD.

Foreign Entities and Foreign Exchange Conversion (JPY) REI Transfer Process on the MRTS Network of the Present Invention Note: This is the convention for JPY, CHF, SEK, NOK, CNY, MXN, BRL, etc.

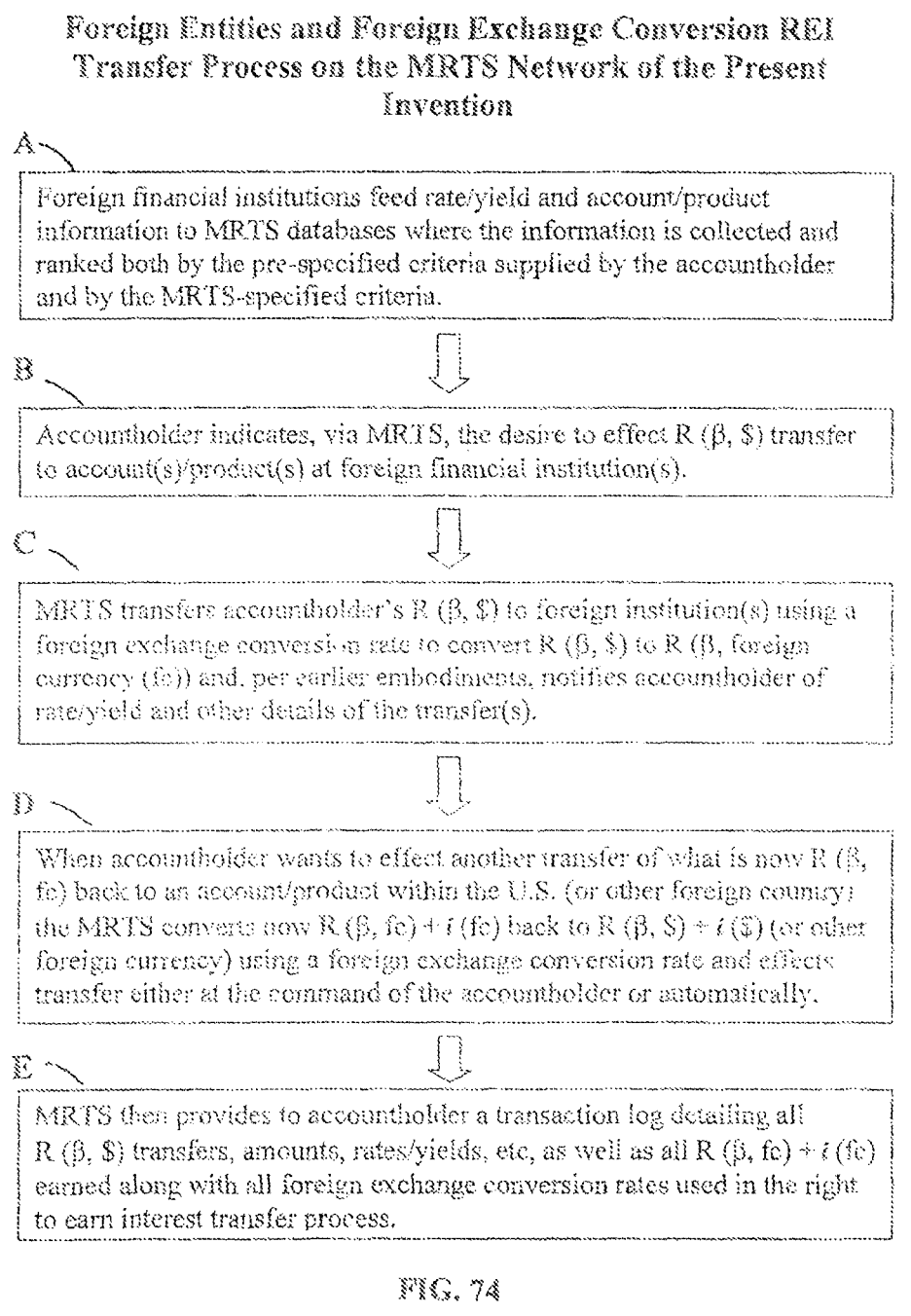

Foreign Entities and Foreign Exchange Conversion REI Transfer Process on the MRTS Network of the Present Invention

A

Foreign financial institutions feed rate/yield and account/product information to MRTS databases where the information is collected and ranked both by the pre-specified criteria supplied by the accountholder and by the MRTS-specified criteria.

B

Accountholder indicates, via MRTS, the desire to effect R (β, $) transfer to account(s)/product(s) at foreign financial institution(s).

C

MRTS transfers accountholder's R (β, $) to foreign institution(s) using a foreign exchange conversion rate to convert R (β, $) to R (β, foreign currency (fc)) and, per earlier embodiments, notifies accountholder of rate/yield and other details of the transfer(s).

D

When accountholder wants to effect another transfer of what is now R (β, fc) back to an account/product within the U.S. (or other foreign country) the MRTS converts now R (β, fc) + *i* (fc) back to R (β, $) + *i* ($) (or other foreign currency) using a foreign exchange conversion rate and effects transfer either at the command of the accountholder or automatically.

E

MRTS then provides to accountholder a transaction log detailing all R (β, $) transfers, amounts, rates/yields, etc, as well as all R (β, fc) + *i* (fc) earned along with all foreign exchange conversion rates used in the right to earn interest transfer process.

FIG. 74

Transaction Log (Hypothetical) on the MRTS Network of the Present Invention

| Date | Institution | Account Type | Principle | Interest Rate | Interest Earned | Total |
|---|---|---|---|---|---|---|
| 01/01/05 | Citibank | Checking | 10,000.00 | 0.00% | $ 0.00 | $ 10,000.00 |
| 01/01/05-01/31/05 | AIG | Money Market | 10,000.00 | 3.25% | $27.60 | $ 10,027.60 |
| 02/01/05-02/07/05 | Bank of America | Money Market Mutual Fund | 10,027.60 | 3.27% | $6.29 | $ 10,033.89 |
| 02/08/05 03/08/05 | Wachovia | 1 Month CD | 10,033.89 | 3.32% | $26.47 | $ 10,060.36 |
| 03/09/05-06/07/05 | BB&T | 3 Month CD | 10,060.36 | 3.48% | $86.32 | $ 10,146.68 |
| 06/08/05-07/23/05 | ING Bank | Cash Mgt. Acct | 10,146.68 | 3.40% | $43.73 | $ 10,190.41 |
| 07/24/05-09/15/05 | Morgan Stanley | Interest Checking | 10,190.41 | 3.44% | $51.86 | $ 10,242.27 |
| 09/16/05-09/20/05 | Citibank | Money Market | 10,242.27 | 3.47% | $4.87 | $ 10,247.14 |
| 09/21/05 10/18/05 | PIMCO | Money Market | 10,247.14 | 3.53% | $27.75 | $ 10,274.89 |
| 10/18/05 | Federal Reserve Bank 0.25% Federal Funds Rate Cut | | | | | |
| 10/19/05 11/04/05 | MetBank | Cash Mgt. Acct | 10,274.89 | 3.29% | $14.82 | $ 10,289.71 |
| 11/05/05 11/29/05 | MetBank | Interest Checking | 10,289.71 | 3.36% | $23.68 | $ 10,313.39 |
| 11/30/05 12/31/05 | Schwab | Money Market | 10,313.39 | 3.42% | $30.92 | $ 10,344.31 |
| | | | | | $344.31 | $ 10,344.31 |

Taxable Interest Earned: $344.31
Average Interest Rate: 3.4431%
Year-end Balance: $10,344.31

FIG. 78

Accountholder Information Collection and Storage on the MRTS Network of the Present Invention Accountholder Name: Social Security #:
Address: Tax Identification #:
City:
State:
Zip Code:
Country:
Email Address: Confirm Email Address:
Home Phone: Business Phone:
Mobile Phone:
Date of Birth:
Employer: Human Resource Administrator:
Mortgage Holder: Mortgage Servicer:

(Firm, Account #)
Existing Accounts:
Checking: ______
Savings: ______
Brokerage: ______
Insurance: ______
IRA: ______
401(K): ______
CD's: ______
Money Market: ______
Others: ______

☐ I authorize the MRTS to contact, and to establish links to, the above listed accounts.
MRTS Password:
Reconfirm Password:

FIG. 76

Accountholder Preferences Collection and Storage on the MRTS Network of the Present Invention

Transfers of Accountholder's Right to Earn Interest R (β, $) on Monies Held

Transfer R (β, $) from Accounts: (Firm, Account #)
Checking: ______________
Savings: ______________
Brokerage: ______________
Insurance: ______________
IRA: ______________
401(K): ______________
Pension: ______________
CD's: ______________
Money Market: ________
Others:

Accountholder's Ranked Preferences

1) Yield/rate
2) Safety
3) Deposit insurance
4) Account(s)
5) Fees/penalties
6) Duration
7) Tax treatment
8) Local, national, international
9) Transfer frequency
10) Split transfers
11) Transfer parameters Partner Network (s)

1) Bank A
2) Bank B
3) Bank C
4) Bank D
5) Brokerage 1
6) Brokerage 2
7) S&L 1
8) S&L 2
9) Credit Union 1
10) Insurer 1
11) Insurer 2

FIG. 77

Establishment and Updating of Accountholder Preferences via Control Panels on the MRTS Network of the Present Invention

Right to Earn Interest (REI) Transfer Options on the MRTS Network of the Present Invention

I want to transfer my REI by the following method(s):

- [ ] Utilize all MRTS partner institutions.
- [ ] My Custom list of institutions from partner institution list.
- [ ] My Preferred Partner Network
- [ ] Exclude certain institutions
- [ ] My Pre-specified criteria
- [ ] OptiBank chosen institutions
- [ ] Internally (institutions where I currently maintain accounts)
- [ ] Include foreign institutions' accounts/products

[ ] Edit [ ] Save

FIG. 79

Institution Transfer List on the MRTS Network of the Present Invention

Preferred Partners Network (PPN) on the MRTS Network of the Present Invention

Excluded Institutions on the MRTS Network of the Present Invention

Rate/Yield Filter on the MRTS Network of the Present Invention

REI Transfer Frequency Filter on the MRTS Network of the Present Invention

Safety/Credit Filter on the MRTS Network of the Present Invention

Transfer REI only to institutions/accounts meeting the following criteria:

- [ ] All participating institutions/accounts
- [ ] Only "AAA" rated institutions/accounts
- [ ] Only "AA" and above rated institutions/accounts
- [ ] Only "A" and above rated institutions/accounts
- [ ] Only institutions/accounts where I currently maintain accounts
- [ ] Only institutions/accounts on my approved transfer list
- [ ] Only institutions/accounts in my Preferred Partner Network
- [ ] Only to institutions/accounts providing full deposit insurance
- [ ] Edit [ ] Save

FIG. 85

Accountholder Risk Assessment Profile on the MRTS Network of the Present Invention I am comfortable with the following risk levels:

- [ ] High risk
- [ ] Medium-high risk
- [ ] Medium risk
- [ ] Medium-low risk
- [ ] Low risk
- [ ] Completely risk-averse
- [ ] Alert me prior to each REI transfer of the potential risks involved

[ ] Edit [ ] Save

FIG. 86

Deposit Insurance Filter on the MRTS Network of the Present Invention

Transfer REI according to the following deposit/account insurance criteria

- [ ] Only transfer REI when full deposit insurance available
- [ ] Split REI transfers to obtain maximum deposit insurance
- [ ] Transfer REI with partial deposit insurance available
- [ ] Transfer REI when no deposit insurance available
- [ ] Notify me prior to each transfer of deposit insurance availability

[ ] Edit [ ] Save

FIG. 87

Minimum Account Balance Filter on the MRTS Network of the Present Invention

Notify me of the following minimum account balance requirements:

- [ ] Minimum Account Balance required
- [ ] No Minimum Account Balance required
- [ ] Amount of Required Minimum Balance
- [ ] Transfer REI only to accounts/products with no minimum balance requirements
- [ ] Any changes in minimum balance requirements

[ ] Edit [ ] Save

FIG. 88

Notification Preferences on the MRTS Network of the Present Invention

Notify me of the following:

- ☐ Better rates/yields available
- ☐ Special offers
- ☐ Changes in credit/safety ratings
- ☐ Changes in minimum account balance requirements
- ☐ Changes in deposit insurance
- ☐ Changes in fees, charges or penalties
- ☐ New accounts/products available
- ☐ Tax-advantaged accounts/products
- ☐ Changes in tax treatment
- ☐ Other accounts, services and products available ☐ Edit ☐ Save

FIG. 89

Preferred Notification Methods on the MRTS Network of the Present Invention

I prefer to be notified/contacted by the following method(s)

- [ ] Email
- [ ] U.S. Mail
- [ ] Fax
- [ ] Phone
- [ ] Wireless Notification
- [ ] Instant Messaging
- [ ] Via OptiBank system updates/web site

[ ] Edit [ ] Save

FIG. 90

Fees, Charges and Penalties Filter on the MRTS Network of the Present Invention

Transfer REI with the following criteria:

- ☐ Notify me of all fees, charges and penalties prior to transfer
- ☐ Notify me of any changes in fees, charges and/or penalties
- ☐ Transfer REI with goal of minimizing fees, charges and/or penalties
- ☐ Avoid CDs with high early withdrawal penalty
- ☐ Avoid accounts with a minimum balance charge/fee
- ☐ Edit ☐ Save

FIG. 91

Preferred Transfer Method(s) on the MRTS Network of the Present Invention

I prefer to conduct REI transfers by the following method(s):

- [ ] Fully automated: MRTS initiates all REI transfers without my pre-approval.
- [ ] Semi-automated: MRTS initiates all REI transfers based on my pre-specified criteria.
- [ ] Semi-manual: MRTS notifies me of opportunities based on my pre-specified criteria and I effect all transfers.
- [ ] Manual: MRTS notifies me of opportunities or I review the MRTS web site and I effect REI transfers manually.

[ ] Edit [ ] Save

FIG. 92

Accountholder Right of First Refusal REI (R (β, $)) Transfer Criteria on the MRTS Network of the Present Invention

Right of First Refusal R (β, $) Transfer Criteria:

☐ Allow "home" bank(s)/institution(s) R (β, $) Right of First Refusal.

☐ Do Not allow "home" bank(s)/institution(s) R (β, $) Right of First Refusal. (Process ends here if selected)

---

☐ Allow "home" bank(s)/institution(s) to match "external" offer(s).

☐ Require "home" bank(s)/institution(s) to beat "external" offer(s) by 0.005%
0.01%
0.015%
0.02%
0.025%
0.03%
0.035%
0.04%
0.045%

(Accountholder highlights choice)

☐ Accept "home" bank(s)/institution(s) counter-offers over "external" offer(s).

Counter-offer must be no less than 0.005%
0.01%
0.015%
0.02%
0.025%
0.03%
0.035%
0.04%
0.045% less than "external" bank(s)/institution(s) offer(s) to be accepted.

(Accountholder highlights choice)

☐ Edit ☐ Save

FIG. 93

Control Panel for Account-Specific Method of Payment Involving Withholding the REI (R (β, $)) until Payment Due Date on the MRTS Network of the Present Invention

I want to make payments withholding R (β, $) until payment due date by the following:

☐ Pay by Citibank checking account #12345678

☐ Pay by Citibank money market account #23456789

☐ Pay by Citibank debit card account # 98765432

☐ Pay by Merrill Lynch brokerage account # 13572468

☐ Pay by Merrill Lynch money market account #24681357

☐ Pay by MRTS checking account # 12341234

---

I want to:

☐ Pay electronically

☐ Pay by check, debit/credit card, or other manual means

☐ Edit ☐ Save

FIG. 94

REI Transfer Process Preferred Accounts and Products List on the MRTS Network of the Present Invention I prefer to transfer my right to earn interest (R (β. $) to the following accounts and products:

- ☐ All participating institutions' accounts and products
- ☐ Checking Accounts
- ☐ Savings Accounts
- ☐ Money Market Accounts
- ☐ Cash Management Accounts
- ☐ Certificates of Deposit
- ☐ Brokerage Accounts and Products
- ☐ Insurance Accounts and Products
- ☐ Money Market Mutual Funds
- ☐ Mortgage Instruments and Products
- ☐ Government Instruments and Products
- ☐ Corporate Instruments and Products
- ☐ Agency Instruments and Products
- ☐ Derivative Instruments and Products
- ☐ NOW Accounts
- ☐ Commercial Paper Products
- ☐ Bankers Acceptances
- ☐ Forward Rate Agreements
- ☐ Customized Products
- ☐ Other ☐ Edit ☐ Save

FIG. 95

METHOD OF AND SYSTEM FOR CAPTURING INTEREST EARNED ON THE MONETARY VALUE OF TRANSFERRED MONETARY RIGHTS MANAGED ON AN INTERNET-BASED MONETARY RIGHTS TRANSFER (MRT) NETWORK SUPPORTED BY A REAL-TIME GROSS SETTLEMENT (RTGS) SYSTEM

RELATED CASES

The Present application is a Continuation-in-Part (CIP) of the following: application Ser. No. 12/987,260 filed Jan. 10, 2011 now abandoned, which is a continuation of application Ser. No. 11/651,413, filed Jan. 9, 2007, now abandoned; and copending application Ser. No. 12/987,255 filed Jan. 10, 2011, continuation of application Ser. No. 11/328,433 filed Jan. 9, 2006, now abandoned; each application being commonly owned by Interest Capturing Systems, LLC, and incorporated herein by reference as if fully set forth herein.

BACKGROUND OF INVENTION

1. Field of Invention

The present invention relates to an Internet-based method of, and system for, enabling the customers of banks, brokerage firms, insurers and other financial institutions the freedom to exercise the rights they possess as holders of money so that they can optimize the utility and value of their money, and capture interest on owned money where currently surrendered in global financial marketplace.

2. Brief Description of the State of Knowledge in the Art

FIG. 1 is a schematic representation of the conventional "Uses of Money" where the "Specific Functions of Money" represent the general purposes of money in an economic framework. The "Specific Functions of Money" include all uses of money, from its inception to the present day, and define money's role in local, national and global economies; all economies using any form of money incorporate some and/or all of these functions in their use(s) of money.

FIGS. 2A and 2B, taken together, set forth a schematic representation illustrating the various conventional uses of/for money in the marketplace, including, but not limited to: purchasing and paying for goods and services, investing, earning interest, lending, borrowing, storing as value, and gifting.

FIG. 3 is a schematic representation illustrating the flow of money associated with conventional money transfer systems utilized in both physical money transfers and electronic money transfers in the global financial system. Money is transferred to another institution(s) and, at the end of the transfer period, the money and any accrued interest are transferred back to the owner of the money and/or the owner's bank or other financial institution.

Consumers and businesses loose interest income, on money that belongs to them but, which, is held by financial intermediaries in areas like: mortgage escrow, payroll withholding, any type of stored value/prepaid product or device, bill payment, tax payment, consumer rebates, merchants' bank accounts, and any other area in which, a financial intermediary holds a consumer's or business's money and either pays no interest on those funds or pays a suboptimal interest rate/yield on those funds.

Owners of money have many options from which to choose when selecting a bank or other type of financial institution for depositing (and subsequently investing) their money. Most financial institution customers assume (and rightfully so) that there is a tremendous amount of time and effort involved in first trying to ascertain where the opportunities exist to earn higher interest rates/yields on their money and, second, in actively transferring their money into and back out of those institutions' accounts and products to capture the higher rates offered. Several internet sites have aggregated financial information for consumers, with Bankrate.com being the most popular and oft-cited of these sites. However, Bankrate.com does not offer any transactional capability leaving all of the actual transfer work to the consumer. Furthermore, even with advanced transfer systems like Electronic Funds Transfer (EFT) and the Automated Clearing House (ACH), there are time lags, ranging from a couple of days to longer, during which time, the consumer is not earning interest on the transferred monies as they are deemed "in transit" and unavailable for use.

Due to the difficulties in finding better interest rates/yields and in transferring money, owners of money experience depositor/investor burnout (similar to mortgage burnout where mortgagees, after a certain period of time, cease searching for better mortgage rates, even though they exist in the marketplace, due to the amount of work involved) as they tire of seeking higher interest rates/yields and accept those, though almost always sub-optimal, offered by their "home" financial institution(s). Because of these factors, there is little incentive for the "home" financial institution(s) to offer highly competitive interest rates and yields for their accounts and products.

Through cash management, or "sweep", accounts, financial institutions "sweep" customers' unused, available monies into other accounts and products that enable the customers to earn higher interest rates and yields on their monies than if those monies were left in a standard account/product. But even though these customers are considered more sophisticated than the average financial institution customer, recent evidence suggests that many financial institutions haven't been paying the appropriate (or advertised) rates on these accounts and products. ("Investors Get Shortchanged on Interest", The Wall Street Journal, Feb. 15, 2005, p. D1 and "Savings: Sweep Yields Can Make You Weep", Kiplinger's Personal Finance, May 2005, p. 92).

Many recent articles have highlighted the problems financial institution customers encounter when seeking higher interest rates/yields on their money. The article "Wall Street Cuts Yields on Investors' Cash" (The Wall Street Journal, Aug. 31, 2005, p. D1) states, "In a development that hurts investors, brokerage firms are quietly moving their clients' cash from money market mutual funds—the traditional default option—into lower-yielding bank accounts."

There have been many attempts, through new technologies, to address these financial industry shortcomings. A brief review of the following U.S. Patents and Publications will provide a good overview of the state of knowledge in the art attempting to address the various problems recognized in the fields of finance, banking and investment management: U.S. Pat. Nos. 6,868,408 (Rosen), 6,609,113 (O'Leary, et al), 6,324,525 (Kramer, et al), 6,304,860 (Martin, et al), 6,240,399 (Frank, et al), 6,233,566 (Levine, et al), 6,112,189 (Rickard, et al), 6,049,782 (Gottesman, et al), 6,021,397 (Jones, et al), 5,933,817 (Hucal), 5,924,082 (Silverman, et al), 5,911,135 (Atkins), 5,852,811 (Atkins), 5,839,118 (Ryan, et al), 5,832,461 (Leon, et al), 5,297,026 (Hoffman), 5,082,275 (Nilssen), 4,751,640 (Lucas, et al), 4,507,745 (Agrawal), 20040153403 (Sadre), 20040044632 (Onn, Liav, et al), 30030236726 (Almonte, et al), 20030212641 (Johnson), 20030097331 (Cohen), 20030070080 (Rosen), 20020185529 (Cooper), 20020116331 (Cataline, et al), 20020091635 (Venkatachari, et al), 20020087461 (Ganesan, et al), 20020022966 (Horgan), and 20020013767 (Katz), each incorporated herein by reference as if set forth fully herein.

Finally, opening multiple accounts at multiple financial institutions to seek higher yields for cash is a very time-consuming, onerous process that requires a potential customer to read through complex and lengthy documents specific to each financial institution, submit all personal information numerous times, and to file reports from each financial institution regarding interest income earned annually with state and federal tax authorities.

In view of all of the aforementioned shortcomings, deficiencies and inefficiencies that exist in the local, national and global financial marketplaces, there is still a great need in the art for an improved method of and system for solving the problem(s) of surrendered interest-capturing opportunities in modern society, while avoiding the shortcomings and drawbacks of the prior art apparatus and methodologies heretofore known.

OBJECTS AND SUMMARY OF THE INVENTION

Accordingly, it is a primary object of the present invention to provide a method of and system for solving the inefficiencies of prior art financial systems, while avoiding the shortcomings and drawbacks of the prior art apparatus and methodologies.

Another object of the present invention to provide a method of capturing interest associated with a whole or partial amount of money owned or controlled by an owner/holder and held in a first account maintained by a home financial institution associated with a monetary rights transfer (MRT) network operably embedded in one (or more) real time gross settlement (RTGS) system(s) connected to the infrastructure of the Internet, and wherein the home financial institution or an external financial institution associated with said MRT network maintains a second interest bearing account for the owner/holder of the amount of money, to capture interest within the MRT network.

Another object of the present invention to provide a method of capturing interest associated with a whole or partial amount of money owned by an owner/holder but controlled by a financial intermediary and held in an account maintained by the financial intermediary either at the owner's/holder's home financial institution or at an external financial institution and associated with a monetary rights transfer (MRT) network operably embedded in one (or more) real time gross settlement (RTGS) system(s), typically maintained or controlled by the central bank of a country (e.g. Federal Reserve Bank) or by a group of central banks like the European Central Bank (ECB) connected to the infrastructure of the Internet, wherein the home financial institution or an external financial institution associated with the MRT network maintains a second interest bearing account, for the owner/holder of the amount of money to capture interest within the MRT network.

Another object of the present invention is to provide a method of and system for facilitating transfers of subsets of monetary rights using a real-time gross settlement (RTGS) system that transfers debits and credits between central bank accounts maintained by different financial institutions at the central bank of a country (e.g. Federal Reserve Bank) so as to allow the financial institution receiving a monetary rights transfer to lend or to invest cash based upon the amount of the monetary credit attributed to the receiving financial institution's central bank account by the RTGS system.

Another object of the present invention is to provide a method of and system for implementing an Internet-based monetary rights transfer (MRT) network utilizing an EDI-based real-time gross settlement (RTGS) system, such as the Fedwire RTGS system, maintained and operated by the Federal Reserve Bank, for crediting/debiting the Federal Reserve bank accounts of participating financial institutions in the amount of the monetary right(s) transfer so as to allow the financial institution receiving a monetary rights transfer to lend or invest cash based upon the amount of the credit effected to its federal reserve bank account by the RTGS system.

Another object of the present invention is to facilitate monetary right(s) transfers using a RTGS transfer system, such as the Fedwire RTGS system maintained and operated by the Federal Reserve Bank, to facilitate the netting and transferring of the dollar amounts of monetary right(s) transfers between participating financial institutions, by the transfer of credits and debits between the Federal Reserve bank accounts of participating financial institutions.

Another object of the present invention is to provide a MRTS network that recognizes and accounts for an unbundled and individually transferable set of monetary rights associated with an amount of money held in a first account at the home financial institution and possessed by the owner/holder, wherein the unbundled and individually transferable set of monetary rights ($R(\alpha \ldots \iota, \$)$) are selected from the group consisting of a monetary right to invest (($R(\alpha, \$)$), a monetary right to earn interest ($R(\beta, \$)$), a monetary right to use as collateral ($R(\chi, \$)$), a monetary right hold money as a store of value ($R(\delta, \$)$), a monetary right to make purchases ($R(\epsilon, \$)$), a monetary right to make payments ($R(\phi, \$)$), a monetary right to lend ($R(\gamma, \$)$), a monetary right to borrow ($R(\eta, \$)$), and a monetary right to gift ($R(\iota, \$)$).

Another object of the present invention is to allow the owner/holder of the amount of money to transfer from a first financial institution account to a second financial institution (interest bearing) account, a subset of the monetary rights represented by the whole or partial value of money held in the first financial institution account, while a non-transferred subset of monetary rights associated with the value of money remain in the first account and serve as full, non-leveraged collateral for the subset of transferred monetary rights.

Another object of the present invention is to allow the owner/holder of the amount of money to earn an amount of interest on the value of transferred monetary rights while the owner/holder of the amount of money enjoys full use of the value of money held in a first account and represented by the non-transferred subset of monetary rights associated with the amount of money held in the first account.

Another object of the present invention is to provide an Internet-based method and system for monetary rights transfer (MRT), wherein the customers of financial and non-financial institutions are afforded the opportunity to freely transfer monetary rights which the system recognizes such customers possessing as owners, holders (fiduciary), and borrowers of money (e.g. the right to earn interest ($R(\beta, \$)$) or other monetary rights) between various institutions and also within their own institutions, so as to take advantage of better rates and yields available in the financial marketplace.

Another object of the present invention is to provide an Internet-based method and system of monetary rights transfer (MRT), wherein, in situations where other entities collect monies for future payments on behalf of an individual or business, the rightful owner of the money is able to benefit from the transfer and/or use of such monetary rights and captures earned interest on such monetary rights until such payments are effected.

Another object of the present invention is to provide an Internet-based method of and system for monetary rights transfer (MRT) which supports a transparent earned interest "netting" process, by which participating financial institutions net settle earned interest (Cash ($)) on transferred monetary rights between themselves, through the transmission of credits and debits between their Federal Reserve bank accounts utilizing a RTGS system.

Another object of the present invention is to provide an Internet-based method of and system for monetary rights transfer (MRT) capable of supporting a transparent earned-interest "netting" process that allows accountholders always know where their money and monetary rights reside, at all times, i.e. in what financial accounts, on the MRT Network.

Another object of the present invention is to support individual financial products on an Internet-based monetary rights transfer (MRT) network utilizing various monetary right(s) transfer processes described herein, including: checking and savings accounts, debit and credit cards, stored value/prepaid products, ATM products, and other financial accounts and products which can be made more productive by utilizing (or embedding) various iterations of the monetary right(s) transfer processes.

Another object of the present invention is to provide an Internet-based monetary rights transfer (MRT) network utilizing a real-time gross settlement (RTGS) transfer system, such as the Fedwire RTGS system maintained and operated by the Federal Reserve Bank, to facilitate instantaneous monetary right(s) transfers in order to eliminate any time/transfer delay period, during which an MRT network user is not earning a higher, or the highest, amount of yield on the transferred monetary right(s).

Another object of the present invention is to provide a method of facilitating the opening of a universal financial account on a monetary rights transfer (MRT) network, providing access to pre-opened, linked accounts at all participating financial institutions to allow an MRT network user to transfer monetary right(s) instantaneously when a participating financial institution presents a better yield offer for any type of financial account or product registered with the MRT network.

Another object of the present invention is to provide participating financial institutions with the ability to offer higher yields than their highest advertised yields typically offered on savings accounts, checking accounts, money market accounts, certificates of deposit and on all other interest-bearing accounts, due to the reduced costs of customer/account acquisition made possible by the universal financial account opening process of the present invention;

Another object of the present invention is to provide an Internet-based method of and system for monetary rights transfer (MRT), wherein one (or more) of the monetary rights associated with owning, holding and/or borrowing money can be transferred, manually or automatically, in a financial marketplace for the purpose of earning interest and, assuring that individuals, businesses and other entities do not violate the minimum deposit/account requirements imposed by financial institutions and receive full deposit insurance.

Another object of the present invention is to provide an Internet-based method of and system for monetary rights transfer (MRT), wherein the monetary rights to invest $(R(\alpha, \$))$ and to earn interest $(R(\beta, \$))$ (or other combinations of monetary rights) can be transferred easily and automatically among institutions belonging to the financial network of the present invention and offering higher interest rates or innovative products and, wherein, earned interest on such transfers of monetary rights is automatically captured by the system and earned by the owner/holder of money on which such monetary rights are based.

Another object of the present invention is to provide an Internet-based method of and system for monetary rights transfer (MRT), wherein an employee is able to transfer the monetary rights to invest $(R(\alpha, \$))$, to earn interest $(R(\beta, \$))$, or other combinations of monetary rights associated with the actual money being held by a payroll service provider but owned by the employee, to any institution offering higher interest rates to earn interest on the full monetary value of the transferred monetary rights until such time as the payroll service provider effects payment(s) on the employee's behalf, while the payroll service provider holds the subset of rights $\{R(\alpha \ldots \iota, \$) - R(\beta, \$)$ or other monetary rights$\}$ of the actual monies to facilitate timely payments on behalf of the employee and, as the payroll service provider pays out the monies, the transferred monetary right(s) are reduced commensurately and ultimately cancelled when all of the underlying money has been paid out on behalf of the employee.

Another object of the present invention is to provide an Internet-based method of and system for monetary rights transfer (MRT) supported by the real-time gross settlement (RTGS) system of the central bank of a country (e.g. US Federal Reserve), wherein consumers and businesses (mortgagees) are able to transfer only the right to earn interest $(R(\beta, \$))$ and/or other monetary rights associated with monies owned but that are held by a mortgage servicer, to any institution offering higher interest rates, in order to earn interest on such transferred monetary rights, until such time as the mortgage servicer effects payment(s) on the consumer's or business's behalf and, as the mortgage servicer pays out the monies, the transferred monetary right(s) are reduced commensurately and ultimately cancelled when all of the underlying money has been paid out on behalf of the mortgagee.

Another object of the present invention is to provide an Internet-based method of and system for monetary rights transfer (MRT) supported by the real-time gross settlement (RTGS) system of the central bank of a country, wherein users of any type of stored value/prepaid product or device (debit cards, gift cards, payroll cards, EZ Pass (RFID-activated) devices, mobile phones and other mobile devices, and any other product or device upon/in which value can be stored/loaded) are able to transfer subsets of monetary rights associated with the monetary value owned and loaded on such products and devices to any institution offering a higher yield, in order to earn interest on such transferred subset of monetary rights, until such time as the owner or holder of the monetary value utilizes some or all of the loaded monetary value on the stored value/prepaid product or device, at which time the transferred subset of monetary rights is reduced commensurately, and ultimately cancelled, when all of the underlying monetary value loaded on the stored value/prepaid product or device has been utilized.

Another object of the present invention is to provide a monetary rights transfer system (MRT) for monetary rights transfer (MRT) supported by the real-time gross settlement (RTGS) system of the central bank of a country, wherein the loader/purchaser, as opposed to the owner/holder, of any type of stored value/prepaid product or device, is provided with both the ability to control the loaded monetary value until that value is depleted, including cash transfers and monetary right(s) transfers, and with the ability to establish an expiration date for the loaded funds at which date, the loader/purchaser of the stored value/prepaid product or device receives all of the unspent value loaded on the stored value/prepaid product or device plus any interest income that may have accrued on the unspent, loaded value.

Another object of the present invention is to provide an Internet-based method of and system for monetary rights transfer (MRT) supported by the real-time gross settlement (RTGS) system of the central bank of a country, wherein customers have the ability to specify other important factors when seeking to earn those higher yields such as: credit quality/rating of an institution, various types of deposit insurance available, size of the institution, location of the institution, duration of deposit or investment, size of the deposit or investment, type of instrument or account, minimization of penalties or fees for early or partial withdrawals, minimization or elimination of minimum required balances at both the "home" bank or institution and at the bank or institution to which those funds are transferred, tax minimization (where applicable), type of funds/monies transferred (personal, business, retirement, educational, charitable, investment, savings, escrow, religious, government, foreign, funds and monies of other financial institutions and non-financial institutions).

Another object of the present invention is to provide an Internet-based method of and system for monetary rights transfer (MRT) supported by the real-time gross settlement (RTGS) system of the central bank of a country, wherein a process allows the system to rank various accounts and products for a system user's benefit under criteria that may differ vastly from that employed by a system user.

Another object of the present invention is to provide an Internet-based method of and system for monetary rights transfer (MRT) supported by the real-time gross settlement (RTGS) system of the central bank of a country, wherein under such a scenario, the system user can rank the aforementioned criteria in order of importance, and the system and methods of the invention would make automatic monetary right(s) transfers on the user's behalf whenever the pre-specified criteria are met, thereby allowing a system user to set all of the parameters of a right(s) transfer and then allow the system to make such transfer automatically.

Another object of the present invention is to provide an Internet-based method of and system for monetary rights transfer (MRT) supported by the real-time gross settlement (RTGS) system of the central bank of a country, wherein a bank or financial institution that currently holds all of a customer's rights associated with monies held in that institution ("home" bank), and that may not want to forfeit or lose to transfer one or more of those rights (expressly the rights to invest and to earn interest on monies held by a system user), would have the "right-of-first-refusal" on a customer's monetary rights to invest, to lend, and to earn interest (or other rights) which would enable the "home" bank to increase rate(s), yield(s) or term(s) offered or, to match or beat the rate(s), yield(s) or term(s) offered by competitors and, wherein, the duration of the "right-of-first-refusal" can be dictated by the customer, as can the terms that will preclude a transfer of a system user's monetary right(s).

Another object of the present invention is to provide an Internet-based method of and system for monetary rights transfer (MRT) supported by the real-time gross settlement (RTGS) system of the central bank of a country, wherein its users can transfer the monetary right to earn interest internally, within their "home" bank(s), in an effort to earn higher interest rates and yields than those offered by the account(s) in which they presently hold their monies.

Another object of the present invention is to provide an Internet-based method of and system for monetary rights transfer (MRT) supported by the real-time gross settlement (RTGS) system of the central bank of a country, wherein participants are provided the opportunity to choose between federal and state insured interest-bearing instruments and non-insured instruments, for the purpose of seeking optimal return(s) on invested monies.

Another object of the present invention is to provide such an Internet-based method of and system for monetary rights transfer (MRT) supported by the real-time gross settlement (RTGS) system of the central bank of a country, wherein certain of a user's monetary rights can be simultaneously transferred to multiple institutions in amounts that fully qualify for all federal, state and private deposit insurance.

Another object of the present invention is to provide an Internet-based method of and system for monetary rights transfer (MRT) supported by the real-time gross settlement (RTGS) system of the central bank of a country, wherein relational databases automatically receive rate feeds from all participating institutions, rank them by a number of different standards (yield, credit rating, penalties for early withdrawals, etc.), and display the optimal interest rates/yields and other financial terms according to the user's preferences, the system's preferences or, which are offered by participating institutions.

Another object of the present invention is to provide an Internet-based method of and system for monetary rights transfer (MRT) supported by the real-time gross settlement (RTGS) system of the central bank of a country, whereby the customers of banks and financial institutions (including managers of money market funds and others with fiduciary responsibilities) are given the opportunity to transfer certain monetary rights on a daily (or intra-day basis) to higher-yielding accounts and investment instruments among those offered by the "home" institution, thereby encouraging the "home" financial institution (i) to allow the customer to automatically transfer certain monetary rights, when desired, to higher-yielding accounts and instruments internally or possibly suffer the loss of the customer or of the customer's funds, or (ii) match the higher rates available to the customer externally or risk losing the customer and/or the customer's monies to invest.

Another object of the present invention is to provide an Internet-based method of and system for monetary rights transfer (MRT) supported by the real-time gross settlement (RTGS) system of the central bank of a country, wherein the customer (account holder) can transfer only certain monetary rights that exceed, for demand and time accounts, an account's minimum required balance, thereby assuring that the participant's account remains in good standing and is not subjected to any penalties which may be levied on accounts in which the balance falls below the minimum required balance.

Another object of the present invention is to provide an Internet-based method o and system for monetary rights transfer (MRT) supported by the real-time gross settlement (RTGS) system of the central bank of a country, wherein the customer (accountholder) can transfer the entire set of monetary rights associated with holding money ($R(\alpha \ldots \iota, \$)$) out of an account at its "home" financial institution and still maintain that account at the "home" financial institution.

Another object of the present invention is to provide an Internet-based method of and system for monetary rights transfer (MRT) supported by the real-time gross settlement (RTGS) system of the central bank of a country, wherein deposit insurance on transferred monetary rights (and/or on transferred cash) is provided by the "home"/"sending" financial institution in return for remuneration from an "external"/"receiving financial institution at or above the "receiving" institution's required deposit insurance premium(s), as required by the Federal Deposit Insurance Corporation (FDIC), with the "home" financial institution then remitting the collected premium(s), less any additional amount charged, directly to the FDIC.

Another object of the present invention is to provide an Internet-based method of and system for monetary rights transfer (MRT) supported by the real-time gross settlement (RTGS) system of the central bank of a country, wherein a customer can request, in one process, that all transferred monetary right(s) held at "external" institutions be immediately cancelled thus restoring full interest-earning rights (and/or other monetary rights) to the customer's remaining subset of monetary rights $\{R(\alpha \ldots \iota, \$)-R(\beta, \$), \text{etc.}\}$ at the "home" institution or intermediary.

Another object of the present invention is to provide such an Internet-based method of and system for monetary rights transfer (MRT) supported by the real-time gross settlement (RTGS) system of the central bank of a country, wherein consumers and businesses have the ability to earn interest on monies paid into escrow accounts and collected for tax payments, insurance payments, social security payments and other payments collected from a system user for future disbursement by the collector or by financial institution holding said monies.

Another object of the present invention is to provide an Internet-based method of, and system for monetary rights transfer (MRT) supported by the real-time gross settlement (RTGS) system of the central bank of a country, representing and accounting for the monetary rights held by consumers, businesses and any and all other entities, and the transfers of such rights among a network of financial institutions registered to deliver financial products, accounts and/or services with interest-capturing services (ICS) provided by the Internet-based system and method of the present invention.

Another object of the present invention is to allow participating financial institutions to trade the various monetary rights between themselves.

These and other objects of the present invention will become more apparent from the descriptions and drawings contained herein, and are, by no means, confined or limited by other improvements or advantages that may be realized.

BRIEF DESCRIPTION OF THE DRAWINGS

In order to understand more fully the Objects of the Invention, the following Detailed Description of the Illustrative Embodiments should be read in conjunction with the appended figure drawings, wherein:

FIG. 2C is a tabular representation of the gross discrepancies that exist between the highest interest rates and the average interest rates for the same accounts and products on a nationwide basis;

FIGS. 4A and 4B, taken together, set forth a set of equations that formally recognize and describe that a broad set of monetary rights possessed by an owner of money can be separated into individual rights $(R(\alpha \ldots \iota, \$))$ in accordance with the principles of the present invention, and illustrating that, in accordance with the principles of the present invention, this set of individual rights is divisible, and each individual right is separately transferable, in a non-mutually exclusive manner, so as to maximize the utility of money in the global marketplace;

FIG. 8 is a schematic representation of a graphical user interface (GUI) used when opening up a universal financial institution account on the MRT Network, involving the supply all relevant personal or business financial account information required to open a financial account within the MRT Network;

FIGS. 11A1 through 11A2 set forth tables containing a series of Monetary Value (MV) accounting variable definitions and algebraic equations that describe the monetary value relations holding at each step of the process depicted in FIGS. 11B1 through 11D3, wherein the primary MRT Control Function that governs all monetary right(s) transfers is ΣMV (Rj (α . . . ι, $, Rk, t))≤MV (CPj, $, CPk, t), allowing an MRT user to capture interest (i) on the transferred monetary right(s) on the MRT Network;

FIG. 11B1 is a schematic representation of the Monetary Value Accounting Process using the Fedwire® RTGS system to facilitate initial outgoing (initial) monetary right(s) transfers regarding the monetary right to earn interest (R (β, $)), from the "home" financial institution to an "external" financial institution, in order to allow an MRT Network user to capture interest on the monetary right(s) transfer;

FIG. 11B2 is a flow chart depicting the various steps carried out in the Monetary Value Accounting Process of FIG. 11B1 utilizing the Fedwire® RTGS system to facilitate initial outgoing (initial) monetary right(s) transfers regarding the monetary right to earn interest (R (β, $)), from the "home" financial institution to an "external" financial institution in order to allow an MRT Network user to capture interest on the monetary right(s) transfer;

FIG. 11B3 is a table containing all of the MV of Accounting Equations associated with Monetary Value Accounting Process of FIGS. 11B1 and 11B2;

FIG. 11C1 is a schematic representation of the Monetary Value Accounting Process using the Fedwire® RTGS system to facilitate an intermediate step transfer of only interest income (i) earned on a monetary right(s) transfer monetary right(s) transfer, while the transferred monetary right (R (β, $)) remains at an "external" financial institution and allows an MRT Network user to continue to earn interest (i);

FIG. 11C2 is a flow chart depicting the various steps involved in the Monetary Value Accounting Process of FIG. 11C1, utilizing the Fedwire® RTGS system for facilitating interest-only (intermediate) transfers within the Internet-based MRT Network of the present invention, while the transferred monetary right (R (β, $)) remains at an "external" financial institution and allows an MRT Network user to continue to earn interest (i);

FIG. 11C3 is a table containing all of the MRT Accounting Equations associated with the Monetary Value Accounting Process of FIGS. 11C1 and 11C2 using the Fedwire® RTGS system for intermediate transfers of interest-only (i) earned on the monetary right to earn interest (R (β, $)) from an "external" financial institution to the "home" financial institution, in order to allow an MRT Network user to capture the interest (i) earned on the monetary right(s) transfer while the transferred monetary right, (R (β, $)), remains at an "external" financial institution and allows an MRT Network user to continue to earn interest (i);

FIG. 11D1 is a schematic representation of the Monetary Value Accounting Process using the Fedwire® RTGS system to facilitate the transfer of the closing (final) monetary right(s) to earn interest R (β, $)) and interest (i) earned within the Internet-based MRT Network of the present invention, from an "external" financial institution to the "home" financial institution in order to allow an MRT Network user to capture the interest (i) earned on the monetary right(s) transfer and to restore the transferred monetary right to earn interest (R (β, $)), to the remaining subset of non-transferred monetary rights (R (α . . . ι, $)−(R (β, $)));

FIG. 11D2 is a flow chart depicting the various steps involved in the Monetary Value Accounting Process of FIG. 11D1 using the Fedwire® RTGS system to facilitate the transfer of the closing (final) monetary right(s) to earn interest R (β, $)) and interest (i) earned within the Internet-based MRT Network of the present invention, from an "external" financial institution to the "home" financial institution in order to allow an MRT Network user to capture the interest (i) earned on the monetary right(s) transfer and to restore the transferred monetary right to earn interest (R (β, $)), to the remaining subset of non-transferred monetary rights (R (α . . . ι, $)−(R (β, $)));

FIG. 11D3 is a table containing all of the MRT Accounting Equations associated with the Monetary Value Accounting Process of FIGS. 11D1 and 11D2, using the Fedwire® RTGS system to facilitate the transfer of the closing (final) monetary right(s) to earn interest R (β, $)) and interest (i) earned within the Internet-based MRT Network of the present invention, from an "external" financial institution to the "home" financial institution in order to allow an MRT Network user to capture the interest (i) earned on the monetary right(s) transfer and to restore the transferred monetary right to earn interest (R (β, $)), to the remaining subset of non-transferred monetary rights (R (α . . . ι, $)−(R (β, $)));

FIGS. 13A, 13B and 13C set forth a flow chart depicting the various steps carried out when transferring monetary rights R (β, $) and capturing interest over the MRT Network of the present invention using the Fedwire® RTGS system to effect the monetary right(s) transfer, and capture interest by utilizing debit/credit accounting between the Federal Reserve banks of participating financial institutions participating on the MRT Network;

FIG. 15 is a flow chart describing the various steps involved in the MRT Network accounting for net-settled monetary right(s) transfers utilizing Fedwire® or other RTGS systems;

FIG. 17 is a flow chart depicting the various steps within the MRT Network Accounting System when carrying out the net-settlement of monetary right(s) transfers between participating financial institutions on the MRT Network;

FIGS. 19A and 19B set forth a flow chart depicting the various steps carried out during the net-settlement of monetary right(s) transfers according to the present invention, utilizing Fedwire® RTGS system or other RTGS systems that allows a financial institution receiving monetary right(s) credits within the MRT Network Accounting System to choose the timing of the Fedwire® net credit to its Federal Reserve Bank account;

FIG. 20 is a schematic representation of a graphic user interface (GUI) screen within the MRT Network that allows an MRT Network User to choose the timing of non-time sensitive monetary right(s) transfers to save on execution fees associated with monetary right(s) transfers, as there is a specific charge for Fedwire® RTGS utilization;

FIG. 21 is a schematic representation of the MRT Network aggregated monetary right(s) transfer process for automated preloaded payment systems (e.g. EZ Pass example) which allows an MRT Network User to transfer monetary rights associated with funds loaded on preloaded payment systems in order to optimize interest earned, while those funds are residing in other accounts for the MRT Network User's benefit, with the MRT Network accounting for aggregated prepaid device usage prior to effecting a monetary right(s) transfer via the Fedwire® RTGS system;

FIGS. 22A and 22B set forth a flow chart showing the various steps involved in the MRT Network aggregated monetary right(s) transfer process for funds deposited in an automated payment system or loaded on a prepaid device or product, as described in FIG. 21;

FIGS. 24A and 24B set forth a flow chart showing the various steps involved in the MRT Network aggregated monetary right(s) transfer process for funds loaded on a prepaid payment device or product;

FIG. 26 is an exemplary chart describing various kinds of Accountholder Products and Services supportable on the MRT Network of the present invention, with interest capturing services;

FIG. 27 is exemplary list describing the diverse provisions which the MRT Network of the present invention seeks to provide to all its users/accountholders;

FIG. 30 is an exemplary list of MRT-Fedwire® EDI codes structured to incorporate the functionalities of the MRT process of the present invention, such that each code specifies a certain transaction step in the monetary rights transfer (MRT) process supported on the MRT Network;

FIG. 32B is a schematic representation of an exemplary MRT-Fedwire EDI message 125 containing exemplary financial information used to carry out Step B in FIG. 32A;

FIG. 33A is a schematic representation of Step "C" of the MRT Process, whereby an MRT Network User requests a monetary right(s) transfer from the MRT Network User's "home" financial institution to an "external" financial institution using MRT-Fedwire message 126;

FIG. 33B is a schematic representation of an exemplary MRT-Fedwire EDI message 126 containing exemplary financial information used to carry out Step C in FIG. 33A;

FIG. 34A is a schematic representation of Step "D" of the MRT Process by which, one or more monetary rights are transferred utilizing MRT-Fedwire EDI messages 127-131.

FIGS. 34B through 34F are schematic representations of exemplary MRT-Fedwire EDI messages 127 through 131, respectively, containing exemplary financial information used to carry out Step D in FIG. 34A.

FIG. 34H is a schematic representation of an exemplary MRT-Fedwire EDI monetary right(s) transfer message (MRT-Fedwire EDI message 129) containing exemplary financial information used to carry out the monetary rights transfer process illustrated in FIGS. 10 and 34A;

FIG. 35A is a schematic representation of Step "E" of the MRT Process, utilizing MRT-Fedwire EDI messages 132 and 133, by which, the Federal Reserve Bank, once notified of a monetary right(s) transfer from the MRT Network User's "home" financial institution to an "external" financial institution, debits the "home" financial institution's Federal Reserve Bank account and credits the "external" financial institution's Federal Reserve Bank account for the amount of the monetary right(s) transfer; the "home" financial institution may then have to liquidate investments or call loans based on the monetary right(s) transfer;

FIGS. 35B and 35C are schematic representations of exemplary MRT-Fedwire EDI messages 132 and 133 containing exemplary financial information used to carry out Step E in FIG. 35A;

FIG. 36 is a schematic representation of Step "F" of the MRT Process and illustrates that the "external" financial institution, after receiving notice from the Federal Reserve Bank that the external financial institution's Federal Reserve Bank account has been credited in the amount of the monetary right(s) transfer, as shown in FIGS. 35A and 35C, can then lend or invest cash (Cash, $) in the amount of the credit to its Federal Reserve Bank account;

FIG. 37A is a schematic representation of Step "G" of the MRT Process, whereby an MRT Network User requests to transfer both the transferred monetary right(s) and the earned interest income from the "external" financial institution to which, the original monetary right(s) transfer was effected, back to the MRT Network User's "home" financial institution, and utilizing MRT-Fedwire EDI messages 134 through 137;

FIGS. 37B through 37E are schematic representations of exemplary MRT-Fedwire EDI messages 134 through 137 containing exemplary financial information used to carry out Step G in FIG. 37A;

FIG. 38 is a schematic representation of Step "H" of the MRT Process by which, the "external" financial institution, upon receiving the request to cancel the original monetary right(s) transfer, either may have to call loans and/or liquidate investments associated with the monetary right(s) transfer, receiving both cash and any earned interest or return;

FIG. 39A is a schematic representation of Step "I" of the MRT "Process through which, the "external" financial institution's Federal Reserve Bank account is debited in the amount of the monetary right(s) transfer plus any earned interest, and the Federal Reserve Account of the MRT Network User's "home" financial institution is credited for the same amount utilizing MRT-Fedwire EDI messages 138 and 139;

FIGS. 39B and 39C are schematic representations of an exemplary MRT-Fedwire EDI messages 138 and 139 containing exemplary financial information used to carry out Step I in FIG. 39A;

FIG. 41A is a schematic representation of Step "K" of the MRT Process by which, the MRT Network automatically reports the MRT Network User's earned interest income to the Internal Revenue Service (IRS);

FIG. 41B is a schematic representation of an exemplary MRT-Fedwire EDI message 140 containing exemplary financial information used to carry out Step K in FIG. 41;

FIG. 42 is a schematic representation of an exemplary MRT-Fedwire EDI Message Exchange Log, detailing each MRT-Fedwire EDI message and including the MRT Network User's "home" and "external" financial institution accounts, the "home" and "external" financial institutions' Federal Reserve Bank account numbers, the amount of the monetary right(s) transfer and the amount of the earned interest income;

FIGS. 45A1, 45A2 and 45A3, taken together, set forth a schematic representation of the REI Transfer Method A depicted in FIG. 44, illustrating that a system user/accountholder can manually review and effect transfers of R (β, $) via the methods of the present invention, wherein each step in the method shows the various account balances and transfer choices and then, at the completion of the R (β, $) transfer, shows the confirmation with all of the details related to each transfer and an "Accounts Status (New)" that shows all of the user's various new account balances post-transfer;

FIG. 45B shows the new accounts status after the monetary right(s) transfer depicted in FIGS. 45A1 through 45A3;

FIGS. 48A1, 48A2 and 48A3, taken together, set forth a schematic representation illustrating REI Transfer Method "B depicted in FIG. 29B, illustrating that a system user/accountholder can pre-specify criteria by which the system will rank participating institutions' accounts/products for the system user, and then the system user can either effect a manual transfer of R (β, $) using the system's rankings, or the system user can, via pre-specification, allow the system to effect transfers automatically based on rankings of the user's pre-specified criteria, and throughout the process, the system provides data regarding account balances, the transfer process and an "Accounts Status (New)" at the completion of the process;

FIG. 48B1 shows the new accounts status after the monetary right(s) transfer depicted in FIGS. 48A1 through 48A3;

FIGS. 51A1, 51A2, 51A3 and 51A4, taken together, set forth a schematic representation depicting various steps in the REI Transfer Method C illustrated in FIG. 50, that allow a user to pre-specify certain participating institutions (preferred partners) to which to transfer R (β, $) based on the system's rankings of those institutions' accounts and products, with the actual transfer either being effected manually by the system user or automatically by the system based on the user's pre-specified criteria and, as with other transfer methods, the system provides account balances, (R (β, $)) transfer progress and an "Accounts Status (New)" at the completion of the transaction;

FIG. 51B1 shows the new accounts status after the monetary right(s) transfer depicted in FIGS. 51A1 through 51A4;

FIGS. 54A1 and 54A2, taken together, set forth a schematic representation of the System-Selected REI Transfer Method "D", which allow a system user to turn over the entire right(s) transfer process to the system of the present invention with automatic transfers of R (β, $) based on the system's own criteria, to pre-specify transfer criteria and then allow the MRT Network of the present invention to effect transfers of R (β, $) automatically based on the user's pre-specified criteria or, to receive the rankings based on the system-selected criteria and then effect manual right(s) transfers, with the MRT Network providing account balances, transfer progress and an "Account Status (NEW)" at the end of the right(s) transfer process;

FIG. 54B1 shows the new accounts status after the monetary right(s) transfer depicted in FIGS. 54A1 and 54A2;

FIGS. 55A and 55B, taken together, set forth a flow chart that depicts the various steps in the System-Selected REI Transfer Method "D", allowing a system user to automatically, semi-automatically or manually transfer R (β, $) based on system-selected criteria that ranks various participating institutions' accounts and products based on the MRT Network's own internal criteria, and features constant updates on account balances, transfer progress and an "Accounts Status (NEW)" at the completion of the transfer process;

FIGS. 57A1 through 57A2 are schematic representations of the Internal REI Method "E" of FIG. 56, allowing a system user to transfer the right to earn interest (R (β, $)) (or other right(s)) internally within the "home" or "external" institution's accounts/products where the R (β, $) resides, wherein the method/process allows a system user to manually transfer R (β, $) or semi-automatically transfer R (β, $) or, specify that the system automatically transfer R (β, $) based on user's pre-specified transfer criteria, while providing the system user with account balances, transfer progress and, at completion, an "Accounts Status (NEW)" showing update account balances;

FIG. 57B1 shows the new accounts status after the monetary right(s) transfer depicted in FIGS. 57A1 and 57A2;

FIGS. 58A through 58B, taken together, set forth a flow chart depicting the various steps in the REI Method E, allowing a system user to automatically, semi-automatically or manually transfer R (β, $) internally within the "home" or "external" institution(s) accounts and products in which R (β, $) resides, and allows for the constant updating on account balances, transfer progress and an "Accounts Status (NEW)" at the completion of the REI transfer process;

FIGS. 61A through 61C2, taken together, set forth a schematic representation of a Commerce-Enabling REI Transfer Process supported on the MRT Network of the present invention, wherein a user/accountholder's monetary right to earn interest (R (β, $)) is transferred in a time-coincident manner with his/her exercise of the right to make purchases (R (ϵ, $)) (via his/her right to make payments (R (ϕ, $) and the right to make withdrawals (e.g. hold money as a store of value) (R (δ, $)), specifically, a user/accountholder transfers R (β, $) in order to earn higher interest rates/yields but, as the user utilizes other, non-mutually exclusive rights associated with holding money through demand account transactions (e.g. R (ϵ, $)), (R (ϕ, $)), and (R (δ, $)), the amount of R (β, $) is automatically reduced or cancelled commensurately, thereby allowing a user to maximize the utility and value of money held/owed;

FIG. 62 is a flow chart depicting the various steps carried out by the Commerce-Enabling REI Transfer Process shown in FIGS. 61A through 61C2, allowing a system user/accountholder to both transfer the right to earn interest R (β, $) and, at the same time, conduct commerce by utilizing other, separable rights associated with money ownership;

FIGS. 65A through 65C3 set forth schematic representations of the Mortgage REI Transfer Process supported on the MRT Network of the present invention, enabling a system user/accountholder to transfer the right to earn interest (R (β, $)) on monies paid to, and escrowed by, a mortgage issuer or mortgage service provider so as to cover the user/accountholder's future obligations with regard to property taxes, insurance and other mortgage related expenses, and thereby allowing a user/accountholder to earn additional interest on monies prior to the individual payment(s) due date(s);

FIGS. 66A and 66B set forth a flow chart depicting the various steps in the Mortgage Interest Right Process for the MRT Network that allow system user/accountholder to transfer the right to earn interest (R (β, $)) on monies paid to a mortgage issuer or to a mortgage service provider;

FIGS. 67A through 67C3, taken together, set forth schematic representations of Human Resources Interest Right Process for supported on the MRT Network of the present invention, enabling a system user to transfer the right to earn interest (R (β, $)) on monies collected from an employee (system user/accountholder) by an employer or payroll services provider to pay the employee's future obligations for such things as taxes, insurance, and other employee-related expenses, and thereby allowing the employee to earn additional interest on the monies collected to pay for future employee obligations by an employer or payroll services provider until each individual payment due date;

FIGS. 68A through 68B, taken together, set forth a flow chart depicting the Human Resources Interest Right Process represented in FIGS. 67A through 67C33, enabling an employee to transfer the right to earn interest (R (β, $)) on monies (still owned by the employee) collected and held by an employer or payroll services provider to pay an employee's future obligations until each individual payment due date;

FIGS. 69A through 69C3 are schematic representations of the Payment Method Withholding the Right to Earn Interest (R (β, $)) until Payment Due Date supported on the MRT Network of the present invention, enabling a system user/accountholder to remit payment on a bill received at any date prior to the bill's due date such that the payment remitted consists of R (α . . . ι, $)–R (β, $) allowing the system user/accountholder to transfer R (β, $) and earn additional interest up to a bill's payment due date at which time R (β, $) is restored to the user's original payment and, simultaneously, the user's R (β, $) transfer is cancelled with any accrued interest being returned to the user's account in the user's "home" and/or "external" institution(s) registered on the MRT Network of the present invention;

FIG. 69D1 through 69D2, set forth a flow chart describing the steps carried out during the Payment Method Withholding the Right to Earn Interest R (β, $) until Payment Due Date, depicted in FIGS. 69A through 69C3;

FIGS. 70B1-1 through 70B1-2, taken together, sets forth a flow chart describing the steps carried out by the Payment Method Withholding the Right to Earn Interest R (β, $) until Payment Due Date, as depicted in FIG. 70A;

FIG. 74 is a flow chart describing the steps carried out during the Foreign Entities and Foreign Exchange Conversion Process, illustrated in FIGS. 73A and 73B;

FIG. 75 is a schematic representation of an exemplary transaction log based on hypothetical transfers of the right to earn interest R (β, $) by an user/accountholder on the MRT Network;

FIG. 76 is a schematic representation of an exemplary Accountholder Information Collection and Storage form that can be used by the MRT Network of the present invention, in order to collect and store relevant information relating to the opening and maintenance of an account on the MRT Network of the present invention;

FIG. 77 is a schematic representation of an exemplary Accountholder Preference Collection and Storage form that can be used by the MRT Network to allow an accountholder to supply account data to the system, rank display and transfer criteria, and provide institution and/or account/product data for the accountholder's Preferred Partner Network (PPN) maintained on the MRT Network;

FIG. 79 is a schematic representation of a Web-based control panel that allows an accountholder on the MRT Network to specify the method(s) by which to transfer the accountholder's right to earn interest (R (β, $)) on accounts maintained on and registered with the MRT Network;

FIG. 85 is a schematic representation of a Web-based control panel that allows an accountholder on the MRT Network to specify minimum safety/credit criteria for institutions and/or accounts and products to which to transfer accountholder's R (β, $);

FIG. 86 is a schematic representation of a Web-based control panel that allows an accountholder on the MRT Network to establish R (β, $) transfer risk levels that will serve to govern automatic (and other) transfers of R (β, $) via the MRT Network;

FIG. 87 is a schematic representation of a Web-based control panel for a Deposit Insurance Filter supported on the MRT Network, allowing an accountholder on the MRT Network to establish parameters regarding deposit insurance afforded to the transfers of the right to earn interest (R (β, $));

FIG. 88 is a schematic representation of a Web-based control panel for the MRT Minimum Account Balance Filter supported on the MRT Network, allowing an accountholder to establish parameters related to minimum account balances for effecting transfers of the accountholder's right to earn interest (R (β, $));

FIG. 89 is a schematic representation of a Web-based control panel for Notification Preferences that allows an accountholder on the MRT Network to establish criteria, for notification of opportunities and offers supported on the MRT Network;

FIG. 90 is a schematic representation of a Web-based control panel for Preferred Notification Methods that allows an accountholder to specify method(s) by which an accountholder on the MRT Network prefers to be contacted/notified;

FIG. 91 is a schematic representation of a Web-based control panel for the Fees, Charges and Penalties Filter that allows an accountholder on the MRT Network to establish criteria related to fees, charges and penalties for notification and transfer of the accountholder's right to earn interest (R (β, $));

FIG. 92 is a schematic representation of Web-based control panel for the Preferred Transfer Method(s) that allows an accountholder on the MRT Network to specify the preferred method(s) by which to transfer the accountholder's right to earn interest (R (β, $));

FIG. 93 is a schematic representation for a Web-based control panel for the Accountholder Right of First Refusal Right(s) (R (β, $)) Transfer Criteria that allows an accountholder on the MRT Network to establish criteria which will (will not) allow "home" bank(s)/institution(s) to match, beat, or counter, offers received by an MRT accountholder from "external" bank(s)/institution(s);

FIG. 94 is a schematic representation for a Web-based control panel for the Account-Specific Payment Method Withholding the Right to Earn Interest (R (β, $)) until payment Due Date Pre-Specifications that allows an accountholder on the MRT Network to pre-specify from which account(s) to make payments withholding R (β, $) until a payment's due date, and to pre-specify whether to make said payment by electronic means or by manual means; and FIG. 95 is a schematic representation for a Web-based control panel for the Right(s) Transfer Preferred Accounts and Products List that allows an accountholder on the MRT Network to specify to which accounts and products the accountholder prefers to transfer the accountholder's monetary right to earn interest R (β, $) possessed by an owner (or borrower) of money.

DETAILED DESCRIPTION OF ILLUSTRATIVE EMBODIMENTS OF THE PRESENT INVENTION

Referring now to the figures in the accompanying Drawings, the illustrative embodiments of the present invention will now be described in great technical detail, wherein like parts are indicated by like reference numbers.

Overview of the Method of Monetary Rights Transfer According to the Principles of the Present Invention Referring to FIGS. 4A and 4B, there is presented an important set of equations that formally recognizes a broad set of monetary rights, possessed by an owner of any amount of money, that can be separated into individual rights (R (α . . . ι, $)) and effectively transferred in the marketplace in accordance with the principles of the present invention. As will be described in great detail hereinafter, the transfer of individual monetary rights, or subsets of monetary rights, is carried out using the Internet-based Monetary Rights Transfer (MRT) Network of the present invention which recognizes and ensures that the above-identified set of individual rights is divisible, and each individual right is transferable, alone or in subsets, on the MRT Network (MRTN), in a non-mutually exclusive manner, so as to maximize the utility and value of money in the global marketplace. Such divisibility of rights is akin to the bundle of rights possessed through ownership of land, including rights pertaining to minerals, timber, agriculture, riparian rights, surface and ground water, air, and development, to name the most common rights.

Overview of Internet-Based MRT Network of the Present Invention

Figure 3:
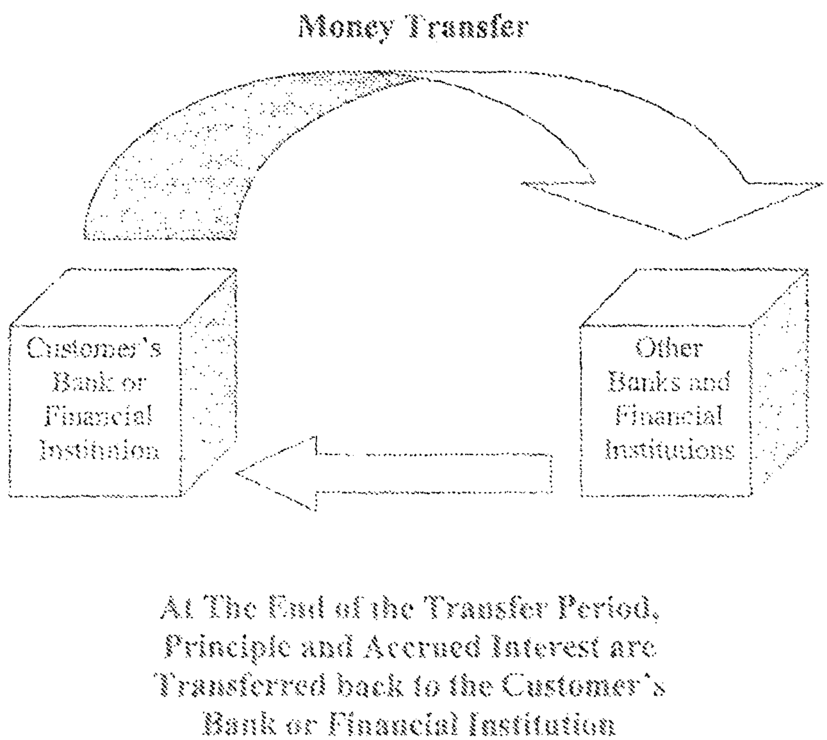
FIG. 3 is a schematic representation illustrating the flow of money associated with conventional money transfer systems, wherein at the end of the transfer period, principle money and accrued interest are transferred back to owner of money, or its bank.
Figure 5:
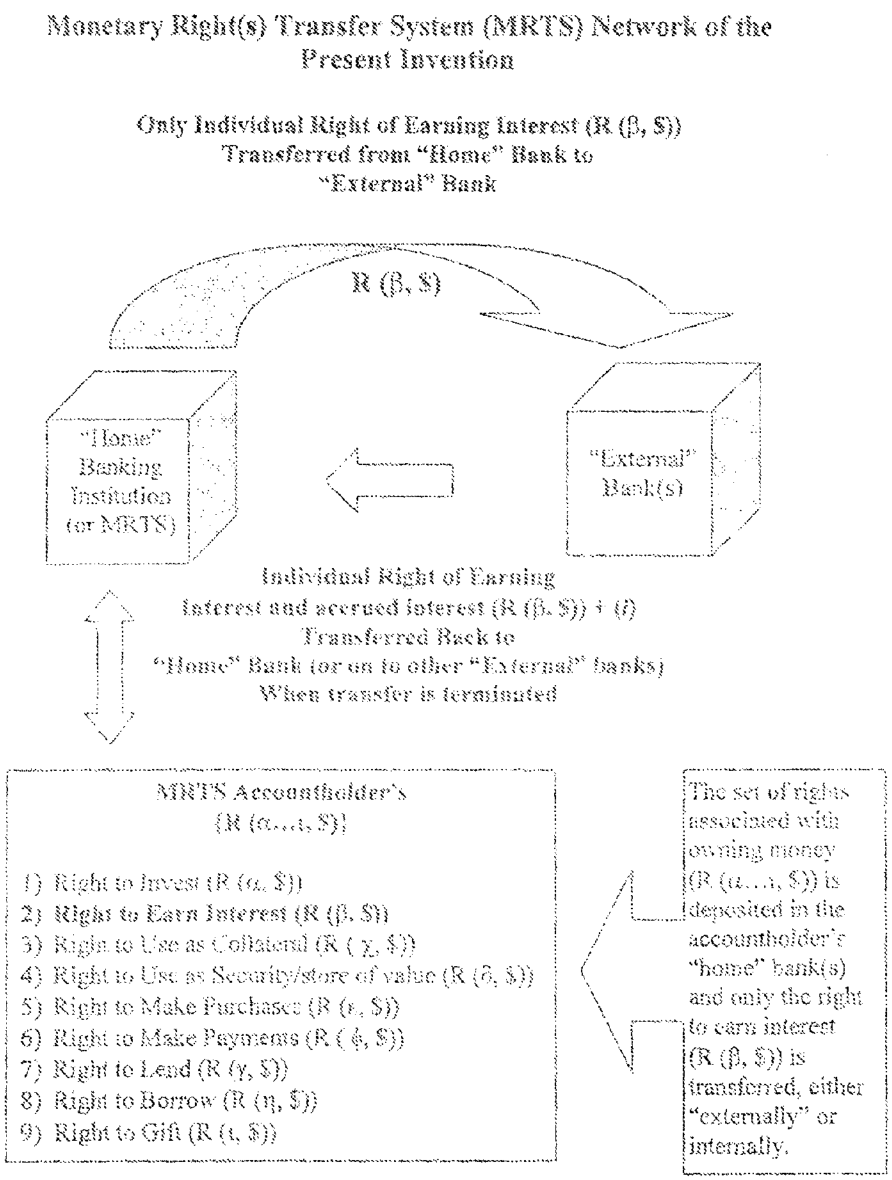
FIG. 5 is a schematic representation of the money rights transfer (MRT) process carried out by the Internet-based Monetary Rights Transfer Network (MRT Network) of the present invention, supported by the real-time gross settlement (RTGS) system of the central bank of a country, wherein, in this illustrative embodiment, only the right to earn interest $(R(\beta, \$))$ possessed by an owner of money is transferred from a "home" financial institution to either an "external" institution (s) or internally within the "home" institution's accounts and products, while all other monetary rights within the bundle $\{R(\alpha \ldots \iota)\}$ possessed by the holder of money remain at the "home" institution for full use by the holder, thereby allowing the holder to maximize the utility of the money held in the global marketplace by earning (higher) interest on the transferred monetary right(s), in accordance with the principles of the present invention.

As shown in FIG. 5, the Internet-based MRT Network of the present invention represents a significant improvement on the "Conventional Money Transfer Systems" as illustrated in FIG. 3. In this figure, the MRT Network is shown transferring only the right to earn interest (R (β, $)) possessed by an owner of money, from a "home" financial institution to either an "external" institution(s) or internally within the "home" institution's accounts and products, in order to allow the owner to receive a better rate/yield at an "external" institution than that offered at the owner's "home" institution, while all other monetary rights within the bundle {R(α . . . ι)} possessed by the holder of money remain at the "home" institution, serving as full, non-levered collateral for the transferred monetary right, and available for full utilization by the holder, thereby allowing the holder to maximize the utility of the money held in the global marketplace, in accordance with the principles of the present invention. For the purpose of the present invention, an "external" bank or financial institution is defined as any other bank or financial institution to which a user of the MRT Network and methods, described herein, might transfer monies and investments, either manually or automatically and, either through an actual transfer of a user's monies or investments or through a transfer of one or more of the user's monetary rights—as shown in FIG. 5, the monetary right to earn interest, which constitutes a transfer of the right to earn interest associated with a user's monies and investments, but not the user's actual monies and/or investments.

Figure 6:
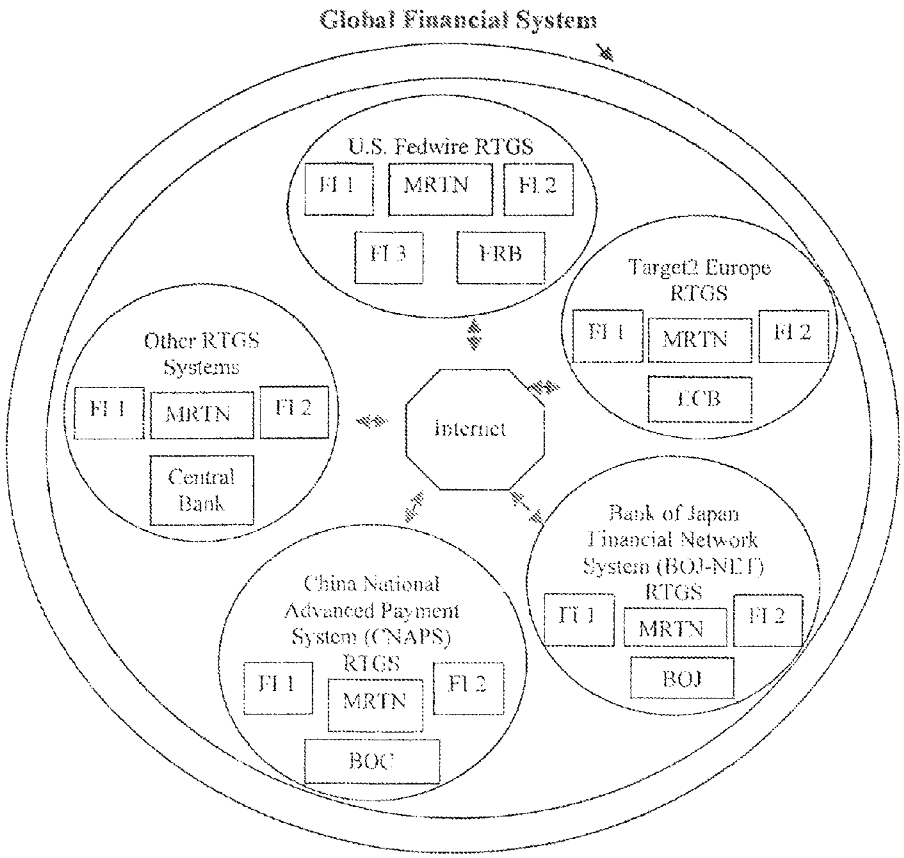
FIG. 6 is a schematic representation of the Internet-based MRT Network of the present invention, realized around the world in numerous countries, utilizing real time gross settlement (RTGS) systems, typically maintained or controlled by the central bank of each country (e.g. U.S. Federal Reserve Bank (FRB), The Bank of China (BOC), The Bank of Japan (BOJ)), or by a consortium of central banks like the European Central Bank (ECB), within the global financial marketplace, whereby various RTGS systems, utilizing the MRT Network, are linked to other RTGS systems, also utilizing the MRT Network, via the Internet, allowing MRT Network users in various countries around the world to effect monetary right(s) transfers with other RTGS systems and to capture and to earn interest on money held within accounts in the MRT Network.

As shown in FIG. 6, the Internet-based MRT Network of the present invention utilizes one or more Real Time Gross Settlement (RTGS) systems, within the global financial marketplace whereby, various RTGS systems, utilizing the MRT Network, are linked to other RTGS systems, also utilizing the MRT Network, via the Internet, allowing MRT Network users in various countries around the world to effect monetary right(s) transfers with other RTGS systems.

Figure 7:
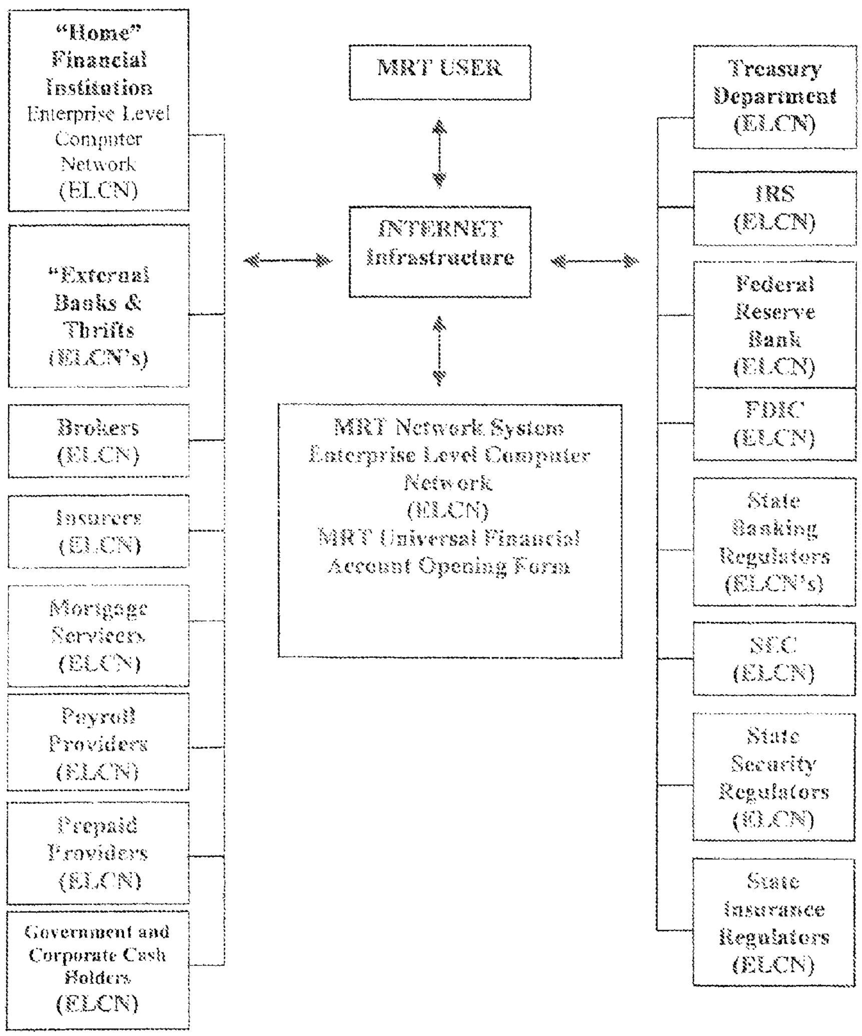
FIG. 7 is a schematic representation of a universal financial institution account opening process on the MRT Network, which allows a MRT Network User to open multiple accounts at financial institutions participating on the MRT Network, for the purpose of earning (higher) interest income by providing all of their relevant personal or business financial information once, with the participating financial institutions agreeing to a universal account opening form that includes all pertinent user financial information and universal legalese required to open a financial account within the MRT Network.

FIG. 7 shows the MRT Network Universal Financial Institution Account Opening Process, which allows an MRT Network User to open multiple accounts at financial institutions participating on the MRT Network. This process involves providing all relevant personal or business financial information at once, with the participating financial institutions agreeing to a universal account opening form, that includes all pertinent user financial information and universal legalese required to open a financial account at each financial institution participating within the MRT Network. A participating financial institution, for the purposes of the present invention, is defined as any financial institution that has the ability to transact over one or more RTGS systems, any financial institution that has access to one or more RTGS systems via another financial institution that has the ability to transact over one or more RTGS systems, or any non-financial institution that has access to one or more RTGS systems via another financial institution that has the ability to transact over one or more RTGS systems. Various financial institutions, each of which includes enterprise level computer networks (ELCN), are shown linked to the MRT Network, also supported by an ELCN, via the Internet.

In general, each ELCN comprises packet-switched routers, switches, gateways, and other data-packet networking components, systems and devices, as well as Web (HTTP), application (JAVA) and database (SQL) servers, and numerous Internet-enabled client systems, configured and distributed throughout the enterprise, in a manner well known in the computer, networking and communication arts.

As shown in FIG. 7, the MRT Network is also linked, via the Internet, to the ELCN's of all of the various state and federal regulatory agencies, that oversee all facets of banking in the United States and, which, have similar counterparts in other global financial systems.

As shown in FIG. 8, when an MRT Network User populates the MRT Network Account Opening form on the MRT Network graphic user interface (GUI) page, the MRT Network forwards the pertinent information to all of the various regulatory agencies to assure that an MRT Network User opening a universal account providing access to all participating financial institutions' accounts, is not doing so for the purpose of money laundering or terror financing and that the MRT Network User reports all earned interest income for tax purposes.

FIG. 8 shows the MRT Network Universal Account Opening process, through which an MRT Network User populates a graphic user interface (GUI) page, which allows the MRT Network to collect all relevant personal (or business) information related to the MRT Network User's "home" bank account(s), which will allow the MRT Network User to open an MRT Network universal account providing instant access to all financial institutions' financial accounts and products that participate on the MRT Network. Importantly, the MRT Network User is required to read and check a box that acknowledges that the MRT Network User has read the standardized legalese to which, all participating financial institutions have agreed.

Figure 9:
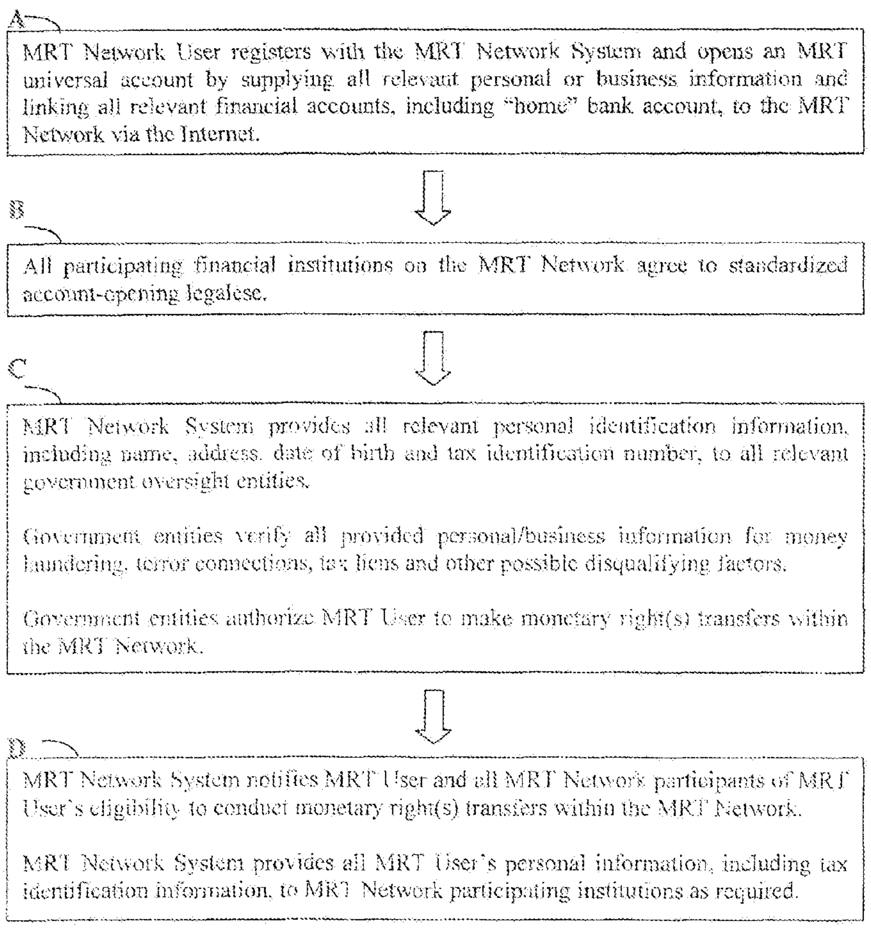
FIG. 9 is a flow chart depicting the various steps carried out when opening a universal account on the MRT Network using the GUI of FIG. 8.

FIG. 9 details the various steps included in the MRT Network Universal Financial Account Opening Process.

Figure 10:
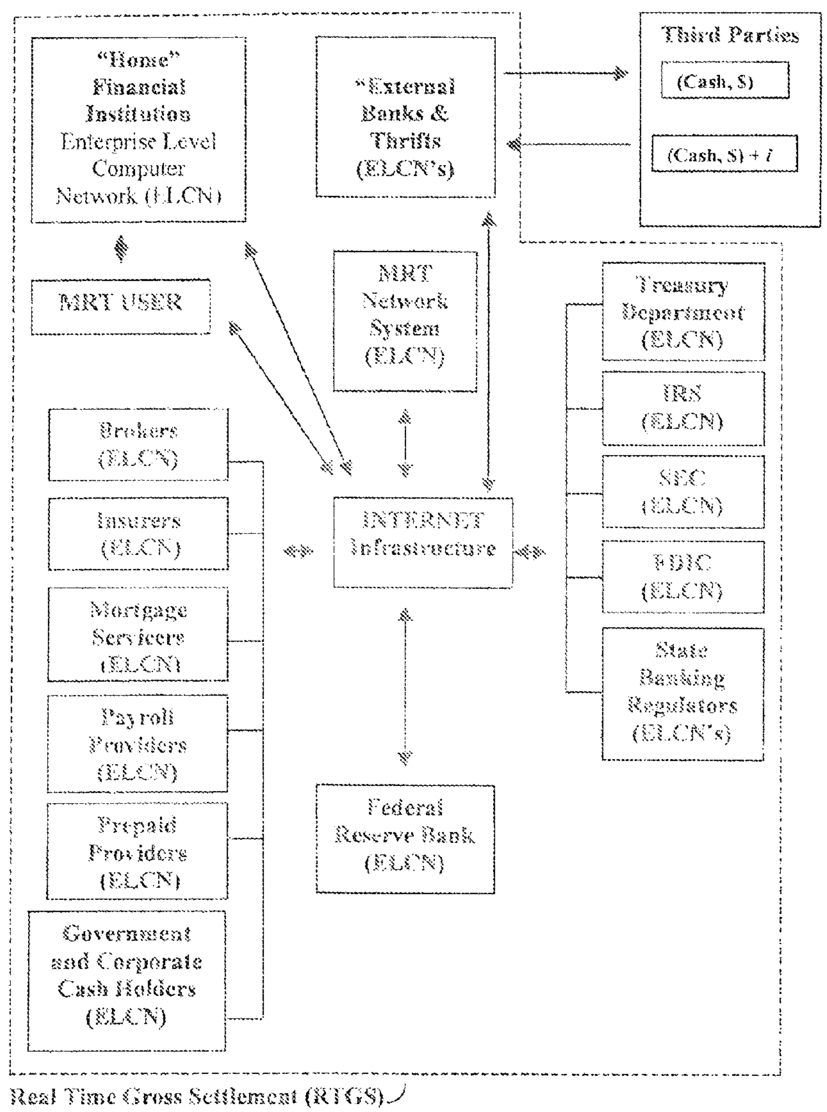
FIG. 10 is a schematic representation of the MRT Network of the present invention supported by the real-time gross settlement (RTGS) system of the central bank of the United States (i.e. the Fedwire® RTGS system of the U.S. Federal Reserve Bank), showing the various components of the MRT Network interacting and cooperating together, so as to enable a system user (i.e. account holder) to transfer one (or more) of the individual monetary rights (e.g. the right to earn interest (R (β, $)) to one or more participating financial institutions on the MRT Network, in order to earn a higher rate of interest, utilizing an EDI-based real-time gross settlement (RTGS) system, such as the Fedwire® RTGS system, maintained and operated by the US Federal Reserve Bank, for (i) transferring monetary rights over the MRT Network using EDI-messaging, and (ii) crediting the Federal Reserve bank account of receiving financial institutions and debiting the Federal Reserve bank accounts of sending financial institutions, in the amount of the transferred monetary right(s) so as to allow (i) the financial institution receiving the monetary value of a monetary rights transfer to lend to third parties, or invest, cash (Cash, $), based upon (a) the amount of the credit, which is dependent upon the monetary value of the transferred monetary right(s), attributed to Federal Reserve Bank account of the financial institution receiving the monetary rights transfer via the RTGS system, and (b) the preferred capital ratio (PCR) of the financial institution, and (ii) the holder of money (who transferred monetary rights to the receiving financial institution) to earn and to capture interest on the monetary value of the transferred monetary rights to the receiving financial institution by utilizing an EDI-based real-time gross settlement (RTGS) system, such as the Fedwire® RTGS system, to debit the Federal Reserve bank account of the sending financial institution, and credit the Federal Reserve bank account of receiving financial institution, in the amount of both the original, transferred monetary right(s), plus the interest (i) paid on the value of the monetary right(s) transfer by the financial institution that received the initial monetary right(s) transfer.

As shown in FIG. 10, the Internet-based MRT Network of the present invention is shown comprising various enterprise-level computer information systems and supporting global financial information services, for each ELCN-based financial institution recognized as a participating financial institution on MRT Network (e.g. banks, thrifts, brokers, insurers, mortgage companies, payroll services companies, billing companies, prepaid product/device issuers, and other institutions including the Federal Reserve Bank, US Treasury Department, State Banking Regulators, IRS, SEC, FDIC, et al).

As shown, each of these enterprise-level information management and transaction supporting systems is integrated with the information infrastructure and services of the MRT Network, including its web, application and database (RDBMS) servers (FIGS. 25A and 25B) configured according to a multi-tier network architecture supported with packet-switched firewall, switch and router technology well known in the networking communications art.

As will be described in greater detail hereinafter, web, application and database servers at each node in the MRT Network cooperate so as to support and deliver the various suites of information services on the MRT Network, depicted in FIGS. 28 through 29B. Among such services are the interest-capturing service (ICS) of the present invention, wherein a system-user (i.e. account holder) is capable of transferring one (or more) of his or her monetary rights (i.e. the right to earn interest (R (β, $)) associated with money ownership) to one or more participating financial institutions registered on the MRT Network to earn interest on such transferred monetary right(s).

As will be described in greater detail hereinafter, this service involves each ELCN-based financial institution recognized as a participating financial institution on the MRT Network, and offering a ICS-enabled financial product or service, to automatically feed (to the MRT Network's information servers) various kinds of time-varying information relating to interest rates/yields, accounts and products, and other information relevant to helping a system user make investment decisions with regard to interest right(s) transfers.

As illustrated in FIG. 10, an owner of money that has established an account within a "home" financial institution is also an MRT Network accountholder. As shown, the MRT Network's servers (which are mirrored at various locations around the globe) receive, via the Internet's IP infrastructure, rate/yield, account/product, and other information fed to the MRT Network's databases by all participating financial institutions. At the end of the R (β, $) transfer period, which may be determined by the accountholder or by the MRT Network based upon the MRT Network User's pre-specified instructions (automated mode), the accountholder's transferred monetary rights R (β, $)+/−earned interest (i) may then be either returned to the bank account at the MRT Network User's "home" financial institution, or may be transferred on to another "external" financial institution. Even if the accountholder chooses to transfer the R (β, $) to another institution, the accountholder can choose to transfer the accrued interest (i) along with the R (β, $) either to another "external" financial institution or back to the MRT Network accountholder's account(s) at the "home" financial institution. At the end of the monetary right(s) transfer process R (β, $)+(i) is returned to the MRT Network accountholder's account(s) at the accountholder's "home" financial institution.

However, should the MRTN system user, who originally transferred the monetary right(s), then go out and utilize the remaining monetary rights, held by the MRT Network User's "home" financial institution, the MRT Network will recall/cancel a commensurate amount of the transferred monetary rights instantaneously and, which, is required to make the system user's transaction good. Monetary rights associated with any funds transferred over the network to a party to support a transaction can, at any time, be automatically terminated over the network by any utilization of the remaining rights associated with the monetary amount held. For example, one or more monetary rights transferred i.e., the right to invest, over the network to a recognized participating financial institution, will earn interest for the owner until the owner chooses to utilize the non-transferred right(s) (in whole or in part) for any other uses such as payments, purchases, cash withdrawals, and any other transactions drawn on a demand account, and upon such alternative use, the right to invest will be automatically terminated with the "receiver" of the monetary rights transfer, and the associated monetary value of such alternative use(s) will be subtracted from the account maintained within the MRT Network.

Cash Deposit Requirements of Participating Financial Institutions Registered on the MRT Network of the Present Invention In much the same manner as banks and other financial institutions account for derivatives, participating banks and financial institutions will have to maintain adequate reserves (Cash ($)) to facilitate the monetary right(s) transfer process. Presently, banks are required to hold a certain percentage of their total assets as reserves (reserve requirements) in order to assure their financial health and to demonstrate their liquidity. While there are minimum reserve requirements required by the Federal Reserve Bank and other financial regulatory authorities, for the purposes of describing the present invention, the reserve requirement is defined as the bank's or financial institution's "Preferred Capital Ratio" (PCR), as each institution may decide, above the Federal Reserve Bank-mandated minimum reserve requirement, what its preferred capital ratio will be. While holding these reserves, banks try to invest (lend, purchase securities, etc.) the remainder of the funds in order to earn a return higher than that which they are paying out to their depositors and investors in interest, dividends, etc. Transferring funds under this regime is straightforward; cash (CASH, $) moves, primarily by electronic means. Thus as an investor transfers cash or electronic money out of a "home" bank or financial institution to an "external" bank or financial institution, the "home" bank or financial institution is no longer required to reserve against those funds, as they are no longer domiciled within the institution from which they were transferred. But, due to a physical or electronic transfer of funds out of a "home" bank or financial institution, the "home" bank or financial institution may be required to sell investments or loan out less money in order to satisfy the aforementioned reserve requirements as there are fewer total assets against which to lend, invest, etc.

Internally, within the MRT Network of the present invention, the right(s) transfer processes (notably the right to earn interest (R (β, $))), participating "home" banks and financial institutions may have to hold a portion of reserves (Cash ($)) against which such monetary right(s) transfers are made. However, this process represents a vast improvement for the "home" banks and financial institutions. In cases where the right to earn interest (R (β, $)) (and/or other monetary rights)

is being transferred out of the "home" bank or financial institution, even though the "home" institution must reserve against these monies as they are held, and it may have to liquidate investments, call loans, etc., if the right to earn interest (R (β, $)) is transferred to another MRT Network participant similar to a wholesale transfer of funds out of the "home" institution, as opposed to a wholesale transfer of funds to another institution, the "home" institution still holds the remaining set of rights {R (α . . . ι, $)–R (β, $)}, which serves as full, non-leveraged collateral for the transferred monetary right(s) and, which, the retained customer can utilize via the "home" institution's accounts and products. Furthermore, by facilitating the transfer of only one (or more) monetary right(s), the "home" institution virtually is assured of retaining the customer.

Figure 11:
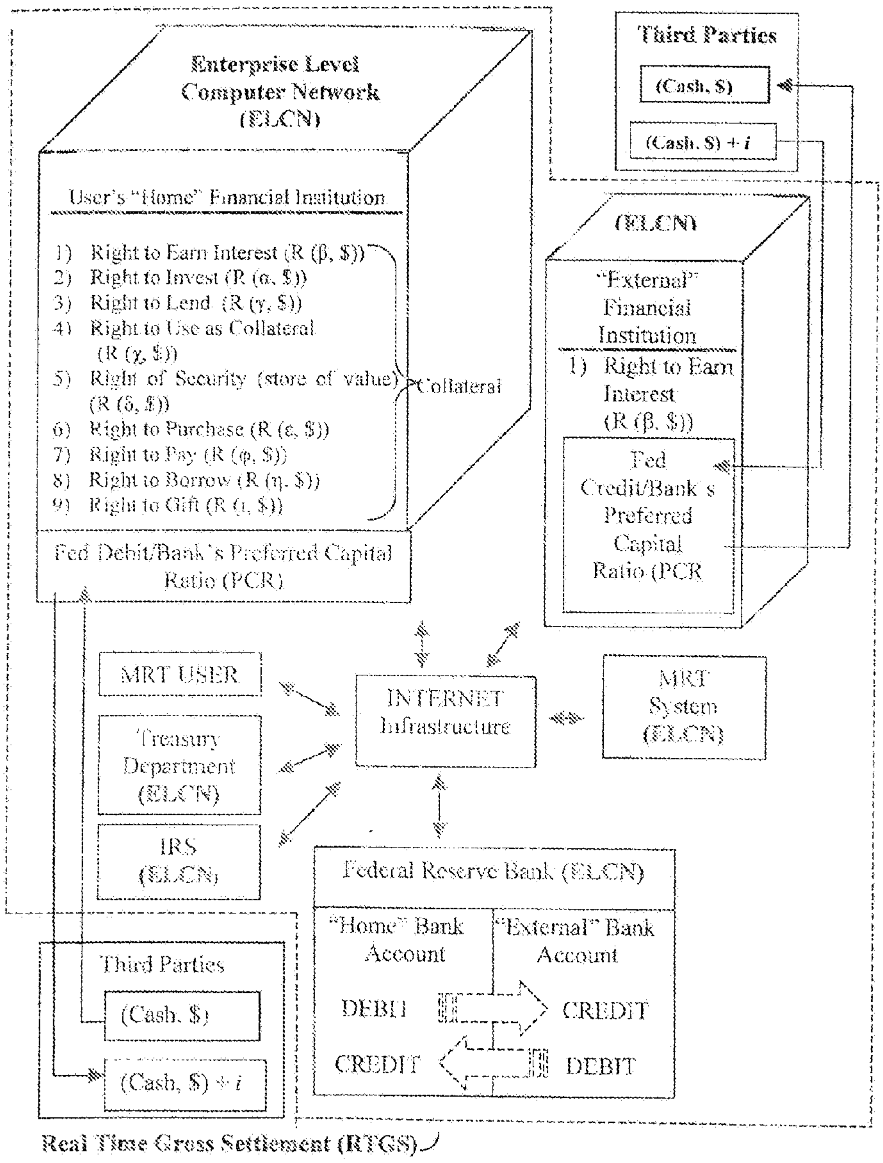
FIG. 11 is a schematic representation of the Internet-based MRT Network (MRT Network) of the present invention using, in the illustrative embodiment, the Fedwire® RTGS system, maintained and operated by the U.S. Federal Reserve Bank (FRB) of the USA.

Using the Fedwire® Real-Time Gross Settlement (RTGS) System to Transfer Credit to External Financial Institutions on the MRT Network of the Present Invention On the MRT Network of the present invention, all participating financial institutions must maintain a bank account with the Federal Reserve Bank (i.e. a Federal Reserve Bank Account) and be a registered member of the Fedwire® Real-Time Gross Settlement (RTGS) System, which is integrated with the MRT Network of the present invention, as shown in FIGS. 10 and 11, and elsewhere throughout the Drawings and Specification. Currently, there are more than 9,250 financial institutions that participate in the Fedwire® RTGS system, requiring that each bank maintain an account at the Federal Reserve Bank to facilitate Fedwire® transfers.

CASE 1: Transferring Monetary Right(s) from the "Home" Financial Institution to the "External" Financial Institution Over the MRT Network When the desired monetary right(s) are transferred from the "home" financial institution to the "external" financial institution over the MRT Network, a debit associated with, and equal to, the monetary value of the transferred monetary right(s) is automatically transferred to and recorded in the Federal Reserve Bank Account of the "home" financial institution, while a credit associated with, and equal to, the monetary value of the transferred monetary right(s) is automatically transferred to and recorded in the Federal Reserve Bank Account of the "external" financial institution—by way of the Fedwire® RTGS system, supported on the Fedwire® network. This EDI-based process effectively credits the "external" financial institution's Federal Reserve Bank Account, with a monetary value (MV) equal to the corresponding monetary rights transfer, while debiting the "home" financial institution's Federal Reserve Bank Account with a monetary value (MV) equal to the corresponding monetary rights transfer. This corresponding credit to the external financial institution's Federal Reserve Bank Account ensures that the "external" financial institution can lend cash (CASH, $) to a third party, or can invest cash (CASH, $), for the purpose of earning a return on the loaned/invested funds so as to allow the "external" financial institution to pay interest on the transferred monetary right(s).

Figure 1:
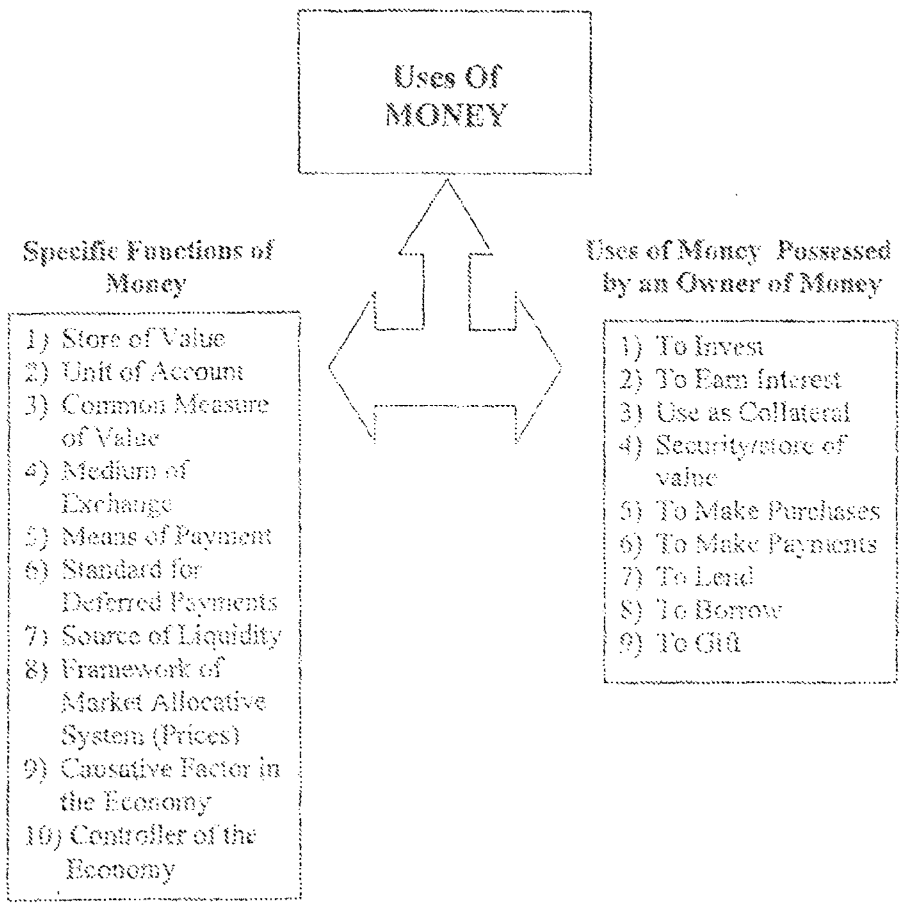
FIG. 1 is a schematic representation of the conventional "Uses of Money" where the "Specific Functions of Money" represent the general purposes of money in an economic framework, while the "Set of Rights Possessed by a Holder of Money" represents the different rights or uses attendant with holding money.

For example, in the Monetary Value Accounting and Control Process Using Real Time Gross Settlement (RTGS) for Initial Monetary Right(s) Transfers, depicted in FIG. 11B1, the logical expression MV (FRBDk, $, Rk, t) represents the monetary value of the Federal Reserve Bank debit (FRBDk) to the account of financial institution FI 1, denominated in U.S. Dollars ($), originating from a monetary right(s) transfer (Rk), at a point in time (t).

The "external" financial institution may lend or invest any amount of cash (CASH, $), up to an amount defined by its Preferred Capital Ratio (PCR). Similarly, the "home" financial institution, from which the monetary right(s) has been transferred, has its account maintained at the Federal Reserve Bank debited in the amount of the monetary right(s) transfer and, depending on its cash reserve situation or PCR, may be required to recall money loaned out and/or to liquidate investments in order to compensate for the amount of the transferred monetary right(s).

CASE 2: Only Transferring Earned Interest (Cash, $) from the "External" Financial Institution Back to the "Home" Financial Institution Over the MRT Network When the MRT Network user wishes to capture all of the interest earned on the aforementioned monetary right(s) transfer but also wants to leave the transferred monetary right(s) at the "external" financial institution to continue earning interest, only the interest earned (CASH, $) is transferred back to the "home" financial institution from the "external" financial institution over the MRT Network, while the transferred monetary right(s) remain at the "external" financial institution. This interest transfer is achieved as follows. A debit associated with, and equal to, the monetary value of the interest earned is automatically recorded to the Federal Reserve Bank Account of the "external" financial institution, while a credit associated with, and equal to, the monetary value of the interest earned is automatically recorded to the Federal Reserve Bank Account of the "home" financial institution—by way of the Fedwire® RTGS system, supported on the Fedwire® network. This EDI-based process effectively debits the "external" financial institution's Federal Reserve Bank Account, with a monetary value (MV) equal to the corresponding earned interest transfer, while crediting the "home" financial institution's Federal Reserve Bank Account with a monetary value (MV) equal to the corresponding earned interest transfer. This corresponding debit to the "external" financial institution's Federal Reserve Bank Account ensures that the "external" financial institution can continue to lend cash (CASH, $) to a third party, or can invest cash (CASH, $), in the amount of the monetary right(s) transfer or up to an amount defined by its Preferred Capital Ratio (PCR), for the purpose of earning a return on the loaned/invested funds so as to allow the "external" financial institution to pay interest on the transferred monetary right(s). And the corresponding credit to the "home" financial institution's Federal Reserve Bank Account ensures that the MRT Network user can capture interest income on the transferred monetary right(s) while still employing the transferred monetary right(s) to capture additional interest income.

For example, in the Monetary Value Accounting and Control Process Using Real Time Gross Settlement (RTGS) for Interest-Only (Intermediate) Transfers" depicted in FIG. 11C1, the logical expression MV (FRBCp, $, CIn, t) represents the monetary value of a Federal Reserve Bank credit to the account of financial institution FI 1 (FRBCp), denominated in U.S. Dollars ($), originating from a transfer of earned interest (CIn), at a point in time (t).

The "external" financial institution may continue to lend or to invest any amount of cash (CASH, $), up to an amount defined by its Preferred Capital Ratio (PCR). Similarly, the "home" financial institution, from which the monetary right (s) has been transferred, still has its account maintained at the Federal Reserve Bank debited in the amount of the monetary right(s) transfer and, depending on its cash reserve situation or PCR, may be able to loan out and/or to invest an additional amount of money based on the earned interest transfer/credit to its Federal Reserve Bank Account.

CASE 3: Transferring Monetary Right(s) Plus Interest Earned (Cash, $) on the Monetary Right(s) Transfer Back from the "External" Financial Institution to the "Home" Financial Institution Over the MRT Network When the MRT Network user wishes to capture all of the interest earned on the aforementioned monetary right(s) transfer and cancel the monetary right(s) transfer, the transferred monetary right(s) plus the interest earned on the monetary right(s) transfer is transferred back to the "home" financial institution from the "external" financial institution over the MRT Network. This monetary right transfer cancellation and earned interest transfer is achieved as follows. A debit associated with, and equal to, the monetary value of the transferred monetary right(s) plus the monetary value of the interest earned via the monetary right(s) transfer is automatically recorded to the Federal Reserve Bank Account of the "external" financial institution, while a credit associated with, and equal to, the monetary value of the transferred monetary right(s) plus the monetary value of the interest earned is automatically recorded to the Federal Reserve Bank Account of the "home" financial institution—by way of the Fedwire® EDI-based RTGS system, supported on the Fedwire® network. This EDI-based process effectively credits the "home" financial institution's Federal Reserve Bank Account, with a monetary value (MV) equal to the corresponding monetary rights transfer plus the monetary value of the interest earned, while debiting the "external" financial institution's Federal Reserve Bank Account with a monetary value (MV) equal to the corresponding monetary rights transfer plus the monetary value of the interest earned. This corresponding credit to the "home" financial institution's Federal Reserve Bank Account ensures that the "home" financial institution can lend cash (CASH, $) to a third party, or can invest cash (CASH, $), up to an amount defined by its Preferred Capital Ratio (PCR), for the purpose of earning a return on the loaned/invested funds so as to allow the "home" financial institution to pay interest on the full set of monetary rights {R (α . . . ι, $)} (CASH, $).

For example, in the Monetary Value Accounting and Control Process Using Real Time Gross Settlement (RTGS) for Closing (Final) Monetary Right(s) and Interest Earned Transfers" depicted in FIG. 11D1, the logical expression MV (FRBCk, $, Rk, t)+MV (FRBCp, $, CIn, t) represents the monetary value of a Federal Reserve Bank credit to the account of financial institution FI 1 (FRBCk), denominated in U.S. Dollars ($), originating from a monetary right(s) transfer (Rk), at a point in time (t) plus the monetary value of a Federal Reserve Bank credit to the account of FI 1 (FRBCk), denominated in U.S. Dollars ($), originating from earned interest (CIn), at a point in time (t).

The "home" financial institution may lend or invest any amount of cash (CASH, $), up to an amount defined by its Preferred Capital Ratio (PCR). Conversely, the "external" financial institution, from which the monetary right(s) and earned interest has been transferred, has its account maintained at the Federal Reserve Bank debited in the amount of both the monetary value of the monetary right(s) transfer plus the monetary value of the earned interest transfer and, depending on its cash reserve situation or PCR, may be required to recall money loaned out and/or to liquidate investments in order to compensate for the amount of the transferred monetary right(s) and earned interest.

It is appropriate at this juncture to provide a more detailed example of the monetary rights and credit/debit transfer process supported on the RTGS-enabled MRT Network described above.

First, each participating financial institution on the MRT Network must maintain an account with the Federal Reserve Bank (i.e. a Federal Reserve Bank account). Also, each participating financial institution must be registered with the MRT Network. When a monetary right(s) transfer occurs, such as the right to earn interest, as illustrated in FIGS. 10 and 11, the "external" financial institution to which the monetary right(s) (in this case, the right to earn interest (R (β, $))) is being transferred receives notice from the MRT Network of the present invention that it has received the monetary right(s) transfer, while the MRT Network User's "home" financial institution receives notice from the MRT Network of the present invention that the monetary right to earn interest (R (β, $)) has been transferred from it. Coincident with those two messages, the MRT Network of the present invention also notifies the Federal Reserve Bank of the monetary right(s) transfer and that there is sufficient collateral, in the form of the remaining subset of non-transferred monetary rights still residing at the MRT Network User's "home" financial institution, (R (α, $))−(R (β, $)), to fully collateralize the monetary right(s) transfer. Via the Fedwire infrastructure, the Federal Reserve Bank then debits the Federal Reserve Bank Account of the MRT Network User's "home" financial institution and credits the Federal Reserve Bank Account of the MRT user's "external" financial institution, for the monetary value (i.e. amount) of the monetary right(s) transfer.

At this point, the "home" financial institution may have to liquidate its investment(s) in the amount of the monetary right to earn interest ((R (β, $)) transfer or, up to the amount of the Federal Reserve's debit/the bank's preferred capital ratio (PCR) depending upon the amount invested, in order to satisfy the MRT user's request to transfer the monetary right(s) and/or, the "home" financial institution may have to cancel loans in the amount of the monetary right to earn interest ((R (β, $)), or up to the amount of the Fed debit/the bank's preferred capital ratio (PCR) depending upon the amount lent, in order to satisfy the MRT user's request to transfer the monetary right(s).

Importantly, for a "home" financial institution from which the right to earn interest (R (β, $)) (or other monetary rights) have been transferred, the transferred right(s) is "dead" to the "home" institution, but the transferor (MRT Network User) still has the remaining subset of now "dormant" rights {R (α . . . ι, $)−(R (β, $)} residing at the "home" financial institution—monetary right(s) that cannot be utilized by the "home" financial institution for lending or investing but, which, can be activated/exercised by the MRT Network User during the transfer process by utilizing one, or more, of the non-transferred monetary rights. Economic value is still maintained by the "home" financial institution due to the fact that the monetary right(s) transfer process allows the "home" financial institution to keep a customer as opposed to losing a customer to another financial institution.

FIG. 11 is a schematic representation of the Internet-based MRT Network of the present invention, showing the Federal Reserve Bank Accounts of home and external financial institutions' being debited and credited by the Fedwire® RTGS system whenever a MRT Network user transfers one (or more) of the individual monetary right(s) over the MRT Network. In this illustrative example, the transferred monetary right is the right to earn interest (R (β, $)) associated with money ownership and, which, is fully collateralized by the remaining, non-transferred subset of monetary rights residing at the user's "home" financial institution. Once a participating financial institution's account maintained at the Federal Reserve Bank has been credited with the dollar amount of the monetary right(s) transfer, the financial institution is then able to go out and lend or invest cash (CASH, $) in the amount of the monetary right(s) transfer or up to an amount that is consistent with the "external" financial institution's PCR. Similarly, when a participating financial institution's Federal Reserve Bank-maintained account has been debited for the dollar amount of the monetary right(s) transfer from that financial institution, that financial institution's ability to lend and/or invest cash (CASH, $) in the amount of the monetary right(s) transfer, or up to an amount that is consistent with the "external" financial institution's PCR has been truncated.

Importantly, while the above illustrative example is for the case of a single monetary right(s) transfer on the MRT Network of the present invention and involves a single credit and debit, via the Fedwire RTGS EDI messaging system (for the purpose of lending and/or investing cash in the amount of the monetary right(s) transfer), to the receiving financial institution's Federal Reserve Bank-maintained account (and debit to the sending financial institution's Federal Reserve Bank-maintained account), it is understood that the MRT Network accounting system can be utilized to facilitate thousands of transfers simultaneously and/or throughout the course of the day through the process of aggregating monetary right(s) transfers and netting the dollar amounts of those transfers between the various participating financial institutions prior to a Fedwire transfer; netting is commonly used in the financial world to settle multiple transactions simultaneously and helps to reduce the costs and number of those transactions. The MRT Network of the present invention can perform, and account for, thousands of monetary right(s) transfers between multiple accounts at multiple financial institutions, and can report each monetary right transfer, along with the appropriate collateral, in the form of the non-transferred subset of monetary rights, to the Federal Reserve Bank, but for the purpose of debiting and crediting the Federal Reserve Bank-maintained accounts of those multiple financial institutions, the MRT Network's monetary right(s) transfers can be netted so that each financial institution's Federal Reserve Bank-maintained account is debited/credited a minimum amount of times, for the netted dollar amount of transferred monetary right(s), via the Fedwire RTGS EDI messaging system. As mentioned previously, no cash moves in the Fedwire RTGS, but the netted dollar amounts of the monetary right(s) transfers are reflected as credits and debits to participating financial institutions' Federal Reserve Bank-maintained accounts.

Automated Accounting and Control of Monetary Value Associated with Monetary Rights Transfers and Captured Earned Interest Over the MRT Network of the Present Invention As described above, the MRT Network employing the Fedwire® EDI-based RTGS system supports three different cases of monetary rights and monetary value (MV) transfer, illustrated in FIGS. 11B1 through 11D3.

In CASE 1, specified in FIGS. 11B1 through 11B3, the desired monetary right(s) are transferred from the "home" financial institution to the "external" financial institution over the MRT Network, while a debit associated with, and equal to, the monetary value of the transferred monetary right(s), is recorded to the Federal Reserve Bank Account of the "home" financial institution, and a credit associated with, and equal to, the monetary value of the transferred monetary right(s) is recorded to the Federal Reserve Bank Account of the "external" financial institution—using the Fedwire® EDI-based RTGS system, supported on the Fedwire® network.

In CASE 2, specified in FIGS. 11C1 through 11C3, only earned interest (CASH, $) is transferred from the "external" financial institution back to the "home" financial institution over the MRT Network by way of recording a debit associated with, and equal to, the monetary value of the interest earned, to the Federal Reserve Bank Account of the "external" financial institution, while a credit associated with, and equal to, the monetary value of the interest earned is recorded to the Federal Reserve Bank Account of the "home" financial institution—by way of the Fedwire® EDI-based RTGS system, supported on the Fedwire® network.

In CASE 3, specified in FIGS. 11D1 through 11D3, the transferred monetary right(s), plus earned interest on the monetary right(s) transfer, are transferred back from the "external" financial institution to the "home" financial institution over the MRT Network by way of recording a debit associated with, and equal to, the monetary value of the transferred monetary right(s) plus the monetary value of the interest earned via the monetary right(s) transfer, to the Federal Reserve Bank Account of the "external" financial institution, while a credit associated with, and equal to, the monetary value of the transferred monetary right(s) plus the monetary value of the interest earned is recorded to the Federal Reserve Bank Account of the "home" financial institution—using the Fedwire® EDI-based RTGS system, supported on the Fedwire® network.

Regardless of what case of monetary rights and value transfer is being carried out at any instant in time over the MRT Network, certain principles of monetary value accounting and control must be maintained at each stage of the process, in a manner similar to principles of conservation of mass, momentum and energy in the world of physics.

FIG. 11A1 sets forth basic definitions involved in monetary rights and value transfer processes (i.e. the specification of monetary value (MV) types, origin types, and monetary rights (R) types) used in formulating algebraic monetary value accounting equations/expressions that can be used to specify all monetary rights and value transfers over the MRT Network.

Figure 2A:
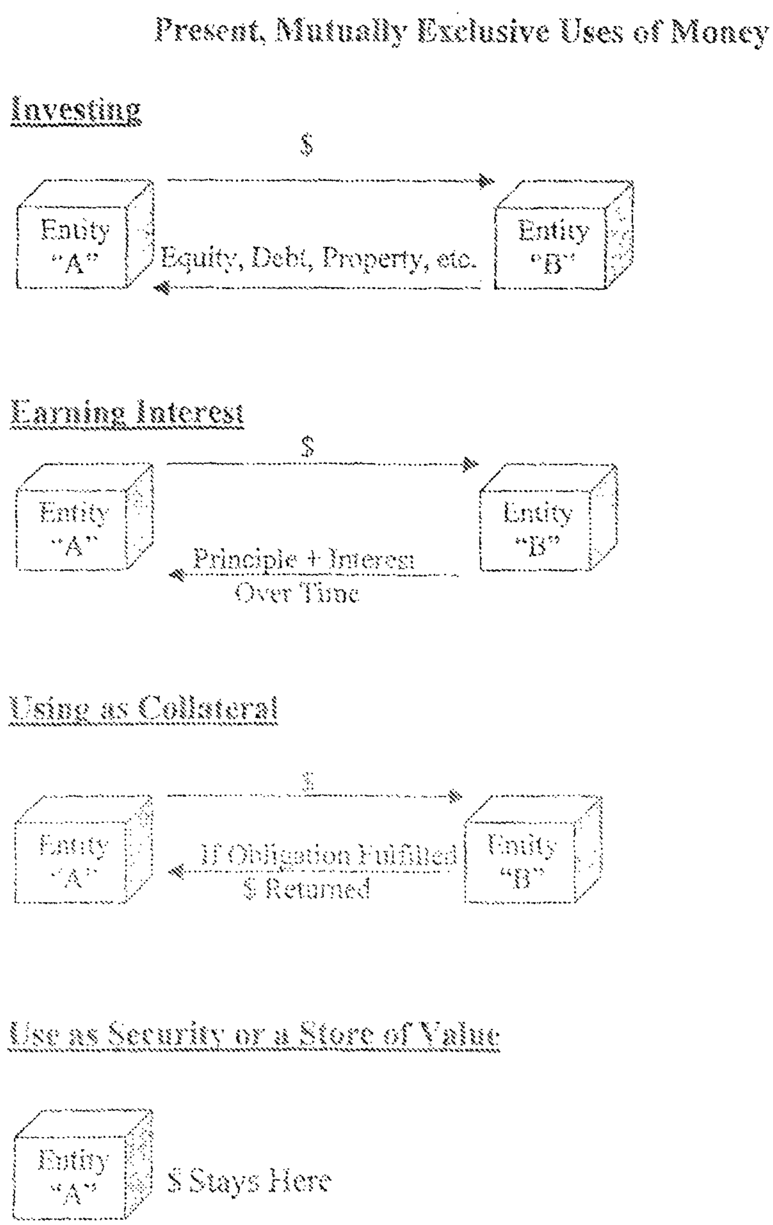
FIGS. 2A and 2B, taken together, set forth a schematic representation illustrating the various conventional uses money in the marketplace, including purchasing and paying for products and services, lending, borrowing, and gifting.
Figure 2B:
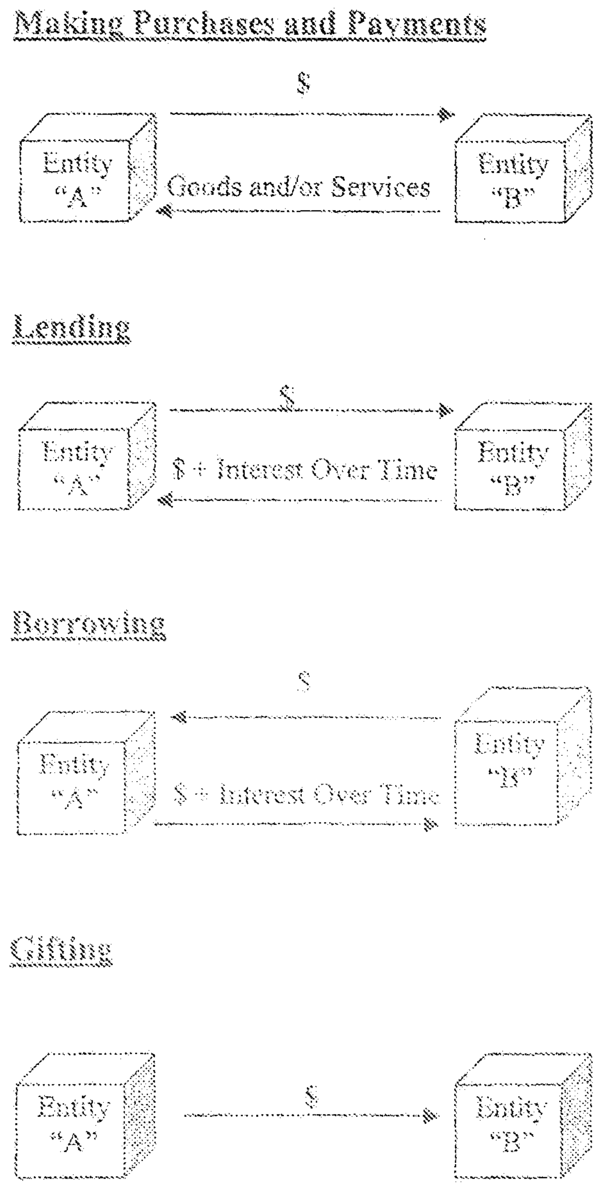

FIG. 11A2 describes the basic MRT control function and monetary value (MV) relationships that must be maintained across the MRT Network at each step of any monetary right(s) transfer process on the MRT Network, wherein monetary right(s) transfer and interest capture processes are facilitated using the Fedwire® EDI-based RTGS system. As shown in FIGS. 11B1 through 11D3, each MV equation or expression contains four variables consisting of the types of monetary value, currency, origin of monetary value, and time.

The MRT control function that governs all monetary right (s) and credit/debit-based monetary value (MV) transfers is: ΘMV (Rj (α . . . ι, $, Rk, t)) MV (CPj, $, CPk, t), which states that the sum of the monetary values of monetary right(s) transfers cannot exceed the monetary value of the underlying amount of cash (CASH, $) upon which the monetary right(s) transfers are based, at any instant in time, over the MRT Network of the present invention.

CASE 1: Transferring Monetary Right(s) from the "Home" Financial Institution to an "External" Financial Institution Over the MRT Network FIG. 11B1 illustrates the monetary value accounting and control process of the present invention using the Fedwire® RTGS system to initially transfer the monetary right to earn interest (R (β, $)) from the "home" financial institution to an "external" financial institution within the Internet-based MRT Network of the present invention, in order to allow an MRT Network user to capture interest on the monetary right (s) transfer at the "external" financial institution.

As shown in FIGS. 11B1 and 11B2, the "home" financial institution (FI 1) holds the cash deposit of an MRT Network user in an account, wherein the monetary value of (CASH, $) is defined as MV (CPj, $, CPj, t), where the first variable is the type of monetary value, the second variable is the type of currency represented by the monetary value, the third variable is the origin type of the monetary value, and the fourth variable is time (t). As indicated, MV (CPj, $, CPj, t) is equal to MV (Rj (α . . . ι, $, CPj, t)) or the monetary value of the full set of monetary rights associated with the monetary value of the cash deposit (CASH, \$) held at the home financial institution (FI 1).

When a monetary right(s) transfer is initiated, in this case the monetary right to earn interest (R (β, \$)), FI 1 is now holding the collateral backing the monetary right transfer of MV (Rj (α . . . ι, \$, CPj, t))−MV (Rj (β, \$, CPj, t)), where the monetary value MV (Rj (β, \$, CPj, t)) is transferred via the MRT Network to an "external" financial institution (FI 2), and where the Federal Reserve Bank (FRB), once notified by the MRT Network of the full collateral (MV (Rj (α . . . ι, \$, CPj, t))−MV (Rj (β, \$, CPj, t))) backing the transferred monetary right(s), then debits FI 1's FRB-maintained account for the monetary value of the monetary right(s) transfer (MV (FRBDk, \$, Rk, t)) and credits FI 2's FRB-maintained account for the monetary value of the monetary right(s) transfer (MV (FRBCk, \$, Rk, t)). Once FI 2 is notified of the FRB credit to its FRB-maintained account, FI 2 can then lend or invest cash in the amount of MV (CPm, \$, CPi, t), where MV (CPm, \$, CPi, t)≤MV (CPi, \$, FRBCk, t)/PCR.

FIG. 11B2 describes each step of the monetary value accounting and control process using the Fedwire® RTGS system for initial monetary right(s) transfers represented in FIG. 11B.

In Step A, MV (CPj, \$, CPj, t) (CASH, \$) is equal to the full set of monetary rights MV (Rj (a . . . t, \$, CPj, t)).

Step B represents the transfer of the monetary right to earn interest (R (β, \$)) shown as FI 1 MV (Rj (α . . . ι, \$, CPj, t))−MV (Rj (β, \$, CPj, t)) and FI 2 MV (Rj (β, \$, CPj, t)).

At Step C, FI 1's FRB-maintained account is debited in the amount MV (FRBDk, \$, Rk, t) and FI 2's FRB-maintained account is credited in the amount MV (FRBCk, \$, Rk, t).

At Step D, FI 2 now has access to cash (CASH, \$) resulting from the FRB credit to its FRB account, in the amount MV (CPk, \$, FRBCk, t), which is equal to MV (FRBCk, \$, Rk, t).

At Step E, FI 2 can now lend and/or invest cash (CASH, \$) to a third party (and held in the third party's bank in this example) in an amount of monetary MV (CPm, \$, CPi, t) where MV (CPm, \$, CPi, t)≤MV (CPi, \$, FRBCk, t)/PCR.

FIG. 11B3 sets forth all of the MRT accounting equations associated with the monetary value accounting process depicted in FIGS. 11B1 and 11B2, using the Fedwire® RTGS system to support initial monetary right(s) transfers within the Internet-based MRT Network of the present invention.

CASE 2: Only Transferring Interest Earned (CASH, \$) from the "External" Financial Institution Back to the "Home" Financial Institution Over the MRT Network FIG. 11C1 illustrates the monetary value accounting and control process using the Fedwire® RTGS system for interest-only (intermediate) transfers within the Internet-based MRT Network of the present invention. As shown, this process utilizes the Fedwire® RTGS system to facilitate an intermediate step transfer of interest (i) earned on a monetary right(s) transfer monetary right(s) transfer, in this case, only the interest income (i) from the monetary right(s) transfer is transferred back to the "home" financial institution, while the transferred monetary right (R (β, \$)) remains at an "external" financial institution and allows an MRT Network user to continue earning interest (i).

When FI 2 is notified of an impending earned interest transfer back to FI 1 by the MRT Network of the present invention, FI 2 may have to recall any loans and/or investments it has made in the amount of the interest earned on the amount of its loans/investments based on the earlier amount of the credit to its account maintained at the FRB up to an amount of MV (CPm, \$, CPi, t)≤MV (CPi, \$, FRBCk, t)/PCR in order to satisfy the earned interest transfer request, which is represented as MV (CIn, \$, CPm, t). In this case, there is no monetary right(s) transfer, as the transferred monetary right (s) remains at the FI 2 and only the earned interest (i) is being transferred back from FI 2 to FI 1.

Financial institution FI 2's FRB-maintained account is debited in the amount of the earned interest represented as MV (FRBDp, \$, CIn, t) and FI 1's FRB-maintained account is credited in the same amount, which is represented as MV (FRBCp, \$, CIn, t) and, which, now allows FI 1 to lend/invest an amount equal to MV (CIn, \$, FRBCk, t)/PCR.

FIG. 11C2 shows each step of the monetary value accounting and control process depicted in FIG. 11C1, and carried out using the Fedwire® RTGS system for transferring interest-only (intermediate) (i) earned on a monetary right(s) transfer, from an external financial institution back to the MRT Network user's "home" financial institution, while the transferred monetary right (R (β, \$)) remains at the "external" financial institution and allows the MRT Network user to continue earning interest (i).

As indicated in Step A, the loans/investments made by FI 2 are represented as (MV (CPm, \$, CPi, t)/PCR), where MV (CPm, \$, CPi, t)≤MV (CPi, \$, FRBCk, t)/PCR+MV (CIn, \$, CPm, t) held at the third party financial institution and include interest earned on those loans/investments.

At Step B, FI 2's FRB-maintained account is debited in the amount MV (FRBDp, \$, CIn, t), and FI 1's FRB-maintained account is credited in the amount MV (FRBCp, \$, CIn, t).

At Step C, FI 1 now has the monetary value of the earned interest income (i), represented as MV (FRBCp, \$, CIn, t), which is equal to MV (CIn, \$, FRBCk, t).

At Step D, FI 1 credits its customer's account in the amount MV (CIn, \$, FRBCp, t).

FIG. 11C3 shows all of the MRT accounting and control equations associated with the monetary value accounting and control process depicted in FIGS. 11C1 and 11C2. As shown, this process uses the Fedwire® RTGS system for transferring interest-only (i) earned on a transferred monetary right to earn interest (R (β, \$)), from an "external" financial institution to the "home" financial institution, thereby allowing an MRT Network user to capture the interest (i) earned on the monetary right(s) transfer while the transferred monetary right, (R (β, \$)), remains at an "external" financial institution and allows an MRT Network user to continue to earn interest (i).

CASE 3: Transferring Monetary Right(s) Plus Earned Interest on the Monetary Right(s) Transfer Back from the "External" Financial Institution to the "Home" Financial Institution Over the MRT Network FIG. 11D1 illustrates the monetary value accounting and control process using the Fedwire® RTGS system for closing monetary right(s) and transferring interest earned within the Internet-based MRT Network of the present invention. As shown, this process utilizes the Fedwire® RTGS system to facilitate the closing (final) transfer of the monetary right to earn interest (R (β, \$)) plus the transfer of the monetary value of earned interest (i), from an "external" financial institution to the "home" financial institution, thereby allowing an MRT Network user to capture the interest (i) earned on the monetary right(s) transfer and also restore the transferred monetary right to earn interest (R (β, \$)) to the remaining subset of non-transferred monetary rights ((R (α . . . ι, \$)−(R (β, \$))+(R (β, \$)) at the home financial institution.

As indicated in FIG. 11D1, when FI 2 is notified of an impending monetary right(s) transfer back to FI 1 by the MRT Network of the present invention, FI 2 may have to recall any loans and/or investments it has made based on the earlier amount of the credit to its account maintained at the FRB up to an amount of MV (CPm, \$, CPi, t)≤MV (CPi, \$, FRBCk, t)/PCR plus any interest income those loans/investments may have earned in order to satisfy the monetary right(s) transfer request, which is represented as (MV (CPm, \$, CPi, t)/PCR+ MV (CIn, \$, CPm, t).

The MRT Network facilitates the transfer of the monetary right to earn interest (R (β, \$)), represented as MV (Rj (β, \$, CPj, t)) from financial institution FI 2 to financial institution FI 1, and upon notification of said transfer by the MRT Network, the FRB debits FI 2's FRB-maintained account in the amount of MV (FRBDp, \$, CPm, t)+MV (FRBDp, \$, CIn, t), which represents the amount of the initial credit to that account resulting from the monetary right(s) transfer plus the earned interest income resulting from the monetary right(s) transfer, and credits FI 1's FRB-maintained account in the amount of MV (FRBCk, \$, Rk, t)+MV (FRBCp, \$, CIn, t).

As shown in FIG. 11D1, financial institution FI 1 now has a full set of monetary rights, with monetary value equal to that of the initial monetary right(s) transfer, plus an FRB credit for the monetary value of the monetary right(s) transfer plus an FRB credit for the amount of interest earned as a result of the monetary right(s) transfer, both of which are represented as MV (CPj, \$, FRBCk, t)+MV (CIn, \$, FRBCk, t).

FIG. 11D2 shows each step of the monetary value accounting and control process depicted in FIG. 11D1 using the Fedwire® RTGS system for transferring the closing (final) monetary right(s) and earned interest from the external financial institution (FI 2) back to the home financial institution (FI 1).

As indicated in Step A of FIG. 11D2, the loans/investments made by FI 2 are represented as (MV (CPm, \$, CPi, t)/PCR), where MV (CPm, \$, CPi, t)≤MV (CPi, \$, FRBCk, t)/PCR+ MV (CIn, \$, CPm, t) held at the third party financial institution and include interest earned on those loans/investments.

At Step B, once the monetary right(s) transfer request has been received from the MRT Network, the transferred monetary right (R (β, \$)), in the form MV (Rj (β, \$, CPj, t)), is transferred via the MRT Network from FI 2 to FI 1.

At Step C, FI 2's FRB-maintained account is debited in the amount MV (FRBDp, \$, CPm, t)+MV (FRBDp, \$, CIn, t), and FI 1's FRB-maintained account is credited in the amount MV (FRBCk, \$, Rk, t)+MV (FRBCp, \$, CIn, t).

At Step D, FI 1 now has the monetary value of both the initial monetary right(s) transfer plus the monetary value of the earned interest income, represented as MV (FRBCk, \$, Rk, t)+MV (FRBCp, \$, CIn, t), which is equal to MV (CPj, \$, FRBCk, t)+MV (CIn, \$, FRBCk, t).

At Step E, FI 1 credits its customer's account in the amount MV (CPj, \$, CPk, t)+MV (CIn, \$, FRBCp, t).

FIG. 11D3 sets forth all of the MRT accounting and control equations associated with the monetary value accounting and control process depicted in FIGS. 11D1 and D2, using the Fedwire® RTGS system for transferring the closing (final) monetary right to earn interest (R (β, \$)) and earned interest (i), from an "external" financial institution (FI 2) to the "home" financial institution (FI 1), thereby allowing an MRT Network user to capture the interest (i) earned on the monetary right(s) transfer and restore the transferred monetary right to earn interest (R (β, \$)), to the remaining subset of non-transferred monetary rights (R (α . . . ι, \$)−(R (β, \$))+(R (β, \$)) at the "home" financial institution FI 1.

As evidenced in all three cases described above, the MRT control function that governs all monetary right(s) and credit/debit-based monetary value (MV) transfers on the MRT Network, is ΣMV (Rj (α . . . ι, \$, Rk, t))≤MV (CPj, \$, CPk, t) which states that the sum of the monetary values of monetary right(s) transfers cannot exceed the monetary value of the underlying amount of cash (CASH, \$) upon which the monetary right(s) transfers are based, at any instant in time, over the MRT Network, applies and governs the entire monetary right(s) transfer process of the present invention.

Figure 12:
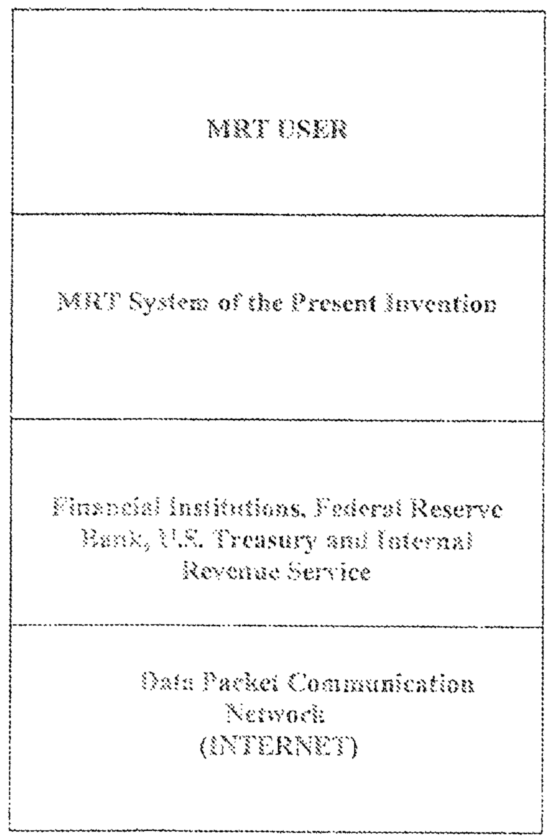
FIG. 12 is schematic stacked-layer model showing how various MRTS users interact with the MRT Network of the present invention, which interfaces with institutions, and technology layers involved in implementing the MRT Network (MRTN) of the present invention.

FIG. 12 shows how various MRT Network users interact with the MRT Network of the present invention, which interfaces with institutions, and technology layers involved in implementing the MRT Network (MRTN) of the present invention.

Using the EDI-Based Fedwire® RTGS System to Carry Out the Monetary Right(s) Transfer Process of the Present Invention FIGS. 13A, 13B and 13C describe the various steps carried out during the monetary right(s) transfer process shown in FIGS. 10, 11 and 12, which allow an MRT Network user to transfer R (β, \$) and other monetary rights via the MRT Network using the EDI-based Fedwire® RTGS system to effect the monetary right(s) transfer across the MRT Network As indicated at Block A in FIG. 13A, a user of the MRT Network links a "home" financial institution account to the MRT Network via the Internet, which will allow the MRT Network User to effect monetary right(s) transfers over the MRT Network. The linked account could also be that of the MRT Network User's mortgage servicer, the MRT Network User's payroll service provider, a prepaid account, or any other account in which the MRT Network User holds funds.

At Block B in FIG. 13A, one or more "external" financial institutions supply rate and yield information for their savings and investment accounts and products, via the Internet, to the MRT Network of the present invention.

At Block C in FIG. 13A, the MRT Network User requests a monetary right(s) transfer, in this case, the monetary right to earn interest (R (β, \$)), from the "home" financial institution to an account at an "external" financial institution, via the MRT Network of the present invention. The MRT Network User may choose the "external" financial institution, or the MRT Network of the present invention may choose the "external" financial institution based on the MRT Network User's pre-specifications.

At Block D in FIG. 13A, the MRT Network notifies both the "home" financial institution and the chosen "external" financial institution that it is transferring the monetary right to earn interest (R (β, \$)) via the MRT Network, from the "home" financial institution to the "external" financial institution.

Simultaneously, the MRT Network notifies the Federal Reserve Bank of the monetary right to earn interest (R (β, \$)) transfer from the "home" financial institution to the chosen "external" financial institution; the MRT Network also notifies the Federal Reserve Bank of the remaining subset of monetary rights still residing at the user's "home" financial institution in the form of the non-transferred subset of monetary rights (R (α . . . ι, \$)−(R (β, \$)) and serving as full, non-leveraged collateral for the transferred monetary right, and notifies the user's "home" financial institution that the remaining subset of monetary rights is dormant.

Finally, and coincident with the first two steps, the MRT Network notifies the U.S. Department of the Treasury of the transfer to assure that there is no money laundering, terror financing or bank fraud involved; then the U.S. Department of the Treasury clears the transfer.

At Block E in FIG. 13B, the Federal Reserve Bank, via Fedwire® RTGS system, debits the "home" financial institution's account maintained at the Federal Reserve Bank in the amount of (R (β, \$) and credits "external" financial institution's account maintained at the Federal Reserve Bank in the amount of (R (β, \$)) and notifies each. Once the "home" financial institution's account maintained at the Federal Reserve Bank has been debited for the dollar value of the monetary right(s) transfer, as noted at Block E, the "home" financial institution may have to liquidate investments and/or call loans (CASH, $) in the amount of the debit to its account maintained at the Federal Reserve Bank or up to or up to the amount of the Fed debit/the bank's preferred capital ratio (PCR). Because Fedwire is a real-time gross settlement system, no money moves during a monetary right(s) transfer but, instead, the Federal Reserve Bank debits/credits the accounts of financial institutions participating in the monetary right(s) transfer.

At Block F in FIG. 13B, the "external" financial institution lends or invests money (CASH, $) in the amount of the credit to its Federal Reserve Bank account or up to the amount of the Fed credit/the bank's preferred capital ratio (PCR).

At Block G, the MRT Network User requests a monetary right(s) transfer, in this case, the monetary right to earn interest (R (β, $)), plus the interest earned, from the "external" financial institution to which the monetary right was transferred, to MRT Network user's "home" financial institution; the MRT Network User is now reversing the original monetary right(s) transfer to restore the transferred monetary right (s) to the MRT Network User's "home" financial institution account and to capture that interest earned at the "external" financial institution as a result of the monetary right(s) transfer.

The MRT Network notifies the chosen "external" financial institution, which received the monetary right to earn interest (R (β, $)) in the initial transfer and the MRT Network User's "home" financial institution, that the monetary right(s) transfer, plus earned interest, is being reversed. Simultaneously, the MRT Network notifies the Federal Reserve Bank of the transfer, of the monetary right to earn interest plus the amount of interest earned ((R (β, $))+i), back to the user's "home" financial institution.

At Block H in FIG. 13C, the "external" financial institution may have to liquidate its investment(s) in the amount of the monetary right to earn interest plus any earned interest ((R (β, $)+i) or up to the amount of the Fed debit/the bank's preferred capital ratio (PCR) depending upon the amount invested, in order to satisfy the MRT user's request to rescind the monetary right(s) transfer and/or may have to cancel the loans in the amount of the monetary right to earn interest plus any earned interest ((R (β, $)+i) or up to the amount of the Fed debit/the bank's preferred capital ratio (PCR) depending upon the amount lent, in order to satisfy the MRT user's request to rescind the monetary rights transfer.

As shown at Block I in FIG. 13C, the Federal Reserve Bank credits the "home" financial institution's account maintained at the Federal Reserve Bank in the amount of the transferred monetary right to earn interest plus any accrued interest ((R (β, $)+i) and debits the "external" financial institution's account maintained at the Federal Reserve Bank in the amount of the transferred monetary right to earn interest plus any accrued interest ((R (β, $)+i). The Federal Reserve Bank notifies both the "home" financial institution and the "external" financial institution of the non-monetary adjustments to their Federal Reserve Bank-maintained accounts.

At Block J in FIG. 13C, the "home" financial, once informed of the credit to its Federal Reserve Bank account in the amount of the transferred monetary right to earn interest plus any accrued interest ((R (β, $)+i), is then free to lend or to invest money (CASH, $) in the amount of the Federal Reserve Bank (Fed) credit or up to the amount of the Fed credit/the bank's preferred capital ratio (PCR).

Finally, at Block K in FIG. 13C, the MRT Network of the present invention, reports all earned interest (i), along with MRT user's tax identification number, to the U.S. Internal Revenue Service and reports all earned interest (i) to the MRT Network User for tax reporting purposes.

Figure 14A:
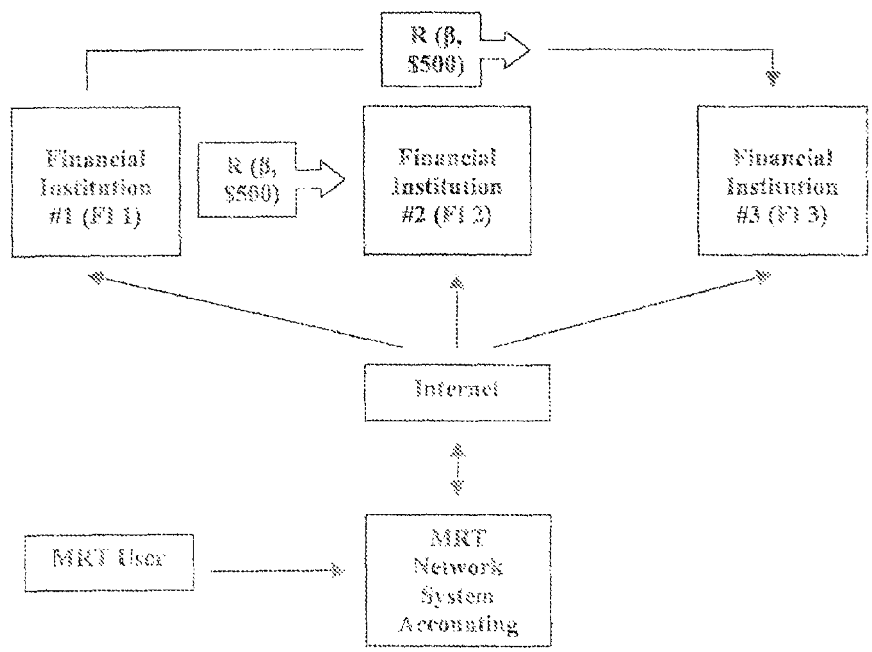
FIG. 14A is a schematic representation of the MRT Network accounting for net-settled monetary right(s) transfers utilizing Fedwire® or other RTGS systems through which, no cash moves but, instead, financial institutions' accounts maintained at the central bank are debited or credited based on the monetary right(s) transfer(s)
Figure 14B:
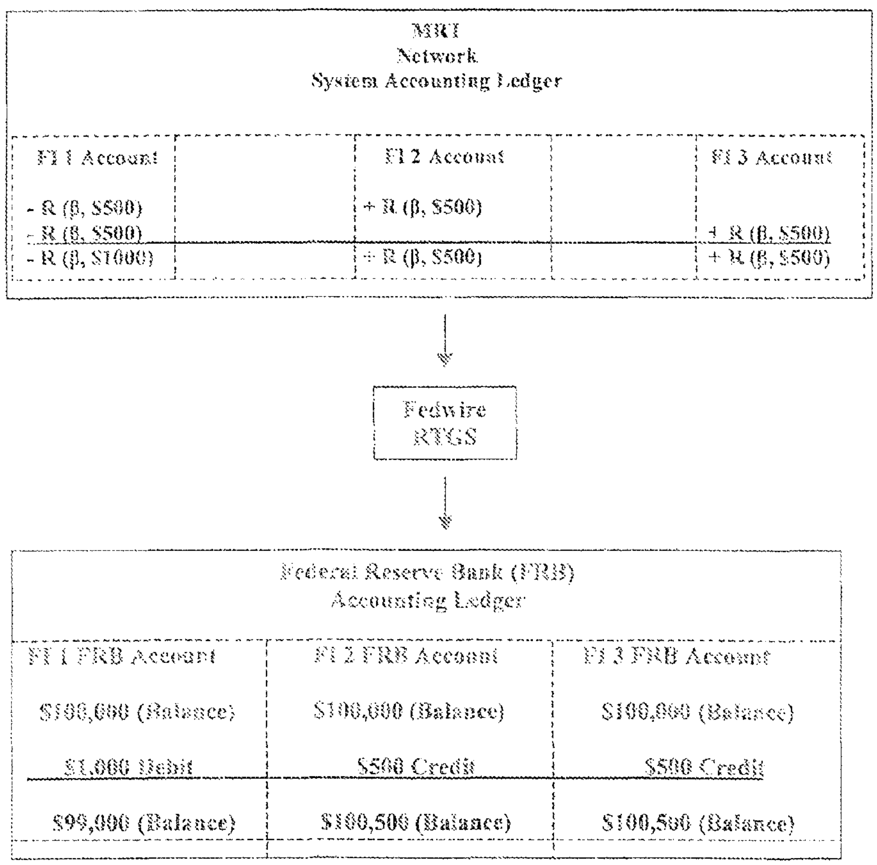
FIG. 14B is a schematic representation of the MRT Network accounting for net-settled monetary right(s) transfers utilizing Fedwire® or other RGS systems and shows the MRT Network accounting for several monetary right(s) transfers and utilizing the Fedwire® RTGS system, whereby the Federal Reserve Bank accounts for the monetary right(s) transfers by debiting and crediting participating banks' accounts maintained at the Federal Reserve Bank.

The MRT Network Accounting System for Net-Settled Monetary Right(s) Transfers Utilizing the Fedwire® Or Other Real-Time Gross Settlement (RTGS) Systems As shown in FIGS. 14A and 14B, using its MRTS Servers, the MRT Network accounts for net-settled monetary right(s) transfers that utilize Fedwire or other real-time gross settlement (RTGS) systems by aggregating numerous monetary right(s) transfers between multiple financial institutions and then utilizing the Fedwire RTGS system to conduct the minimum number of transfers between the multiple financial institutions in order to minimize the transfer cost to MRT Network users.

As shown in FIG. 14B, the MRT Network maintains its own accounting ledger, to account for numerous monetary right(s) transfers prior to utilizing the Fedwire® RTGS system to effect the net-settled monetary right(s) transfers. Upon receipt of the MRT Network's Fedwire EDI message(s), the Federal Reserve Bank debits and credits the participating financial institutions' accounts that are maintained at the Federal Reserve Bank, because the transfer(s) is effected via a RTGS system.

FIG. 15 describes the various steps that allow the MRT Network to net-settle monetary right(s) transfers while utilizing the Fedwire® RTGS system or other RTGS systems.

As indicated at Block A in FIG. 15, an MRT Network User requests two monetary right(s) transfers to two separate financial institutions from the MRT Network User's "home" financial institution (FI 1); then the MRT Network notifies all participating financial institutions of the transfer requests.

At Block B, the MRT Network accounting system net-settles the monetary right(s) transfers prior to the Fedwire RTGS system transfer(s). Each participating financial institution, having received the monetary right(s) transfer request, arranges to adjust its investment/loan portfolio, if required, to reflect the net debit or net credit to its Federal Reserve Bank-maintained account.

At Block C, the MRT Network utilizes the Fedwire RTGS system to transmit one or more MRT Network Fedwire EDI messages to the Federal Reserve Bank that contain detailed instructions related to the previously net-settled monetary right(s) transfers.

At Block D, the Federal Reserve Bank receives the MRT Network Fedwire EDI messages and credits and debits the participating financial institutions' accounts accordingly. The financial institution(s) receiving a net credit may then lend/invest those funds, and the financial institution(s) receiving a net debit may be required to liquidate investments and/or cancel loans to reflect the reduced balance in their Federal Reserve Bank-maintained account(s).

Figure 16:
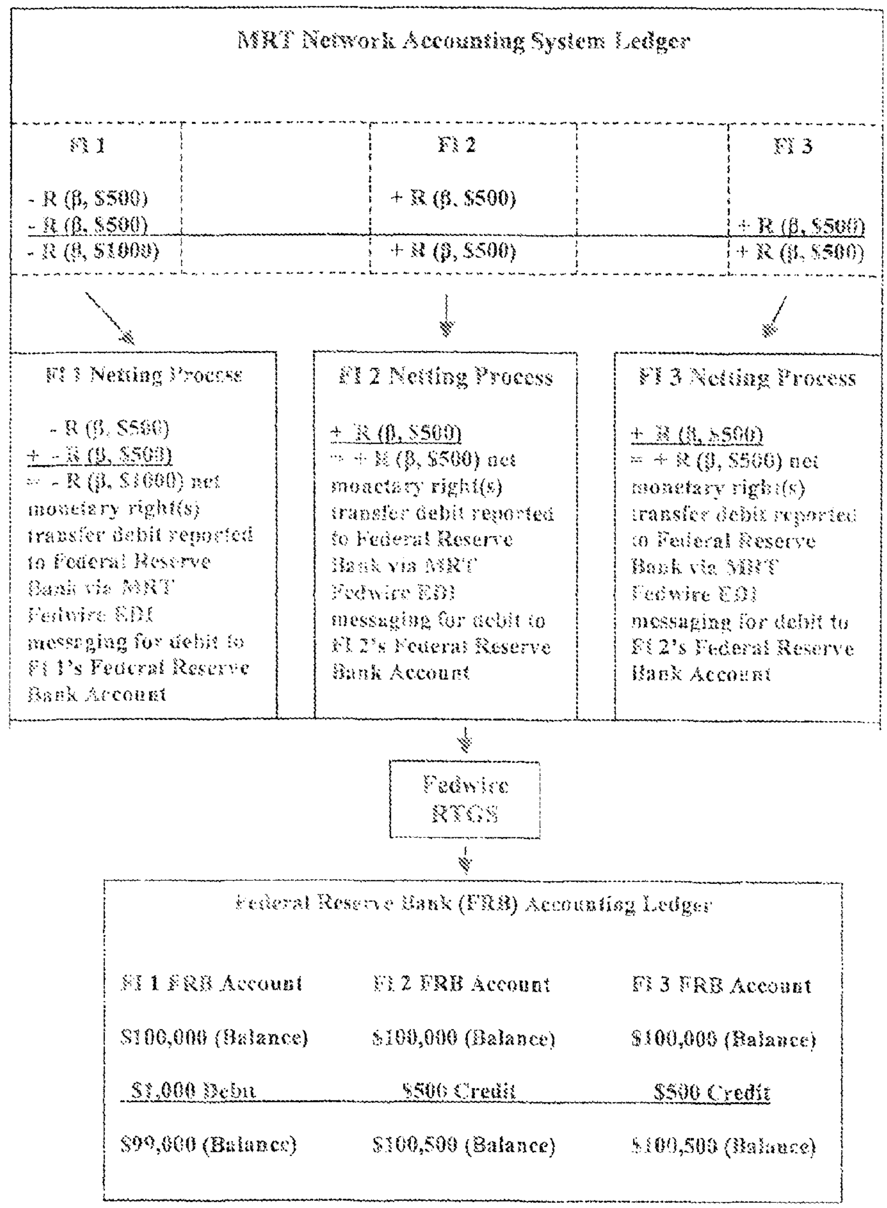
FIG. 16 is a schematic representation of the MRT Network Accounting System, carried out by MRT Servers and the Fedwire® RTGS system, for net-settling monetary right(s) transfers utilizing the Fedwire® RTGS system and showing the net-settling of monetary right(s) transfers between the MRT Network and the Federal Reserve Bank.

FIG. 16 illustrates the operation of the MRT Network accounting system during net-settling monetary right(s) transfers. As shown, the MRT Network maintains separate accounts for each participating financial institution, where all monetary right(s) transfers are recorded, net-settled, and running debit/credit balances are constantly updated and maintained. The MRT Network then effects Fedwire® RTGS system monetary right(s) transfers with the Federal Reserve Bank, wherein the Federal Reserve Bank debits/credits the Federal Reserve Bank accounts of the participating financial institutions, based on the information contained in the MRT Network Fedwire EDI messages.

FIG. 17 is a flow chart depicting the various steps involved in the MRT Network accounting system net-settlement of monetary right(s) transfers. At Block A, all monetary right(s)

transfers are aggregated in each financial institution's MRT Network account. The MRT Network adds all of the monetary right(s) transfers balances and provides each participating financial institution with real-time monetary right(s) balances prior to effecting Fedwire transfers.

At Block B, the MRT Network transmits MRT Network Fedwire EDI messages to the Federal Reserve Bank. The Federal Reserve Bank, upon receipt of the MRT Network Fedwire EDI messages, debits and credits the participating financial institutions' Federal Reserve Bank accounts based upon the instructions contained in the MRT Network Fedwire EDI messages.

Figure 18A:
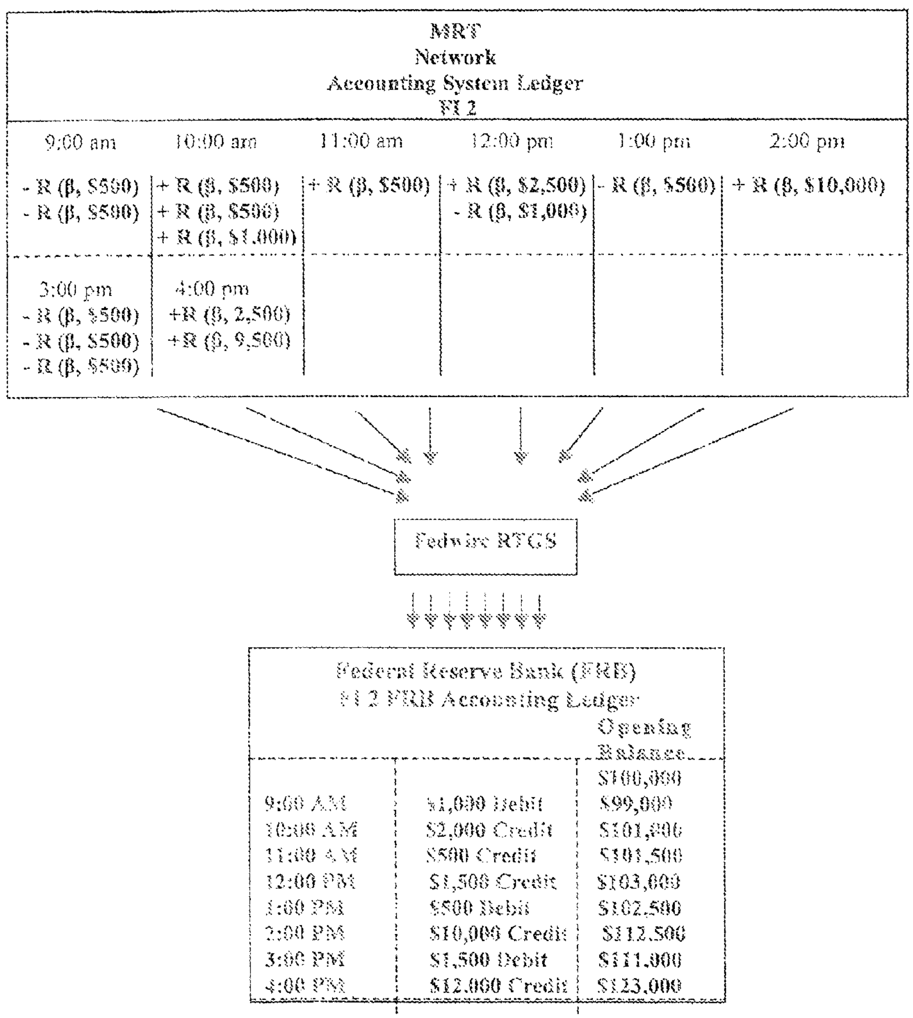
FIG. 18A is a schematic representation of the MRT Network Accounting System for time-specific net-settlement of monetary right(s) transfers utilizing the Fedwire® RTGS system, which allows a financial institution to receive credits to its Federal Reserve Bank-maintained account on a periodic basis.
Figure 18B:
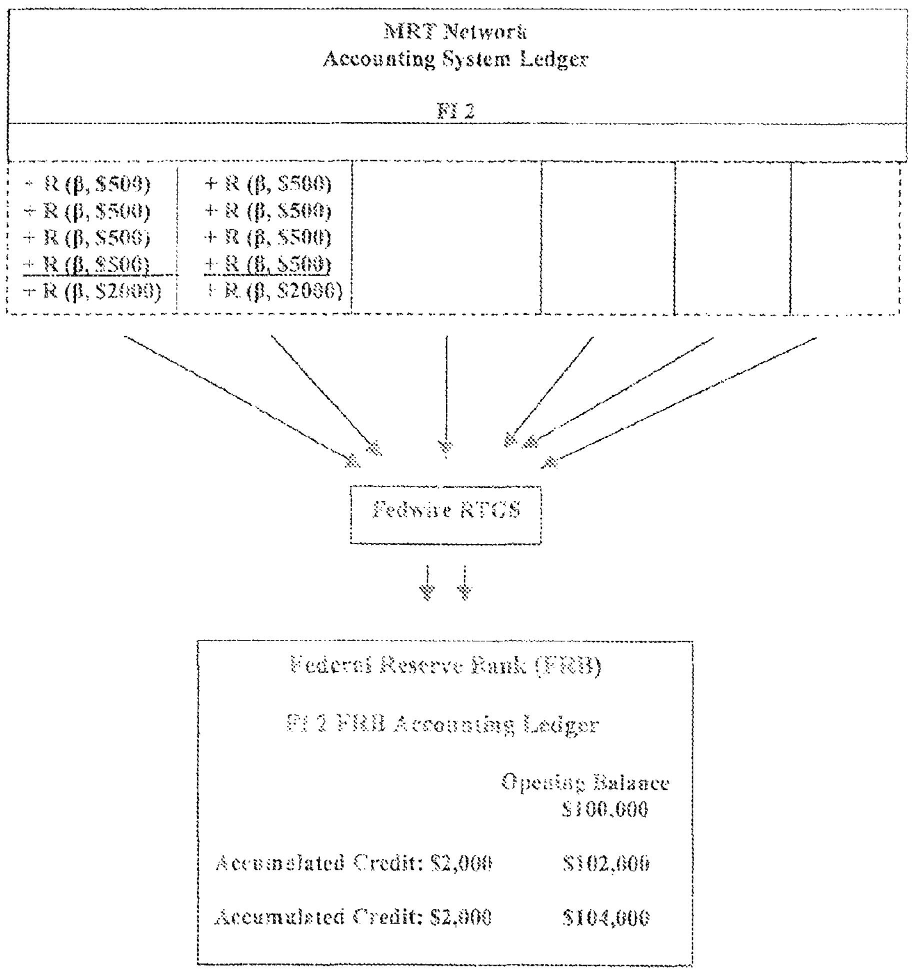
FIG. 18B is a schematic representation of the MRT Network Accounting System for cumulative credit net-settlement of monetary right(s) transfers utilizing the Fedwire® RTGS and, which, allows a financial institution to receive a credit to its Federal Reserve Bank-maintained account when certain monetary right(s) credit balances are achieved within the MRT Network Accounting System for that financial institution.
Figure 18C:
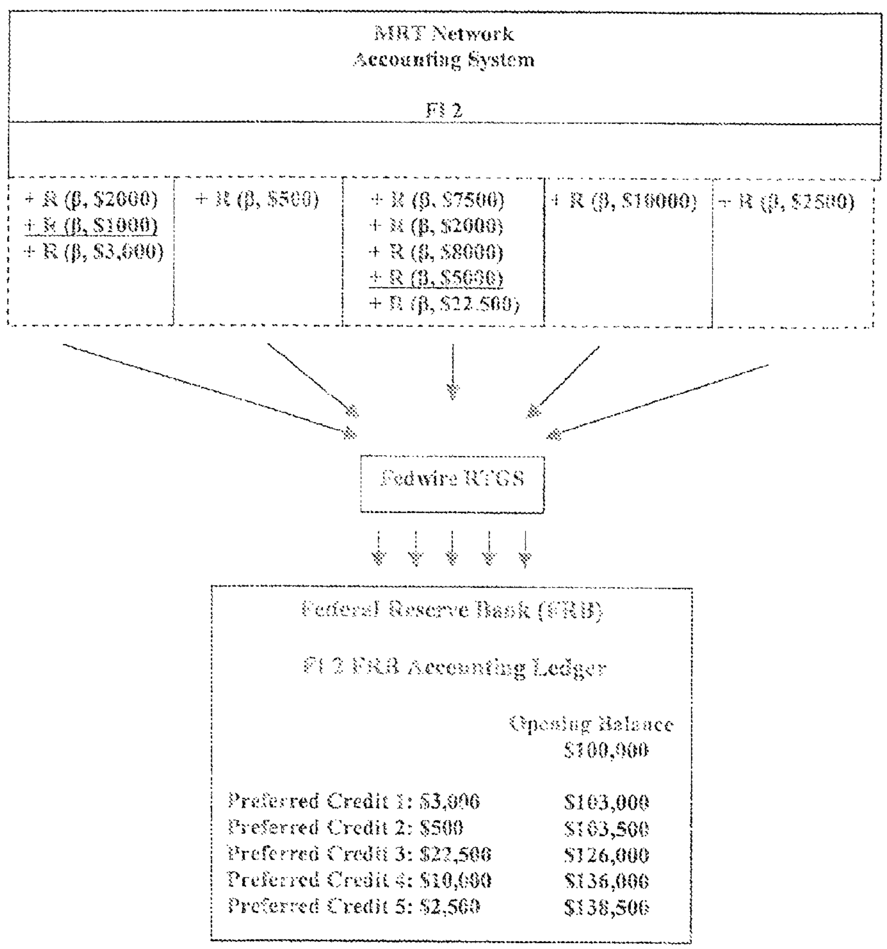
FIG. 18C is a schematic representation of the MRT Network Accounting System for preferred net-settlement of monetary right(s) transfers utilizing the Fedwire® RTGS and, which, allows a financial institution to receive credits to its Federal Reserve Bank-maintained account at any time the financial institution has achieved a net monetary right(s) credit balance.

FIGS. 18A, 18B and 18C show various methods for the MRT Network accounting system to effect MRT Network Fedwire EDI messages, based on a financial institution's preferences for receiving the net-settled monetary right(s) transfers.

FIG. 18A illustrates net-settlement of monetary right(s) transfers and subsequent MRT Network Fedwire EDI message transfers based on a financial institution's preference for time-specific receipt of net credits/debits to its Federal Reserve Bank-maintained account. In the example shown, financial institution #2 (FI 2), has elected to receive net credits/debits to its Federal Reserve Bank account on an hourly basis.

FIG. 18B illustrates the net-settlement of monetary right(s) transfers and the subsequent MRT Network Fedwire EDI message effecting net-settled transfer to the Federal Reserve Bank, based on a financial institution's preference for receiving cumulative net-settled credits (or debits) to its Federal Reserve Bank account. The financial institution specifies a certain cumulative net credit (or debit) balance within the MRT Network accounting system, which automatically triggers an MRT Network Fedwire EDI message effecting the monetary right(s) transfer.

FIG. 18C illustrates the net-settlement of monetary right(s) transfers and the subsequent MRT Network Fedwire EDI message effecting net-settled transfer to the Federal Reserve Bank, based on a financial institution's preference for receiving net-settled credits (or debits) to its Federal Reserve Bank account at any time of its choosing. The financial institution notifies the MRT Network, at any time it chooses, to receive a net credit (or debit) to its Federal Reserve Bank account, and the MRT Network sends an MRT Network Fedwire EDI message effecting the monetary right(s) transfer.

Figure 19A:
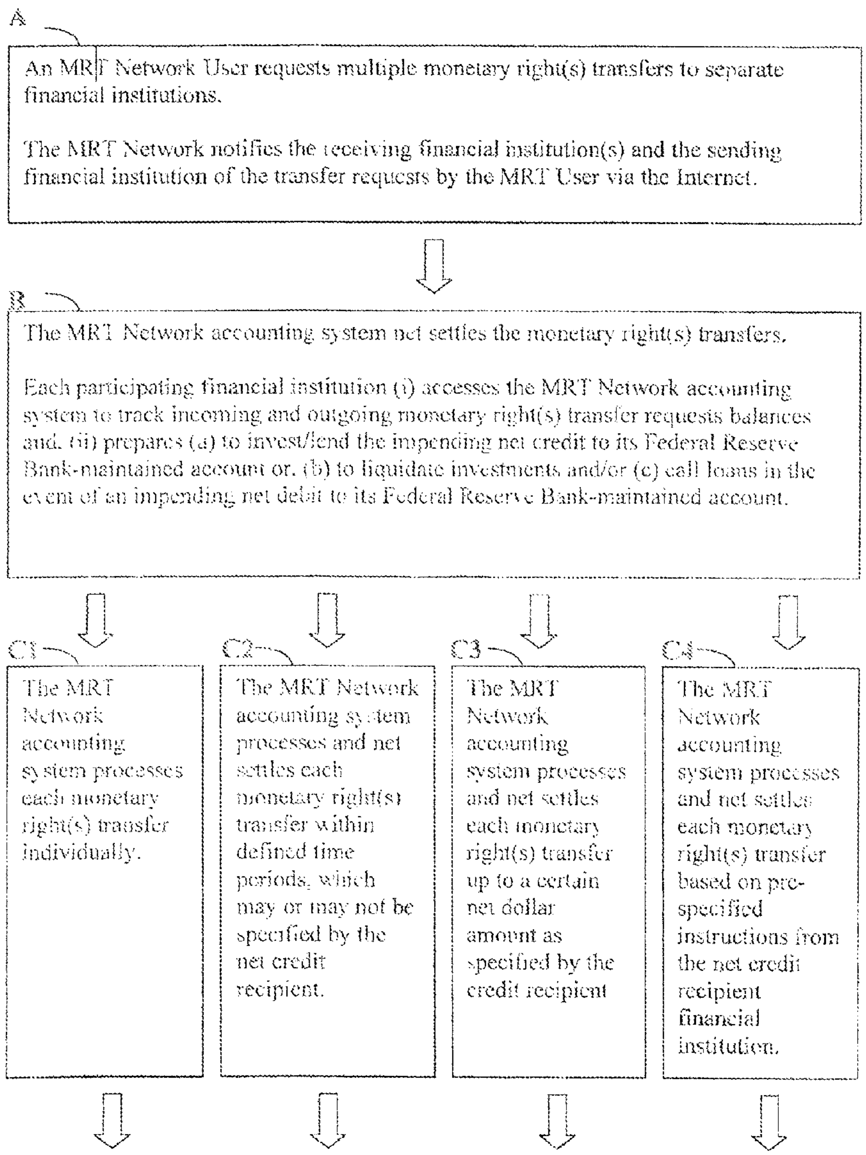

FIG. 19A describes the various steps in the MRT Network accounting system net-settlement process using Fedwire or another RTGS system.

As indicated at Block A in FIG. 19A, an MRT Network User requests multiple monetary right(s) transfers to separate financial institutions. The MRT Network notifies the participating financial institutions of the monetary right(s) transfer requests. At Block B, the MRT Network accounting system net-settles the monetary right(s) transfer requests, and each participating financial institution has the ability to monitor its net-settled monetary right(s) balance(s) in real-time.

At Blocks C1, C2, C3 and C4 in FIG. 19A, a participating financial institution can choose which method it prefers to receive a net credit or net debit to its Federal Reserve Bank-maintained account, via a monetary right(s) transfer effected by MRT Network Fedwire EDI message(s). It may choose to have the MRT Network transfer each individual monetary right(s) transfer separately, which does not require any net-settlement. It may choose to have net-settled monetary right (s) credits/debits transferred on a period basis (C2). It may choose to have net-settled monetary right(s) credits/debits transferred when certain credit or debit amounts are achieved in its MRT Network monetary right(s) account (C3), or it may choose to have net-settled monetary right(s) credits/debits transferred based on its own preferences throughout a business day (C4).

At Block D in FIG. 19B, once a financial institution has indicated its preference(s) for receipt of credits/debits to its Federal Reserve Bank account based on its MRT Network monetary right(s) net-settled balance(s), the MRT Network utilizes the MRT Network Fedwire EDI messages to transmit the transfer instructions to the Federal Reserve Bank.

At Block E, the Federal Reserve Bank receives the MRT Network Fedwire EDI messages and credits or debits the financial institution's account based on transferred, net-settled monetary right(s) balances.

FIG. 20 depicts a graphic user interface (GUI) screen that allows an MRT Network User to select preferences for monetary right(s) transfers. While the goal of the MRT Network process is the allow instantaneous transfers of monetary right (s) in order allow a user to optimize interest on his/her money, for a cost perspective, it may be advantageous for a user to wait until the end of a business day to effect monetary right(s) transfers if there is no yield advantage to be gained and, thus, the user can have the monetary right(s) transfer aggregated with other users' monetary right(s) transfers in order to save money.

FIG. 21 depicts exemplary MRT Network aggregated monetary right(s) transfer process for automated, preloaded payment systems. As illustrated, an MRT Network User makes both a standard monetary right(s) transfer between two financial institutions (FI 1 & FI 2); then loads money onto a preloaded payment device, in this case, EZ Pass; and then finally transfers the monetary right to earn interest (R (β, $100)) associated with the preloaded balance from EZ Pass's financial institution (FI 3) to another financial institution (FI 2), in order to optimize yield on those funds until the MRT Network User actually utilizes part, or all, of the preloaded balance.

As shown in FIG. 21, the MRT Network maintains its own accounting system ledger in order to aggregate all monetary right(s) transfer balances prior to utilizing the Fedwire RTGS system to effect monetary right(s) transfers. Upon receipt of the MRT Network Fedwire EDI message(s), the Federal Reserve Bank debits and credits the participating financial institutions' accounts accordingly.

Figure 22B:
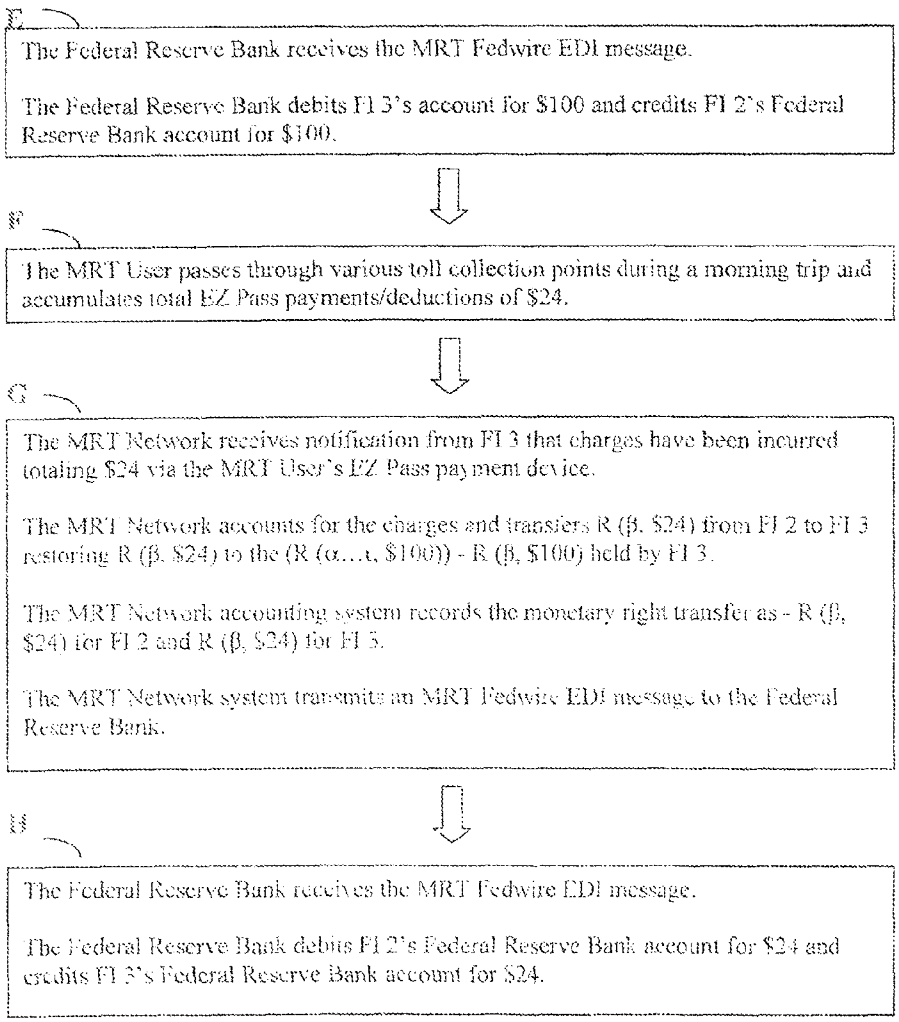

FIGS. 22A and 22B are a flow chart that depicts the various steps involved in the MRT Network aggregated monetary right(s) transfer process for preloaded payment systems, as illustrated in FIG. 21

As indicated at Block A in FIG. 22A, an MRT Network User utilizes the MRT Network process to transfer (R (β, $500)) from FI 1 to FI 2, and the MRT Network accounting system records the monetary right(s) debits and credits accordingly (FI 2 for (R (β, $500)), and FI 1 for (R (α . . . ι, $500)−(R (β, $500))) and transmits an MRT Network Fedwire EDI message to the Federal Reserve Bank. At Block B, the Federal Reserve Bank receives the MRT Network Fedwire EDI message and credits FI 2's account in the amount of $500 and debits FI 1's account in the amount of $500.

At Block C, the MRT Network User then transfers $100 in cash from his/her account at FI 1 to an "external" financial institution, FI 3, which serves as the depository institution for EZ Pass, and $100 in value is loaded on the MRT Network User's preloaded EZ Pass payment device.

At Block D in FIG. 22A, the MRT Network User transfers (R (β, $100)) associated with the monetary value loaded on the EZ Pass payment device from FI 3 to FI 2 in order to optimize yield on those funds until the $100 value loaded on the EZ Pass payment device is utilized, wholly or partially. The MRT Network accounting system credits FI 2's account for (R (β, $100)) and debits FI 3's account for (R (α . . . ι, $100)–(R (β, $100)). The MRT Network then transmits an MRT Network Fedwire EDI message to the Federal Reserve Bank with the monetary right(s) transfer information.

At Block E in FIG. 22B, the Federal Reserve Bank receives the MRT Network Fedwire EDI message and debits FI 3's account in the amount of $100 and credits FI 2's account in the amount of $100.

At Block F, the MRT Network User passes through various toll collection points using the EZ Pass payment device to pay each toll and accumulating total toll charges of $24.

At Block G, the MRT Network receives notification from FI 3 that total charges on the MRT Network User's EZ Pass have been incurred in the amount of $24. The MRT Network accounts for the charges and transfers (R (β, $24) from FI 2 to FI 3, thus restoring (R (β, $24) to the (R (α . . . ι, $100)–(R (β, $100)) held by FI 3 in the MRT Network accounting system. The MRT Network accounting system records the monetary right(s) transfer as –(R (β, $24) for FI 2 and (R (β, $24) for FI 3. The MRT Network then transmits an MRT Network Fedwire EDI message to the Federal Reserve Bank that includes the new monetary right(s) transfer information.

At Block H, the Federal Reserve Bank receives the MRT Network Fedwire EDI message and debits FI 2's account in the amount of $24 and credits FI 3's account in the amount of $24.

Figure 23:
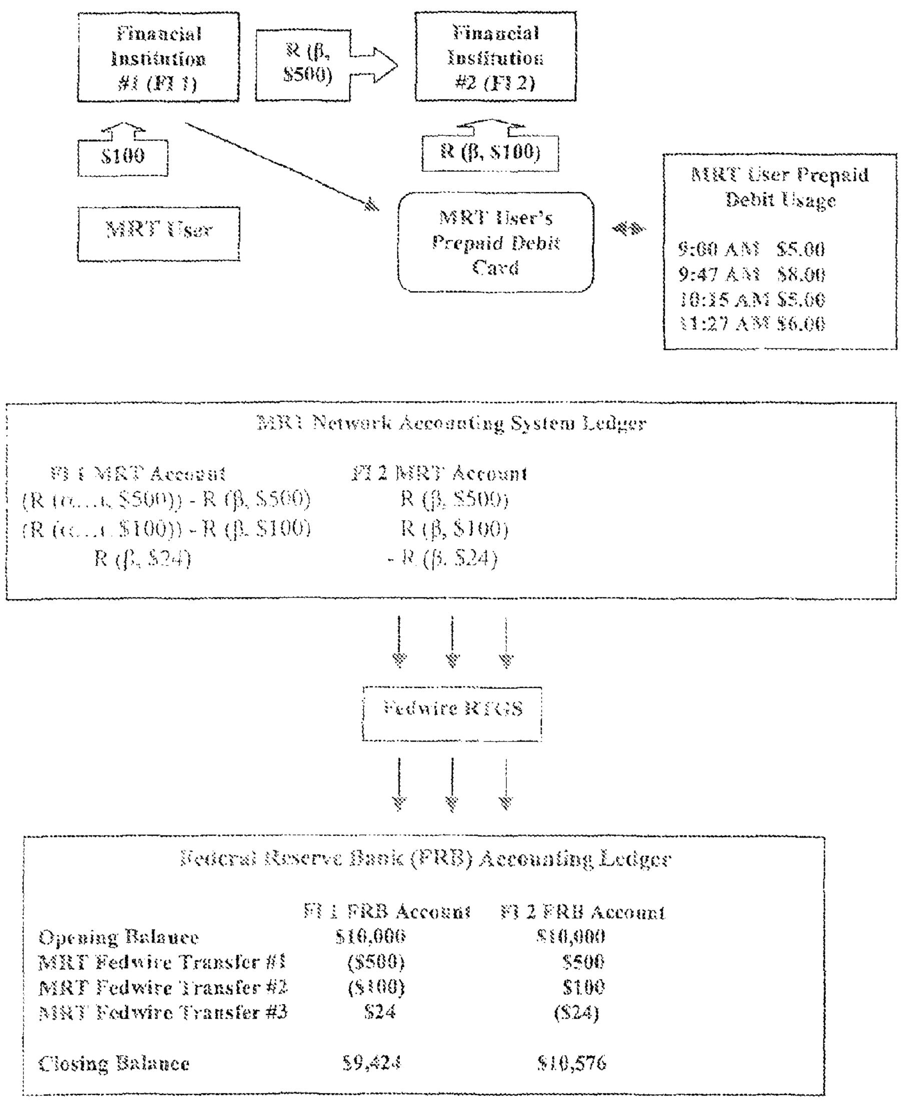
FIG. 23 is a schematic representation of the MRT Network aggregated monetary right(s) transfer process for preloaded/prepaid payment products and devices (e.g. prepaid debit cards, gift cards payroll cards, etc) which allow an MRT Network User to transfer monetary rights associated with funds loaded on the preloaded/prepaid payment products and devices in order to optimize interest earned while those funds are residing in other accounts for the MRT Network User's benefit, with the MRT Network accounting for aggregated prepaid device usage prior to effecting a monetary right(s) transfer via the Fedwire® RTGS system.

FIG. 23 depicts the MRT Aggregated Monetary Right(s) Transfer for Preloaded/Prepaid Payment Products and Devices (Prepaid Debit Cards, Gift Cards, Payroll Cards, etc.), whereby an MRT Network User can purchase a prepaid debit card, gift card or other prepaid card or device or reload a prepaid card or device and then transfer monetary right(s) associated with the prepaid/loaded balance in order to optimize yield on those loaded funds until they are used, partially or wholly, in a transaction. The MRT Network User makes both a standard monetary right(s) transfer between two financial institutions (FI 1 and FI 2) and then purchases a prepaid gift card from FI 1 in the amount of $100, and then transfers the monetary right to earn interest (R (β, $100)) associated with the preloaded gift card purchased from FI 1 to another financial institution (FI 2) in order to optimize yield on those funds until the MRT Network User actually utilizes part, or all, of the preloaded balance.

As shown previously, the MRT Network maintains its own accounting system ledger in order to aggregate all monetary right(s) transfer balances prior to utilizing the Fedwire RTGS system to effect monetary right(s) transfers. Upon receipt of the MRT Network Fedwire EDI message(s), the Federal Reserve Bank debits and credits the participating financial institutions' accounts accordingly.

FIGS. 24A and 24B are a flow chart that depicts the various steps involved in the MRT Network aggregated monetary right(s) transfer process for preloaded debit cards and devices (Prepaid Debit Cards, Gift Cards, Payroll Cards, etc.), which allows an MRT Network User to transfer balances loaded on prepaid cards and devices from the financial institution that issued the prepaid card or device to another financial institution offering higher yields until the loaded funds are used, wholly or partially, in a transaction.

At Block A, an MRT Network User utilizes the MRT Network to transfer R (β, $500) from the "home" financial institution (FI 1) to an "external" financial institution (FI 2) to optimize yield on the transferred monetary value. The MRT Network accounting system records the monetary right transfer as (R (α . . . ι, $500))–R (β, $500) for FI 1 and R (β, $500) for FI 2. The MRT Network transmits an MRT-Fedwire EDI message to the Federal Reserve Bank.

At Block B, the Federal Reserve Bank receives the MRT-Fedwire EDI message. The Federal Reserve Bank debits FI 1's Federal Reserve Bank account for $500 and credits FI 2's Federal Reserve Bank account for $500.

At Block C, the MRT Network User purchases (or loads) $100 on a prepaid debit card issued by FI 1.

At Block D, the MRT Network User transfers R (β, $100) from FI 1 to FI 2 to optimize yield on the transferred monetary value until the MRT Network User utilizes the $100 value, wholly or partially. The MRT Network accounting system records the monetary right transfer as (R (α . . . ι, $100))–R (β, $100) for FI 1 and R (β, $100) for FI 2. The MRT Network transmits an MRT-Fedwire EDI message to the Federal Reserve Bank.

At Block E in FIG. 24B, the Federal Reserve Bank receives the MRT-Fedwire EDI message. The Federal Reserve Bank debits FI 1's account for $100 and credits FI 2's Federal Reserve Bank account for $100.

At Block F, the MRT Network User uses the prepaid debit card in several different transactions during a morning and accumulates total charges of $24.

At Block G, the MRT Network receives notification from FI 1 that charges have been incurred totaling $24 via the MRT Network User's prepaid debit card. The MRT Network accounts for the charges and transfers R (β, $24) from FI 2 to FI 1 restoring R (β, $24) to the (R (α . . . ι, $100))–R (β, $100) held by FI 1. The MRT Network accounting system records the monetary right transfer as –R (β, $24) for FI 2 and R (β, $24) for FI 1. The MRT Network transmits an MRT-Fedwire EDI message to the Federal Reserve Bank.

At Block H in FIG. 24B, the Federal Reserve Bank receives the MRT-Fedwire EDI message. The Federal Reserve Bank debits FI 2's Federal Reserve Bank account for $24 and credits FI 1's Federal Reserve Bank account for $24.

Implementation of the MRT Network of the Present Invention

Figure 25A:
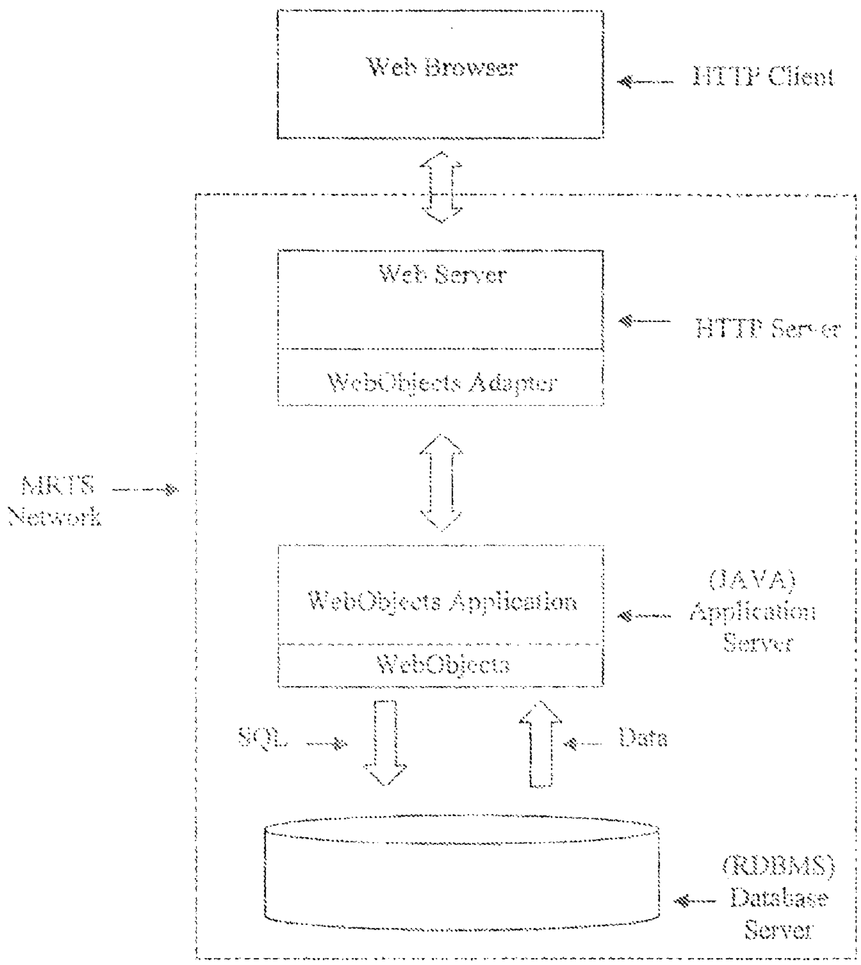
FIGS. 25A and 25B are schematic representations for two alternative implementations of the enterprise-level MRT Network of the present invention using enterprise-level object-oriented systems designed, developed and deployed using industrial-strength development tools in a manner known in the field of rational object-oriented systems engineering (ROSE)
Figure 25B:
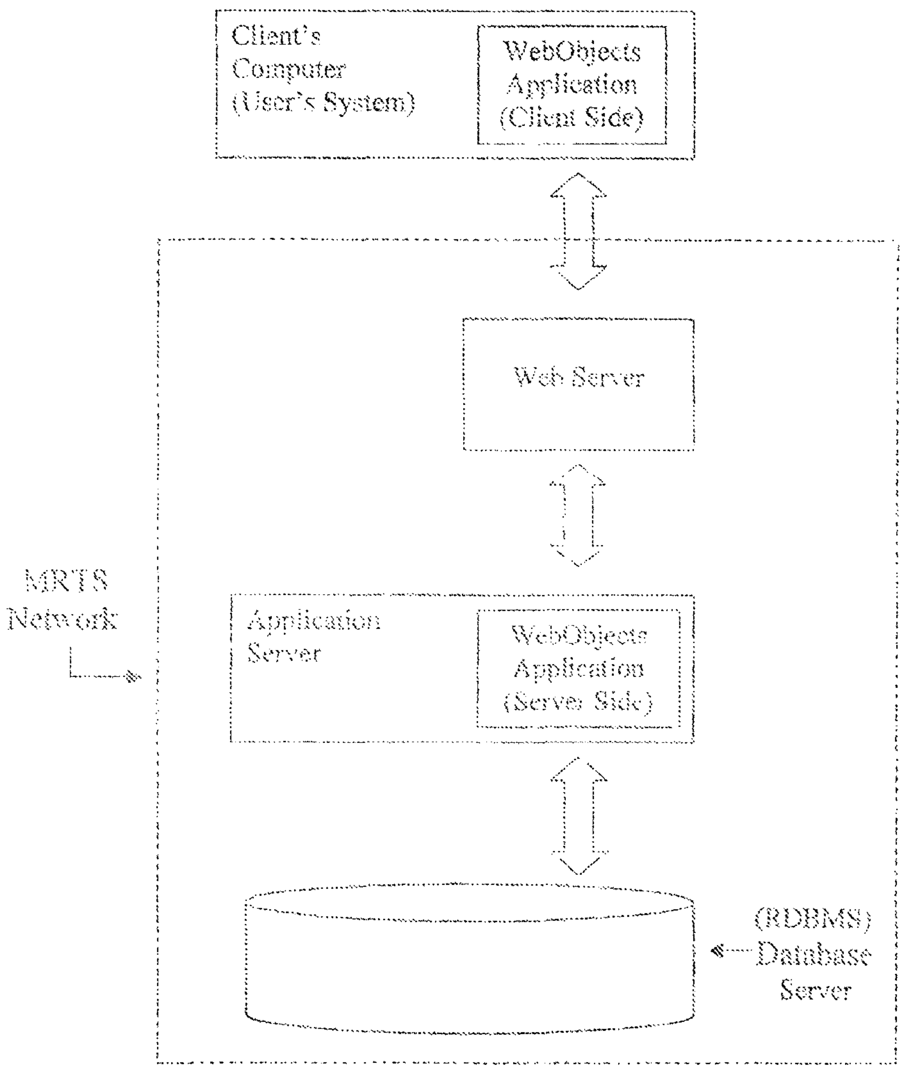

As shown in FIGS. 25A and 25B, the MRT Network of the present invention, (including MRT Servers) is preferably designed and implemented as an industrial-strength, carrier-class Internet-based financial information communications network of object-oriented system engineering (DOSE) design. Using available object-oriented technology, this system can be developed in various ways: for example, using any suitable Java-based object-oriented integrated development environment (IDE) e.g. WebObjects 5.2 by Apple Computer Inc, Websphere IDE by IBM, or Weblogic IDE by BEA; or using another object-oriented programming language such as C sharp, supported by the Microsoft® Visual Studio 2005 .NET IDE. FIGS. 24B and 24C show two alternative implementations of the enterprise-level MRT Network of the present invention using the WebObjects IDE and Java Application Server.

Overview of the Services Supported on the MRT Network of the Present Invention

FIG. 26 is an exemplary chart describing various kinds of Accountholder Services that can be supported on the MRT Network of the present invention. This list is representative of the many kinds of the accounts and products that various participating (i.e. registered) financial institutions (including the MRT Network administrator) may offer on MRT Network to accountholders.

FIG. 27 describes the diverse provisions which the MRT Network of the present invention seeks to provide to all its users/accountholders.

Figure 28:
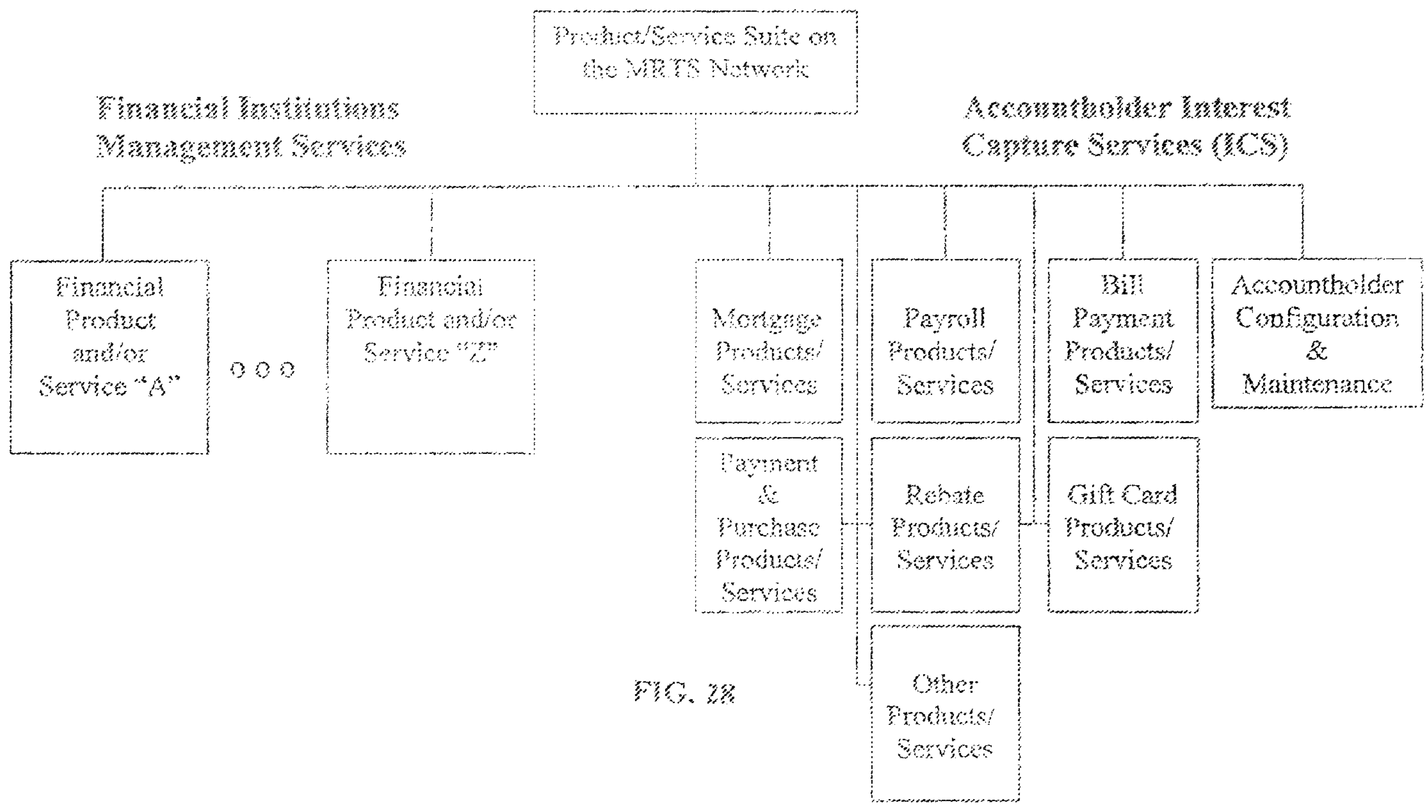
FIG. 28 is a schematic representation depicting a systems-level architecture of the various services supported by the MRT Network of the illustrative embodiment of the present invention, including (i) management services for financial institutions who have registered with the MRT Network, interest-capturing products and services offered to clients over the MRT Network, as well as (ii) management services for clients holding accounts on interest capturing products and services, registered on and supported by the MRT Network.

As shown in FIG. 28, the MRT Network of the present invention supports and delivers various financial information and accounting services to both its institutional members as well as its accountholders, namely: (i) management services for financial institutions who have registered and are supporting their "interest-capturing" products and services on the MRT Network; as well as (ii) management services for clients holding accounts on "interest capturing" products and services, registered on and supported by the MRT Network.

Figure 29A:
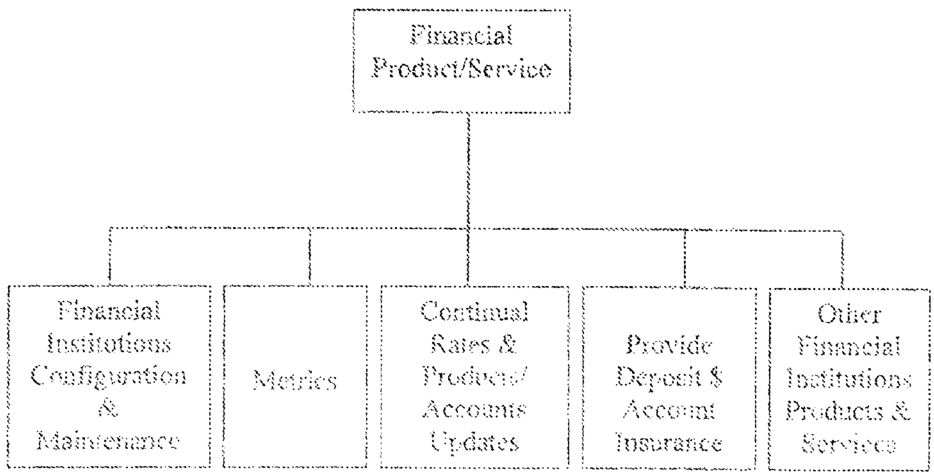
FIG. 29A is a schematic representation depicting various kinds of management services supported for any financial product registered and offered on the MRT Network of the present invention, including financial institution configuration and maintenance, consumer metrics, continual interest rates and product/account updates, provide deposit and account insurance.
Figure 29B:
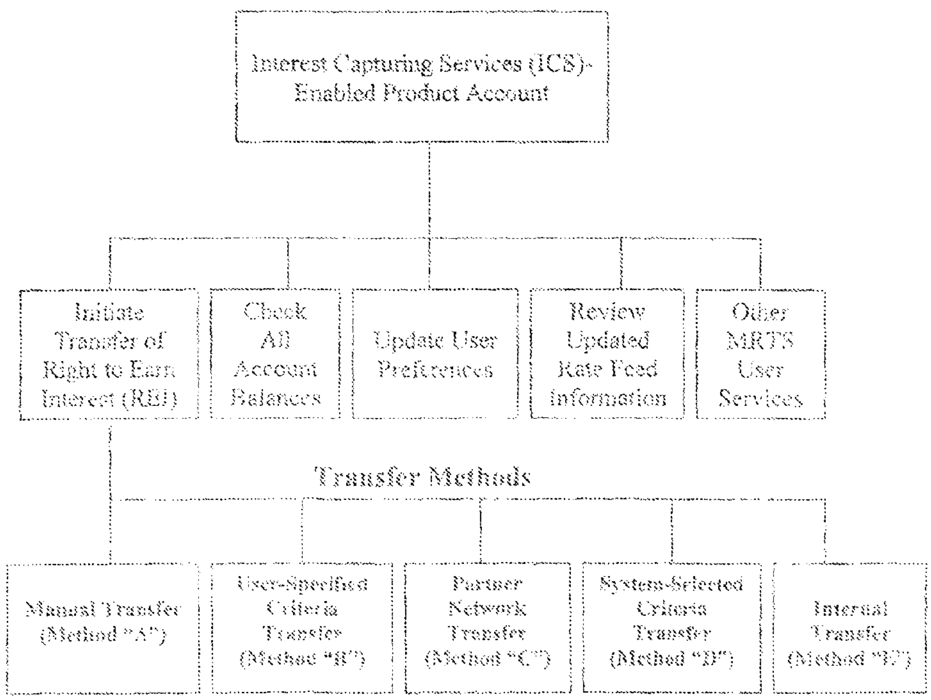
FIG. 29B is a schematic representation depicting the various kinds of management services supported for any interest capturing system-enabled financial account associated with an interest capturing product registered on the MRT Network, including the client's right to initiate the transfer of his/her right to earn interest (REI), check all account balances, update user preferences, review updated rate feed information, and other MRT Network services, as well as the various REI transfer methods supported on the illustrative embodiment of the MRT Network.

In FIG. 29A, the various management services supported for any financial product offered by a participating financial institution on the MRT Network of the present invention, are shown to include: financial institution configuration and maintenance; consumer metrics; continual interest rates and product/account updates; deposit and account insurance; etc. In FIG. 29B, the various management services supported for any client financial account associated with a ICS-product/service offered by a participating financial institution on the MRT Network, are shown to include: the client's right to initiate the transfer of his/her right to earn interest (REI); check all account balances; update user preferences; review updated rate feed information; as well as the various REI Transfer Methods (Methods A through E) supported on the MRT Network of the present invention. Through the "Update user preferences services, an accountholder provides all relevant personal/business information including, but not limited to accountholder: name, address, city, state, zip code, country, email address, home phone, business phone, mobile phone, date of birth, employer, mortgage holder/servicer, human resource administrator, existing "home" accounts and products, passwords, etc. Additionally, an accountholder can establish, save and change preferences related to right(s) transfers. Such transfer preferences may include, but are not limited to, institutions, accounts, products, transfer methods, preferred partner networks (PPN), criteria by which institutions/accounts and products are ranked, criteria by which transfers are effected, etc. Through "Review Updated Rate Fee Information" Services, accountholders can also review updated rate feed information from all participating institutions, with the system databases constantly receiving, ranking and displaying all incoming data as it relates to rates/yields, accounts and products, institutions, expenses, etc. In addition to the basic REI Transfer Methods, there are additional services supported by the MRT Network which allow an accountholder to transfer the monetary right to earn interest on monies owned by an accountholder until either transactions are effected by the accountholder, or by others effecting payments on behalf of the accountholder. These services will be described in greater detail hereinafter.

FIG. 30 is a list of MRT-Fedwire EDI codes structured to incorporate and carry out the MRT process of the present invention, with each code specifying a certain transaction step in the monetary rights transfer (MRT) process of the present invention. As the Federal Reserve Bank will not allow its actual code format to be distributed outside registered, participating financial institutions, Applicant has developed exemplary "MRT Network-Fedwire" EDI codes shown throughout the accompanying Drawings for purposes of illustration and exposition of the present invention. Such kind of code used in the Fedwire RTGS system serve to illustrate, inter alia, how EDI messages transmitted electronically over the Internet (using high security protocols) allows the Federal Reserve Bank, upon receipt of such EDI messages, to debit and credit participating financial institutions' accounts maintained at the Federal Reserve Bank without physically transferring money, and allowing financial institutions whose Federal Reserve Bank account has been credited, to go out and lend or invest money based on the credit to its Federal Reserve Bank account.

Carrying Out the Monetary Rights Transfer (MRT) Process of the Present Invention Using the EDI-Based Fedwire® RTGS System Referring to FIGS. 10, and 31 through 41B, the manner in which STEPS A through K of the MRT Process are carried out in an illustrative embodiment of the present invention, will be described in great detail herein below.

Figure 31:
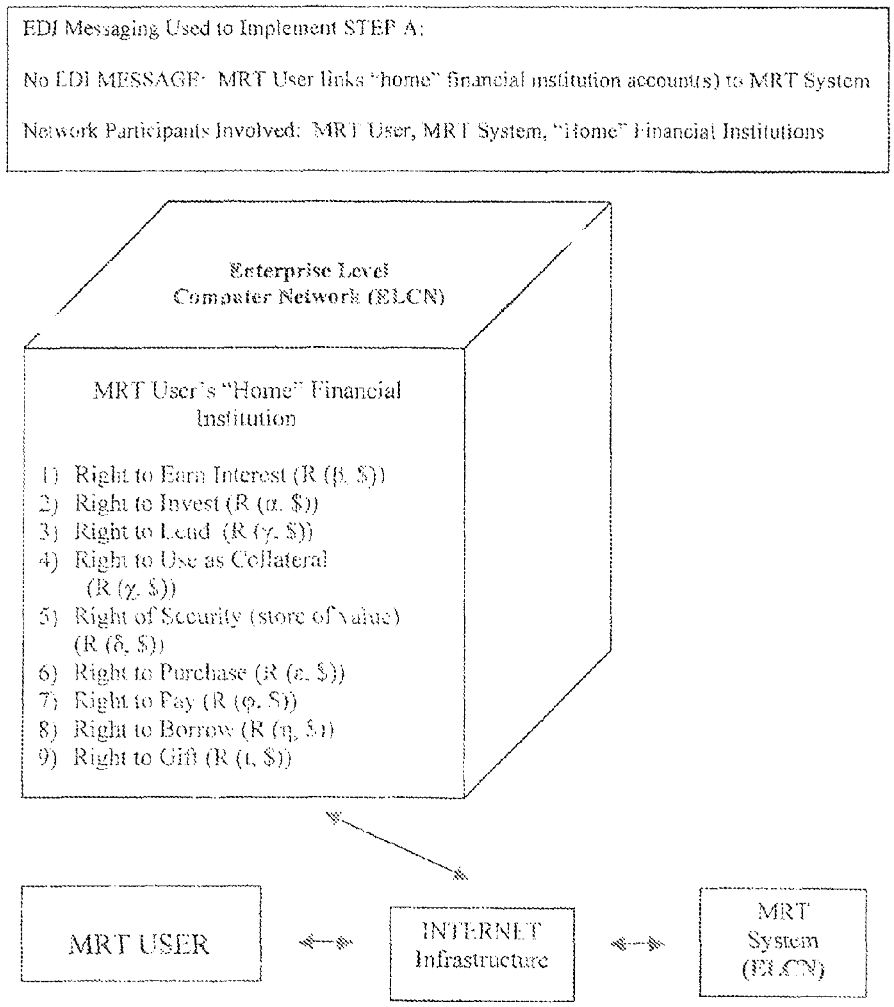
FIG. 31 is a schematic representation showing the first step (Step "A") in the MRT Process of the illustrative embodiment of the present invention, involving the MRT Network User linking his "home" financial institution account(s) to the MRT Network, each of which is supported by an enterprise level computer network (ELCN) operably connected to the Internet.

As indicated in FIG. 31, STEP "A" of the monetary right(s) transfer process begins with the MRT Network User linking a "home" financial institution account to the MRT Network via the Internet.

Figure 32A:
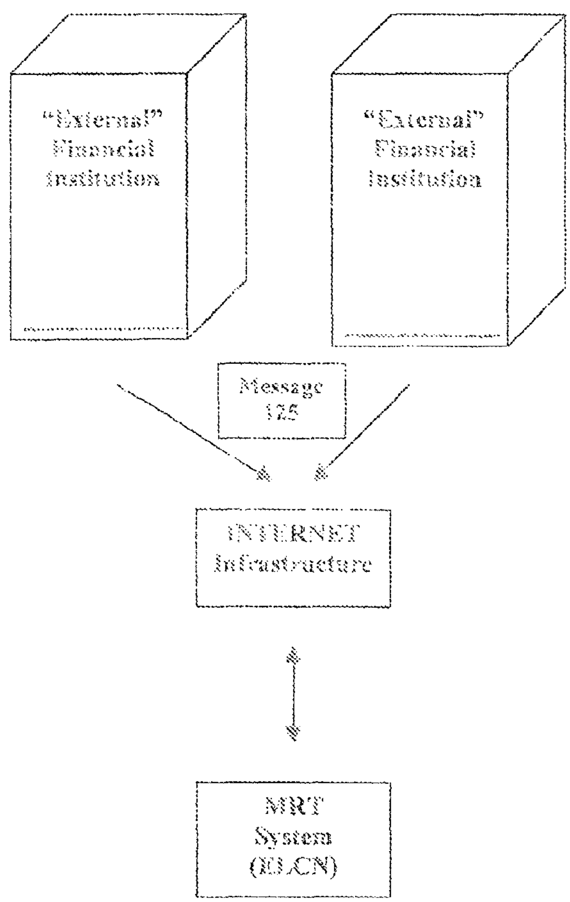
FIG. 32A is a schematic representation showing Step "B" of the MRT Process, whereby "external" financial institutions feed their rate/yield information, via the Internet, to the MRT Network of the present invention using MRT-Fedwire EDI message 125.

As shown in FIGS. 10, 32A and 32B (STEP "B"), "external" financial institutions then supply rate and yield information on their various savings products directly to the MRT Network of the present invention via the Internet using the MRT Network Fedwire EDI 125 message code to convey this information; this information can be updated by the "external" financial institutions as often as their rates/yields change.

STEP "C" of the MRT Network Process is shown in FIGS. 33A and 33B, where the MRT Network User sends a message via the Internet, which is transmitted using MRT-Fedwire EDI code 126 as a request to transfer the MRT Network User's monetary right to earn interest (R (β, $)) and, which, includes all pertinent data related to the monetary right transfer request including: account number, date, time, the monetary right(s) to be transferred, the amount of the monetary right(s) transfer, the "home" and "external" financial institutions involved, the account type, the yield, the method of interest compounding, the execution status and the status of the request.

As shown in FIGS. 10, 34A through 34H (STEP "D"), the MRT Network notifies both the "home" financial institution and the chosen "external" financial institution that it is transferring the monetary right to earn interest (R (β, $)) via the MRT Network, from the "home" financial institution to the "external" financial institution. This information is conveyed to both financial institutions via MRT Network Fedwire EDI messages 127 and 128, which contain all of the information pertinent to the monetary right(s) transfer request and the MRT Network User's tax identification information.

Simultaneously, the MRT Network System notifies the Federal Reserve Bank of the monetary right to earn interest (R (β, $)) transfer from the "home" financial institution to the chosen "external" financial institution. This information also includes the "home" and "external" financial institutions' Federal Reserve Account numbers along with information certifying to the Federal Reserve Bank that the monetary right(s) transfer is fully collateralized by the remaining subset of monetary rights still residing at the user's "home" financial institution in the form of the non-transferred subset of monetary rights (R (α . . . ι, $)−(R (β, $)) as shown in FIGS. 34D and 34E, which are the MRT Network Fedwire EDI messages (129 & 130) notifying the Federal Reserve Bank of both the monetary right(s) transfer and of the full collateral supporting the monetary right(s) transfer. The MRT Network of the present invention also notifies the user's "home" financial institution that the remaining subset of monetary rights is dormant.

FIG. 34F is the MRT Network Fedwire EDI message (131) that notifies the U.S. Treasury (Department of Homeland Security) of the monetary right(s) transfer to assure that there is no money laundering or terror financing associated with said transfer; should there be a problem with a transfer, the U.S. Treasury will notify the MRT Network of its concerns.

Figure 34G:
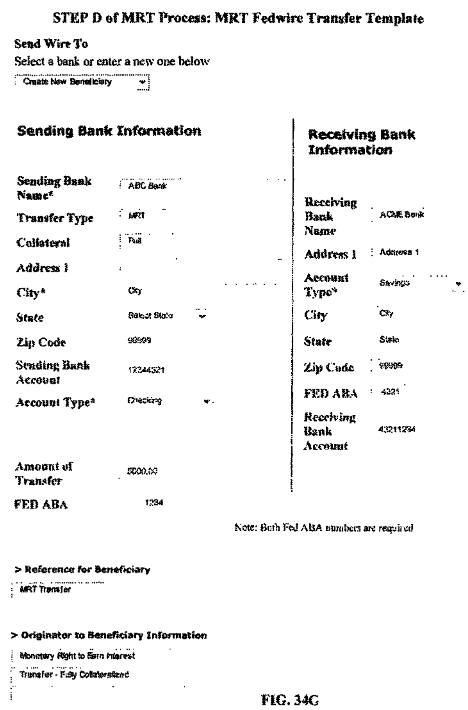
FIG. 34G is a schematic representation of an exemplary MRT-Fedwire transfer template (Step "D") that incorporates all of the necessary information to effect a monetary right(s) transfer via the Fedwire® RTGS system, including specificity as to monetary right(s) being transferred as well as proper collateralization of the monetary right(s) transfer.

FIG. 34G shows a representative MRT Network Fedwire Transfer Template by which, the MRT Network will supply all pertinent information to both the MRT Network User's "home" financial institution and to the "external" financial institution to which, the MRT Network User's monetary right (s) is being transferred. Importantly, the template includes an information section that denotes that the transfer is a monetary right(s) transfer and denotes which monetary right(s) are included in the transfer. All Fedwire transfers include a special section/code that allows for the user to specify instructions related to the transfer.

Figure 44:
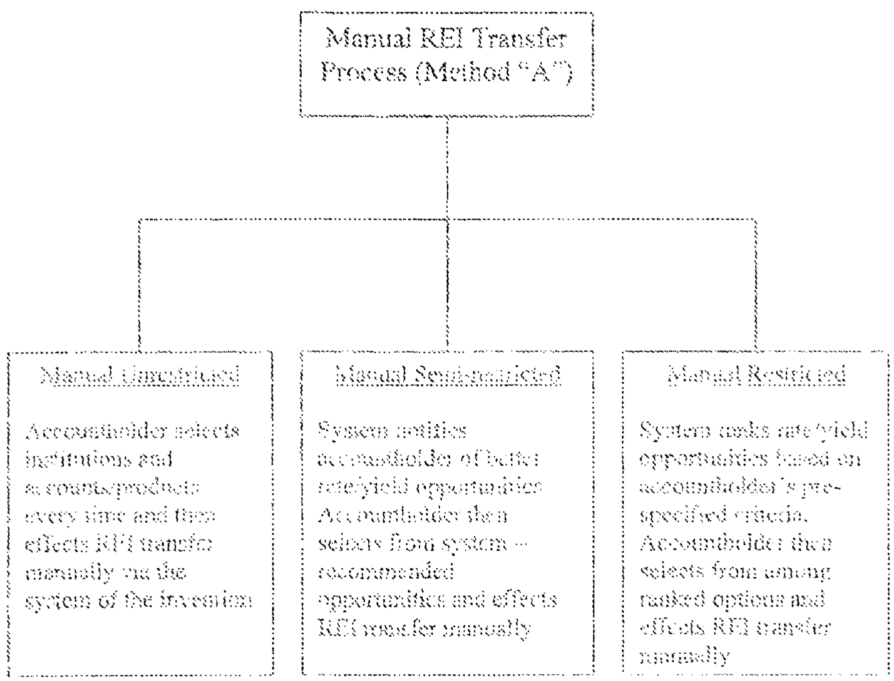
FIG. 44 is schematic representation illustrating in greater detail, the structure of the REI Transfer Method A" of the present invention indicated in FIG. 29B, showing three different kinds of processes by which an account holder on the MRT Network can manually transfer one's right to earn interest (R (β, $)) (or other monetary rights) including (i) the unrestricted manual transfer process, (ii) the semi-restricted manual transfer process, and (ii) the restricted manual transfer process.

FIG. 34H illustrates a representative MRT Network Fedwire EDI message that would be used to effect the transfer shown in FIGS. 33 and 44 inclusive, with the message including a field for each piece of information relevant to the monetary right(s) transfer. This is the standard method used for all Fedwire transfers, and allows for the Fedwire® RTGS system to debit/credit the participating financial institutions' accounts without physically moving any cash.

FIG. 35A depicts STEP "E" of the MRT Network Process and is a schematic representation of the process by which, the Federal Reserve Bank, once notified by the MRT Network of the present invention of a monetary right(s) transfer from the MRT Network User's "home" financial institution to an "external" financial institution, debits the "home" financial institution's Federal Reserve Bank account and credits the "external" financial institution's Federal Reserve Bank account for the amount of the monetary right(s) transfer. This occurs within the Fedwire RTGS system, which means physical money is not transferred but, instead, a credit for the dollar amount of the monetary rights transfer is posted to the "external" financial institution's Federal Reserve Bank-maintained account and a debit, in the same amount, is posted to the MRT Network User's "home" financial institution's Federal Reserve Bank-maintained account. Once the "external" financial institution's account has been credited with the monetary right(s) transfer amount, the "external" financial institution is free to lend or invest, in cash (CASH, $) as shown in FIGS. 10 & 11, in the amount of the monetary right(s) transfer or up to the Fed credit/the bank's preferred capital ratio (PCR).

At STEP "E", the "home" financial institution may have to liquidate its investment(s) in the amount of the monetary right to earn interest ((R (β, $)) transfer or up to the amount of the Fed debit/the bank's preferred capital ratio (PCR) depending upon the amount invested, in order to satisfy the MRT user's request to transfer the monetary right(s) and/or may have to cancel loans in the amount of the monetary right to earn interest ((R (β, $)) or up to the amount of the Fed debit/the bank's preferred capital ratio (PCR) depending upon the amount lent, in order to satisfy the MRT user's request to transfer the monetary right(s).

FIGS. 35B and 35C are examples of the MRT Network Fedwire EDI messages 132 & 133, which are employed to notify the MRT Network User's "home" financial institution (debit) and the "external" financial institution (credit) receiving the monetary right(s) transfer that the Federal Reserve Bank has debited/credited their respective Federal Reserve Bank accounts in the amount of the monetary right(s) transfer as shown in FIG. 35A. These MRT Network Fedwire EDI messages also indicate to each financial institution that the proper collateral backing the monetary right(s) transfer, in this case (R (α . . . ι, $)−(R (β, $)), still resides at the MRT Network User's "home" financial institution.

FIG. 36 illustrates STEP "F", where the "external" financial institution, after receiving notice from the Federal Reserve Bank, as shown in FIGS. 10, 11, 35A and 35C, that its Federal Reserve Bank account has been credited in the amount of the monetary right(s) transfer, can then lend or invest cash (Cash, $) in the amount of the credit to its Federal Reserve Bank account or up to the amount of the Fed credit/the bank's preferred capital ratio (PCR).

FIG. 37A illustrates STEP "G", where an MRT Network User requests a transfer of the monetary right(s) transferred to an "external" financial institution, as well as the interest income that has accrued during the transfer period, back to the MRT Network User's "home" financial institution. This process is also shown in FIGS. 10 & 11, with the monetary right to earn interest plus the interest earned at the "external" financial institution ((R (β, $))+i) being transferred back to the MRT Network User's "home" financial institution via the same process by which the monetary right to earn interest (R (β, $)) was transferred originally.

The process of transferring ((R (β, $))+i) back to the MRT Network User's "home" financial institution begins with a MRT Network Fedwire EDI message (MRT Network Fedwire EDI message 134), as shown in FIG. 37B, employed to notify the MRT Network of the present invention, by the MRT Network User, of the request to transfer back the monetary right(s) in transfer plus the accrued interest income ((R (β, $))+i), back to the MRT Network User's "home" financial institution from the "external" financial institution, as shown in FIG. 37A.

FIGS. 37C and 37D are examples of the two MRT Network Fedwire EDI messages (MRT Network Fedwire EDI messages 135 & 136) employed by the MRT Network of the present invention to notify both the MRT Network User's "home" financial institution and the "external" financial institution of the transfer request, including the transferred monetary right(s) plus accrued interest income ((R (β, $))+i), back to the MRT Network User's "home" financial institution.

FIG. 37E shows the MRT Network Fedwire EDI message (MRT Network Fedwire EDI message 137) employed by the MRT Network of the present invention to notify the Federal Reserve Bank of the transfer request by the MRT Network User to transfer the previously transferred monetary right(s), plus accrued interest income, back from the "external" financial institution to the MRT Network User's "home" financial institution. Again, because the Fedwire system is a real-time gross settlement system, the total amount of the transfer—in this case the $5,000 monetary right to earn interest ((R (β, $5,000)) plus the cash interest earned (i) of $77.50) at the "external" financial institution—can be transferred via Fedwire with no actual money moving but, instead, each financial institution's accounts maintained at the Federal Reserve Bank being debited/credited accordingly. This process is also reflected in FIGS. 10 & 11.

Once the "external" financial institution that had initially received the credit to its Federal Reserve Bank-maintained account via the initial monetary right(s) transfer receives notice from the MRT Network of the monetary right(s) plus earned interest ((R (β, $))+i) transfer request back to the MRT Network User's "home" financial institution, the "external" financial institution, as shown in FIG. 38 (STEP "H"), either liquidates it investments or cancels its outstanding loans in the amount of the monetary right(s) transfer plus accrued interest income ((R (β, $))+i) transfer request in order to facilitate their transfer back to the MRT Network User's "home' financial institution via the MRT Network or liquidates it investments or cancels its outstanding loans up to the amount of the Fed debit/the bank's preferred capital ratio (PCR).

FIG. 39A illustrates STEP "I", where the Federal Reserve Bank, once notified of the monetary right(s) transfer plus accrued interest income ((R (β, $))+i), from the "external" financial institution to the MRT Network User's "home" financial institution, credits the "home" financial institution's Federal Reserve Bank account in the amount of the monetary right(s) transfer plus the accrued interest income ((R (β, $))+i), and debits the "external" financial institution's Federal Reserve Bank account for the amount of the monetary right(s) transfer plus the accrued interest income ((R (β, $))+i). Again, because this occurs using the Fedwire RTGS system, money does not move but, instead, the MRT Network User's "home" financial institution account maintained at the Federal Reserve Bank is credited in the amount of ((R (β, $))+i), and the "external" financial institution's account maintained at the Federal Reserve Bank is debited for the same amount (((R (β, $))+i).

FIGS. 39B and 39C are the MRT Network Fedwire EDI messages (138 & 139) employed to notify both the MRT Network User's "home" financial institution and the "external" financial institution that their Federal Reserve Bank accounts have been credited/debited respectively in the amount of the monetary right(s) transfer plus the accrued interest income ((R (β, $))+i) by the Federal Reserve Bank. Using the Fedwire system, no money moves, but both the MRT Network User's "home" financial institution and the "external" financial institution have their Federal Reserve Bank-maintained accounts adjusted by ((R (β, $))+i) to reflect the monetary right(s) plus accrued interest income transfer. Again, this is also reflected in FIGS. 10 & 11.

Figure 40:
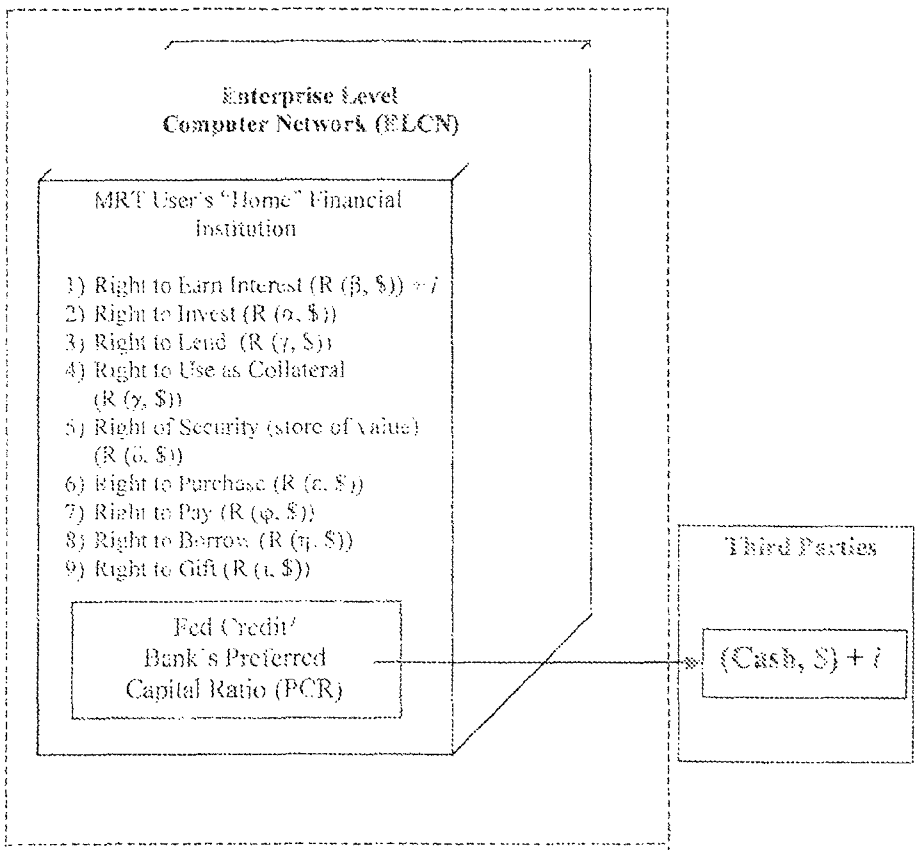
FIG. 40 is a schematic representation of Step "J" of the MRT Process via which, the "home" financial institution, upon receipt of the credit to its Federal Reserve Bank account in the amount of the monetary right(s) transfer plus earned interest, can then lend or invest that amount, or up to the amount of the Fed credit/the bank's preferred capital ratio (PCR), in cash.

As illustrated in FIG. 40, or STEP "J", Once the MRT Network User's "home" financial institution receives notice from the Federal Reserve Bank that its Federal Reserve Bank-maintained account has been credited in the amount of the monetary right(s) transfer, plus the accrued interest income ((R (β, $))+i), the "home" financial institution can then lend or invest cash (Cash, $) in the amount of the credit to its Federal Reserve Bank account up to the amount of the Fed credit/the bank's preferred capital ratio (PCR).

FIG. 41A illustrates STEP "K" of the MRT process, where MRT Network automatically reports to the Internal Revenue Service (IRS), as shown in FIGS. 10 and 11, that MRT Network User has earned taxable interest income in the monetary right(s) transfer process depicted in FIGS. 10, 11 and 34.

FIG. 41B depicts the MRT Network Fedwire EDI message (MRT Network Fedwire EDI message 140) employed to notify the Internal Revenue Service of the MRT Network User's earned interest income resulting from the monetary right(s) transfer to the "external" financial institution, for taxation purposes.

In order to keep track of the various MRT Network Fedwire EDI messages employed to facilitate both the initial monetary right to earn interest ((R (β, $)) transfer as well as the monetary right to earn interest plus the amount of accrued interest income ((R (β, $))+i) received at the "external" financial institution during the transfer period, the MRT Network of the present invention maintains a MRT Network Fedwire EDI Message Log, as shown in FIG. 42, which details each MRT Network Fedwire EDI message and includes the MRT Network User's "home" and "external" financial institution accounts, the "home" and "external" financial institutions' Federal Reserve Bank account numbers, the amount of the monetary right(s) transfer and the amount of the earned interest income.

Figure 43:
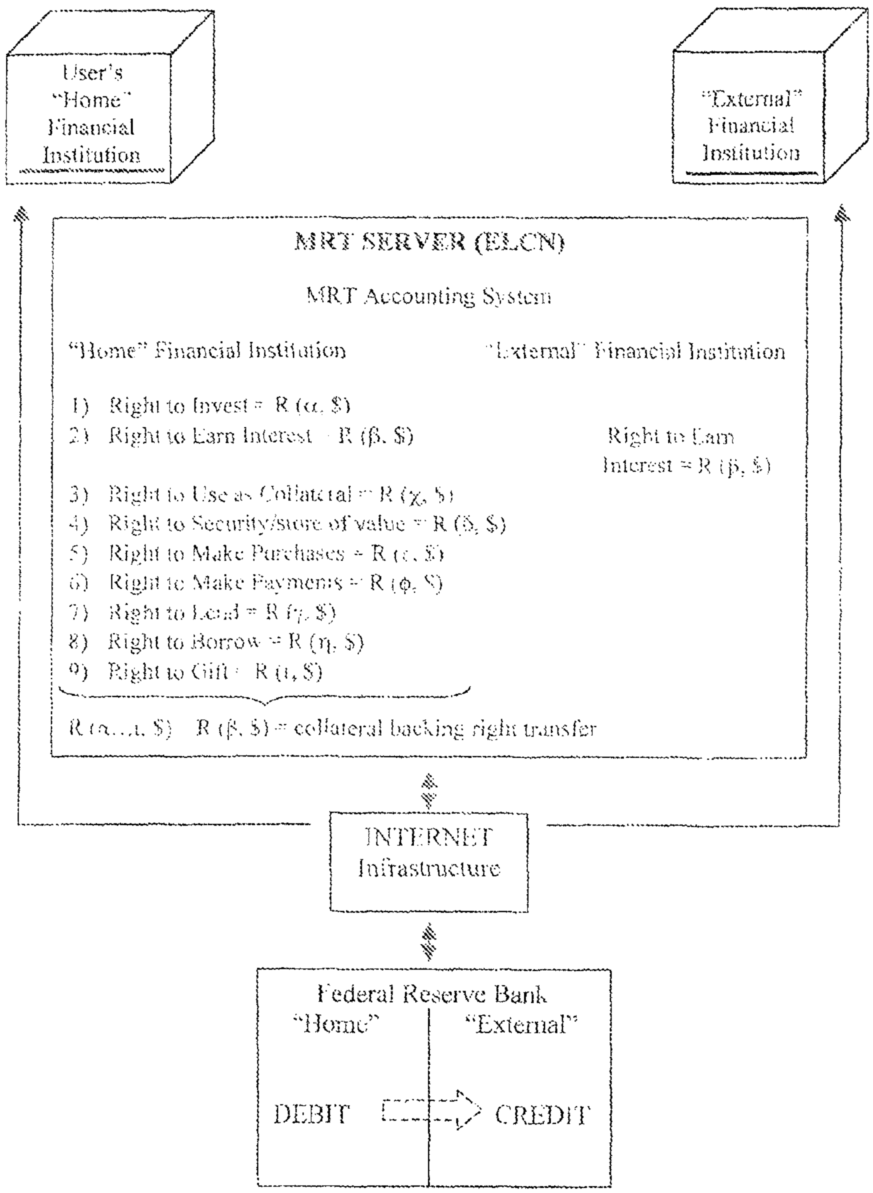
FIG. 43 is a schematic representation of an exemplary MRT Network Accounting Process supported by the MRT Server for monetary right(s) transfers and monetary right(s) collateral, whereby the MRT Server reports to the Federal Reserve Banking System, for each monetary right(s) transfer effected, that there is a subset of monetary right(s) residing at the "home" financial institution that fully collateralizes the transferred subset of monetary right(s) in a non-leveraged manner.

Furthermore, the MRT Network of the present invention also maintains its own monetary rights accounting process, supported by the MRT Server, in order to track and account for each monetary right(s) transfer and to account for, and assure, that the proper collateral backing the monetary right (s) transfer, in the form of a subset of monetary right(s) residing at the "home" financial institution that fully collateralizes the transferred subset of monetary right(s) in a non-leveraged manner, is maintained and accounted for, as shown in FIG. 43. Through this accounting process, the MRT Network of the present invention is able, to represent, and to demonstrate, to the Federal Reserve Bank that each monetary right(s) transfer is fully collateralized before the Federal Reserve Bank debits/credits the accounts of the two participating financial institutions—with the MRT Network of the present invention keeping electronic ledgers of all monetary right(s) transfers between an MRT Network User's "home" financial institution and any "external" financial institution to which the MRT Network User's monetary right(s) are transferred.

Manual Right to Earn Interest (REI) Transfer Processes According to the Present Invention (Method A)

Referring to FIGS. 29B, 44, 45A1, 45A2, 45A3, 45B and 46, the REI Transfer Method "A" will be described in greater detail.

As shown in FIG. 44, the Manual Transfer Process (Method "A") of the present invention, includes three different kinds of processes by which an accountholder on the MRT Network can manually transfer ones right to earn interest (R (β, $)) namely: the "Manual Unrestricted" Method; the "Manual Semi-Restricted" Method; and the "Manual Restricted" Method.

As shown in FIG. 44, when using the "Manual Unrestricted" Method, the accountholder selects from among the ranked institutions' accounts and products every time the accountholder accesses the system. The accountholder then selects from among the participating institutions' accounts and products and manually effects the R (β, $) transfer(s) receiving confirmation from the MRT Network of the completed transfer.

When using the "Manual Semi-Restricted" Method, the MRT Network notifies an accountholder (via email or other method) of better rate/yield opportunities available to the accountholder and to which, the accountholder can transfer the right to earn interest (R (β, $)). After such system notification, the accountholder then selects from among either the opportunities of which the system notified the accountholder or, from the ranked institutions' accounts and products, and effects the R (β, $) transfer(s) manually. The accountholder then receives confirmation, via the accountholder's preferred means, of the completed transfer(s).

When using the "Manual Restricted" Method, the MRT Network ranks institutions' rate(s)/yield(s) accounts and products based on an accountholder's pre-specified transfer criteria. The accountholder then manually selects from among the ranked, displayed options and effects the manual transfer of right to earn interest (REI) (R (β, $)). The accountholder then receives confirmation, via the accountholder's preferred means, of the completed REI transfer(s).

Figure 46:
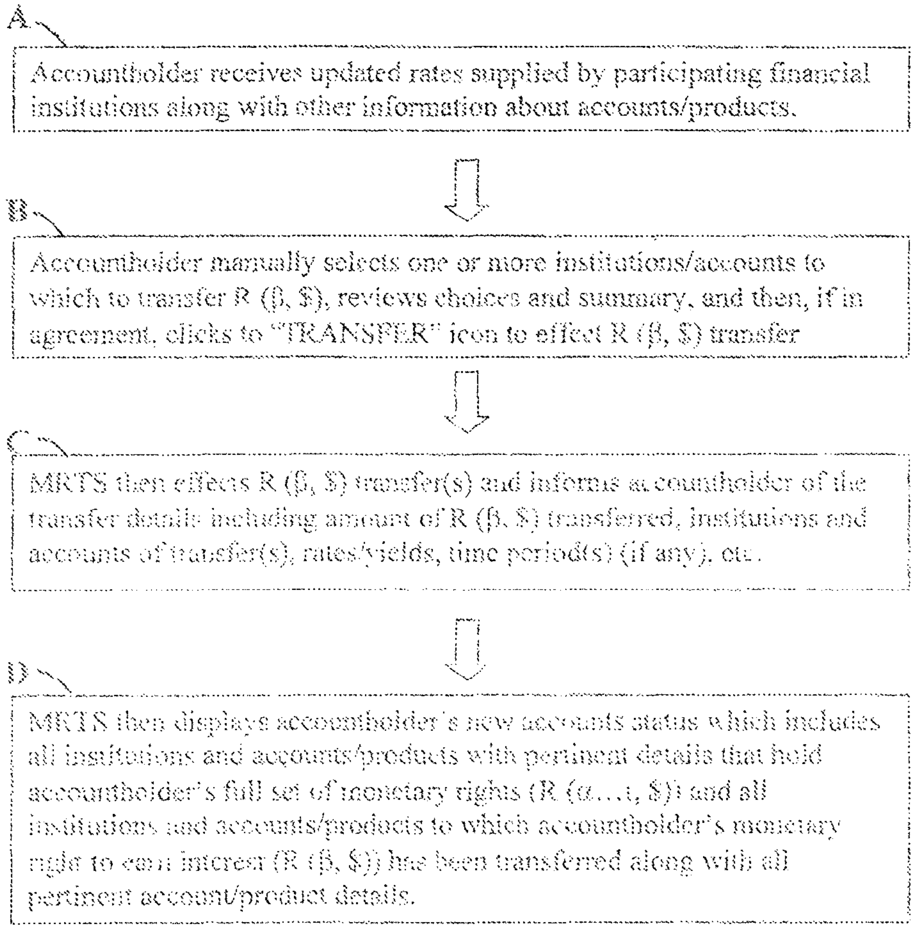
FIG. 46 is a flow chart depicting the various steps carried out during Transfer Method A illustrated in FIGS. 45A1-3 and 45B, allowing a system user to manually transfer R (β, $) via the MRT Network of the present invention.

As indicated at Block A in FIG. 46, the accountholder receives updated rates supplied by participating financial institutions recognized as members on the MRT Network, along with other information about accounts and products. At Block B, the accountholder manually selects one or more institutions/accounts to which to transfer R (β, $), reviews choices and summary, and then if in agreement, clicks TRANSFER icon on a control panel so as to effect the R (β, $) transfer. At Block C, the MRT Network then effects R (β, $) transfer(s) and informs accountholder of the transfer details including the amount of R (β, $) transferred, institutions and accounts of transfers, rate/yields, time periods(s), if any, etc. At Block D, the MRT Network then displays the accountholder's new accounts status which includes all institutions and accounts/products with pertinent details that holds accountholder's full set of monetary rights (R (α . . . ι, $) and all institutions and accounts/products to which accountholder's monetary right to earn interest (R (β, $)) has been transferred along with all pertinent account/product details. This method is particularly suited for those accountholders who wish to exercise a high degree of control over all aspects of REI transfer.

"Accountholder-Specified Criteria" REI Transfer Processes According to the Present Invention (Method B)

Referring to FIGS. 29B, 47, 48A1, 48A2, 48A3, 48B, 49A and 49B, the REI Transfer Method "B" will be described in greater detail.

Figure 47:
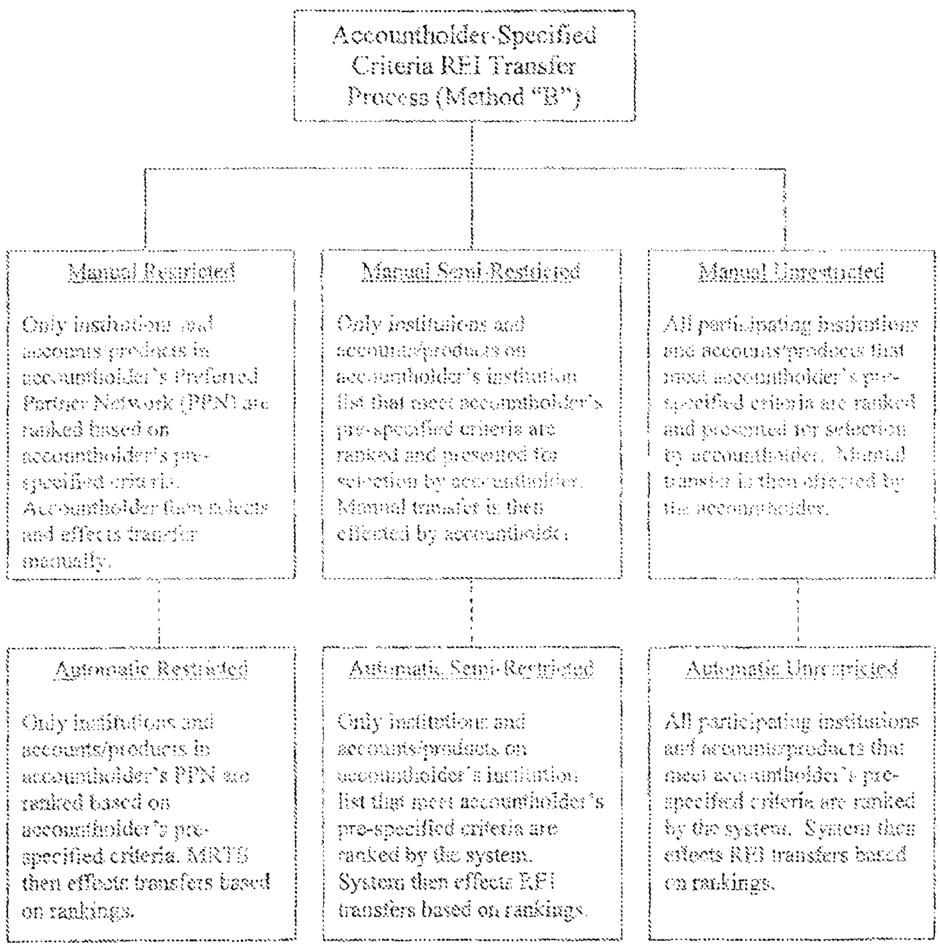
FIG. 47 is a schematic representation illustrating, in greater detail, the structure of the Accountholder-Specified Criteria Right to Earn Interest (REI) Transfer Method "B" indicated in FIG. 29B, showing various processes by which an accountholder can effect both manual and automatic transfer transfers of the right to earn interest (R (β, $)) (and/or other monetary right(s)) on the MRT Network.

As shown in FIG. 47, the Accountholder-Specified Criteria REI Transfer Process (Method "B") of the present invention, includes six different kinds of processes by which an accountholder on the MRT Network can manually transfer one's right to earn interest (R (β, $)) namely: "Manual Restricted" Method; "Manual Semi-Restricted" Method; "Manual Unrestricted" Method; "Automatic Restricted" Method; "Automatic Semi-Restricted" Method; and the "Automatic Unrestricted" Method. In each method shown, the accountholder pre-specifies criteria that determine how the MRT Network of the present invention will rank and display institutions' accounts and products based on factors ranked by the accountholder. Establishing (and updating) R (β, $) transfer criteria requires an accountholder to rank variables related to participating institutions' accounts and products, and to the accountholder's own interests including, but not limited to, interest rates/yields, safety and credit ratings, deposit insurance afforded, transfer frequency, types of accounts/products, specific types of institutions, specific institutions, tax treatment, duration, fees, charges and penalties, local, national and/or international institutions, and establishment of various idiosyncratic formulas for governing transfers. The MRT Network will rank and display R (β, $) transfer opportunities among participating institutions based on an accountholder's rankings. An accountholder can employ multiple rankings of transfer criteria to further diversify transfer opportunities. Furthermore, this process is not limited only to transfers of the right to earn interest (R (β, $)), but is applicable to any of the other individual, separable rights possessed by an owner of money.

Once the accountholder has established the R (β, $) transfer criteria, there are then at least six different iterations of the Accountholder-Specified Criteria REI Transfer Process that an MRT Network accountholder may employ.

As shown in FIG. 47, when using the "Manual Restricted" Method, the accountholder pre-specifies criteria (highest rate/yield, credit, local, etc.), based upon only accounts and products offered by institutions in the accountholder's "Preferred Partner Network" (PPN) that the accountholder deems important with regard to effecting an REI transfer. The MRT Network then ranks and displays institutions' accounts and products based on the accountholder's pre-specified transfer criteria. The accountholder then selects from among the ranked and displayed accounts and products and effects the REI transfer(s) manually via the system of the present invention. The accountholder then receives confirmation, via the accountholder's preferred means, of the completed REI transfer(s).

When utilizing the "Manual Semi-Restricted" transfer option on the MRT Network, the accountholder, having pre-specified REI transfer criteria, is shown only institutions' accounts and products from institutions on the accountholder's institutions list. These institutions' accounts and products are ranked and displayed based on the accountholder's pre-specified REI transfer criteria. The accountholder then selects from among the ranked products and accounts and effects the REI transfer(s) manually via the MRT Network of the present invention. The accountholder then receives confirmation, via the accountholder's preferred means, of the completed REI transfer(s).

The MRT Network accountholder, when using the "Manual Unrestricted" Method, has all registered institutions' accounts and products ranked and displayed based on the accountholder's pre-specified REI transfer criteria. The accountholder then selects from among the ranked products and accounts and effects the REI transfer(s) manually via the MRT Network of the present invention. The accountholder then receives confirmation, via the accountholder's preferred means, of the completed REI transfer(s).

Prior to utilizing any of the automated REI transfer options provided by the MRT Network, the accountholder has to elect to give the MRT Network the authority to make automated transfers on the accountholder's behalf.

When using the "Automatic Restricted" Method, the MRT Network continually ranks only those institutions' accounts and products that are included in the accountholder's PPN, based on the accountholder's pre-specified REI transfer criteria. The MRT Network of the present invention then effects REI transfers automatically, with the frequency of the REI transfers pre-determined by the accountholder's pre-specifications. The accountholder then receives confirmation, via the accountholder's preferred means, of the completed REI transfer(s).

When using the "Automatic Semi-Restricted" Method, only institutions' accounts and products on the accountholder's preferred institutions list are continually ranked by the MRT Network based on the accountholder's pre-specified REI transfer criteria. Based upon the desired REI transfer frequency, as indicated by the accountholder in the "REI Transfer Frequency Filter" control panel (FIG. 84), the MRT Network automatically effects REI transfers on the accountholder's behalf. The accountholder then receives confirmation, via the accountholder's preferred means, of the completed REI transfer(s).

In the "Automatic Unrestricted" Method, all participating, registered institutions' accounts and products, that meet the accountholder's pre-specified REI transfer criteria, are continually ranked by the MRT Network. The MRT Network then effects REI transfers on the accountholder's behalf, with the frequency of such transfers pre-determined by the MRT Network accountholder via the control panel shown in FIG. 84. The accountholder then receives confirmation, via the accountholder's preferred means, of the completed REI transfer(s).

FIGS. 48A1 through 48A3 and 48B1, taken together, set forth a schematic representation illustrating the User-Specified Criteria Right(s) Transfer Process (Method "B") depicted in FIG. 47, illustrating that a system user/accountholder can pre-specify criteria by which the system will rank participating institutions' accounts/products for the system user, and then the system user can either effect a manual transfer of R (β, $) using the system's rankings, or the system user can, via pre-specification, allow the system to effect transfers automatically based on rankings of the user's pre-specified criteria, and throughout the process the system provides data regarding account balances, the transfer process and an "Accounts Status (New)" at the completion of the process.

After securely logging-in to the MRT Network of the present invention, an accountholder chooses to "Make Transfer" and is then shown various balances held in the accountholder's various financial accounts and products at various financial institutions (FIG. 48A1). The accountholder then sees a screen (FIG. 48A2) that displays the system-ranked and recommended accounts and products, which are based on criteria pre-specified by the MRT Network accountholder and, which, are derived from the various rate feeds supplied by participating financial institutions on the MRT Network. From this screen the accountholder then selects the institution(s)/account(s) and/or product(s) to which to transfer the right to earn interest (R (β, $)).

The accountholder then sees a screen (FIG. 48A3) confirming the accountholder's choice(s); if correct the accountholder clicks the "TRANSFER" icon and receives a message confirming that the right transfer has been effected.

The accountholder then sees a new screen (FIG. 48B1) "Accounts Status (NEW)" which provides updated information on the accountholder's various balances in institutions' accounts and products.

Figure 49A:
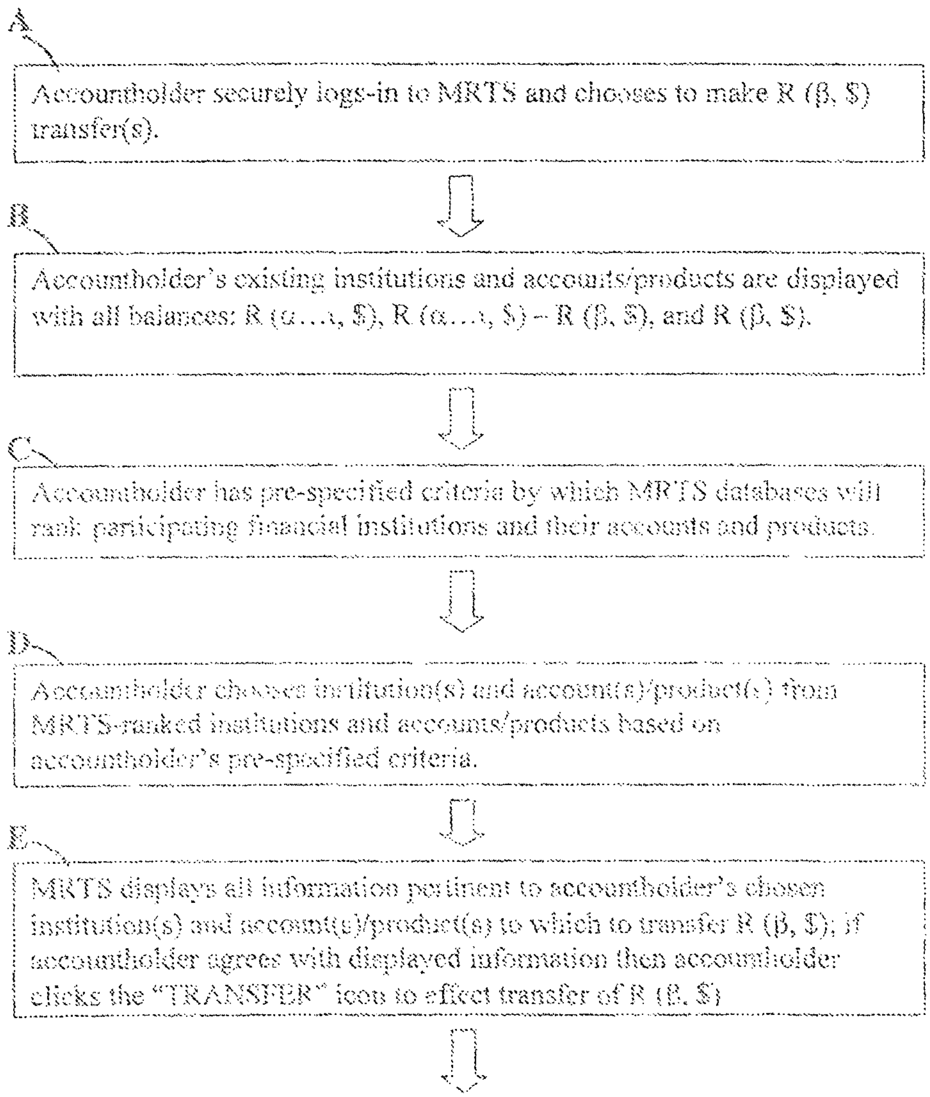
FIGS. 49A and 49B, taken together, set forth a flow chart depicting the various steps in REI Transfer Method B of FIGS. 48A1 through 48A3 and 48B1, allowing a system user to transfer R (β, $), either manually or automatically, after pre-specifying R (β, $) transfer criteria and receiving rankings of various institutions' accounts and products based on the pre-specified criteria via the system of the present invention.
Figure 49B:
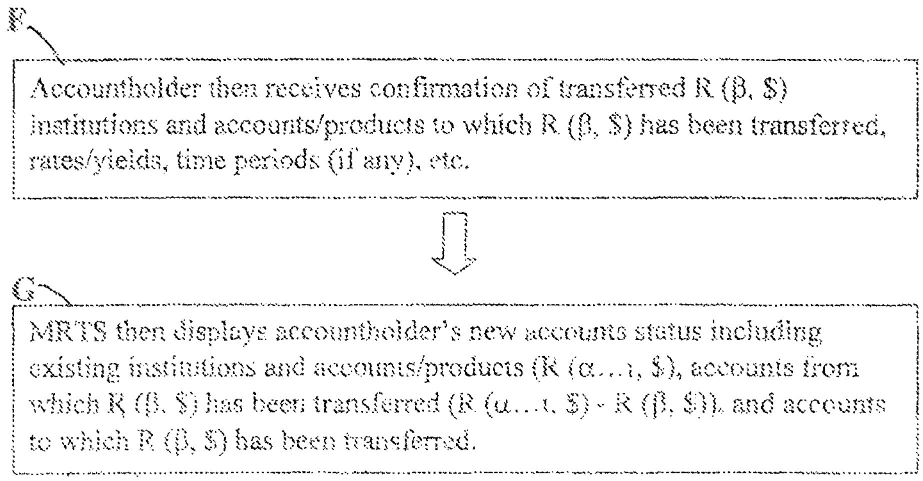

FIGS. 49A and 49B, taken together, set forth a flow chart that depicts the various steps in Method "B" illustrated in FIGS. 48A1-3 and 48B1 that allow a system user to transfer R (β, $), either manually or automatically, after pre-specifying R (β, $) transfer criteria and, in the manual iterations, receiving rankings of various institutions' accounts and products based on the pre-specified criteria via the system of the present invention. In the automated iterations, the MRT Network automatically effects transfers on an accountholder's behalf based on the accountholder's pre-specified REI transfer criteria.

As indicated at Block A in FIG. 49A, the accountholder securely logs-in to the MRT Network of the present invention and chooses to make an REI (or other monetary right) transfer via the MRT Network. At Block B, the accountholder's existing institutions and accounts/products are displayed with all balances: R (α . . . ι, $), R (α . . . ι, $)−R (β, $), and R (β, $). At Block C, the accountholder has pre-specified REI transfer criteria by which the MRT Network databases will rank participating financial institutions and their accounts and products. At Block D, the MRT Network accountholder, in the manual iterations of Method "B", chooses an institution(s) and account(s)/product(s) from MRT-ranked institutions and accounts/products based on the accountholder's pre-specified REI transfer criteria. At Block E, the MRT Network displays all information pertinent to the accountholder's chosen institution(s) and account(s)/product(s) to which to transfer the accountholder's right to earn interest (R (β, $)); if the accountholder agrees with the displayed information, then the accountholder clicks the "TRANSFER" icon to effect a manual transfer of the right to earn interest (R (β, $)). At Block F in FIG. 49B, the accountholder receives confirmation of the transferred R (β, $), the names of the institutions' account(s)/product(s) to which the accountholder's R (β, $) has been transferred, and all of the pertinent information with regard to the account(s)/product(s) including: rate(s)/yield (s), time periods (if any), etc. At Block G, the MRT Network then displays the accountholder's new accounts status including existing institutions and accounts/products' R (α . . . ι, $), accounts from which R (β, $) has been transferred (R (α . . . ι, $)−R (β, $)), and accounts to which R (β, $) has been transferred.

Notably, for the automatic REI transfer iterations of Method "B", Blocks A-C are the same as in the manual iterations; however, Block D and Block E will consist of the MRT Network effecting the REI transfer automatically on the MRT Network accountholder's behalf based on the accountholder's pre-specified REI transfer criteria. Block F and Block G will remain the same.

The system and method of the invention may provide a "right of first refusal" (See FIGS. 71A-D and 72) option to the system user's "home" institution(s) whereby the "home" institution would have a finite time period, determined by the system user, to decide whether or not to match competitors' offers prior to having the user's monetary right to earn interest (R (β, $)) transferred. Furthermore, the system would provide to the user's "home" institution(s) the opportunity to match or beat a competing offer even after the user's monetary right to earn interest (R (β, $)) had been transferred to an "external" institution(s). In such a case, the user would be apprised of the "home" institution's offer and would then have the option as to whether or not to accept said offer. The "home" institution would then facilitate (pay) for any transfer costs associated with transferring the system user's monetary right to earn interest (R (β, $)) back to the "home" institution.

Another benefit to banks' and other participating financial institutions' participation is that they may be able to provide their customers with higher rates of interest through a right-of-first-refusal option (See FIGS. 71A-D and 72) whereby the "home" or "external" bank(s) holding the system user's monies would have the opportunity to improve its own terms or, match or beat other offers from any other banks or financial institutions before the system user's monetary right to earn interest (R (β, $)) is transferred to other institutions. This would allow any bank or participating financial institution to compete on an individualized basis for a system user's monies as opposed to offering the same rate to the universe of potential customers. A bank might be willing to match or beat an offer from a competitor if it thought it might be able to sell the system user other, more lucrative, financial products and services. Obviously, banks offering higher rates of interest are trying to attract additional monies to their accounts and products. As an example, ABC Bank, which may offer a full range of banking and other financial products and services, may not be able to offer optimal interest rates on a range of accounts and instruments due to its high overhead and fixed costs. XYZ Bank may only offer checking, savings, CD's and other accounts on which it can pay much higher, or even optimal, interest rates because it doesn't have high overhead and fixed costs. Through use of the system of the invention, ABC Bank's customers can receive higher rates on their monies and investments at ABC Bank if ABC Bank chooses to match or beat XYZ Bank's (or any other bank's or institution's offer(s)) through the system's right-of-first-refusal feature.

"Preferred Partner Network (PPN)" Right to Earn Interest (REI) Transfer Processes According to the Present Invention (Method C)

Referring to FIGS. 29B, 50, 51A1, 51A2, 51A3, 51A4, 51B1, 52A and 52B the REI Transfer Method "C" will be described in greater detail.

Figure 50:
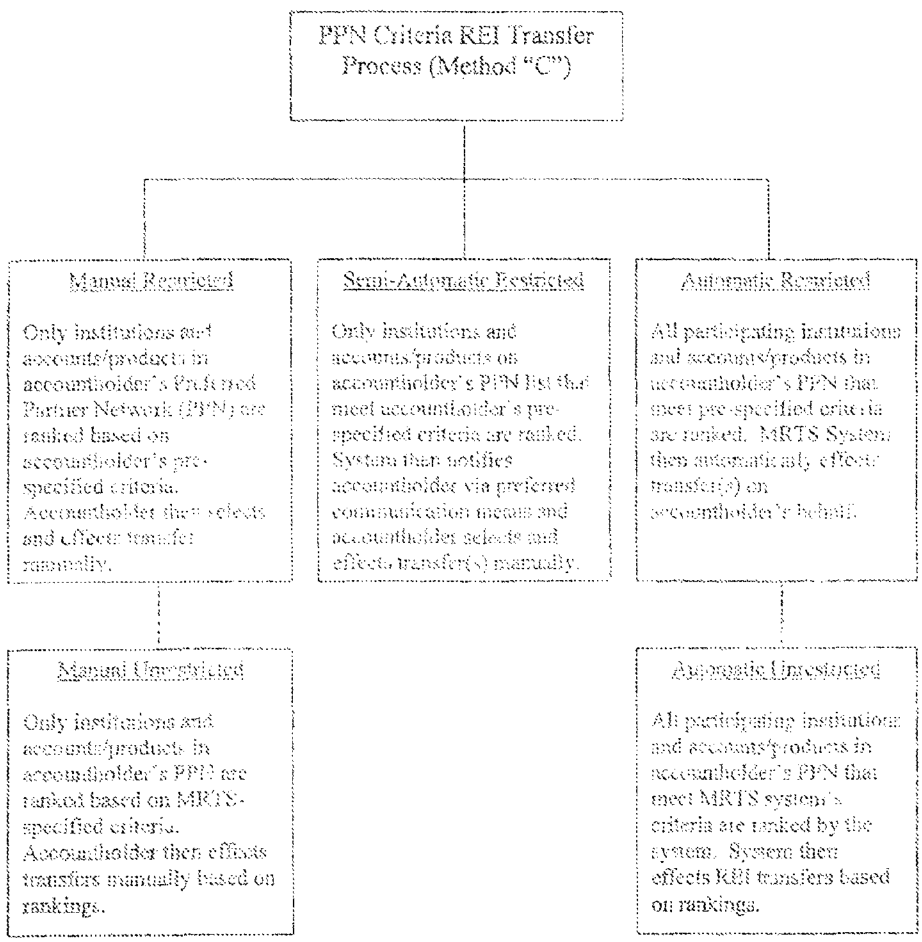
FIG. 50 is a schematic representation, illustrating, in greater detail, the structure of the Preferred Partner Network (PPN) REI Transfer Method "C" indicated in FIG. 29B, and showing various processes by which an accountholder can effect both manual and automatic transfers of the right to earn interest (R (β, $)) over the MRT Network.

FIG. 50 is a flow chart depicting the MRT Network Preferred Partner Network (PPN) REI Transfer Process and five of the different iterations of Method "C" including both manual and automatic REI transfer options. The MRT Network accountholder begins by pre-establishing R (β, $) transfer criteria based on select institutions (or select accounts/products) with whom (which) the accountholder prefers to conduct all R (β, $) transfers via the MRT Network.

Figure 81:
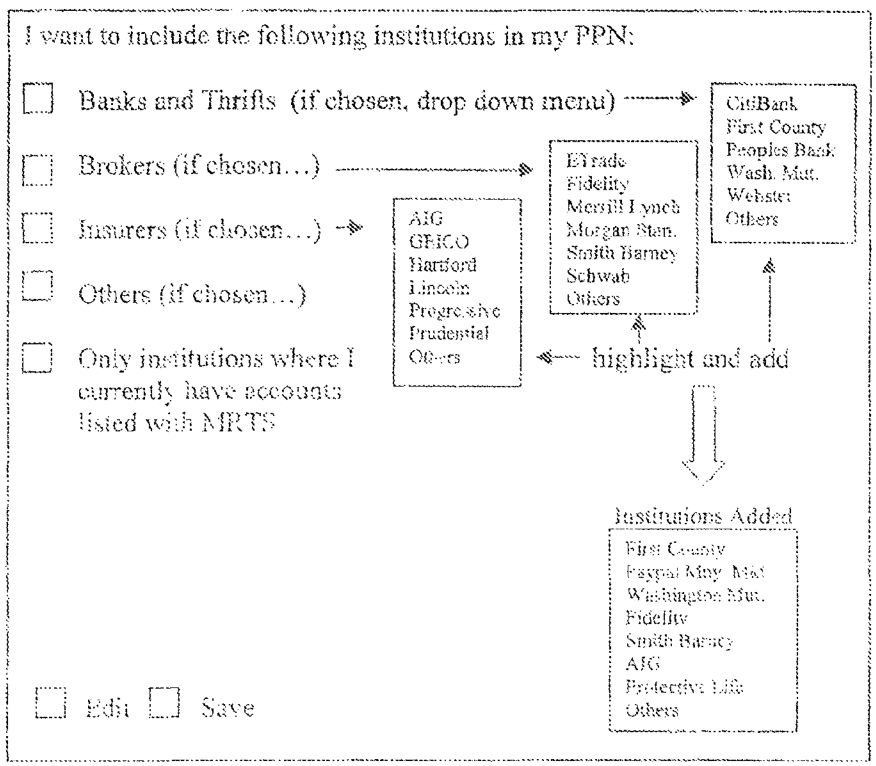
FIG. 81 is a schematic representation of a Web-based control panel that allows an accountholder on the MRT Network to specify which banks and/or institutions, and/or accounts and products, to include in the accountholder's Preferred Partner Network (PPN), for the purpose of effecting transfers of R (β, $)

The accountholder then pre-specifies, via PPN control panel shown in FIG. 81, to make a PPN criteria (Method "C") REI transfer and has an option of picking between five separate iterations of this R (β, $) transfer process.

The first is the "Manual Restricted" iteration, by which an accountholder, after having logged-in to the MRT Network, requests rankings of only pre-chosen institutions' accounts and products based on pre-specified REI transfer criteria. Only institutions' accounts/products (or accounts/products) in the accountholder's PPN are ranked and displayed based on an accountholder's pre-specified REI transfer criteria. The accountholder then selects from among the displayed ranked choices and effect an R (β, $) transfer(s) manually. The accountholder then receives confirmation, via the accountholder's preferred means, of the completed REI transfer(s).

In the "Semi-Automatic Restricted" iteration, only institutions' accounts/products (or accounts/products) that meet an accountholder's pre-specified R (β, $) transfer criteria are ranked by the MRT Network of the present invention. The MRT Network then notifies the accountholder, via the accountholder's preferred contact method of a transfer(s) opportunity, and the accountholder then selects and effects the R (β, $) transfer manually from the MRT Network ranked and displayed institutions' accounts/products (or accounts/products). The accountholder then receives confirmation, via the accountholder's preferred means, of the completed REI transfer(s).

In the "Automatic Restricted" R (β, $) transfer iteration of Method "C", all participating PPN institutions' accounts/products that meet the accountholder's pre-specified R (β, $) transfer criteria are ranked by the MRT Network. Then, based on pre-approval to make automatic REI transfers given by the accountholder in the control panel shown in FIG. 65, the MRT Network effects the R (β, $) transfer automatically on behalf of the accountholder. The accountholder then receives confirmation, via the accountholder's preferred means, of the completed REI transfer(s).

In the "Manual Unrestricted" R (β, $) transfer iteration, only institutions' accounts/products in the accountholder's PPN are ranked based not on the MRT Network accountholder's pre-specified REI transfer criteria, but on MRT Network-specified REI transfer criteria. The accountholder then chooses from among the MRT Network-ranked PPN accounts/products and effects the R (β, $) transfer manually. The accountholder then receives confirmation, via the accountholder's preferred means, of the completed REI transfer(s).

Finally, in the "Automatic Unrestricted" R (β, $) transfer process, all participating, registered PPN institutions' accounts/products that meet the MRT Network's R (β, $) transfer criteria are ranked by the MRT Network. The MRT Network, having received accountholder pre-approval via the control panel shown in FIG. 81, then effects the R (β, $) transfer(s) automatically on behalf of the MRT Network accountholder. The accountholder then receives confirmation, via the accountholder's preferred means, of the completed REI transfer(s).

As in previous embodiments of the present invention, throughout the transfer process the accountholder is presented with different screens apprising the accountholder of the status of the transfer process.

Figure 52A:
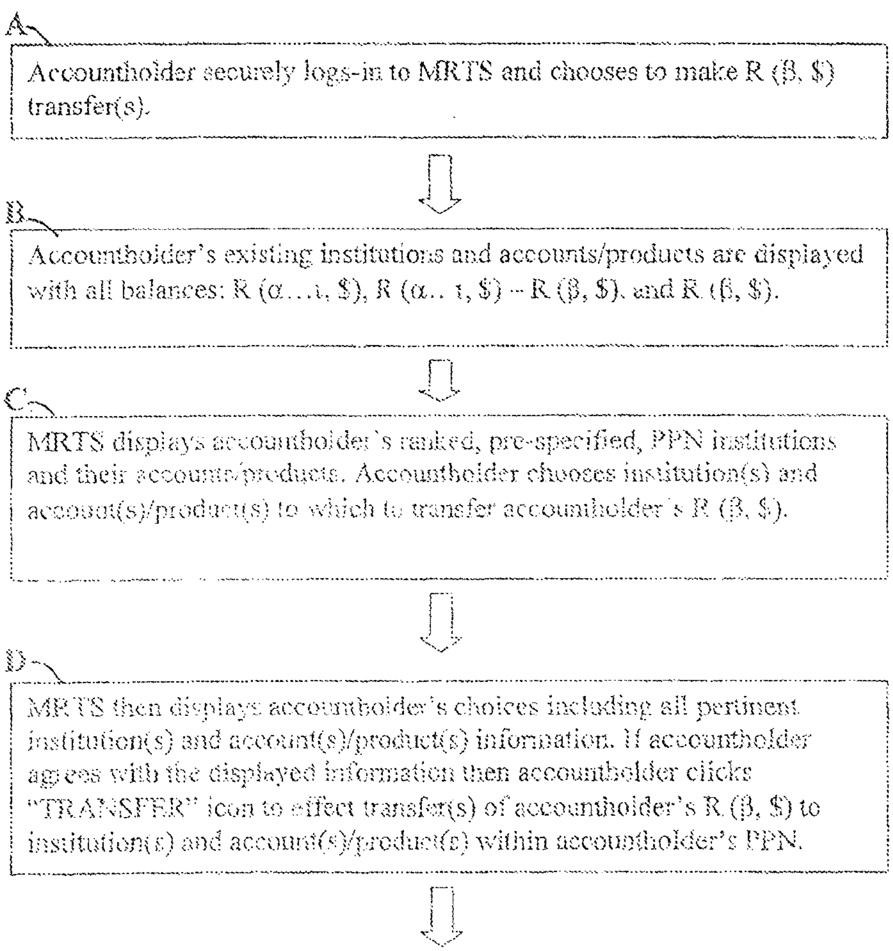
FIGS. 52A and 52B, taken together, set forth a flow chart depicting the various steps in REI Transfer Method C that allow a system user to pre-specify institutions (or products/accounts) to which to transfer R (β, $), either manually or automatically, after pre-specifying R (β, $) transfer criteria and receiving rankings of the pre-specified institutions' accounts and products based on the pre-specified criteria via the MRT Network of the present invention.
Figure 52B:
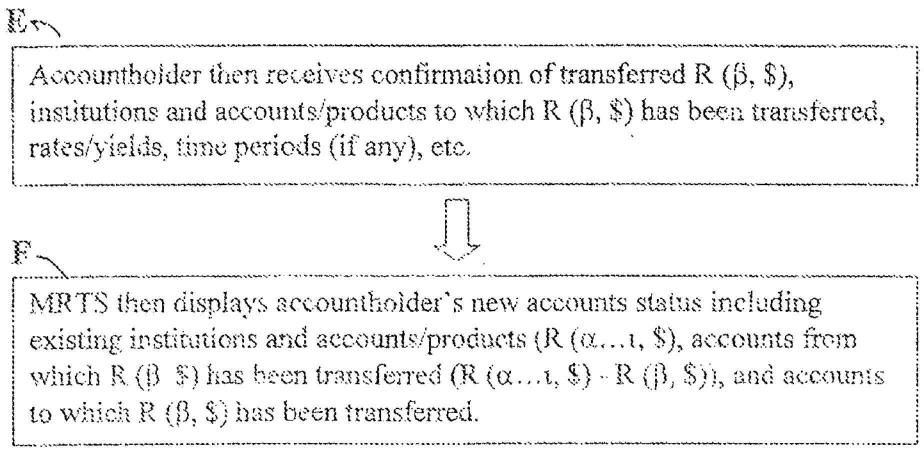

FIGS. 51A1-4 and 51B1, taken together, set forth a schematic representation depicting the various steps in the Method "C" illustrated in FIGS. 52A and 52B that allow a user to pre-specify certain participating institutions (preferred partners) to which to transfer an MRT Network accountholder's R (β, $) based on the accountholder's or the system's rankings of those institutions' accounts and products, with the actual transfer(s) either being effected manually by the system user or, automatically by the system based on the user's (or system's) pre-specified REI transfer criteria and, as with other transfer methods, the system provides account balances, (R (β, $)) transfer progress and an "Accounts Status (New)" at the completion of the process.

After securely logging-in to the MRT Network, the MRT Network accountholder is presented with a screen (FIG. 51A1) that shows the accountholder's existing institutions' accounts and products, existing balances, and the amount available for interest right (R (β, $)) transfer(s). From this screen the MRT Network accountholder chooses from which accounts to transfer the accountholder's REI. (In the automatic transfer iterations, the accountholder will pre-choose from which accounts the MRT Network will effect automatic REI transfers on the accountholder's behalf).

FIG. 51A2 shows a screen that provides an MRT Network accountholder's Preferred Partner Network (PPN) institutions, as pre-chosen by the MRT Network accountholder.

The accountholder is presented with a new screen (FIG. 51A3) that has ranked the accountholder's PPN institutions' accounts/products based on the accountholder-specified R (β, $) transfer criteria. From this screen the accountholder indicates to which institutions' accounts/products to transfer the accountholder's right to earn interest (R (β, $)).

The accountholder is then presented with a screen (FIG. 51A4) that confirms all of the relevant details of the accountholder's intended R (β, $) transfer(s), and if the accountholder agrees with the information presented by the MRT Network, the accountholder then clicks on the "TRANSFER" icon to effect the intended R (β, $) transfer(s).

The accountholder immediately receives a message confirming all of the details of the just-executed R (β, $) transfer (s). The accountholder is then presented with a new screen (FIG. 51B1), "Accounts Status (NEW)", that displays all of the accountholder's accounts/products, balances, interest rates/yields, etc., post-R (β, $) transfer(s).

FIGS. 52A and 52B, taken together, set forth a flow chart that depicts the various steps in Method "C" illustrated in FIGS. 51A1-4 and 51B1 that allow an accountholder to transfer R (β, $) via the accountholder's pre-established PPN, either manually or automatically, after pre-specifying R (β, $) transfer criteria (or utilizing the MRT Network's REI transfer criteria) and receiving rankings of various institutions' accounts and products, based on the accountholder's pre-specified criteria, via the system of the present invention. In the automated iterations of Method "C", the accountholder doesn't receive the PPN institutions' accounts/products rankings, as the MRT Network either utilizes the accountholder's pre-specified REI transfer criteria, or that REI transfer criteria proprietary to the MRT Network, to effect REI transfers.

As indicated in Block A in FIG. 52A, an MRT Network accountholder securely logs-in to the MRT Network and chooses to make an R (β, $) transfer(s). At Block B the MRT Network accountholders' existing institutions and account/products are displayed with all balances: R (α . . . ι, $), R (α . . . ι, $)−R (β, $), and R (β, $). At Block C the MRT Network displays an accountholder's ranked, pre-specified, PPN institutions and their accounts/products (or accounts/products). The accountholder then chooses institution(s) and account(s)/products (or account(s)/product(s) to which to transfer the accountholder" REI (R (β, $)). At Block D the MRT Network then displays the accountholder's REI transfer choices, including all pertinent institution(s) and account(s)/product (s) (or account(s)/product(s)). If the MRT Network accountholder agrees with the displayed information, then the accountholder clicks the "TRANSFER" icon to effect transfer(s) of the accountholder's REI (R (β, $)) to the chosen institution(s) and account(s)/product(s) (or account(s)/product(s)) within the accountholder's PPN. At Block E in FIG. 52B, the accountholder then receives confirmation of the transferred R (β, $), institution(s) and account(s)/product(s) to which the accountholder's R (β, $) has been transferred, and all relevant information relating to rates/yields, time periods (if any), etc. At Block F, the MRT Network then displays the accountholder's new accounts status including existing institutions and accounts/products R (α . . . ι, $), accounts from which the accountholder's R (β, $) has been transferred (R (α . . . ι, $)–R (β, $)), and accounts to which the accountholder's R (β, $) has been transferred.

Notably, for the automatic REI transfer iterations of Method "C", the Blocks A-C are the same as in the manual iterations; however, Block D will consist of the MRT Network effecting the REI transfer automatically on the MRT Network accountholder's behalf based on the accountholder's pre-specified REI transfer criteria or, on the MRT Network's REI transfer criteria. Block F will remain the same.

System-Selected" REI Transfer Processes According to the Present Invention (Method "D")

Referring to FIGS. 29B, 53, 54A1, 54A2, 54B1, 55A & 55B, the REI Transfer Method "D" will be described in greater detail.

Figure 53:
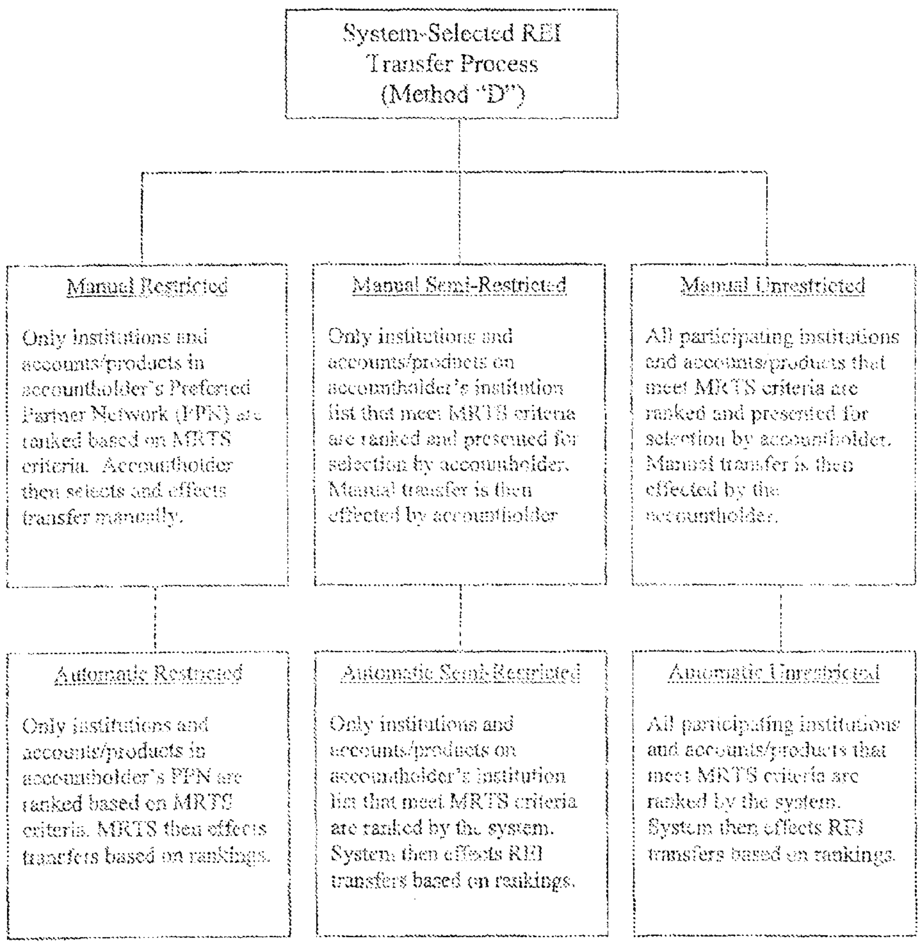
FIG. 53 is a schematic representation, illustrating in greater detail, the structure of the System-Selected REI Transfer Method "D" of FIG. 29B, and showing various processes by which an accountholder can effect both manual and automatic transfers of the right to earn interest (R (β, $))

FIG. 53 is a flow chart depicting the MRT Network-selected REI Transfer Process and six of the different iterations of Method "D", including both manual and automatic REI transfer options. As opposed to using accountholder pre-established REI transfer criteria as shown in previous REI transfer methods, this process uses the MRT Network's REI transfer criteria to recommend institutions' accounts/products for manual REI transfers and, by which, to effect automatic REI transfers on the accountholder's behalf. Under this R (β, $) transfer method, the accountholder can still pick preferred institutions (PPN), a broader list of institutions, or open up the ranking process to all participating institutions.

In the "Manual Restricted" iteration of Method "D", only institutions' accounts/products pre-specified in the accountholder's PPN are ranked and displayed based on the MRT Network's REI transfer criteria. From these rankings, the accountholder then selects institutions' account(s)/product(s) to which to transfer the accountholder's R (β, $), and then the MRT Network accountholder effects the R (β, $) transfer manually. The accountholder then receives confirmation, via the accountholder's preferred means, of the completed REI transfer(s).

Figure 80:
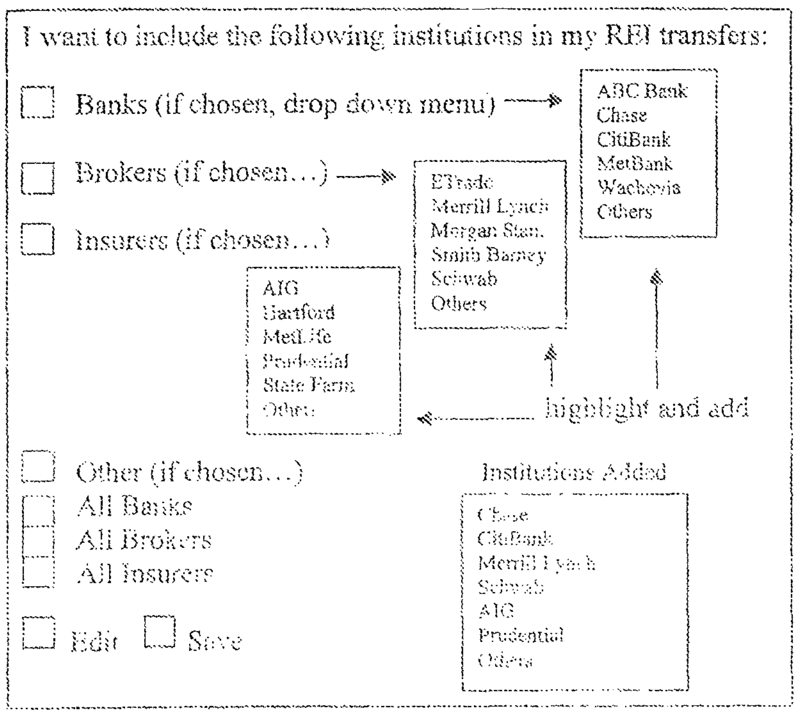
FIG. 80 is a schematic representation of a Web-based control panel that allows an accountholder on the MRT Network to specify which institutions to include when the MRT Networks automatically ranks participating financial institutions via absolute rate/yield, the accountholder's pre-specified criteria, and/or the system's criteria, for the purpose of effecting transfers of R(β, $)

Under the "Manual Semi-Restricted" iteration of Method "D", only the institutions' accounts/products on the accountholder's institutions list, are shown in the "Institution Transfer List" control panel in FIG. 80, that meet the MRT Network's R (β, $) transfer criteria are ranked and displayed for perusal by the accountholder. The accountholder then selects and effects the R (β, $) transfer(s) manually. The accountholder then receives confirmation, via the accountholder's preferred means, of the completed REI transfer(s).

In the "Manual Unrestricted" iteration of Method "D" all participating, financial institutions' accounts/products that meet the MRT Network's R (β, $) transfer criteria are ranked and presented for selection by the accountholder. The MRT Network accountholder then selects and effects the R (β, $) transfer(s) manually. The accountholder then receives confirmation, via the accountholder's preferred means, of the completed REI transfer(s).

In the "Automatic Restricted" iteration of Method "D" only institutions' accounts/products pre-specified in the accountholder's PPN (see FIG. 81) are ranked based on the MRT Network's R (β, $) transfer criteria. The MRT Network then effects R (β, $) transfer(s) automatically on behalf of the accountholder, as pre-approved by the accountholder via the control panel shown in FIG. 83. The accountholder then receives confirmation, via the accountholder's preferred means, of the completed REI transfer(s).

In the "Automatic Semi-Restricted" iteration of Method "D" only institutions' accounts/products on the accountholder's "Institution Transfer List" control panel (see FIG. 64) that meet the MRT Network's R (β, $) transfer criteria are ranked by the MRT Network. The MRT Network then effects R (β, $) transfer(s) automatically on behalf of the accountholder via the pre-approval granted by the accountholder in the control panel shown in FIG. 92. The accountholder then receives confirmation, via the accountholder's preferred means, of the completed REI transfer(s).

Finally, in the "Automatic Unrestricted" iteration of Method "D" all participating financial institutions' accounts/products that meet the MRT Network's R (β, $) transfer criteria are ranked by the MRT Network. The MRT Network then effects R (β, $) transfer(s) automatically on behalf of the accountholder, again via the approval granted by the accountholder via the control panel shown in FIG. 92. The accountholder then receives confirmation, via the accountholder's preferred means, of the completed REI transfer(s).

FIGS. 54A1, 54A2 and 54B1, taken together, set forth a schematic representation of the System-Selected Criteria Right(s) Transfer Process (Method "D") that allows a system user to turn over the entire REI transfer process to the system of the present invention with automatic transfers of R (β, $) based on the system's own criteria or, to receive the rankings based on the system-selected criteria and then effect manual right(s) transfers, with the MRT Network providing account balances, transfer progress and an "Account Status (NEW)" at the end of the right(s) transfer process.

FIGS. 54A1, 54A2 and 54B1 show a schematic representation of the MRT Network-selected Criteria Right(s) Transfer Process (Method "D") that allows an MRT Network accountholder to utilize the proprietary R (β, $) transfer criteria of the MRT Network to effect R (β, $) transfers. The example shown is the "Automatic Unrestricted" iteration of Method "D".

After logging-in and deciding to effect an R (β, $) transfer, the MRT Network accountholder is then presented with a screen (FIG. 54A1) that provides the accountholder with all existing account information as known to the MRT Network. From this screen the accountholder then selects from which account(s)/product(s) to transfer the accountholder's R (β, $).

The accountholder then clicks on the "Make Automatic Transfer" icon to effect the "Automatic Unrestricted" R (β, $) transfer process.

FIG. 54A2, a new screen presented to the accountholder, shows all participating institutions' accounts/products that meet the MRT Network's R (β, $) transfer criteria, ranked for the benefit of the accountholder. As the MRT Network is effecting the automatic R (β, $) transfer(s) on behalf of the accountholder, the next thing the accountholder sees is the message confirming all of the relevant details of the MRT Network's automatic R (β, $) transfer(s).

The accountholder is then presented with a new screen, "Accounts Status (NEW)", as shown in FIG. 54B1, that displays the accountholder's new accounts/products, balances, interest rates/yields, etc., post-automated R (β, $) transfer(s).

Figure 55A:
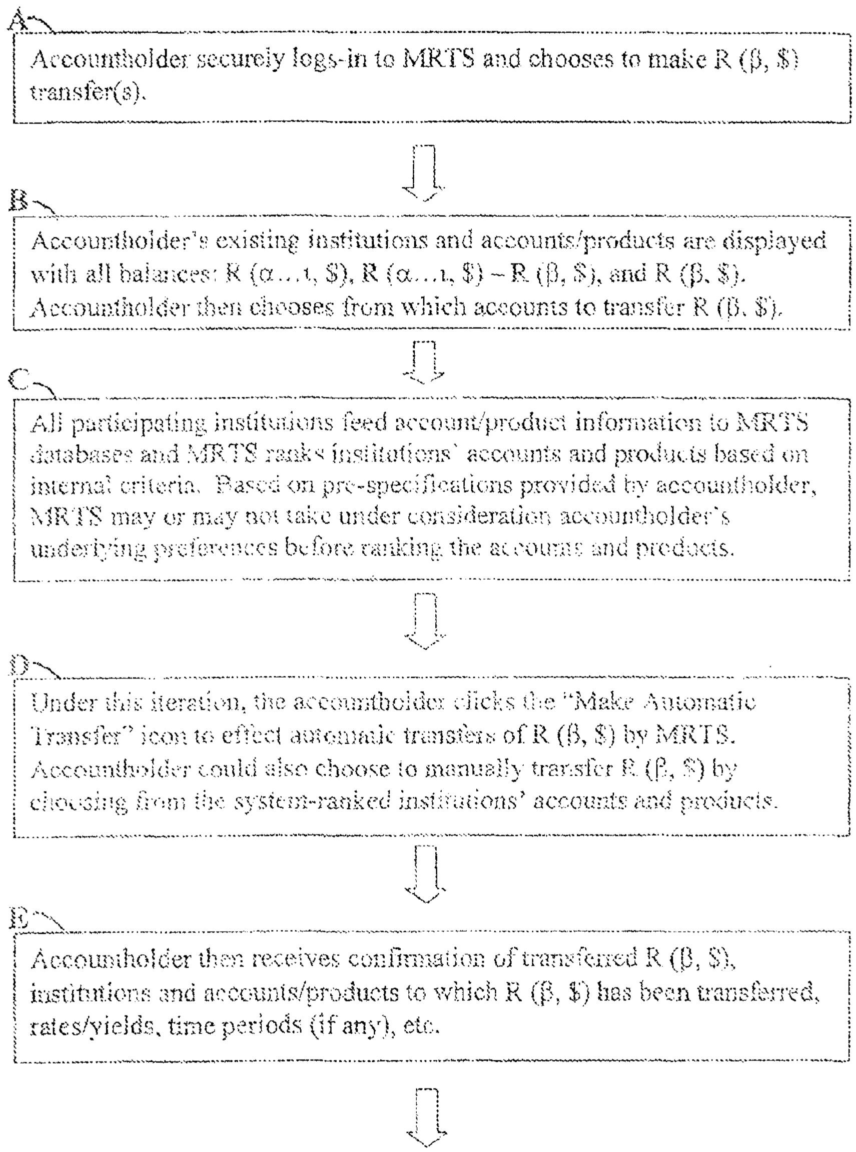

FIGS. 55A and 55B, taken together, set forth a flow chart that depicts the various steps in the System-Selected Criteria Right(s) Transfer Process (Method "D") that allow a system user to automatically, semi-automatically or manually transfer R (β, $) based on MRT Network-selected criteria that ranks various participating financial institutions' accounts and products based on the MRT Network's own internal criteria, and features constant updates on account balances, transfer progress and an "Accounts Status (NEW)" at the completion of the transfer process.

As indicated at Block A of FIGS. 55A, an MRT Network accountholder securely logs-in to the MRT Network and chooses to make an R (β, $) transfer(s). At Block B the MRT Network accountholder's existing institutions and accounts/products are displayed with all balances: R (α . . . ι, $), R (α . . . ι, $)–R (β, $), and R (β, $). In the manual REI transfer iterations, the accountholder then chooses from which account(s) to transfer the REI. In the automatic REI transfer iterations the accountholder will pre-choose from which accounts the MRT Network will automatically transfer the accountholder's REI. At Block C, all participating financial institutions feed account/product information to the MRT Network databases and the MRT Network then ranks institutions' accounts/products based on the MRT Network's internal REI transfer criteria. Based on pre-specifications provided by the MRT Network accountholder, the MRT Network may, or may not, take under consideration an accountholder's underlying REI transfer preferences before ranking the institutions' accounts and products. AT Block D, the accountholder clicks the "Make Automatic Transfer" icon to have the system effect automatic REI transfers. Conversely, an MRT Network accountholder could also choose to make a manual REI transfer based on the MRT Network's rankings of the institutions' accounts/products. At Block E, the MRT Network accountholder receives confirmation of R (β, $) transfer(s) including institutions and accounts/products to which the accountholder's R (β, $) has been transferred, rates/yields, time periods (if any), etc. At Block F of FIG. 55B, the MRT Network then displays the accountholder's new accounts status including existing institutions and accounts/products (R (α . . . ι, $), accounts from which the accountholder's R (β, $) has been transferred (R (α . . . ι, $)–R (β, $)), and accounts to which the accountholder's R (β, $) has been transferred.

"Internal" REI Transfer Processes According to the Present Invention (Method "E")

Referring to FIGS. 29B, 56, 57A1, 57A2, 57B1, 58A & 58B the REI Transfer Method "E" will be described in greater detail.

Figure 56:
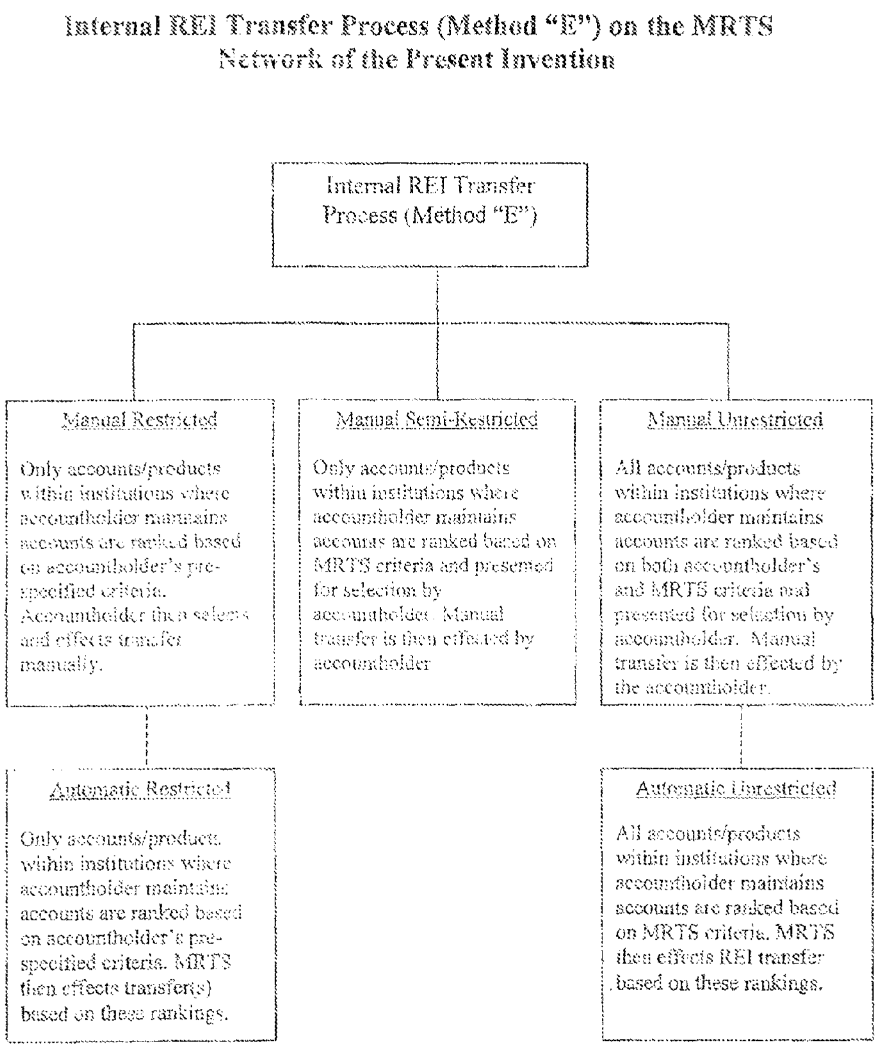
FIG. 56 is a schematic representation, illustrating in greater detail, the structure the Internal REI Transfer Method "E" of FIG. 29B, showing various processes by which an accountholder can effect both manual and automatic transfers of the right to earn interest (R (β, $))

FIG. 56 is a flow chart depicting the MRT Network's Internal REI Transfer Process (Method "E") and five of the different iterations of Method "E", including both manual and automatic REI transfer options. Method "E" allows an MRT Network accountholder to transfer the accountholder's R (β, $) internally, among "home" institutions' accounts/products where the accountholder's R (β, $) currently resides. This method is also applicable to "external" institutions to which an accountholder's R (β, $) has been transferred, and are thus considered new "internal" institutions.

In the "Manual Restricted" iteration of Method "E", only institutions' accounts/products where the MRT Network accountholder currently maintains accounts/products are ranked by the MRT Network based on the accountholder-specified R (β, $) transfer criteria. From the ranked, displayed accounts/products, the accountholder selects and effects the R (β, $) transfer(s) manually. The accountholder then receives confirmation, via the accountholder's preferred means, of the completed REI transfer(s).

In the "Manual Semi-Restricted" iteration of Method "E" only the institutions' accounts/products within institutions where the MRT Network accountholder currently maintains accounts/products are ranked based on the MRT Network's proprietary R (β, $) transfer criteria and presented for selection by the accountholder. The MRT Network accountholder then selects account(s)/product(s) and effects the R (β, $) transfer(s) manually. The accountholder then receives confirmation, via the accountholder's preferred means, of the completed REI transfer(s).

In the "Manual Unrestricted" iteration of Method "E" all institutions' accounts/products, where an MRT Network accountholder maintains accounts/products, are ranked based on both the accountholder's and on the MRT Network's proprietary R (β, $) transfer criteria and displayed for selection by the MRT Network accountholder. The accountholder then selects accounts/products based on either, or both, criteria and effects the R (β, $) transfer(s) manually. The accountholder then receives confirmation, via the accountholder's preferred means, of the completed REI transfer(s).

In the "Automatic Restricted" iteration of Method "E" only accounts/products within institutions where an MRT Network accountholder maintains accounts/products are ranked based on accountholder's pre-specified R (β, $) transfer criteria. The MRT Network then effects transfers automatically, having given pre-approval for automatic REI transfers via the control panel shown in FIG. 92, based on these rankings, on behalf of the MRT Network accountholder. The accountholder then receives confirmation, via the accountholder's preferred means, of the completed REI transfer(s).

In the "Automatic Unrestricted" iteration of Method "E" all accounts/products within institutions where an MRT Network accountholder currently maintains accounts/products are ranked based on the MRT Network's proprietary R (β, $) transfer criteria. The MRT Network then effects the accountholder's R (β, $) transfer automatically based on the MRT Network's proprietary R (β, $) transfer criteria rankings. Again, pre-approval for the automatic REI transfer is provided by the MRT Network accountholder via the control panel shown in FIG. 92. The accountholder then receives confirmation, via the accountholder's preferred means, of the completed REI transfer(s).

FIGS. 57A1, 57A2 and 57B1 show a schematic representation of the MRT Network's Internal Right(s) Transfer Process (Method "E") that allows a system user to transfer the right to earn interest (R (β, $)) (or other right(s)) internally within the "home" or "external" (new "internal") institution's accounts/products where the R (β, $) resides, such process allowing a system user to manually transfer R (β, $), semi-automatically transfer R (β, $) or, to specify that the system automatically transfer R (β, $) based on user's pre-specified transfer criteria, all the while providing the system user with account balances, transfer progress and, at completion, an "Accounts Status (NEW)" showing update account balances. The example shown is the "Manual Restricted" iteration of Method "E".

After securely logging-in to the MRT Network site and opting to conduct an R (β, $) transfer, the accountholder sees a screen (FIG. 57A1) that displays all of the accountholder's present institutions' accounts/products information including balances, rates/yields, and the amount of R (β, $) available for transfer that is unencumbered by any restrictions. The accountholder then selects from which account to transfer the accountholder's R (β, $).

FIG. 57A2 displays all internal accounts/products as ranked by the MRT Network based on the accountholder's pre-specified R (β, $) transfer criteria. The accountholder then selects to which account to transfer the accountholder's R (β, $) and clicks on the "TRANSFER" icon. The MRT Network accountholder then receives a message confirming all the relevant financial details of the completed R (β, $) transfer.

Finally, the accountholder sees a new screen (FIG. 57B1), “Accounts Status (NEW), that shows all of the updated, post-R (β, $) transfer, account balances, rate/yields, etc.

FIGS. 58A through 58B, taken together, set forth a flow chart depicting the various steps in Method E allowing a system user to automatically, semi-automatically or manually transfer R (β, $) internally within the “home” or “external” (new “internal”) institution(s) accounts and products where R (β, $) resides, either manually, semi-automatically or automatically, and features constant updates on account balances, transfer progress and an “Accounts Status (NEW)” at the completion of the transfer process.

Now referring to FIG. 58A, at Block A, the MRT Network accountholder securely logs-in to the MRT Network and chooses to make an R (β, $) transfer(s). At Block B, the MRT Network accountholder’s existing “home” institution(s) accounts and products are displayed with all balances: R (α . . . ι, $), R (α . . . ι, $)−R (β, $), and R (β, $). The MRT Network accountholder then chooses from which account(s) and/or product(s) to transfer R (β, $) internally, within the “home” institution(s). AT Block C, all participating “home” institutions feed account/product information to the MRT Network databases and the MRT Network ranks the “home” institutions’ accounts and products base on, in this example, the MRT Network accountholder’s pre-specified REI transfer criteria (it could, in other iterations, be based on the MRT Network’s REI transfer criteria). The MRT Network accountholder then selects account(s) and/or product(s) to which to transfer the accountholder’s R (β, $) and then clicks the “TRANSFER” icon to effect internal R (β, $) transfer(s). At Block D, the accountholder then receives confirmation of the transferred R (β, $), internal institutions’ account(s)/product(s) to which the R (β, $) has been transferred along with rates/yields, time periods (if any), etc. At Block E (FIG. 58B), the MRT Network then displays the MRT Network accountholder’s new account(s) status including existing “home” institutions’ accounts/products (R (α . . . ι, $), “home” institutions’ accounts/products from which accountholder’s R (β, $) has been transferred (R (α . . . ι, $)−R (β, $)), and “home” institutions’ accounts/products to which accountholder’s R (β, $) has been transferred.

Rate Collection and Display Processes Supported on the MRT Network of the Present Invention Referring to FIGS. 10, 11, 32A, 32B 59 and 60, the Rate Collection and Display Processes supported on the MRT Network will now be described in greater detail.

In general, the function of the Rate Collection and Display Process is to facilitate data collection on/by the MRT Network to enable participating financial (or non-financial) institutions to provide information to the relational database management systems (RDBMS) of the MRT Network, and wherein these RDBMS then sort and rank the data inputs and display the ranked data in different means according to the user/accountholder’s preference(s) so that the system user/accountholder can then effect a transfer of the right to earn interest (R (β, $)) on monies owned, using the various transfer methods supported on the MRT Network. Similarly, the MRT Network utilizes the information supplied and updated by participating institutions in order to rank various criteria and then to effect automatic REI transfers based on the MRT Network’s own REI transfer criteria.

Figure 59:
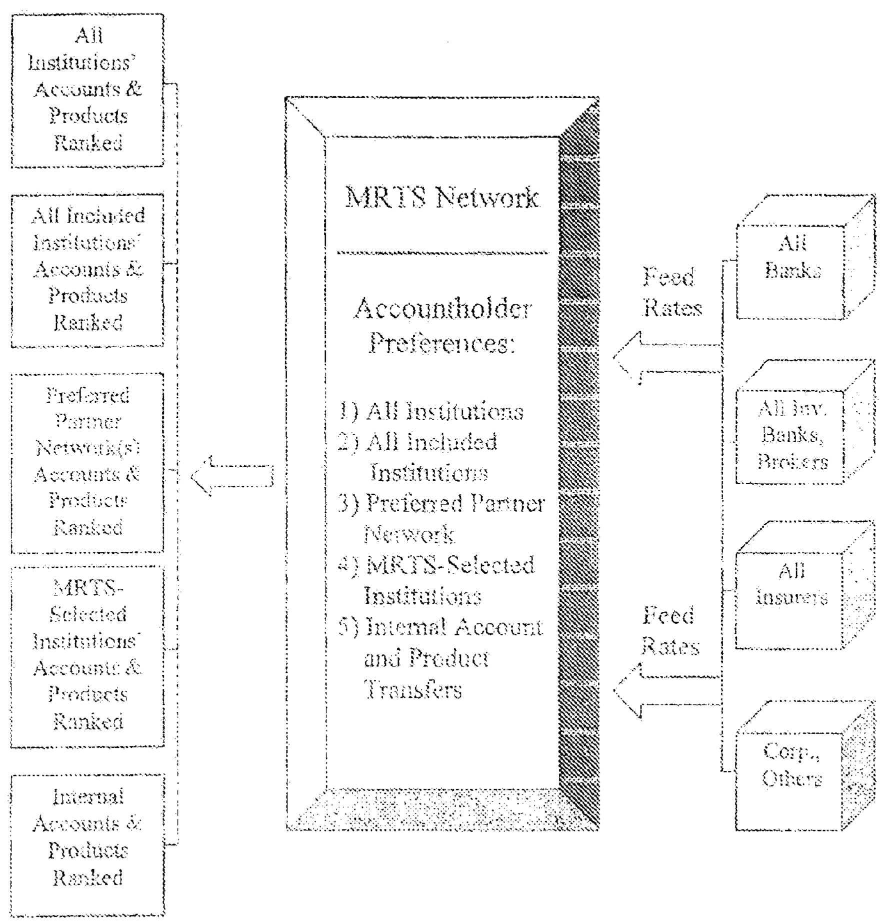
FIG. 59 is a schematic representation of the Rate Collection and Display Process supported on the MRT Network of the present invention, whereby participating institutions provide information to the relational database management systems (RDBMS) of the MRT Network, and wherein these RDBMS's then sort and rank such data inputs and display the ranked data in different ways according to the user/accountholder's preference(s) so that the system user/accountholder can then effect a transfer of the right to earn interest (R (β, $)) on monies owned, using the various transfer methods supported on the MRT Network.
Figure 60:
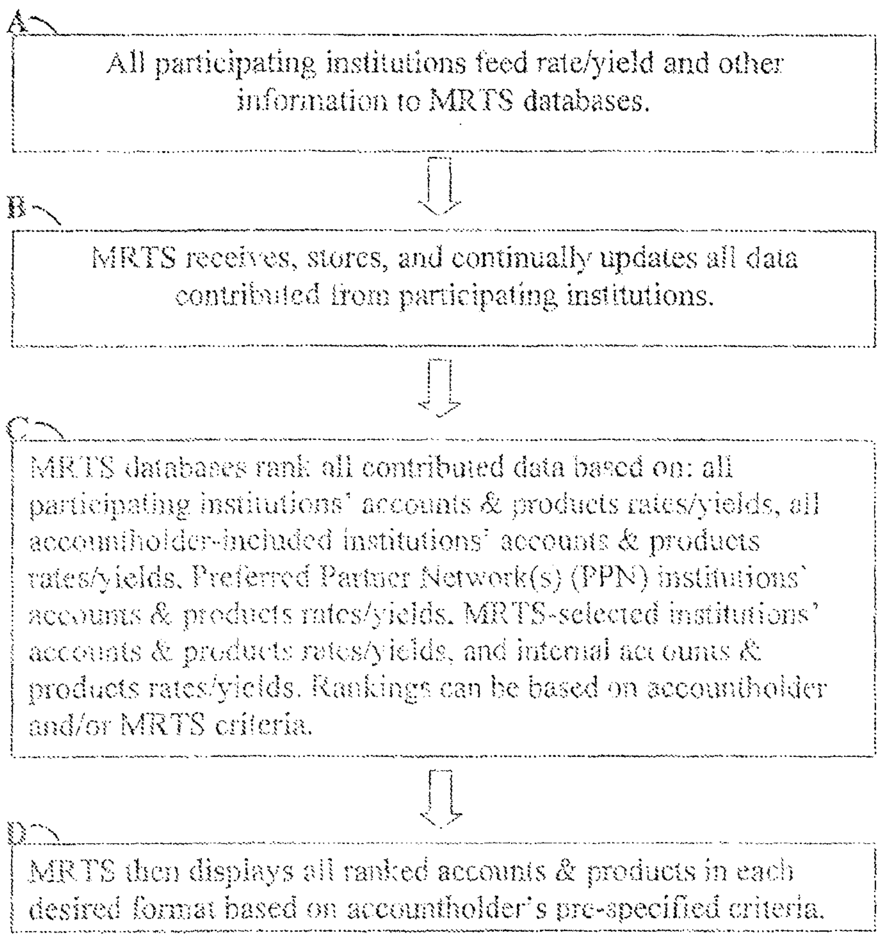
FIG. 60 is a flow chart describing the steps involved in the MRT Network Rate Collection and Display Process depicted in FIG. 59, beginning with the step of the financial institution feeding rates/yields to the RDBMS's of the MRT Network, and culminating in the transfer of the right to earn interest (R (β, $)) by the system user/accountholder using one of the preferred REI transfer methods disclosed herein.

FIG. 60 is a flow chart that describes the steps involved in the MRT Network’s Rate Collection and Display Process, as shown in FIG. 59, beginning with the financial institutions’ rate feeds to the RDBMS’s of the MRT Network, and culminating in the transfer of the right to earn interest (R (β, $)) by the system user/accountholder using one of the preferred transfer method(s).

Now, referring to FIG. 60, at Block A, all participating financial institutions feed rate/yield and other account/product data/information to the MRT Network databases. At Block B, the MRT Network receives, stores in databases, and continually updates all data contributed by participating institutions. At Block C, the MRT Network databases rank all contributed data based on, but not limited to: all participating institutions’ accounts and products rates/yields, all accountholder-included institutions’ accounts and products rates/yields, Preferred Partner Networks (PPN) institutions’ accounts and products rates/yields, MRT Network-selected institutions’ accounts and products rates/yields, and internal accounts and products rates/yields. Rankings can be based on accountholder-specified and/or on MRT Network-specified criteria and may be based on factors other than highest rates/yields. AT Block D, the MRT Network then displays all ranked accounts and products in each desired format based on the accountholder’s, or on the MRT Network’s, pre-specified REI transfer criteria.

REI Transfer Process Coincident with Purchases, Payments, and Withdrawals (Commerce Facilitation) on the MRT Network of the Present Invention Referring to FIGS. 61A, 61B1, 61B2, 61C1 & 61C2 the REI Transfer Process Coincident with Purchases, Payments and Withdrawals (Commerce Facilitation) on the MRT Network of the Present Invention, supported on the MRT Network, will now be described in greater detail.

Figure 61A:
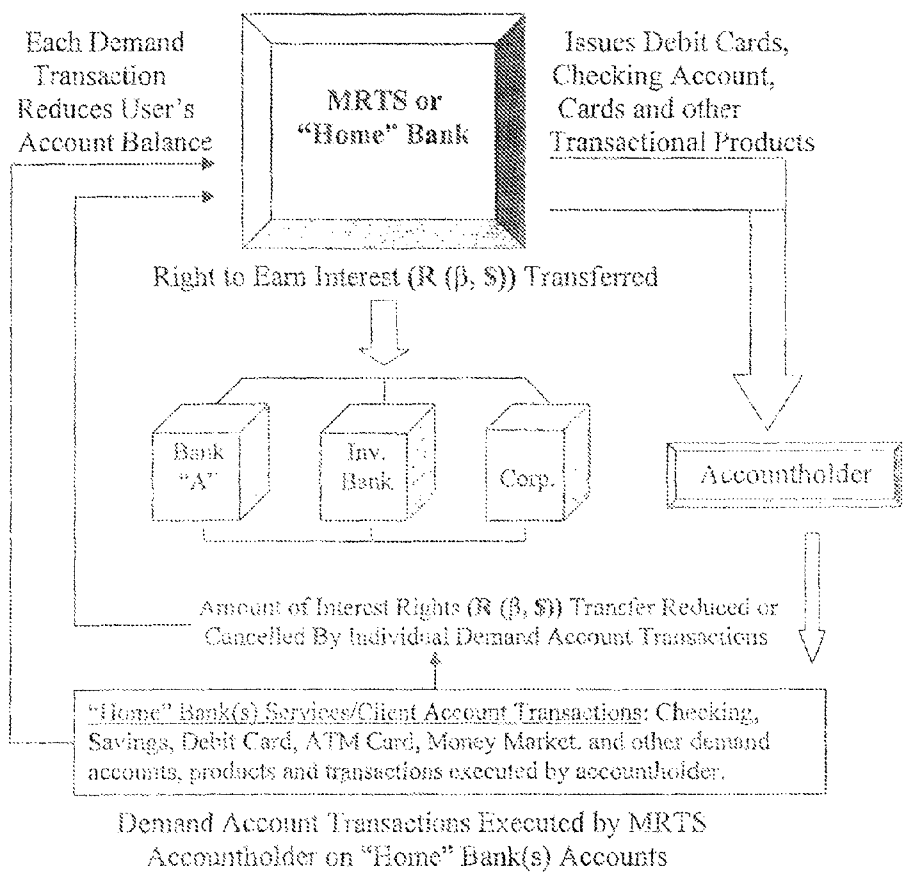

FIGS. 61A through 61C2, taken together, set forth a schematic representation of the process supported by the MRT Network of the present invention, for transferring of the monetary right to earn interest (R (β, $)) coincident with user/accountholder’s exercise of the right to make purchases (R (ϵ, $)) utilizing the right to make payments (R (ϕ, $) and the right to make withdrawals (hold money as a store of value) (R (δ, $)) wherein a system user/accountholder transfers R (β, $) in order to earn higher interest rates/yields but, as the system user utilizes the other, non-mutually exclusive rights associated with holding money through demand account transactions (R (ϵ, $)), (R (ϕ, $)), and (R (δ, $)), the amount of R (β, $) is reduced or cancelled commensurately, thereby allowing a system user to maximize the utility of money held.

FIG. 61A is one of the processes by which the system and methods of the invention allow an MRT Network accountholder to maximize the utility of money owned by separating, and simultaneously utilizing, the individual, non-mutually exclusive, monetary rights (R (α . . . ι, $)) as defined in “Recognition of the Set of Rights Possessed by an Owner of Money in Accordance with the Principles of the Present Invention” (FIGS. 4A-B). In this process, the MRT Network accountholder’s “home” bank(s) (or the MRT Network itself) issues demand accounts and products to the MRT Network accountholder in the form of checking accounts, savings accounts, debit/credit cards, ATM cards and any and all other transactional products.

In FIG. 61A, the MRT Network accountholder transfers the right to earn interest (R (β, $)) to any of the participating institutions in order to earn additional interest. During the course of normal, everyday commerce the MRT Network accountholder utilizes one of the transactional products to make purchases, pay bills, withdraw funds, etc. from accounts/products maintained at the accountholder’s “home” bank(s) or within the MRT Network. Coincident with the MRT Network accountholder’s use of a transactional product, the accountholder's transferred R (β, $) is reduced commensurately with the amount of the purchase(s) and/or payment(s).

Now, referring to FIG. 61B1, the MRT Network provides an MRT Network accountholder with a screen showing all of the accountholder's R (β, $) transfers; such screen including the institutions and accounts/products to which the accountholder's R (β, $) has been transferred, the various account(s) balances, rate/yields, etc. Upon execution of a demand transaction (FIG. 61B2), an electronic signal is sent to the MRT Network of the present invention, as the accountholder has previously provided sufficient "home" institution(s) account/product information to cause a "linking" of the demand account(s) to the accountholder's account (s) within the MRT Network (FIGS. 76 & 77). Upon receiving the signal that a demand transaction has been effected, the MRT Network automatically reduces or cancels the accountholder's transferred R (β, $) commensurate with the amount of the demand transaction (FIG. 61B2). If the accountholder has multiple R (β, $) transfers, the MRT Network will reduce or cancel the transferred R (β, $) in an account(s) based on the user's pre-specified transfer criteria. This process can be repeated multiple times in any time period.

All R (β, $) (or other right(s)) transfers, or transfer reductions or cancellations, will be reflected in the accountholder's "Accounts Status (NEW)" (FIG. 61C1), and includes a transactional log (FIG. 61C2) of all of the accountholder's MRT Network transactional activities.

FIG. 62 is a flow chart depicting the various steps carried out by the Commerce Facilitation Process shown in FIGS. 61A through 61C2, allowing a system user/accountholder to both transfer the right to earn interest R (β, $) and, at the same time, conduct commerce by utilizing other, separable rights associated with money ownership.

Now referring to FIG. 62, at Block A, an MRT Network accountholder opens accounts and/or purchases products (checking, savings, debit card, money market, stored value cards, gift cards, and other accounts and/or products with transactional capabilities, either within the "home" institution(s) or within the MRT Network. At Block B, the MRT Network accountholder securely logs-in to the MRT Network and, having established account(s) and R (β, $) transfer preferences within the MRT Network, initiates R (β, $) transfer(s) via the MRT Network. At Block C, the MRTS accountholder executes a demand transaction via any of the available demand accounts and/or transactional products. At Block D, upon execution of a demand account/transactional product transaction, two things occur simultaneously: the MRT Network accountholder's R (β, $) transfer is automatically reduced (or cancelled) commensurate with the amount of the demand transaction and, the MRT Network accountholder's monetary balance (R (α . . . ι, $)−R (β, $)) in the demand account (or in the transactional product) at the "home" institution(s), or within the MRT Network, is reduced commensurately by the amount of the demand transaction. The recipient of the demand transaction payment thus receives the entire set of monetary rights (R (α . . . ι, $)) associated with money ownership. At Block E, the MRT Network accountholder is provided with a log of all demand transactions as well as an updated schedule of all transferred right to earn interest (R (β, $)) balances.

Tax Recognition and Reporting Processes Supported on the MRT Network of the Present Invention Referring to FIGS. 10, 11, 63 and 64, the Tax Recognition and Reporting Processes supported on the MRT Network will now be described in greater detail.

Figure 63:
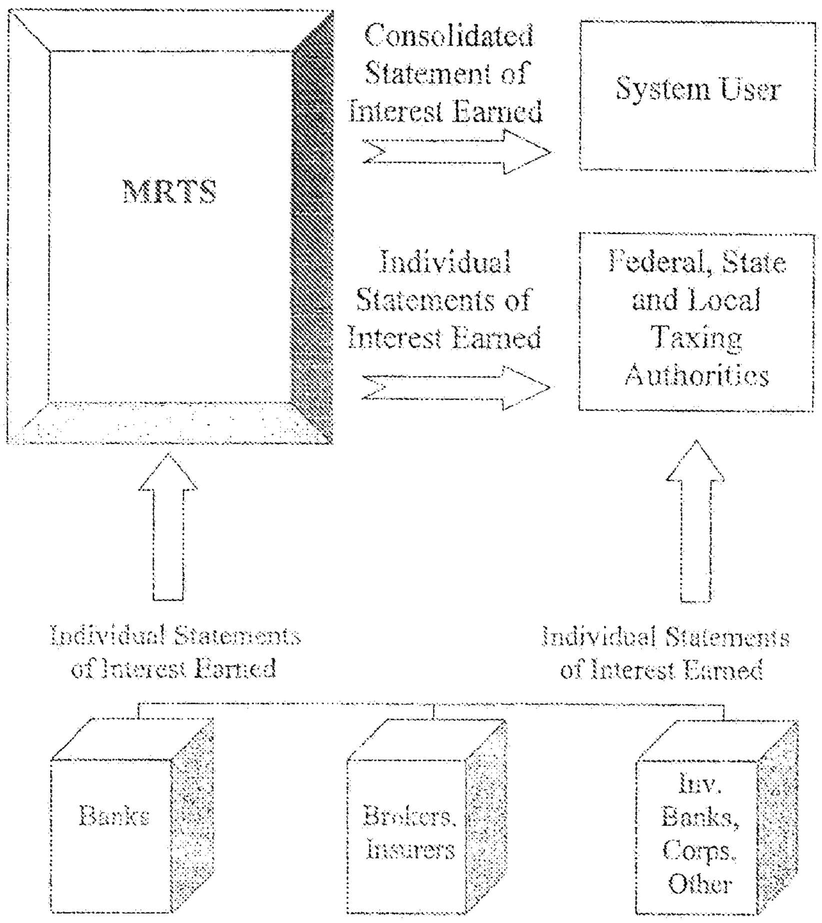
FIG. 63 is a schematic representation of the Tax Recognition and Reporting Process supported by the MRT Network of the present invention, whereby the MRT Network automatically coordinates the collection and distribution of information pertaining to taxable interest earned by users on the MRT Network.

FIG. 63 is a schematic representation of the Tax Recognition and Reporting Process supported by the MRT Network of the present invention, whereby the MRT Network coordinates the collection and distribution of information pertaining to taxable interest earned by users of the MRT Network.

FIG. 63 represents the "Tax Recognition and Reporting Process within the MRT Network" in the form of a flow chart. After having earned interest on transferred R (β, $), the individual, participating financial institution(s), to which the MRT Network accountholder's R (β, $) has been transferred, provide individual statements of taxable interest earned by the MRT Network accountholder both to the relevant taxing authorities and to the MRT Network which then provides an MRT Network accountholder a consolidated statements of interest earned at various institution. As a confirmation of the taxable interest earned on transferred R (β, $) at each institution to which the MRT Network accountholder transferred R (β, $), the MRT Network also provides, on a periodic basis, the relevant taxing authorities with individual statements of taxable interest earned by the MRT Network accountholder. The MRT Network then provides the MRT Network accountholder with a consolidated statement of taxable interest earned for income reporting purposes. The MRT Network accountholder can also check, at any time, transactional logs maintained by the MRT Network to ascertain taxable interest earned at any time.

Figure 64:
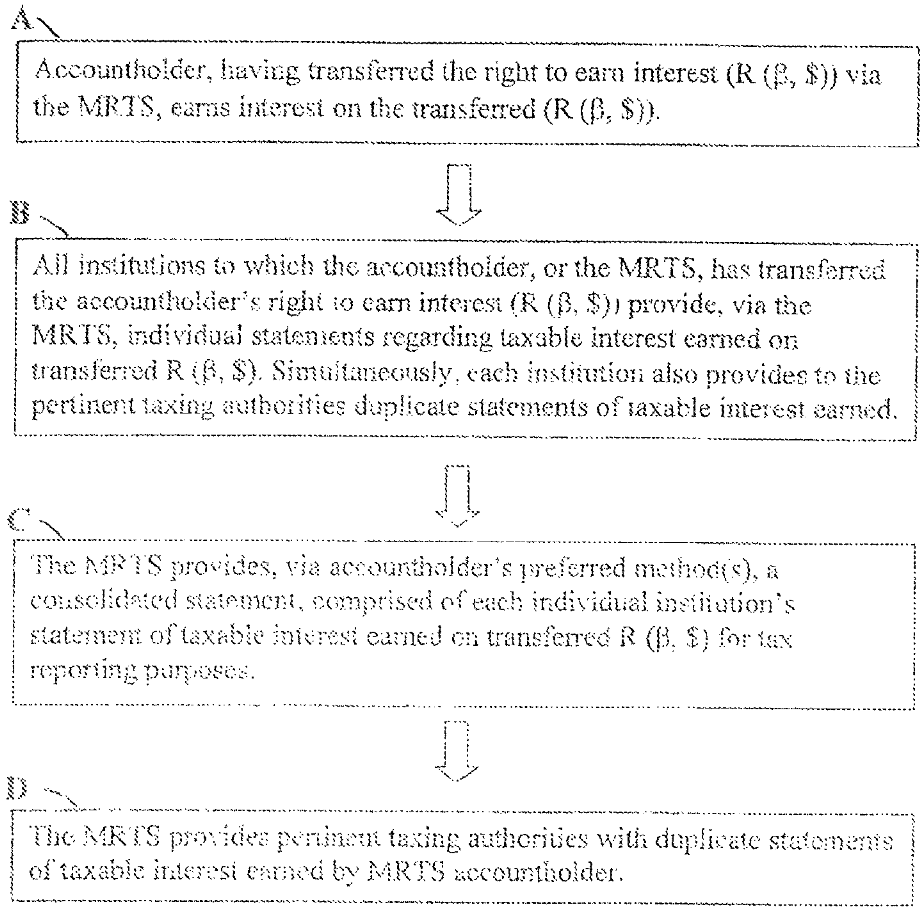
FIG. 64 is a flow chart describing the various steps involved in the Tax Recognition and Reporting Process depicted in FIG. 62.

Now referring to FIG. 64, FIG. 64 is a flow chart depicting the various steps involved in the Tax Recognition and Reporting Process illustrated in FIG. 63. At Block A, the MRT Network accountholder, having transferred the right to earn interest (R (β, $)) via the MRT Network, earns interest on the transferred R (β, $). At Block B, all institutions, to which the MRT Network accountholder (or the MRT Network) has transferred the accountholder's R (β, $), provide, via the MRT Network, individual statements regarding taxable interest earned on the accountholder's transferred R (β, $). Simultaneously, each institution also provides, to the pertinent taxing authorities, duplicate statements of taxable interest earned. At Block C, the MRT Network provides, via the MRT Network accountholder's preferred method(s), a consolidated tax statement comprised of each institution's statement of taxable interest earned on transferred R (β, $) for tax reporting purposes. At Block D, the MRT Network provides all pertinent taxing authorities with duplicate statements of taxable interest earned by an MRT Network accountholder.

Mortgage Interest Right Process Supported on the MRT Network of the Present Invention Referring to FIGS. 10, 11, 65A, 65B1, 65B2, 65B3, 65C1, 65C2, 65C3, 66A and 66B, the Mortgage REI Transfer Process supported on the MRT Network will now be described in greater detail.

Figure 65A:
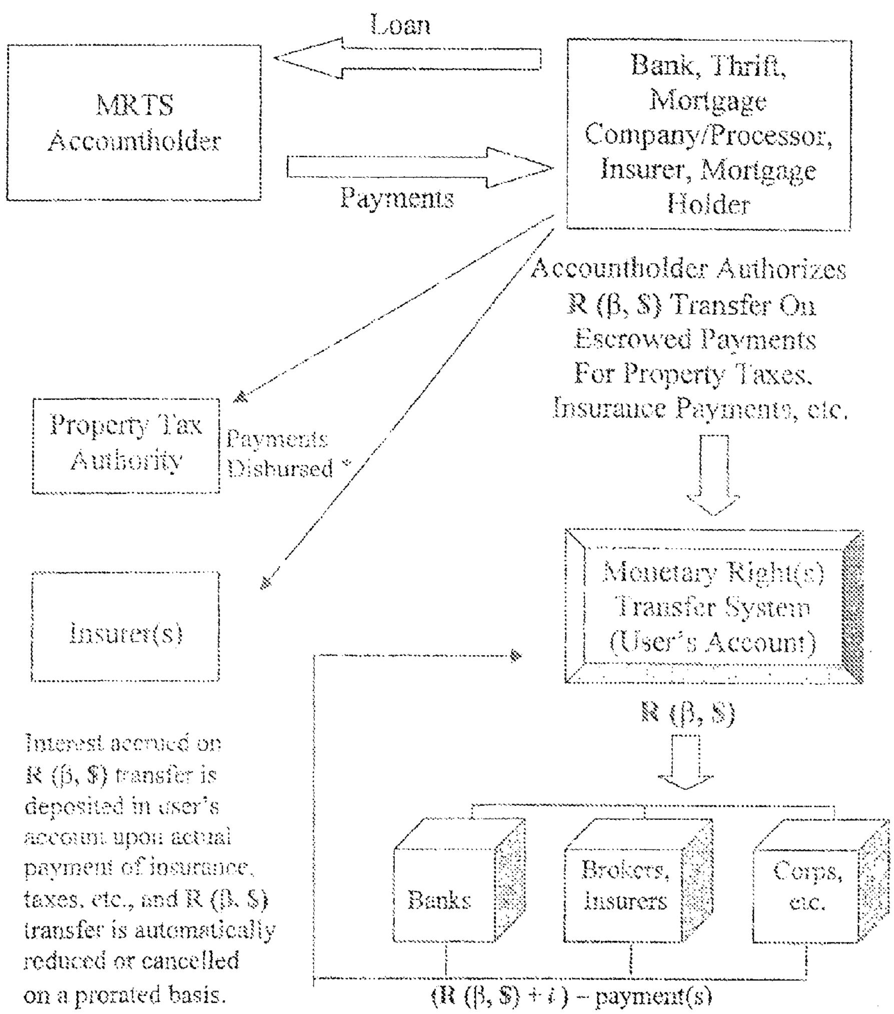

FIGS. 65A through 65C3, set forth a schematic representation of the Mortgage Interest Right Process supported on the MRT Network of the present invention, enabling an MRT Network user/accountholder to transfer the right to earn interest (R (β, $)) on monies paid to, and escrowed by, a mortgage issuer or mortgage service provider to cover the user/accountholder's future obligations with regard to property taxes, insurance and other mortgage related expenses, and thereby allowing a system user/accountholder to earn additional interest on those monies prior to the individual payment (s) due date(s).

Now, referring to FIG. 65B1, an MRT Network accountholder first provides to the MRT Network all relevant information relating to the accountholder's mortgage holder and/or mortgage service provider including: name of mortgage holder/mortgage service provider, mortgage account number(s), mortgage service provider's contact information, etc. Additionally, via the approval process provided in FIG. 65B2, the MRT Network accountholder authorizes the MRT Network to contact the accountholder's mortgage service provider for the purpose of allowing the MRT Network accountholder to transfer the REI on monies held by the mortgage service provider until the specified due dates of each individual payment collected by the mortgage service provider.

After securely logging-in to the MRT Network, an accountholder clicks the "Mortgage Transfer" icon and is then shown a new screen (FIG. 65B3) where the accountholder can pick the individual components of a mortgage payment on which to transfer the accountholder's R (β, $) until such time as each individual payment is due ("payment due date"). After effecting an R (β, $) transfer via any of available methods and their iterations, FIG. 65C1 presents the accountholder with a new screen showing the accountholder's "Account Status (NEW)" detailing the new account(s), the rate/yield earned, the amount of the interest right transfer, etc.

As individual payments become due, the accountholder is shown a new screen, "Transaction Log" (FIG. 65C2), that details the amount of any reduction of the transferred REI in order to restore the right to earn interest (R (β, $)) on the "payment due date" to the original payment made to the mortgage service provider of R (α . . . ι, $)–R (β, $). Reducing or canceling the withheld R (β, $) has the same effect of restoring it to the original payment of R (α . . . ι, $)–R (β, $), thus providing the mortgage service provider with the entire set of monetary rights (R (α . . . ι, $)).

The MRT Network accountholder then sees a new screen, "Account Status (NEW)" shown in FIG. 65C3 that shows the MRT Network accountholder's new balance(s), REI transfer (s), the rate/yield earned, etc.

Now referring to FIGS. 66A and 66B, both figures comprise a flow chart that details the Mortgage REI Transfer Process supported on the MRT Network. At Block A, an MRT Network accountholder maintains a mortgage (account) with a financial institution or with a mortgage service provider, to which, the accountholder makes monthly (or other periodic payments) covering mortgage principle and interest, property taxes, property insurance, and any other payments coincident with servicing the accountholder's mortgage. At Block B, the MRT Network accountholder provides the MRT Network with information regarding the accountholder's mortgage account and authorizes the MRT Network to contact the accountholder's mortgage service provider for the purpose of transferring the accountholder's R (β, $) from the participating financial institution or mortgage service provider holding the accountholder's money in escrow until the aforementioned payments are made on behalf of the MRT Network accountholder. At Block C, the MRT Network accountholder securely logs-in to the MRT Network and indicates a desire to transfer the accountholder's R (β, $) from the monies associated with payments made to the mortgage service provider. At Block D, the MRT Network accountholder or, the MRT Network, depending on the R (β, $) transfer method chosen, transfers the accountholder's R (β, $) on escrowed mortgage payments for property taxes, property insurance, etc., via the MRT Network, to either the accountholder's "home" or "external" participating institutions in order to earn additional interest on the accountholder's transferred R (β, $). The R (β, $) transfer(s) is shown in the accountholder's new account status screen. At Block E (FIG. 66B), as the mortgage holder/servicer, which is holding the MRT Network accountholder's remaining set of monetary rights (R (α . . . ι, $)–R (β, $)), makes payments on behalf of the MRT Network accountholder, the accountholder's transferred R (β, $) is automatically reduced (or cancelled) commensurately with each individual payment on each individual "payment due date" as reflected in the "Transaction Log". Accrued interest (i) is then returned to the MRT accountholder's MRT Network account(s). At Block F, the MRT Network accountholder's remaining transferred R (β, $) balance is reflected in the accountholder's new account status and information concerning payments and payment dates of accountholder's mortgage obligations is sent to the accountholder via the accountholder's preferred contact method(s).

Human Resources Interest Right Process Supported on the MRT Network of the Present Invention Referring to FIGS. 10, 11, 67A, 67B1, 67B2, 67B3, 67C1, 67C2, 67C3, 68A & 68B, the Human Resources REI Transfer Process supported on the MRT Network will now be described in greater detail.

Figure 67A:
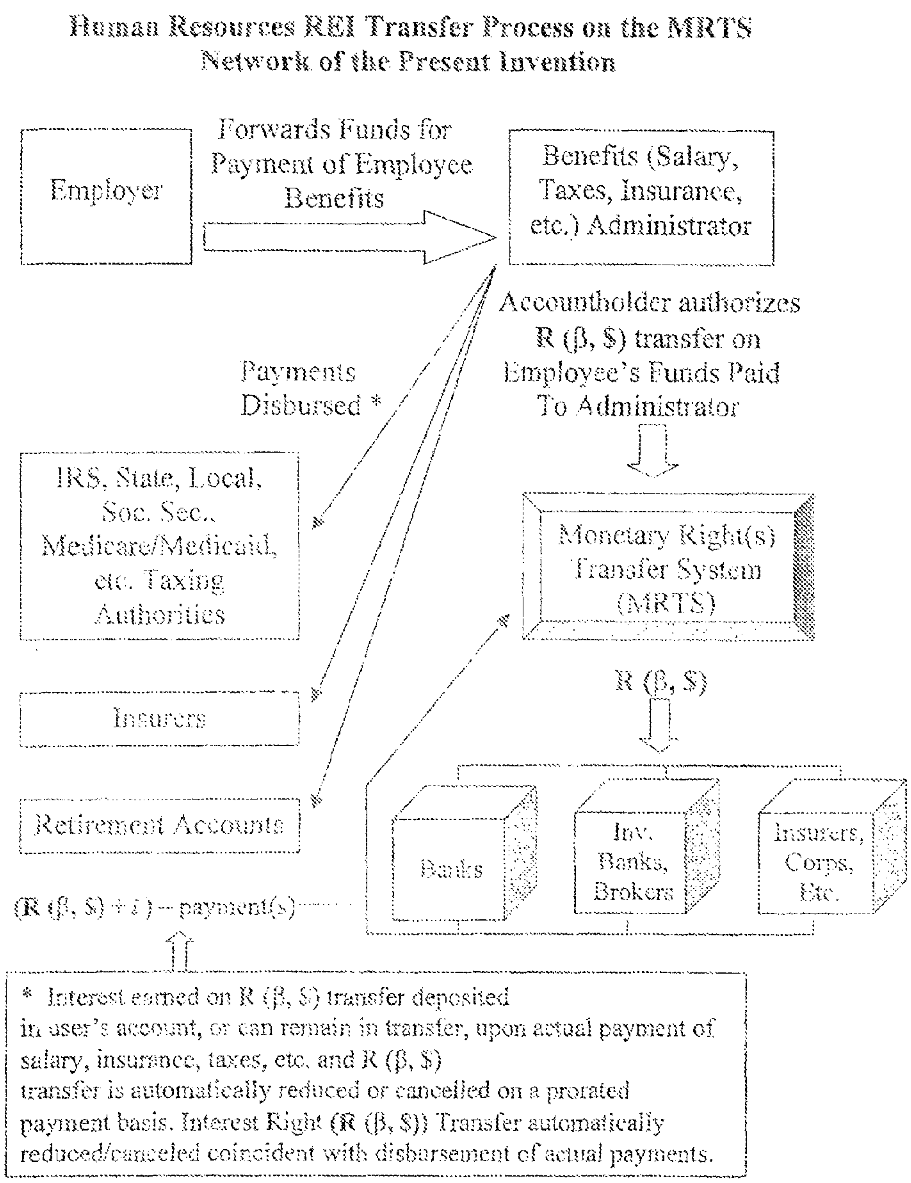

FIGS. 67A through 67C3, taken together, set forth a schematic representation of Human Resources Interest Right Process supported on the MRT Network of the present invention, enabling an MRT Network accountholder (employee) to transfer the right to earn interest (R (β, $)) on monies collected from an employee (MRT Network accountholder) by an employer or payroll services provider to pay the employee's future obligations for such things as taxes, insurance, other employee-related expenses, and other benefits payments that are collected and held in escrow, by an employer of payroll services provider, and thereby allowing the employee to earn additional interest on the monies collected to pay for future employee obligations by an employer or payroll services provider until each individual "payment due date".

As an employee earns periodic paychecks (or other compensation like bonuses, etc.) from an employer, either the employer or a payroll service provider (collectively the "benefits administrator") withholds monies from each paycheck for various taxes, insurance premium payments, etc., on behalf of the employee. These monies are held in escrow by the "benefits administrator" until such payments are due, allowing the "benefits administrator" to earn interest on monies legally belonging to the employee until such payments are effected on the employee's behalf.

This process will allow an employee, having previously supplied all relevant employment information (FIG. 67B1) and appropriate authorization to the MRT Network (FIG. 67B2), to transfer the R (β, $) on the employee's/accountholder's monies held in escrow by the "benefits administrator". Once the MRT Network accountholder authorizes the transfer of R (β, $) on these monies (FIG. 67B2), the MRT Network notifies the "benefits administrator" of the transfer and effects the transfer, based on the accountholder's (or MRT Network's) pre-specified transfer criteria, by transferring the accountholder's R (β, $) to any participating institution(s) (FIG. 67B3). The accountholder then receives a message confirming the right transfer.

The accountholder then sees, in FIG. 67C1, the "Account Status (NEW)" screen. The accountholder's R (β, $) transfer remains in effect until an individual payment on behalf of the employee/accountholder is due. On the due date of an individual payment, the accountholder's transferred R (β, $) is reduced (or cancelled) commensurately with the payment amount; any accrued interest can remain in transfer or be returned to the accountholder's MRT Network account(s). This activity is reflected in the "Transaction Log" (FIG. 67C2). This allows the employee's/accountholder's transferred R (β, $) to be returned to the "benefits administrator" to effect "full" payment on the employee's behalf, yet allows the employee/accountholder to earn interest on all monies up until the due date of each individual payment made for the employee's benefit.

As in previous examples, the MRT Network provides the accountholder with an "Accounts Status (NEW)" screen (FIG. 67C3) allowing the accountholder to track items such as account/product balances, right(s) transfers, payments and payment dates, interest earned, etc.

FIGS. 68A through 68B, taken together, set forth a flow chart depicting the Human Resources Interest Right Process represented in FIGS. 67A through 67C3, enabling an employee to transfer the right to earn interest (R (β, $)) on monies (still owned by the employee) collected and held by an employer or payroll services provider to pay an employee's future obligations, until each individual "payment due date".

Now, referring to FIGS. 68A and 68B, at Block A, an MRT Network accountholder/employee works for an employer that either manages the employee's benefits payments (salary, taxes, insurance, etc.) or outsources these services to a payroll services provider/administrator that manages employee benefits and makes the aforementioned payments for the benefit of the accountholder/employee. At Block B, the MRT accountholder/employee provides to the MRT Network all relevant employer or payroll service provider information and authorizes the MRT Network to effect to effect automatically (or the accountholder can effect manually) R (β, $) transfers on the accountholder's monies held by the employer or the payroll service provider to make the accountholder's/employee's future benefits payments. AT Block C, the MRT Network accountholder/employee securely logs-in to the MRT Network and indicates a desire to transfer R (β, $) from the monies held by the employer or payroll service provider associated with payments for the accountholder's/employee's benefit. At Block D, either the accountholder or the MRT Network, depending on the transfer method and iteration chosen, transfers the accountholder's/employee's R (β, $) on escrowed payments for the accountholder's obligations and benefits such as taxes, insurance, etc., via the MRT Network, to "home" or "external" participating institutions to earn additional interest on the accountholder's transferred R (β, $). The R (β, $) transfer(s) is shown in the new account status screen. At Block E (FIG. 68B), as the employer or payroll service provider, which is holding the accountholder's/employee's remaining set of monetary rights (R (α . . . ι, $)−R (β, $)), makes the payments on behalf of the accountholder, the accountholder's transferred R (β, $) is automatically reduced (or cancelled) commensurately with each individual payment made on each individual payment's due date as reflected in the "Transaction Log". Accrued interest (i) is then returned to the accountholder's/employee's MRTS account(s). AT Block F, the MRT Network accountholder's remaining transferred R (β, $) balance is reflected in the accountholder's new account status screen and information concerning payments and payment due dates of the accountholder's taxes and benefits obligations is sent to the accountholder via the accountholder's preferred contact method(s).

Method of Payment Involving the Withholding of the Right to Earn Interest (R (β, $)) until Payment Due Date Supported on the MRT Network of the Present Invention Referring to FIGS. 10, 11, 69A, 69B1, 69B2, 69B3, 69C1, 69C2, 69C3, 69D1 and 69D2, the Method of Payment Involving The Withholding of the Right to Earn Interest (R (β, $)) until Payment Due Date_Process supported on the MRT Network will now be described in greater detail.

Figure 69A:
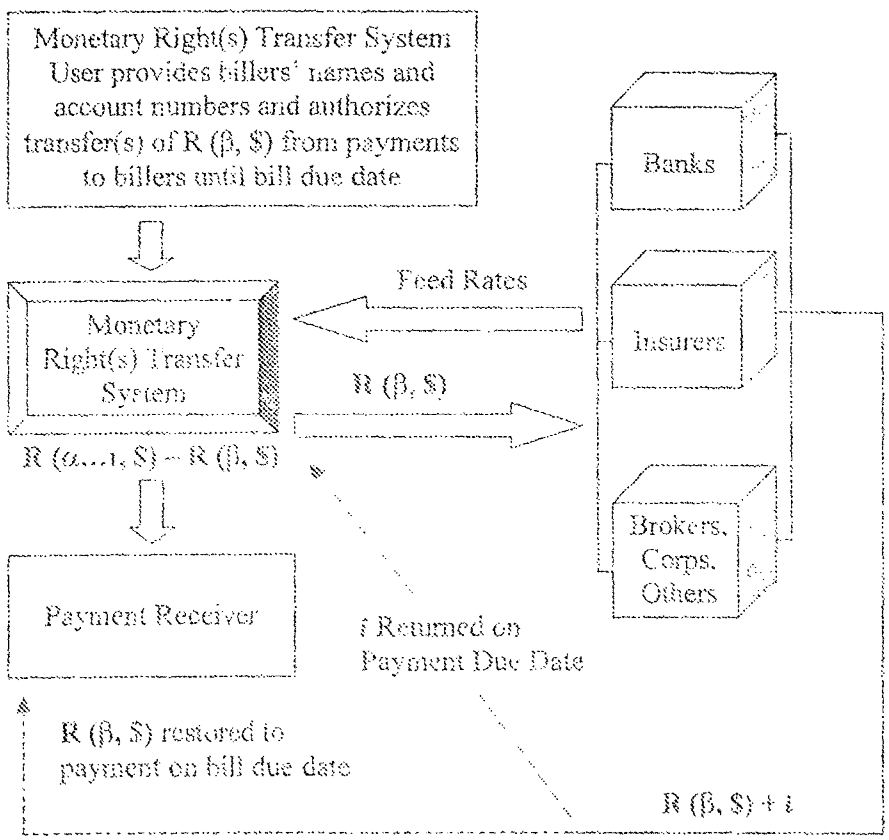

FIGS. 69A through 69C3 is a schematic representation of the Payment Method Withholding the Right to Earn Interest (R (β, $)) until Payment Due Date supported on the MRT Network of the present invention, enabling a system user/accountholder to remit payment on a bill received, by any means, at any date prior to the bill's due date such that the payment remitted consists of R (α . . . ι, $)−R (β, $), allowing the MRT Network accountholder to transfer R (β, $) and earn additional interest up to a bill's payment due date, at which time the R (β, $) is restored to the user's original payment of (R (α . . . ι, $)−R (β, $)) and, simultaneously, the user's R (β, $) transfer is cancelled commensurately with the amount of the bill payment, with any accrued interest (i) returned to the user's account within the MRT Network or to the user's "home" and/or "external" institution(s).

FIGS. 69D1 through 69D2, set forth a flow chart depicting the Payment Method Withholding the Right to Earn Interest R (β, $) until Payment Due Date, enabling a system user/accountholder to withhold R (β, $) from payments and transfer the R (β, $) to earn additional interest until the payment's actual due date.

An MRT Network accountholder provides to the MRT Network all pertinent information with regard to accountholder's bills received including, but not limited to, company name, account number(s), contact information, payment due date, etc., that will allow the MRT Network to establish an electronic link with each individual bill sender (FIG. 69B1). The MRT Network accountholder also authorizes the MRT Network to transfer accountholder's R (β, $) from payments sent to biller until the each bill's due date, at which time the accountholder's R (β, $) is returned to the original payment of R (α . . . ι, $)−R (β, $), allowing the MRT Network accountholder to earn additional interest until each payment's due date (FIG. 69B2).

As in previous embodiments of the system of the invention, participating institutions submit rate feeds to the MRT Network via an electronic network (Internet). The incoming institutions' account/product information is then ranked by the system's databases and displayed for the accountholder. The accountholder can then choose from among the various right(s) transfer methods offered by the MRT Network and indicate the intent to transfer the R (β, $) from various payments made at any time prior to a bill's due date. While this process can be effected manually by an accountholder, an accountholder also has the option to put this payment method in automatic mode whereby the system will automatically withhold and transfer the accountholder's R (β, $) from each payment made from an account within the MRT Network to one of the bill senders as previously specified by an accountholder.

When an accountholder effects bill payment via this process, the MRT Network sends the payment as R (α . . . ι, $)−R (β, $), withholding and transferring the accountholder's R (β, $) (FIG. 69B3) per the accountholder's chosen transfer option (s) (FIG. 69C1). On an individual payment's due date, the MRT Network reduces or cancels the accountholder's R (β, $) transfer(s) commensurately with the amount of the bill payment (FIG. 69C2) shown in the "Transaction Log". R (β, $)+(i) is then split, with accrued interest (i) being returned to the accountholder's MRT Network account(s), and R (β, $) returned to the bill payment receiver thus restoring R (β, $) to the accountholder's original payment of R (α . . . ι, $)−R (β, $) and restoring the full set of monetary rights (R (α . . . ι, $)) to the payment receiver on the bill's due date.

As in previous embodiments, the accountholder is provided with a "Accounts Status (NEW)" screen (FIG. 69C3) at the end of this process that apprises the MRT Network accountholder of account balances, transfers, bill payments and payment dates, and all information relevant to the transfer and payment process.

This process allows an MRT Network accountholder to pay, at any date prior to a bill's due date, in full, yet withhold the right to earn interest R (β, $) from that payment in order to maximize interest earned until the bill's actual due date, allowing the MRT Network accountholder, not the payment recipient, to earn interest on the accountholder's monies until the last possible date prior a bill's payment due date.

An MRT Network accountholder pre-designates specific accounts, either within or via the MRT Network or within the accountholder's "home" bank(s)/institution(s) from which to effect payments withholding accountholder's R (β, $) until payment due date. Via this process, the accountholder can pre-specify from which account(s) to effect such payments and also pre-specify whether to effect these payments automatically or, whether accountholder will effect them manually. If the accountholder chooses to effect them electronically, then the MRT Network or "home" bank(s)/institution (s) will restore the accountholder's R (β, $) to the original payment of R (α . . . ι, $)–R (β, $) on the payment due date while simultaneously returning any accrued interest (i) to the accountholder's account(s) within the MRT Network or the accountholder's "home" bank(s)/institution(s). However, should the accountholder choose to effect these payments manually, the MRT Network (or accountholder's "home" bank(s)/institution(s)) will automatically withhold the equivalent R (β, $) from the manual payment, as the accountholder has already provided biller's account numbers, contact information, and authorizations to the MRT Network, until the payment's due date at which time the accountholder's R (β, $) will be restored to the original payment of R (α . . . ι, $)–R (β, $). Again, any accrued interest (i) will be returned to the accountholder's MRT Network or "home" account(s).

Now, referring to FIG. 69D1, at Block A, an MRT Network accountholder provides the MRT Network with a list of names and account numbers from which the accountholder receives bills for such things as: electricity, natural gas, credit cards, mortgage payments, phone service, auto insurance, health insurance, etc., and authorizes the MRT Network to contact each identified party and to withhold transfer of the accountholder's R (β, $) until each payment's due date. At Block B, the MRT Network accountholder securely logs-in to the MRT Network and indicates a desire to transfer the accountholder's R (β, $) from monies associated with payments made to the various companies from which the accountholder receives bills. At Block C, the accountholder then transfers, via preferred means, the accountholder's R (β, $) coincident with the payment of each bill, via check, money market account, electronic bill payment, debit/credit card, etc. at any time prior to a bill's due date. Thus, the accountholder is remitting to each company from which a bill is received R (α . . . ι, $)–R (β, $). The R (β, $) transfer is reflected in the accountholder's new account status screen. At Block D, as each bill's payment due date arrives, the MRT Network automatically reduces (or cancels) the accountholder's transfer(s) of R (β, $) commensurately with the amount of each bill and restores R (β, $) to the accountholder's original payment of received R (α . . . ι, $)–R (β, $) to each payee. Simultaneously, the MRT Network returns all accrued interest (i) to the accountholder's account(s) within the MRT Network on the date of each bill payment. This payment activity is shown in the transaction log. At Block E in FIG. 69D2, after each payment of a bill by restoring the withheld R (β, $) to the original payment of received R (α . . . ι, $)–R (β, $) originally remitted to the payee, the MRT Network then provides to the accountholder a new account status screen reflecting the new balance(s) of the transferred R (β, $). The accountholder also receives updates on interest earned on all R (β, $) transfers.

Figure 70A:
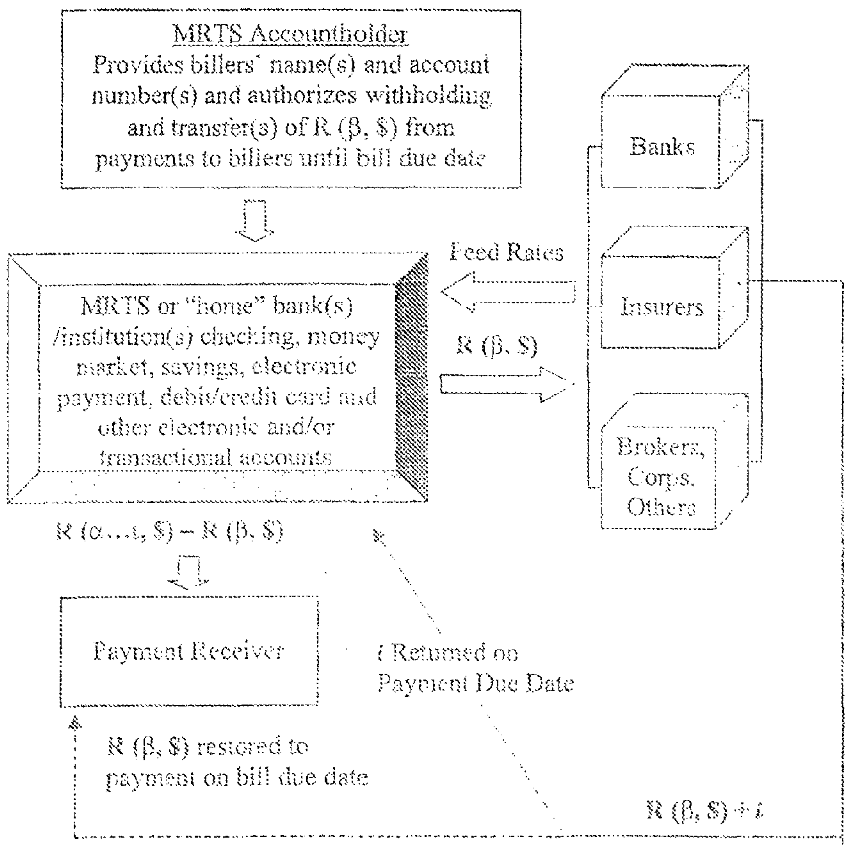
FIG. 70A is a schematic representation describing the "Account-Specific" Payment Method Withholding the Right to Earn Interest (R (β, $)) until Payment Due Date supported on the MRT Network of the present invention, enabling a system user/accountholder to remit payment on a bill received at any date prior to the bill's due date such that the payment remitted consists of R (α . . . ι, $)–R (β, $), and thereby allowing the system user/accountholder to transfer R (β, $) and earn additional interest up to a bill's payment due date at which time R (β, $) is restored to the user's original payment and, simultaneously, the user's R (β, $) transfer is cancelled with any accrued interest being returned to the user's account in user's "home" and/or "external" institution (s) maintained on the MRT Network of the present invention.

"Account-Specific" Payment Method Withholding the Right to Earn Interest (R (β, $)) until Payment Due Date Supported on the MRT Network of the Present Invention FIG. 70A is a schematic representation of the "Account-Specific" Payment Method Withholding the Right to Earn Interest (R (β, $)) until Payment Due Date supported on the MRT Network of the present invention, enabling a system user/accountholder to remit payment on a bill received at any date prior to the bill's due date such that the payment remitted consists of R (α . . . ι, $)–R (β, $), and thereby allowing the system user/accountholder to transfer R (β, $) and earn additional interest up to a bill's payment due date at which time R (β, $) is restored to the user's original payment and, simultaneously, the user's R (β, $) transfer is cancelled with any accrued interest (i) returned to the user's account within the MRT Network or the user's "home" and/or "external" institution(s).

FIG. 70B1-1 through 70B2-2, taken together, sets forth a flow chart depicting the Account-Specific Payment Method Withholding the Right to Earn Interest R (β, $) until Payment Due Date supported on the MRT Network of the present invention, enabling a system user/accountholder to withhold R (β, $) from payments and transfer the R (β, $) to earn additional interest until the payment's actual due date.

Now, referring to FIGS. 70B1-1, at Block A, an MRT Network accountholder provides the MRT Network with a list of names and account numbers from which the accountholder receives bills for such things as: electricity, natural gas, credit cards, mortgage payments, phone service, auto insurance, health insurance, etc., and authorizes the MRT Network to contact each identified party and to withhold transfer of the accountholder's R (β, $) until each payment's due date. At Block B, the MRT Network accountholder securely logs-in to the MRT Network and indicates a desire to transfer the accountholder's R (β, $) from monies associated with payments made to the various companies from which the accountholder receives bills. At Block C, the accountholder pre-establishes account(s) (checking, money market, debit/credit card, savings or any other electronic and/or transactional account(s) from which to effect payment(s) withholding the accountholder's R (β, $) by making the appropriate designations on the MRT Network Account-Specific Payment Method Withholding R (β, $) until Payment Due Date Control Panel as shown in FIG. 94. At Block D, the accountholder then transfers, by preferred means, the accountholder's R (β, $) coincident with the payment of each bill, via check, money market account, electronic bill payment, debit/credit card, etc., at any time prior to a bill's due date. The accountholder is remitting, to each company from which a bill is received, R (α . . . ι, $)–R (β, $). The R (β, $) transfer(s) is reflected in the accountholder's new account status screen. At Block E in FIG. 70B1-2, as each bill's payment due date arrives, the MRT Network automatically reduces (or cancels) the accountholder's transfer(s) of R (β, $) commensurately with the amount of each bill and restores R (β, $) to the accountholder's original payment of received R (α . . . ι, $)–R (β, $) to each payee. Simultaneously, the MRT Network returns all accrued interest (i) to the accountholder's account(s) within the MRT Network on the date of each bill payment. This payment activity is shown in the transaction log. At Block F, after each payment of a bill by restoring the withheld R (β, $) to the original payment of received R (α . . . ι, $)–R (β, $) originally remitted to the payee, the MRT Network then provides to the accountholder a new account status screen reflecting the new balance(s) of the transferred R (β, $). The accountholder also receives update on interest earned on all R (β, $) transfers.

Right of First Refusal Right(s) Transfer Process Supported on MRT Network of the Present Invention Referring to FIGS. 71A, 71B, 71C, 71D, 72, and 78, the Right-of-First-Refusal REI Transfer Process supported on the MRT Network will now be described in greater detail.

FIGS. 71A, 71B, 71C, and 71D, is a schematic representation of the Right-of-First Refusal Process supported on the MRT Network of the present invention, that is available as an accountholder's option to both "home" and "external" banks and financial institutions, whereby the system of the present invention notifies the institution(s) ("home") holding an accountholder's R (β, $) that the user has requested a transfer of R (β, $), at which point the institution may, at the discretion of the system user, have an opportunity to improve the interest rate/yield offered or, to match or beat the competitor's rate/yield to which a system accountholder has requested the transfer with the amount of time for the institution holding the system user's R (β, $) to improve, match or beat a competitor's offer determined by the system user; if the system user accepts the offer, no transfer is effected.

Figure 71A:
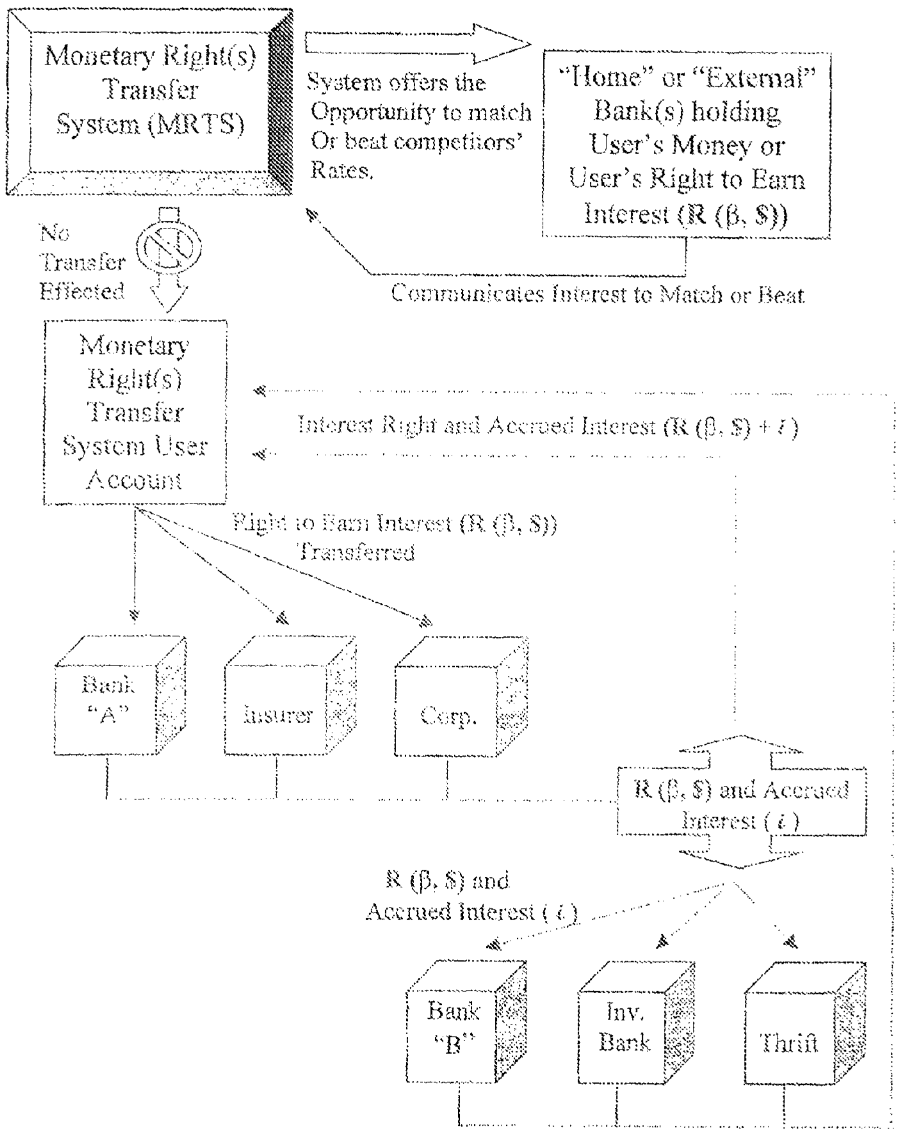
FIGS. 71A through 71D are schematic representations of the Right-of-First-Refusal Process supported on the MRT Network of the present invention, wherein both "home" and "external" banks and financial institutions, holding an accountholder's R (β, $) on the MRT Network, are automatically notified that the user has requested a transfer of such rights R (β, $) and, at which point, the financial institution may, at the discretion of the system user, have an opportunity to improve, match, beat or counter the interest rate/yield being offered a competitor's offer determined by the system user, and if the system user accepts the offer, then no monetary right(s) transfer is effected over the MRT Network.
Figure 71B:
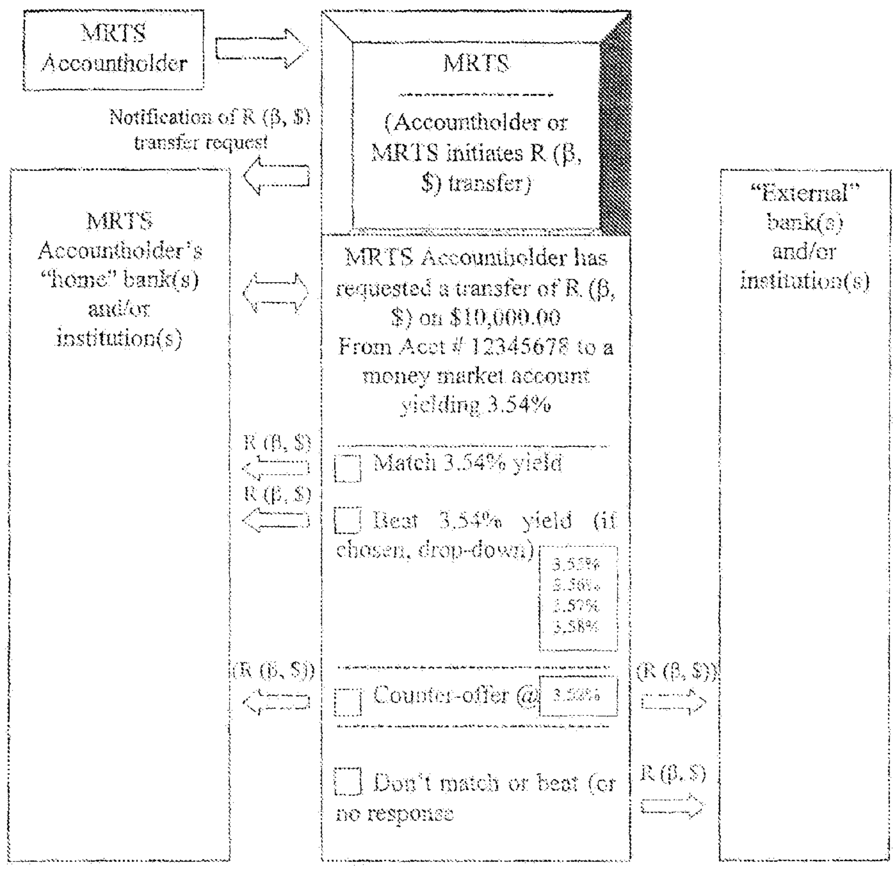

FIG. 71B is a schematic representation of the MRT Network Right of First Refusal Right(s) Transfer Process through which either an MRT Network accountholder or the MRT Network itself (depending on R (β, $) method(s) chosen by the MRT Network accountholder) provides an accountholder's "home" bank(s) or institution(s) with the opportunity to match, beat, or counter R (β, $) transfer offers received by the MRT Network accountholder or the MRT Network itself.

Via the MRT Network, the accountholder or the MRT Network initiates an R (β, $) transfer. The MRT Network notifies the accountholder's "home" bank(s)/institution(s) of the initiation of the transfer process and of the associated transfer terms. Accompanying the R (β, $) transfer notification is a menu of choices by which the "home" bank(s)/institution(s) can choose to match, beat, or counter, the offer (s) received by the MRT Network accountholder. If the "home" bank(s)/institution(s) choose to match or beat the competing offer(s), the MRT Network accountholder's R (β, $) will remain with the "home" bank(s)/institution(s). In the event the "home" bank(s)/institution(s) chooses to beat the competing offer (this may be the only option afforded the "home" bank(s)/institution(s) by an MRT Network accountholder via the control panel shown in FIG. 93), a drop-down menu will appear allowing the "home" bank(s)/institution(s) to highlight the interest rate/yield it will offer.

If the MRT Network accountholder has chosen to provide the "home" bank(s)/institution(s) with an opportunity to provide a counter-offer (see FIG. 93), the "home" bank(s)/institution(s) will have a "window" in which to provide its counter-offer. In the event the "home" bank(s)/institution(s) provides a counter-offer, the MRT Network will decide, based on the MRT Network accountholder's pre-specified criteria, whether to leave the MRT accountholder's R (β, $) with the "home" bank(s)/institution(s) or transfer the MRT Network accountholder's R (β, $) to an "external" bank(s)/institution(s).

Finally, the "home" bank(s)/institution(s) may choose not to match, beat, or counter, an offer received by the MRT Network accountholder. In this case, the MRT Network accountholder's R (β, $) will be transferred to an "external" bank(s)/institution(s) by the MRT Network.

Figure 71C:
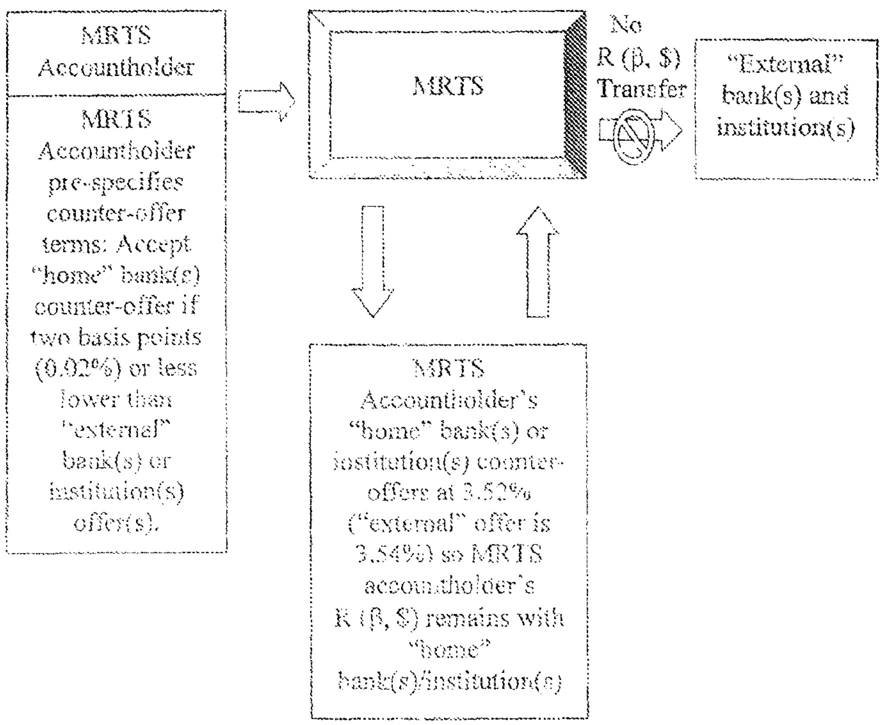

FIG. 71C is a flow chart depicting the Right-of-First Refusal Right(s) Transfer Process Counter-Offer Method in which the "home" bank(s)/institution(s) counter-offer is accepted and the MRT Network accountholder's R (β, $) remains at the "home" bank(s)/institution(s). In this example, the MRT Network accountholder has specified that the MRT Network accept the "home" bank(s)/institution(s) counter-offer if it is two basis points (0.02%) or less lower than the "external" bank(s)/institution(s) offer(s). The MRT Network notifies the MRT Network accountholder's "home bank(s)/institution(s) of the offer received, and the accountholder's "home bank(s)/institution(s) counters with an acceptable offer based on the accountholder's pre-specified R (β, $) transfer criteria. Once notified of an acceptable counter-offer, the MRT Network leaves the accountholder's R (β, $) at the "home" bank(s)/institution(s) and does not effect an R (β, $) transfer to an "external" bank(s)/institution(s).

Figure 71D:
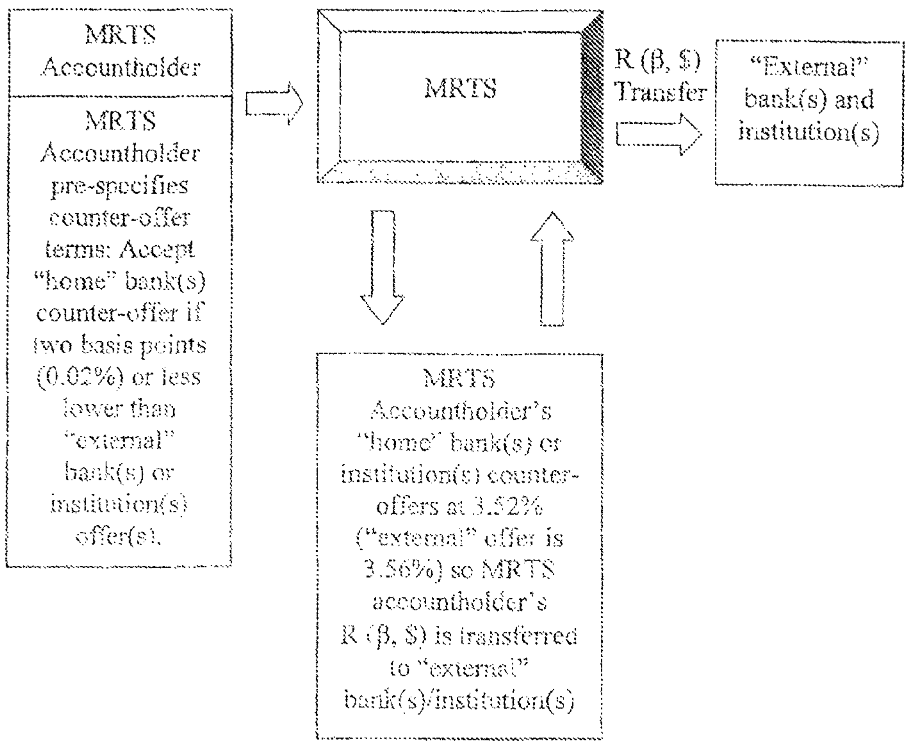

FIG. 71D is a flow chart depicting the MRT Network Right of First Refusal Right(s) Transfer Process Counter-Offer Method in which the "home" bank(s)/institution(s) counter-offer is rejected and the MRT Network effects an R (β, $) transfer to an "external" bank(s)/institution(s). In this example, the MRT Network accountholder has also specified that the MRT Network accept the "home" bank(s)/institution (s) counter-offer if it is two basis points (0.02%) or less lower than the "external" bank(s)/institution(s) offer(s). However, the "home" bank(s)/institution(s) counter-offer is more than two basis points (0.02%) lower than the offer received from an "external" bank(s)/institution(s), so the MRT Network effects the an R (β, $) transfer on behalf of the MRT Network accountholder with the "external" bank(s)/institution(s).

As in previous embodiments, the accountholder has constant access to all relevant account(s) information regarding balances, transfers, etc.

Figure 72:
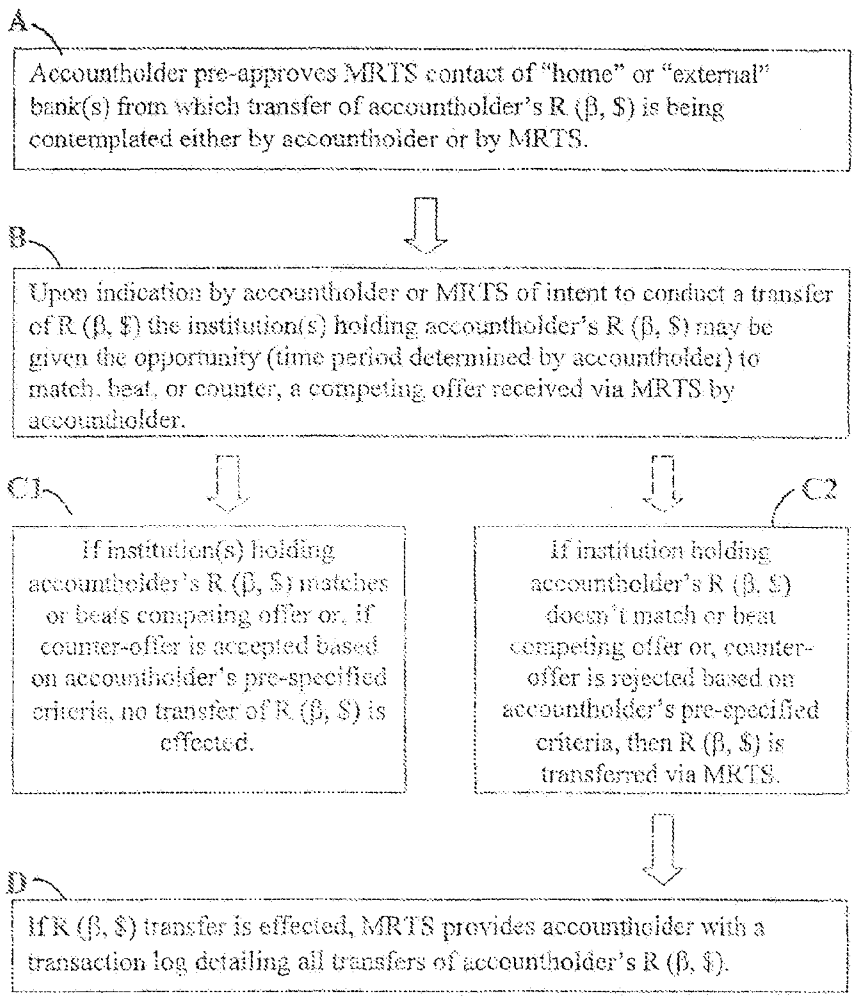
FIG. 72 is a flow chart describing the steps carried out during the Right of First Refusal Process depicted in FIGS. 71A through 71D, supported on the MRT Network of the present invention.

FIG. 72 is a flow chart depicting the Right-of-First Refusal Process supported on the MRT Network of the present invention, enabling a system accountholder to provide a bank or institution holding the user's R (β, $) ("home" bank(s) or institution(s)) with the opportunity to match, beat, or counter, a competing offer prior to system accountholder or the MRT Network transferring the R (β, $) from that institution.

Now, referring to FIG. 72, at Block A, an MRT Network accountholder pre-approves the MRT Network to contact the accountholder's "home" or "external" financial institution(s) from which a transfer of the accountholder's R (β, $) is being contemplated either by the accountholder or by the MRT Network on the accountholder's behalf. At Block B, upon indication by an accountholder or by the MRT Network of the intent to conduct a transfer of the accountholder's R (β, $), the institution(s) holding the accountholder's R (β, $) may be given the opportunity by the accountholder (time period determined by the accountholder) to match, beat, or counter a competing offer received by the accountholder via the MRT Network. At Block C1, if the institution(s) holding the accountholder's R (β, $) matches or beats the competing offer(s) or, if a counter-offer is accepted based on the accountholder's pre-specified criteria (see FIG. 60), no transfer of the accountholder's R (β, $) is effected. At Block C2, however, if the institution(s) holding the MRT Network accountholder's R (β, $) doesn't match or beat a competing offer(s) or, a counter-offer is rejected based on the accountholder's pre-specified criteria (see FIG. 93), then the R (β, $) transfer is effected via the MRT Network. AT Block D, provided that the R (β, $) transfer is effected via Block C2, the MRT Network provides the accountholder with a transaction log detailing all transfers of the accountholder's R (β, $).

Foreign Entities and Foreign Exchange Conversion (GBP) Process Supported on the MRT Network of the Present Invention Referring to FIGS. 73A, 73B, 74, and 79, the Foreign Entities and Foreign Exchange Conversion REI Transfer Processes supported on the MRT Network will now be described in greater detail.

Figure 73A:
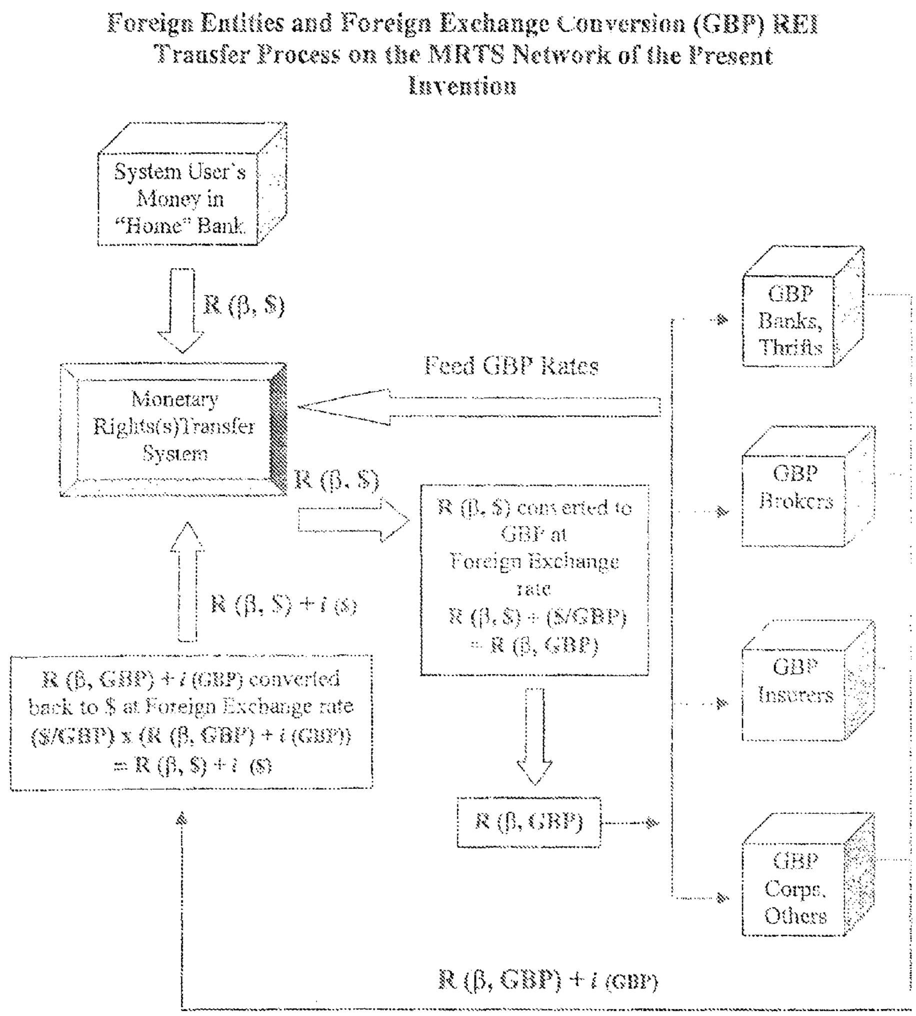
FIG. 73A is a schematic representation of the Foreign Entities and Foreign Exchange Conversion (GBP) Process supported on the MRT Network of the present invention, enabling a system user/accountholder to transfer R (β, $) to foreign participating institutions that provide rate feeds to the MRT by first converting the R (β, $) to R (β, GBP) via a market-based foreign exchange conversion rate and then, upon transfer back to a domestic institution, by converting R (β, GBP)+(i, GBP) back to R (β, $)+(i, $) via a similar foreign exchange market-based conversion rate.

FIG. 73A is a schematic representation of the Foreign Entities and Foreign Exchange Conversion (GBP) Process supported on the MRT Network of the present invention, enabling a system user/accountholder to transfer R (β, $) to foreign participating institutions that provide rate feeds to the MRT Network by first converting the R (β, $) to R (β, GBP) via a market-based foreign exchange conversion rate and then, upon transfer back to a domestic institution, by converting R (β, GBP)+(i, GBP) back to R (β, $)+(i, $) via a similar foreign exchange market-based conversion rate. Due to foreign exchange quoting convention, this example also serves for the Euro, the Australian Dollar and the New Zealand Dollar.

Figure 73B:
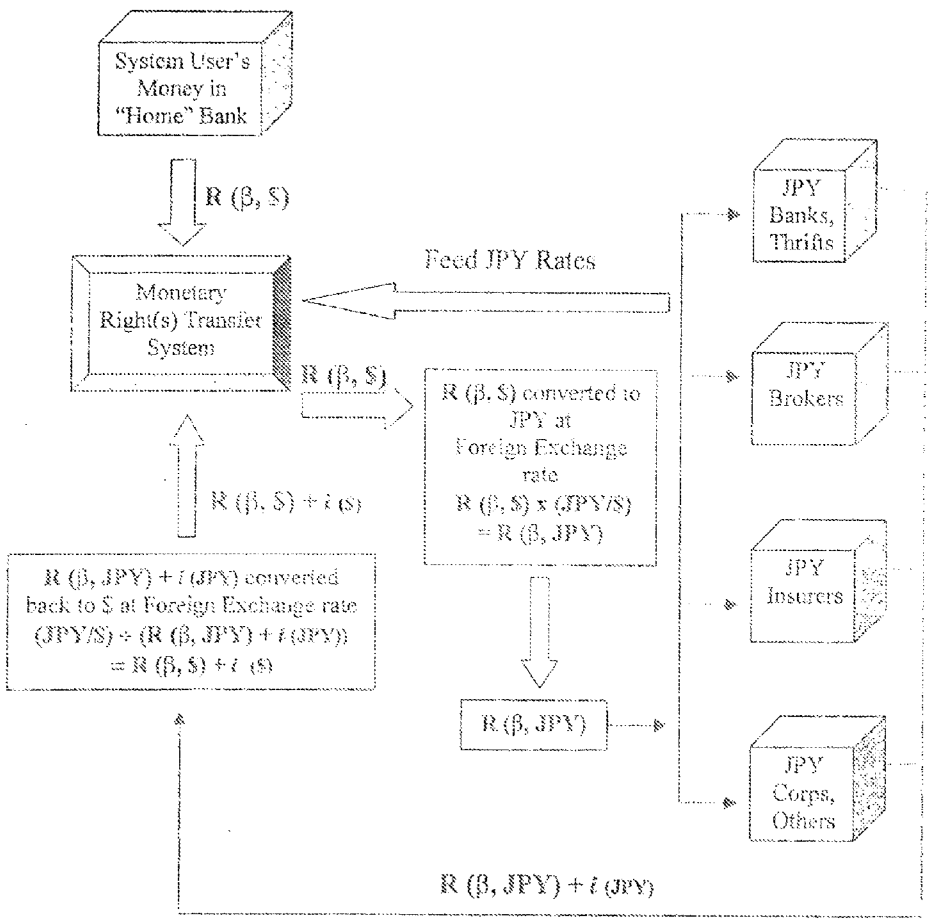
FIG. 73B is a schematic representation of the Foreign Entities and Foreign Exchange Conversion (JPY) Process supported on the MRT Network of the present invention, enabling a system user/accountholder to transfer R (β, $) to foreign participating institutions that provide rate feeds to the MRT by first converting the R (β, $) to R (β, JPY) via a market-based foreign exchange conversion rate and then, upon transfer back to a domestic institution, by converting R (β, JPY)+(i, JPY) back to R (β, $)+(i, $) via a similar foreign exchange market-based conversion rate.

Similarly, FIG. 73B is a schematic representation of the Foreign Entities and Foreign Exchange Conversion (JPY) Process supported on the MRT Network of the present invention, enabling a system user/accountholder to transfer R (β, $) to foreign participating institutions that provide rate feeds to the MRT Network by first converting the R (β, $) to R (β, JPY) via a market-based foreign exchange conversion rate and then, upon transfer back to a domestic institution, by converting R (β, JPY)+(i, JPY) back to R (β, $)+(i, $) via a similar foreign exchange market-based conversion rate. Due to foreign exchange quoting convention, this example also serves for the Swiss Franc, the Swedish Krona, the Norwegian Krona, the Chinese Yuan, the Mexican Peso, the Brazilian Real, and many other currencies.

FIGS. 73A-B is a schematic representation of the MRT Network Foreign Entities and Foreign Exchange Conversion Process. This process allows an MRT Network accountholder to effect foreign R (β, $) (and other right(s)) transfers via the system and methods of the present invention.

An MRT Network accountholder maintains accounts at "home" institution(s) where the accountholder's individual, separable set of monetary rights (R (α . . . ι, $)) reside. The MRT Network receives foreign rate feeds from various foreign financial institutions and ranks and displays them in the same manner as it ranks and displays domestic institutions' accounts and products.

The MRT Network accountholder (or the MRT Network, depending on the accountholder's pre-specified criteria) initiates an R (β, $) transfer to a foreign institution. Prior to receipt by a foreign institution, the R (β, $) is converted to R (β, foreign currency (fc)) by using a market-derived foreign exchange conversion rate which can be "time-stamped" to assure that the accountholder is receiving a fair conversion rate. After the conversion to R (β, fc), the transfer is placed with the foreign institution(s) until such time as the accountholder or the MRT Network recalls the R (β, fc) or transfers the R (β, fc) to another institution in another country.

If the R (β, fc) is recalled, then R (β, fc)+(i, fc) must be converted back to R (β, $)+(i, $) by again utilizing a market-derived foreign exchange conversion rate, which can again be "time-stamped" to assure a fair conversion rate. Once this conversion back to R (β, $)+(i, $) has taken place the accrued interest is placed in the accountholder's MRT Network account(s), the R (β, $) is restored to the accountholder's MRT Network account(s) and the process can begin anew.

In the event the accountholder (or the MRT Network) chooses to transfer the R (β, fc) to another foreign institution, the (i, fc) can be transferred as well or converted back to (i, $) and deposited in the accountholder's MRT Network account. The R (β, fc) can be transferred to another institution and, if necessary, can be converted to another R (β, fc) via the aforementioned process.

Depending on the foreign currency conversion, there are two separate conventions that are used to convert the R (β, $) and the (i, $) to their foreign currency equivalents, and back; both are shown in FIGS. 73A-B.

FIG. 74 is a flow chart depicting the Foreign Entities and Foreign Exchange Conversion Processes, illustrated in FIGS. 73A and 73B, and enabling a system user/accountholder to make foreign transfers of R (β, $ (or other currencies)) in order to seek potentially higher rates/yields offered by foreign institutions.

Now, referring to FIG. 74, at Block A, participating foreign financial institutions feed rate/yield and account/product information to the MRT Network databases where the information is collected and ranked both by the pre-specified criteria supplied by the accountholder and by the MRT Network-specified criteria. At Block B, the MRT Network accountholder indicates, via the MRT Network, the desire to effect an R (β, $) to account(s)/product(s) at foreign financial institutions. At Block C, the MRT Network transfers the accountholder's R (β, $) to foreign institution(s) account(s)/product(s) using a foreign exchange conversion rate to convert R (β, $) to R (β, foreign currency (fc)) and, per earlier embodiments, notifies the accountholder of rate/yield and other details of the foreign transfer(s). At Block D, when the accountholder wants to effect another transfer of what is now R (β, fc) back to an account/product within the U.S. (or other foreign country) the MRT Network now converts R (β, fc)+i (fc) back to R (β, $)+i ($) (or other foreign currency) using a foreign exchange conversion rate and effects the transfer either at the command of the accountholder or automatically. At Block E, the MRT Network then provides to the accountholder a transaction log detailing all R (β, $) transfers, amounts, rates/yields, etc., as well as all R (β, fc)+i (fc) earned along with all foreign exchange conversion rates used in the REI transfer process.

Transaction Logs on the MRT Network of the Present Invention

FIG. 76 is a schematic representation of an exemplary transaction log based on hypothetical transfers of R (β, $) by an user/accountholder on the MRT Network.

The MRT Network Transaction Log provides the pertinent details of each right(s) transfer, in this case the right to earn interest R (β, $) possessed by an owner of money. While the R (β, $) transfer can be accomplished through a number of different methods employed by the MRT Network, the relevant details of each right(s) transfer can be viewed by an MRT Network accountholder in the transaction log.

The transaction log includes, but is not limited to, the following information: the date of each right(s) transfer, the institution to which the right(s) was transferred, the type of account or product where the right(s) was placed, the amount (principle) of the right(s) transfer, the interest rate or yield afforded by the account or product, the total interest earned for each right(s) transfer, and the accountholder's total right (s) transfer balance (R (β, $)+(i)). In addition, the transaction log may include the accountholder's total taxable interest earned, the average interest rate/yield received on R (β, $) transfers and a periodic balance of balance (R (β, $)+(i)).

The transaction log may also include additional entries that denote central bank rate cuts/hikes and other information that may help to explain large interest rate/yield discrepancies on the accountholder's transaction log.

GUI-Based Control Panels Enabling the Delivery of Services on the MRT Network of the Present Invention Having described the structure, function and operation of the MRT Network of the illustrative embodiment, it is appropriate at this juncture to briefly describe some exemplary GUI-Based Control Panels that can be used to enable the delivery the services supported on the MRT Network of the present invention.

FIG. 76 is a schematic representation of an exemplary Accountholder Information Collection and Storage form that can be used by the MRT Network of the present invention, in order to collect and store relevant information relating to the opening and maintenance of an account on the MRT Network of the present invention.

FIG. 77 is a schematic representation of an exemplary Accountholder Preference Collection and Storage form that can be used by the MRT Network to allow an accountholder to supply account data to the system, rank display and transfer criteria, and provide institution and/or account/product data for the accountholder's Preferred Partner Network (PPN). The first section of the form allows an accountholder to establish from which registered account(s)/product(s) to transfer the accountholder's R (β, $). The second part of the form allows an MRT Network accountholder to rank the various R (β, $) transfer criteria that will be used in the aforementioned methods and their various iterations to transfer an accountholder's R (β, $). The final form allows an MRT Network accountholder to establish Preferred Partner Network(s) that can specify to which institutions' accounts/products to transfer accountholder's R (β, $).

Figure 78:
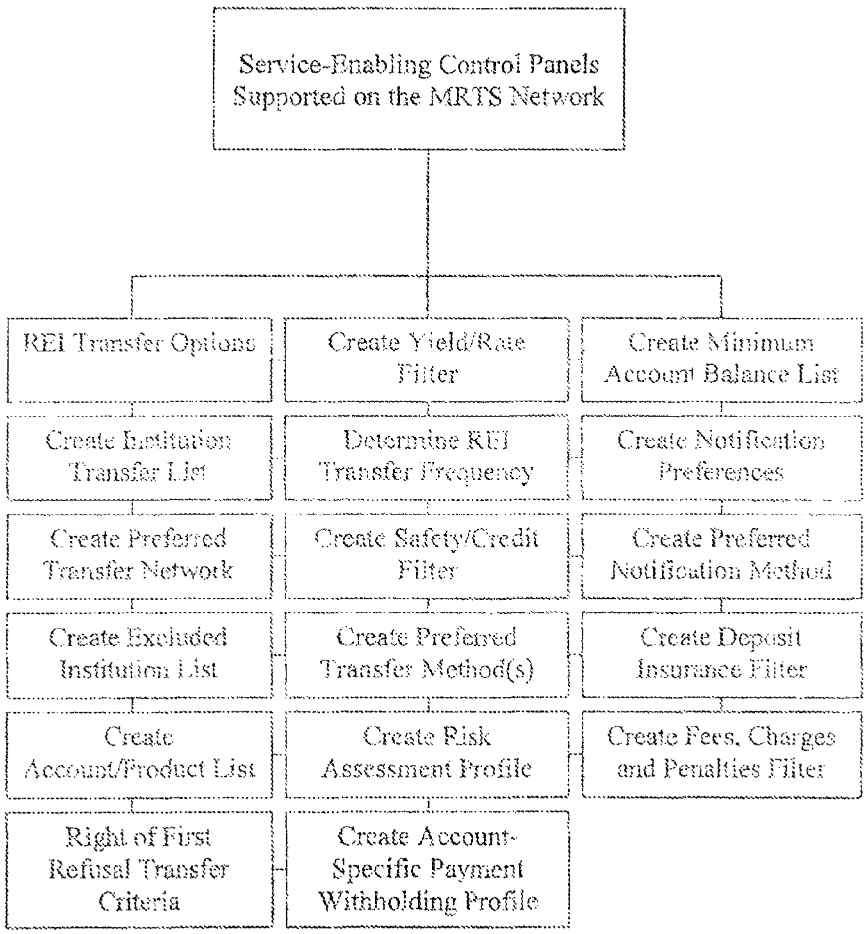
FIG. 78 is a schematic representation illustrating the architecture of the various control panels available to accountholders on the MRT Network, illustrated in FIGS. 77 through 93, for purposes of carrying out the principles of the present invention.

FIG. 78 is a schematic representation of a Web-based control panel that allows an accountholder on the MRT Network to specify the method(s) by which to transfer the accountholder's right to earn interest (R (β, $)) on accounts registered with the MRT Network. The first section of the form allows an accountholder to establish from which registered account(s)/product(s) to transfer the accountholder's R (β, $). The second part of the form allows an MRT accountholder to rank the various R (β, $) transfer criteria that will be used in the aforementioned methods and their various iterations to transfer an accountholder's R (β, $). The final form allows an MRT Network accountholder to establish Preferred Partner Network(s) that can specify to which institutions' accounts/products to transfer accountholder's R (β, $).

This is the MRT Network control panel by which an accountholder establishes R (β, $) transfer options. This panel allows an accountholder to establish preferences for conducting the accountholder's R (β, $) transfers by signifying which institutions and networks to include and exclude in the R (β, $) transfer process.

FIG. 79 is a schematic representation of a Web-based control panel that allows an accountholder on the MRT Network to specify which institutions to include when the MRT Network ranks, for the purpose of facilitating a R (β, $) transfer, participating institutions via absolute rate/yield, the accountholder's pre-specified criteria and/or the system's criteria.

FIG. 80 is a schematic representation of an MRT Network Web-based control panel that allows an MRT Network accountholder to choose certain institutions (or groups of institutions) to which to transfer the accountholder's R (β, $) (or other right(s)). When an accountholder chooses a certain group, a drop-down menu appears listing all participating institutions in that particular category. As the accountholder highlights individual institutions they appear in the "Institutions Added" list. When an accountholder has completed this process the accountholder then has the option to "edit" or "save" the choices made. In the future, the accountholder can return to this control panel to edit the "Institutions Added" list at any time.

FIG. 81 is a schematic representation of a Web-based control panel that allows an accountholder on the MRT Network to specify which banks and/or institutions, and/or accounts and products, to include in the accountholder's Preferred Partner Network (PPN) for the purpose of effecting transfers of R (β, $). The mechanics of the control panel are very similar to those of the control panel shown in FIG. 64.

Figure 82:
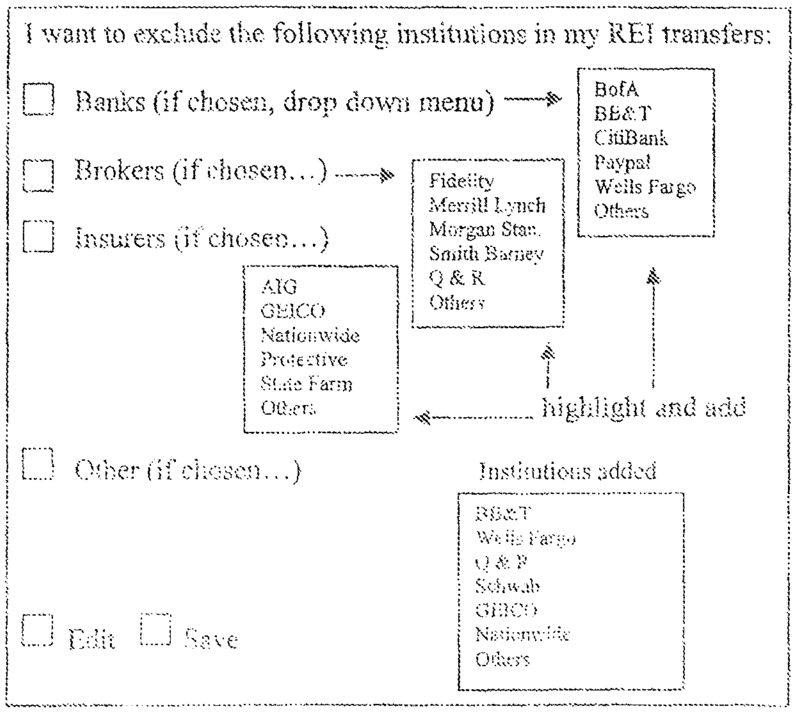
FIG. 82 is a schematic representation of a Web-based control panel that allows an accountholder on the MRT Network to exclude certain institutions from consideration for ranking and from consideration for receiving R (β, $) transfers.

FIG. 82 is a schematic representation of a Web-based control panel that allows an accountholder on the MRT Network to exclude certain institutions, or groups of institutions, from consideration for ranking and from consideration for receiving R (β, $) transfers. As in previous control panels, the accountholder can save these preferences and then come back at any point in the future and edit them.

Figure 83:
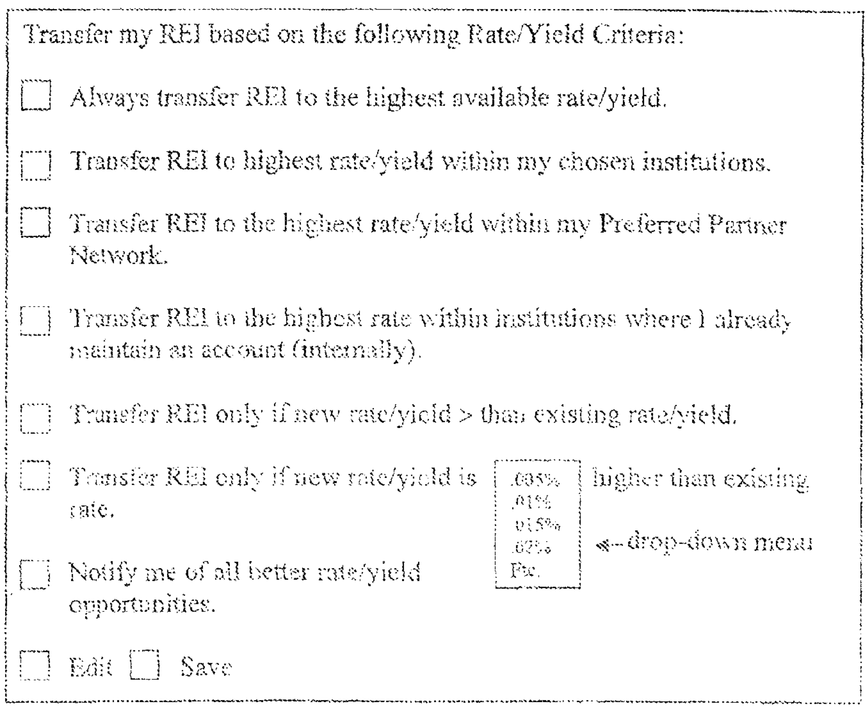
FIG. 83 is a schematic representation of a Web-based control panel that allows an accountholder on the MRT Network to specify the various interest rate/yield criteria as they relate to transfers of R (β, $) transfers via the MRT Network of the present invention.

FIG. 83 is a schematic representation of a Web-based control panel that allows an accountholder on the MRT Network to specify the various interest rate/yield criteria as they relate to R (β, $) transfers via the system of the present invention. The MRT Network Rate/Yield Filter control panel allows an MRT Network accountholder to establish criteria based on interest rates/yields by which to conduct the accountholder's R (β, $) transfers. The criteria established in this control panel will be important in ranking institutions' accounts/products either by the other pre-specified criteria supplied by the accountholder or by the criteria utilized by the MRT Network to rank institutions' accounts and products. After making the various selections on this control panel, the accountholder can then "edit" or "save" them. As with other control panel embodiments, the accountholder can always come back to this panel at any point in the future to edit the saved choices.

Figure 84:
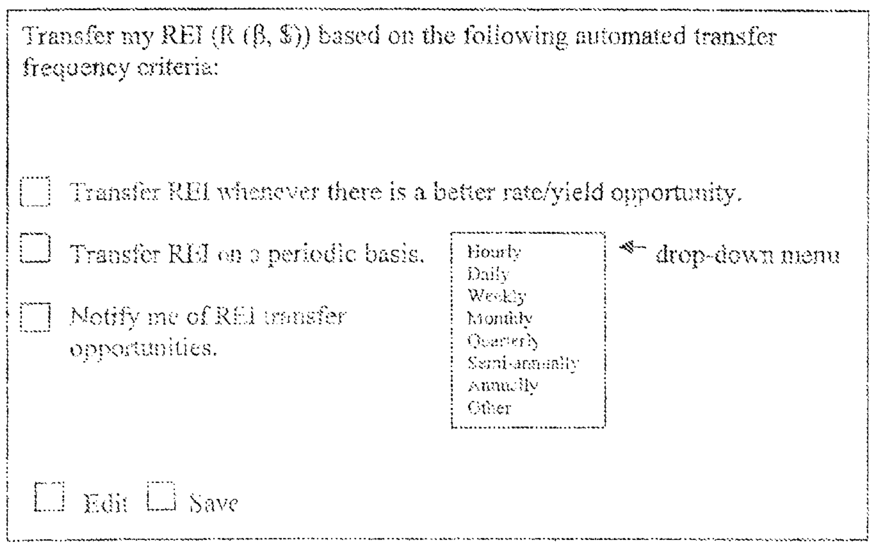
FIG. 84 is a schematic representation of a Web-based control panel that allows an accountholder on the MRT Network to specify the frequency with which automatic R (β, $) transfers are effected on the accountholder's behalf by the system.

FIG. 84 is a schematic representation of a Web-based control panel that allows an accountholder on the MRT Network to specify the frequency with which automatic R (β, $) transfers are effected on the accountholder's behalf by the system. This MRT Network control panel allows an accountholder to establish the frequency with which the MRT conducts automated transfers on the accountholder's behalf. After making the desired selections, the accountholder can then "edit" or "save" the selections as per previous control panels.

FIG. 85 is a schematic representation of a Web-based control panel that allows an accountholder on the MRT Network to specify minimum safety/credit criteria for institutions and/or accounts and products to which to transfer accountholder's R (β, $). This MRT Network Safety/Credit Filter control panel enables an accountholder to determine the credit rating (s) or safety ratings for institutions with which to conduct R (β, $) transfers. The MRT Network will also take these selections into account when ranking and displaying either transfer methods employing the accountholder-specified transfer criteria or the MRT Network-specified transfer criteria, where the MRT Network-specific criteria can exclude all institutions with which the accountholder chooses not to conduct R (β, $) transfers, allowing this one critical aspect to override potential selections by the MRT Network-specific criteria.

FIG. 86 is a schematic representation of a Web-based control panel that allows an accountholder on the MRT Network to establish R (β, $) transfer risk levels that will serve to govern automatic (and other) transfers of R (β, $) via the MRT Network. This MRT Network control panel that allows an accountholder to define a risk profile that will then be taken into account when displaying and ranking either accountholder-specified R (β, $) transfer criteria and/or MRT Network-specified transfer criteria.

FIG. 87 is a schematic representation of A Web-based control panel for a Deposit Insurance Filter supported on the MRT Network, allowing an accountholder on the MRT Network to establish parameters regarding deposit insurance afforded to the transfers of the right to earn interest (R (β, $)). This MRT Network Deposit Insurance Filter control panel allows an accountholder to specify R (β, $) transfer criteria by which an accountholder can receive the maximum allowable deposit insurance afforded by each account/product to which the accountholder's R (β, $) is transferred. Conversely, the accountholder can also opt to forego some, or all, of the potential deposit insurance available in return for seeking higher interest rates/yields. As is the case with other control panels, the accountholder can choose to either "edit" or "save" choices made and can always come back at any point in the future to modify these choices.

FIG. 88 is a schematic representation of a Web-based control panel for the MRT Minimum Account Balance Filter supported on the MRT Network, allowing an accountholder to establish parameters related to minimum account balances for effecting transfers of the accountholder's right to earn interest (R (β, $)). This MRT Network control panel allows an accountholder to establish R (β, $) transfer criteria based on whether or not account(s)/product(s) require a minimum balance to avoid fees and/or penalties. By pre-specifying this R (β, $) transfer criteria, an accountholder can assure that no minimum account balance fees or penalties are incurred in the R (β, $) transfer process or, an accountholder may choose to be notified of any minimum balance requirement and may then proceed with an R (β, $) transfer irrespective of any associated fees and/or penalties. As is the case with other control panels, the accountholder can choose to either "edit" or "save" choices made and can always come back at any point in the future to modify these choices.

FIG. 89 is a schematic representation of a Web-based control panel for Notification Preferences that allows an accountholder on the MRT Network to establish criteria, for notification of opportunities and offers supported on the MRT Network. This MRT Network control panel by which an accountholder can choose to receive MRT Network notification of any potential offerings, new products, special offers, or changes in any of the other criteria that may influence an accountholder's an R (β, $) transfer decisions. The accountholder can then "edit" or "save" these choices and can come back to this control panel at any point in the future to modify choices.

FIG. 90 is a schematic representation of a Web-based control panel for Preferred Notification Methods that allows an accountholder to specify method(s) by which an accountholder on the MRT Network prefers to be contacted/notified. This MRT Network control panel allows an accountholder to define preferred notification methods by the MRT Network. The choices made in this control panel will dictate how the MRT Network contacts the accountholder to apprise the accountholder of R (β, $) transfers, offers, tax statements, etc. As with other control panels, the accountholder is able to edit and save these changes.

FIG. 91 is a schematic representation of a Web-based control panel for the Fees, Charges and Penalties Filter that allows an accountholder on the MRT Network to establish criteria related to fees, charges and penalties for notification and transfer of the accountholder's right to earn interest (R (β, $)). This MRT Network control panel, by which an accountholder can define terms under which the MRT Network notifies the accountholder of potential charges, fees, and/or penalties associated with any potential R (β, $) transfer(s) or with any account(s)/product(s) ranked and displayed by the MRT Network. It also allows an accountholder to establish criteria by which to conduct potential R (β, $) transfers with an objective of avoiding or minimizing charges, fees and/or penalties. An accountholder can then "edit" and/or "save" these preferences for future revision.

FIG. 92 is a schematic representation of Web-based control panel for the Preferred Transfer Method(s) that allows an accountholder on the MRT Network to specify the preferred method(s) by which to transfer the accountholder's right to earn interest (R (β, $)). This MRT Network control panel allows an accountholder to specify the preferred means by which to transfer the accountholder's R (β, $) (or other monetary right(s)). The MRT Network accountholder can choose the last option to always conduct transfers manually, or the accountholder can "edit" and "save" choices at any time to reflect a change in the accountholder's preferred transfer method.

FIG. 93 is a schematic representation for a Web-based control panel for the Accountholder Right-of-First Refusal REI (R (β, $)) Transfer Criteria that allows an accountholder on the MRT Network to establish criteria which will (will not) allow "home" bank(s)/institution(s) to match, beat, or counter, offers received by an MRT Network accountholder from "external" bank(s)/institution(s). This MRT Network control panel allows an MRT Network accountholder to pre-establish criteria that will or will not allow the accountholder's "home" bank(s)/institution(s) to match, beat, or counter, offers from "external" bank(s)/institution(s) via the MRT Network Right-of-First Refusal REI (R (β, $)) Transfer Process.

First the MRT Network accountholder can decide whether or not to allow "home" bank(s)/institution(s) to have the opportunity to match, to beat or to counter offers received via the MRT Network from "external" institutions. Assuming the MRT Network accountholder chooses to accept counter-offers, the MRT Network accountholder can then allow a "home" bank(s)/institution(s) to only match "external" offers, require the "home" bank(s)/institution(s) to beat "external" offers, or accept the "home" bank(s)/institution(s) counter-offers.

If the MRT Network accountholder allows a "home" bank(s)/institution(s) to beat "external" offers, then a drop-down menu appears that allows the accountholder to determine by what amount of basis points the "home" bank(s)/institution(s) must beat the "external" offer to retain the accountholder's R (β, $). The accountholder highlights the choice from the drop-down menu.

If the MRT Network accountholder allows the "home" bank(s)/institution(s) to make a counter-offer(s), again a drop-down menu appears that allows the accountholder to determine by what amount of basis points the "home" bank(s)/institution(s) offer(s) can be less than that of the "external" offer(s) (If the amount is 0.000% then the accountholder would choose the "match" option), and still be acceptable to the MRT Network accountholder. Again, the accountholder chooses this amount from the drop-down menu.

These choices are not mutually exclusive, as the MRT Network accountholder's choices here are not known to the "home" bank(s)/institution(s), and the "home" bank(s)/institution(s) must make their best offer and see if it is accepted based on the MRT Network accountholder's criteria. However, if the MRT Network accountholder is operating in a completely manual mode, the accountholder may override the pre-established criteria and allow an R (β, $) transfer to occur that would normally be rejected by the MRT Network accountholder (or the MRT Network) based on the accountholder's pre-established criteria.

As in previous embodiments, after making choices in this control panel the accountholder then can either edit or save choices made.

FIG. 94 is a schematic representation for a Web-based control panel for the Account-Specific Payment Method Withholding the Right to Earn Interest (R (β, $)) until payment Due Date Pre-Specifications that allows an accountholder on the MRT Network to pre-specify from which account(s) to make payments withholding R (β, $) until a payment's due date, and to pre-specify whether to make said payment by electronic means or by manual means. This MRT Network control panel allows an MRT Network accountholder to pre-designate from which accounts to make bill payments (or payments of any type) via the MRT Network Account-Specific Payment Method Withholding the Right to Earn Interest (R (β, $)) until Payment Due Pre-Specifications.

This control panel provides an MRT Network accountholder with specific payment options with (R (α . . . ι, $)–R (β, $)) being paid by an MRT Network accountholder at any time prior to a bill's actual payment due date, allowing the accountholder to transfer the withheld R (β, $) and earn interest until the actual payment due date. The accountholder chooses from accounts already registered with the MRT Network by the accountholder (See FIG. 61) from which to make the payments withholding the right to earn interest (R (β, $)) until the payment(s) due date.

Then the MRT Network accountholder pre-specifies whether to pay electronically, which may be effected either by the MRT Network or by the accountholder's "home" bank (s)/institution(s), or whether to pay manually from one (or more) of the already-specified accounts.

Should the MRT Network accountholder choose to pay manually, the MRT Network, having already been provided the accountholder's account number(s) with each bill sender, the bill sender's contact information, and the proper authorization to establish contact with each bill sender, will automatically withhold the accountholder's R (β, $) from payments the accountholder chooses to make manually until the actual payment(s) due date(s) at which time the withheld R (β, $) will be restored to the accountholder's initial payment of (R (α . . . ι, $)–R (β, $)). This will allow MRT Network accountholders who are more comfortable paying bills manually to still withhold, and transfer, their R (β, $) until each payment's due date.

As in previous embodiments of control panels, the accountholder always has the ability to edit and/or save any choices made in this panel.

FIG. 79 is a schematic representation for a Web-based control panel for the Right(s) Transfer Preferred Accounts and Products List that allows an accountholder on the MRT Network to specify to which accounts and products the accountholder prefers to transfer the accountholder's monetary right to earn interest R (β, $) possessed by an owner (or borrower) of money. This MRT Network control panel allows an MRT Network accountholder to pre-specify types of accounts and products to which to transfer the accountholder's R (β, $). The first option allows the accountholder to pre-specify all participating institutions' accounts and products, which would then preclude all of the other options. However, if an accountholder prefers to pick accounts and products individually, then the accountholder may do so. Once the accountholder has made the preferred choices, as in previous embodiments of the MRT Network control panels, the accountholder can at any time either edit or save selections made in this control panel.

It is understood that while the illustrative embodiments of the MRT Network of the present invention have been described using the example(s) of an accountholder transferring its right to earn interest (R (β, S)) to one "external" bank or financial institution under the accountholder's management, it is understood that in alternative embodiments such monetary right(s) can be transferred among multiple "external" financial institutions (and internally among the "home" institution) in order to maximize earned interest. In such embodiments, the MRT Network of the present invention will track and account for all such R (β, $) (and other right(s)) transfers as well as the netting of earned interest.

Also, it is understood that the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto

The invention claimed is:

1. A method of capturing interest, said method comprising:

(a) providing an internet-based monetary rights transfer (MRT) network that recognizes and accounts for an unbundled and individually transferable set of monetary rights associated with an amount of money, said unbundled and individually transferable set of monetary rights (R (α . . . τ, $)) selected from the group consisting of: a monetary right to invest (R (α, $)), a monetary right to earn interest (R (β, $)), a monetary right to use as collateral (R (χ, $)), a monetary right to hold as a store of value (R (δ, $)), a monetary right to make purchases (R (ϵ, $)), a monetary right to make payments (R, (ϕ, $)), a monetary right to lend (R (γ, $)), a monetary right to borrow (R (η, $)), and a monetary right to gift (R (τ, $));

(b) embedding said internet-based MRT network into a real time gross settlement (RTGS) system controlled by a central bank of a country, wherein said RTGS system record debits and credits between central bank accounts maintained by different financial institutions at the central bank;

(c) registering a home financial institution and an external financial institution as participating financial institutions with said internet-based MRT network;

(d) registering said home financial institution and said external financial institution with said central bank, wherein said central bank maintains a home financial institution central bank account and an external financial institution central bank account;

(e) maintaining, by said home financial institution, a first account which holds a monetary amount for an MRT network user, and wherein said MRT network user is an owner or holder of said monetary amount;

(f) maintaining, by said external financial institution, a second account for said MRT network user;

(g) transferring by said MRT network user, via an enterprise level computer network of said internet-based MRT network, a subset of monetary rights associated with a monetary value held at said first account to said second account, wherein said subset of monetary rights comprises one or more of said monetary right to invest (R (α, $)), said monetary right to earn interest (R (β, $)), and said monetary right to lend (R (γ, $)), and wherein said monetary value comprises the whole monetary value or a partial monetary value of the monetary amount held at said first account;

(h) instantly recording, via said RTGS system, a debit equal to said monetary value in said home financial institution central bank account and a credit equal to said monetary value in said external financial institution central bank account, upon the RTGS system receiving notice from the internet-based MRT network that a non-transferred subset of monetary rights associated with said monetary value remains at said first account serving as full, non-leveraged collateral for said transferred subset of monetary rights;

(i) lending or investing a cash amount, by said external financial institution, to earn a return, wherein said cash amount is based on the monetary value credited to said external financial institution central bank account;

(j) earning, by said MRT network user, an interest amount on the monetary value associated with said transferred subset of monetary rights;

(k) receiving, via said internet-based MRT network, by said external financial institution a request to transfer the earned interest amount from said second account to said first account;

(l) capturing said interest amount by recording, via said RTGS system, a debit equal to a monetary value of said interest amount in said external financial institution central bank account and a credit equal to said monetary value of said interest amount in said home financial institution central bank account.

2. The method of claim 1, wherein said central bank is the United States Federal Reserve Bank, said country is the United States of America, and said RTGS system is the Fedwire RTGS system.

3. The method of claim 1, further comprising:

while said subset of monetary rights is transferred to said second account, exercising, by said MRT network user, one or more of the non-transferred subset of monetary rights associated with said monetary value held at said first account, and automatically and commensurately reducing, via said internet-based MRT network, the monetary value associated with said subset of monetary rights transferred to said second account.

4. The method of claim 3, further comprising:

upon the monetary value associated with said transferred subset of monetary rights being automatically reduced, automatically transferring the earned interest amount to said first account via steps (k) and (l).

5. The method of claim 1, further comprising:

while said subset of monetary rights is transferred to said second account, exercising, by said MRT network user, said monetary right to make purchases (R (ϵ, $)) by executing a demand transaction on said first account for a purchase amount, automatically reducing, via said internet-based MRT network, the monetary value associated with said subset of monetary rights transferred to said second account by the monetary value of the purchase amount; and simultaneously reducing the monetary amount held at said first account by the purchase amount.

6. The method of claim 1, further comprising:

while said subset of monetary rights is transferred to said second account, exercising, by said MRT network user, said monetary right to make payments (R (ϕ, $)) by executing a demand transaction on said first account for a bill pay amount, automatically reducing, via said internet-based MRT network, the monetary value associated with said subset of monetary rights transferred to said second account by the monetary value of the bill pay amount; and simultaneously reducing the monetary amount held at said first account by the bill pay amount.

7. The method of claim 1, further comprising:

while said subset of monetary rights is transferred to said second account, exercising, by said MRT network user, said monetary right to hold as a store of value (R (δ, $)) by executing a demand transaction on said first account for a withdrawal amount, automatically reducing, via said internet-based MRT network, the monetary value associated with said subset of monetary rights transferred to said second account by the monetary value of the withdrawal amount; and simultaneously reducing the monetary amount held at said first account by the withdrawal amount.

8. The method of claim 1, wherein said first account is a demand account or an investment account.

9. The method of claim 1, wherein said second account is selected from the group consisting of a checking account, a savings account, a money market account, a stored value account, a brokerage account, an insurance account, a certificate of deposit, and a retirement account.

10. The method of claim 1, further comprising:

while said subset of monetary rights is transferred to said second account, exercising, by said MRT network user, one or more of the non-transferred subset of monetary rights associated with said monetary value held at said first account by executing a demand transaction on said first account for a transaction amount, automatically reducing, via said internet-based MRT network, the monetary value associated with said subset of monetary rights transferred to said second account by the monetary value of the transaction amount;

simultaneously reducing the monetary amount held at said first account by the transaction amount, and either (i) capturing, via steps (k) and (l), any earned interest amount associated with the monetary value of the transaction amount when its associated subset of monetary rights was transferred to said second account or (ii) allowing said any earned interest amount to remain at said second account earning a high rate of interest with any monetary value associated with said transferred subset of monetary rights remaining at said second account.

11. The method of claim 1, wherein: (i) said home financial institution is a mortgage servicer, (ii) said first account is a mortgage escrow account, (iii) said monetary amount held in said mortgage escrow account comprises contributions made by said MRT network user for the purpose of paying mortgage principle payments, mortgage interest payments, property tax payments, and property insurance payments of said MRT network user, (iv) said second account offers an interest rate higher than said mortgage escrow account, (v) only said monetary right to earn interest (R (β, $)) is transferred to said second account, and (vi) said non-transferred subset of monetary rights are held by said mortgage servicer;

the method further comprising:

prior to step (g), contacting, by said internet-based MRT network, said mortgage service provider to permit said MRT network user to transfer only said monetary right to earn interest (R (β, $)) associated with said monetary amount held in said mortgage escrow account;

while said subset of monetary rights is transferred to said second account, exercising by said mortgage servicer, on behalf of said MRT network user, said monetary right to make payments (R (ϕ, $)) by executing, on its due date, a demand transaction on said mortgage escrow account for a payment amount, wherein said payment amount is a mortgage principle payment amount, a mortgage interest payment amount, a property tax payment amount, or a property insurance payment amount;

automatically reducing, via said internet-based MRT network, the monetary value associated with said subset of monetary rights transferred to said second account by the monetary value of the payment amount; and simultaneously reducing the monetary amount held at said mortgage escrow account by the payment amount;

so that said MRT network user earns the higher interest rate offered by said second account until the demand transaction is executed by said mortgage servicer on said due date.

12. The method of claim 1, wherein: (i) said home financial institution is a payroll service provider, (ii) said first account is a payroll escrow account, (iii) said monetary amount held in said payroll escrow account comprises withholdings of said MRT network user for the purpose of paying tax payments and benefits payments of said MRT network user, (iv) said second account offers an interest rate higher than said payroll escrow account, (v) only said monetary right to earn interest (R (β, $)) is transferred to said second account, and (vi) said non-transferred subset of monetary rights are held by said payroll service provider;

the method further comprising:

prior to step (g), contacting, by said internet-based MRT network, said payroll service provider to permit said MRT network user to transfer only said monetary right to earn interest (R (β, $)) associated with said monetary amount held in said payroll escrow account;

while said subset of monetary rights is transferred to said second account, exercising by said payroll servicer, on behalf of said MRT network user, said monetary right to make payments (R (β, $)) by executing, on its due date, a demand transaction on said payroll escrow account for a payment amount, wherein said payment amount is a tax payment amount or a benefit payment amount;

automatically reducing, via said internet-based MRT network, the monetary value associated with said subset of monetary rights transferred to said second account by the monetary value of the payment amount; and simultaneously reducing the monetary amount held at said payroll escrow account by the payment amount, so that said MRT network user earns the higher interest rate offered by said second account until the demand transaction is executed by said payroll service provider on said due date.

13. The method of claim 1, wherein: (i) said home financial institution is a stored value product issuer (ii) said first account is an escrow account, (iii) said monetary amount held in said escrow account comprises funds loaded by said MRT network user for the purpose of paying stored value product purchase amounts, (iv) said second account offers an interest rate higher than said escrow account, and (v) only said monetary right to earn interest (R (β, $)) is transferred to said second account;

the method further comprising:

prior to step (g), contacting, by said internet-based MRT network, said stored value product issuer to permit said MRT network user to transfer only said monetary right to earn interest (R (β, $)) associated with said monetary amount held in said escrow account;

while said subset of monetary rights is transferred to said second account, exercising, by said MRT network user, said monetary right to make purchases (R (ϵ, $)) by executing a demand transaction, via the stored value product, on said escrow account for a purchase amount, automatically reducing, via said internet-based MRT network, the monetary value associated with said subset of monetary rights transferred to said second account by the monetary value of the purchase amount; and simultaneously reducing the monetary amount held at said escrow account by the purchase amount, so that said MRT network user earns the higher interest rate offered by said second account until the demand transaction is executed via the stored value product.

14. The method of claim 13, further comprising:

establishing, by said MRT Network user, an expiration date for said funds loaded to said escrow account, and receiving, by said MRT Network user, any unspent monetary value held in said escrow account on said established expiration date.

15. The method of claim 1, wherein: (i) said home financial institution is a cash rebate issuer, said cash rebate issuer being a merchant or a manufacturer (ii) said first account is an escrow account, (iii) said monetary amount held in said escrow account comprises cash for the purpose of paying a cash rebate amount to said MRT network user, (iv) said second account offers an interest rate higher than said escrow account, (v) only said monetary right to earn interest (R (β, $)) is transferred to said second account, and (vi) said non-transferred subset of monetary rights are held by said cash rebate issuer;

the method further comprising:

prior to step (g), contacting, by said internet-based MRT network, said cash rebate issuer to permit said MRT network user to transfer only said monetary right to earn interest (R (β, $)) associated with said monetary amount held in said escrow account;

while said subset of monetary rights is transferred to said second account, exercising, by said cash rebate issuer, said monetary right to make payments (R (ϕ, $)) by executing a demand transaction on said escrow account for said cash rebate amount, automatically reducing, via said internet-based MRT network, the monetary value associated with said subset of monetary rights transferred to said second account by the monetary value of the cash rebate amount; and simultaneously reducing the monetary amount held at said escrow account by the cash rebate amount, so that said MRT network user earns the higher interest rate offered by said second account until said demand transaction is executed by said cash rebate issuer.

16. The method of claim 1, further comprising:

generating, by said internet-based MRT network, a transactional log for each monetary rights transfer and each monetary rights transfer reduction of said MRT network user.

17. The method of claim 1, further comprising:

poplulating, by said MRT network user a universal account opening form, said universal account opening form preapproved by all participating financial institutions of said internet-based MRT network, and pre-opening, base on said populated universal account opening form accounts at said all participating financial institutions so that said MRT network user can transfer monetary rights instantaneously to any of said preopened accounts.

18. The method of claim 1, further comprising:

crediting, by said home financial institution, the monetary value of said interest amount to said first account.

19. A system for capturing interest, said system comprising:

a real time gross settlement (RTGS) system controlled by a central bank of a country which (i) registers a home financial institution and an external financial institution and (ii) maintains a home financial institution central bank account and an external financial institution central bank account, and said RTGS system is configured to:

record debits and credits between central bank accounts maintained by different financial institutions at the central bank;

an internet-based monetary rights transfer (MRT) network, embedded into said RTGS system, said internet-based MRT network comprising an enterprise level computer network (ELCN) configured to:

recognize and account for an unbundled and individually transferable set of monetary rights associated with an amount of money, said unbundled and individually transferable set of monetary rights (R (α . . . τ, $)) selected from the group consisting of: a monetary right to invest (R (α, $)), a monetary right to earn interest (R (β, $)), a monetary right to use as collateral (R (χ, $)), a monetary right to hold as a store of value (R (δ, $)), a monetary right to make purchases (R (ϵ, $)), a monetary right to make payments (R, (ϕ, $)), a monetary right to lend (R (γ, $)), a monetary right to borrow (R (η, $)), and a monetary right to gift (R (τ, $)), and register said home financial institution and said external financial institution as participating financial institutions;

a home financial institution ELCN connected to said internet-based MRT network ELCN via the Internet, said home financial institution ELCN configured to maintain a first account which holds a monetary amount for an MRT network user, and wherein said MRT network user is an owner or holder of said monetary amount;

an external financial institution ELCN connected to said internet-based MRT network ELCN via the Internet, said external financial institution ELCN configured to maintain a second account for said MRT network user; and said internet-based MRT network ELCN is further configured to:

transfer, by said MRT network user, a subset of monetary rights associated with a monetary value held at said first account to said second account, wherein said subset of monetary rights comprises one or more of said monetary right to invest (R (α, $)), said monetary right to earn interest (R (β, $)), and said monetary right to lend (R (γ, $)), and wherein said monetary value comprises the whole monetary value or a partial monetary value of the monetary amount held at said first account; and said RTGS system is further configured to:

instantly record a debit equal to said monetary value in said home financial institution central bank account and a credit equal to said monetary value in said external financial institution central bank account, upon the RTGS system receiving notice from the internet-based MRT network ELCN that a non-transferred subset of monetary rights associated with said monetary value remains at said first account serving as full, non-leveraged collateral for said transferred subset of monetary rights; and said external financial institution ELCN is further configured to:

lend or invest a cash amount to earn a return, wherein said cash amount is based on the monetary value credited to said external financial institution central bank account, earn, by said MRT network user, an interest amount on the monetary value associated with said transferred subset of monetary rights, and receive, via said internet-based MRT network ELCN, a request to transfer the earned interest amount from said second account to said first account; and said RTGS system is further configured to:

capture said interest amount by recording a debit equal to a monetary value of said interest amount in said external financial institution central bank account and a credit equal to said monetary value of said interest amount in said home financial institution central bank account.

20. The system of claim 19, wherein said central bank is the United States Federal Reserve Bank, said country is the United States of America, and said RTGS system is the Fedwire RTGS system.

* * * * *